United States Patent
Mizuhashi et al.

(10) Patent No.: US 10,474,276 B2
(45) Date of Patent: *Nov. 12, 2019

(54) DISPLAY DEVICE AND TOUCH DETECTION DEVICE

(71) Applicant: Japan Display Inc., Tokyo (JP)

(72) Inventors: Hiroshi Mizuhashi, Tokyo (JP); Hayato Kurasawa, Tokyo (JP); Fumitaka Gotoh, Tokyo (JP); Daichi Suzuki, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 90 days.

This patent is subject to a terminal disclaimer.

(21) Appl. No.: 15/091,356

(22) Filed: Apr. 5, 2016

(65) Prior Publication Data
US 2016/0306489 A1    Oct. 20, 2016

(30) Foreign Application Priority Data

Apr. 17, 2015    (JP) .................................. 2015-085185

(51) Int. Cl.
*G06F 3/041*    (2006.01)
*G06F 3/044*    (2006.01)
*G06F 3/046*    (2006.01)

(52) U.S. Cl.
CPC ............ *G06F 3/0416* (2013.01); *G06F 3/044* (2013.01); *G06F 3/046* (2013.01); *G06F 2203/04106* (2013.01)

(58) Field of Classification Search
CPC combination set(s) only.
See application file for complete search history.

(56) References Cited

U.S. PATENT DOCUMENTS 5,798,756 A  *  8/1998  Yoshida .................  G06F 3/0412
                                                 345/179
6,459,272 B1 * 10/2002  Yamashita .........  G01R 31/2805
                                                 324/529

(Continued)

FOREIGN PATENT DOCUMENTS

JP    H10-049301 A    2/1998
JP    2005-352572 A   12/2005

(Continued)

OTHER PUBLICATIONS

Chinese Office Action dated May 21, 2018 in corresponding Chinese Application No. 2016102375909.

(Continued)

*Primary Examiner* — Temesghen Ghebretinsae
*Assistant Examiner* — Sosina Abebe
(74) *Attorney, Agent, or Firm* — K&L Gates LLP

(57) ABSTRACT

To provide a display device with a touch detection function capable of suppressing an increase in price. The display device is provided with a pixel array which includes a plurality of pixels; a plurality of signal lines which supply an image signal to the plurality of pixels; a plurality of drive electrodes which supply a drive signal to the plurality of pixels; and an electrode driving circuit which supplies a magnetic field drive signal to the drive electrode at a time of detecting an external proximity object using the magnetic field, and supplies an electric field drive signal to the drive electrode at a time of detecting the external proximity object using the electric field.

9 Claims, 35 Drawing Sheets

(56) References Cited

U.S. PATENT DOCUMENTS

| | | | |
|---|---|---|---|
| 9,760,220 B2 | 9/2017 | Tanaka | |
| 2005/0140866 A1* | 6/2005 | Chuang | G02F 1/133555 349/114 |
| 2007/0124515 A1 | 5/2007 | Ishikawa et al. | |
| 2007/0200487 A1* | 8/2007 | Uno | G06F 3/046 313/500 |
| 2010/0194698 A1* | 8/2010 | Hotelling | G06F 3/041 345/173 |
| 2010/0328249 A1* | 12/2010 | Ningrat | G06F 3/044 345/174 |
| 2012/0154326 A1* | 6/2012 | Liu | G06F 3/0412 345/174 |
| 2012/0169400 A1* | 7/2012 | Liu | G06F 3/0416 327/517 |
| 2013/0106769 A1* | 5/2013 | Bakken | G06F 3/044 345/174 |
| 2013/0162596 A1* | 6/2013 | Kono | G06F 3/044 345/174 |
| 2013/0207926 A1* | 8/2013 | Kremin | G06F 3/0383 345/174 |
| 2014/0002413 A1* | 1/2014 | Kim | G06F 3/0416 345/174 |
| 2014/0078104 A1* | 3/2014 | Lee | G06F 3/044 345/174 |
| 2014/0111466 A1* | 4/2014 | Kim | G06F 3/044 345/174 |
| 2014/0152621 A1* | 6/2014 | Okayama | G06F 3/044 345/174 |
| 2015/0091859 A1* | 4/2015 | Rosenberg | G06F 3/044 345/174 |
| 2015/0277601 A1* | 10/2015 | Tahara | G06F 3/03545 345/174 |
| 2016/0041644 A1* | 2/2016 | Bae | G06F 3/044 345/174 |
| 2016/0062532 A1* | 3/2016 | Tahara | G06F 3/0416 345/173 |

FOREIGN PATENT DOCUMENTS

| | | |
|---|---|---|
| JP | 2006-163745 A | 6/2006 |
| JP | 2007-257619 A | 10/2007 |
| JP | 2008152640 | 7/2008 |
| JP | 2010231533 | 10/2010 |
| JP | 2014164770 | 9/2014 |
| JP | 2015069595 | 4/2015 |

OTHER PUBLICATIONS

Japanese Office Action dated Jun. 19, 2018 in corresponding Japanese Application No. 2015-085185.

* cited by examiner

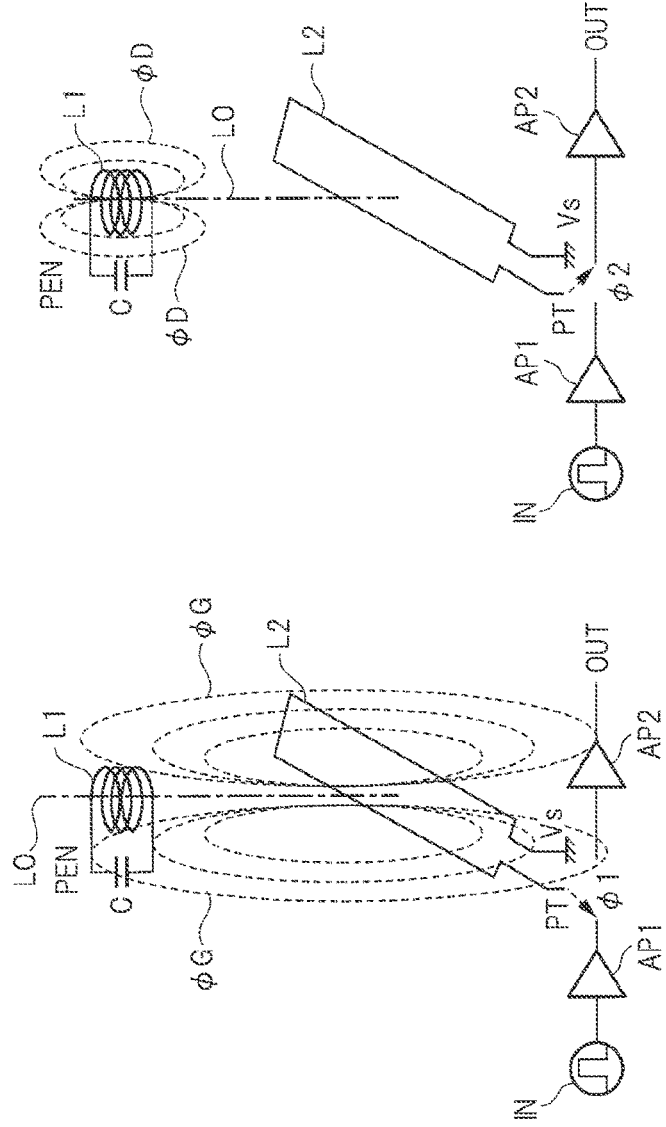

DISPLAY DEVICE AND TOUCH DETECTION DEVICE

CROSS-REFERENCE TO RELATED APPLICATION

The present application claims priority from Japanese Patent Application No. 2015-085185, filed on Apr. 17, 2015, the content of which is hereby incorporated by reference into this application.

FIELD OF THE INVENTION

The present invention relates to a display device and a touch detection device, and particularly to a display device with a touch detection function capable of detecting an external proximity object and a touch detection device capable of detecting an external proximity object.

BACKGROUND

Recently, a focus has been placed on a touch detection device, a so-called touch panel, which is capable of detecting an external proximity object. The touch panel is provided as a display device with a touch detection function in the state of being equipped on a display device, for example, on a liquid crystal display device, or being integrated with the liquid crystal display device.

There is provided a touch panel capable of using a pen as the external proximity object. For example, it is possible to designate a small area or input a handwritten letter by allowing the pen to be used. There are various types of techniques to detect touch by the pen. One of the various types of techniques is an electromagnetic induction system. This electromagnetic induction system can realize a high accuracy and a high writing pressure detection accuracy, and also can realize a hovering detection function in which the external proximity object is spaced apart from a touch panel surface, and thus, this is effective as a technique of detecting the touch by the pen.

Touch detection techniques using the electromagnetic induction system are described in, for example, Japanese Patent Application Laid-Open Publication No. H10 (1998)-49301 (Patent Document 1), No. 2005-352572 (Patent Document 2), and No. 2006-163745 (Patent Document 3).

Further, there is provided a touch detection device capable of detecting a finger or the like as the external proximity object. In this case, a detection target is different from the pen, and thus, another system, different from the electromagnetic induction system, is employed as a technique of detecting a touch. For example, there are systems that detect an optical change, a change of a resistance value, or a change of an electric field caused by touch of a finger or the like. For example, there is a capacitive system using a capacitance, as the system that detects the change of the electric field among these systems. This capacitive system has a relatively simple structure, and consumes low power, and thus, has been used in a portable information terminal or the like.

SUMMARY OF THE INVENTION

Examples of the electromagnetic induction system include a system in which a coil and a battery are mounted to a pen, a magnetic field is generated by the pen, and magnetic field energy is detected by a touch panel. In this case, the touch panel needs to include a sensor plate that receives the magnetic field energy. Further, there is another system in which a coil and a capacitor are mounted to a pen, a magnetic field is generated by a touch panel, and magnetic field energy is stored in the capacitor mounted to the pen and then is detected by the touch panel. In the case of this system, the magnetic field is generated by the touch panel, and a sensor plate to receive the magnetic field energy from the pen is required.

It is necessary to add the sensor plate in any of the electromagnetic induction systems, in order to realize the display device with a touch detection function, thereby leading an increase in price (production cost).

Further, it is necessary to provide a capacitive electrode for detecting a change in the capacitance, in the touch panel, even in the case of the capacitive system, thereby leading an increase in price.

The inventors of the present application have considered to provide a display device with a touch detection function capable of performing both detection of touch by a pen and detection of touch by a finger while suppressing an increase in the price, because the electromagnetic induction system is suitable for the detection of touch by the pen, and the capacitive system is suitable for the detection of touch by the finger.

Patent Documents 1 to 3 describe touch detection devices using the electromagnetic induction system. However, a technique capable of performing both the detection of touch by the pen and the detection of touch by the finger has not been described, and not recognized in any of the documents.

An object of the present invention is to provide a display device with a touch detection function capable of suppressing an increase in price.

A display device according to an embodiment of the present invention is provided with a pixel array which includes a plurality of pixels arranged in a matrix form; a plurality of scan lines which are arranged in each row of the pixel array, and supply a scan signal to the plurality of pixels arranged in a corresponding row; a plurality of signal lines which are arranged in each column of the pixel array, and supply an image signal to the plurality of pixels arranged in a corresponding column; and a plurality of drive electrodes which are arranged in parallel to each other in the pixel array, and supply a drive signal to the plurality of pixels at a time of displaying an image. The display device further includes an electrode driving circuit which supplies a magnetic field drive signal for generating a magnetic field to the drive electrode at a time of detecting an external proximity object using the magnetic field, and supplies an electric field drive signal for generating an electric field to the drive electrode at a time of detecting the external proximity object using the electric field.

Further, a display device according to another embodiment of the present invention is provided with a pixel array which includes a plurality of pixels arranged in a matrix form; a plurality of scan lines which are arranged in each row of the pixel array, and supply a scan signal to the plurality of pixels arranged in a corresponding row; a plurality of signal lines which are arranged in each column of the pixel array, and supply an image signal to the plurality of pixels arranged in a corresponding column; and a plurality of drive electrodes which are arranged in parallel to each other in the pixel array, and supply a drive signal to the plurality of pixels at a time of displaying an image. The plurality of drive electrodes are divided into a plurality of groups each of which has drive electrodes at a time of detecting an external proximity object, a coil is formed, in a first group among the plurality of groups, using the drive electrodes which are included in a second group and a third group adjacent to a first group as a winding, at the time of detecting the external proximity object which generates a magnetic field, and an electric field drive signal for generating an electric field is supplied to the drive electrodes included in the first group at a time of detecting a change of the electric field caused by the external proximity object.

Furthermore, a touch detection device according to another embodiment of the present invention is provided with a plurality of first wirings which are arranged in parallel to each other in a first area; a changeover adjustment circuit which is arranged in an area different from the first area, and electrically connects the plurality of first wirings such that a coil is formed using the plurality of first wirings, at a time of detecting an external proximity object using a magnetic field; and a plurality of second wirings which are arranged to intersect with the plurality of first wirings in the first area, and transmit a detection signal based on a change of an electric field, at a time of detecting the external proximity object using the electric field. The first wiring is used in common at the time of detecting the external proximity object using the magnetic field and at the time of detecting the external proximity object using the electric field.

BRIEF DESCRIPTIONS OF THE FIGURES

FIGS. 2A to 2D are explanatory diagrams illustrating a principle of an electromagnetic induction system;

DETAILED DESCRIPTION

Figure 1:
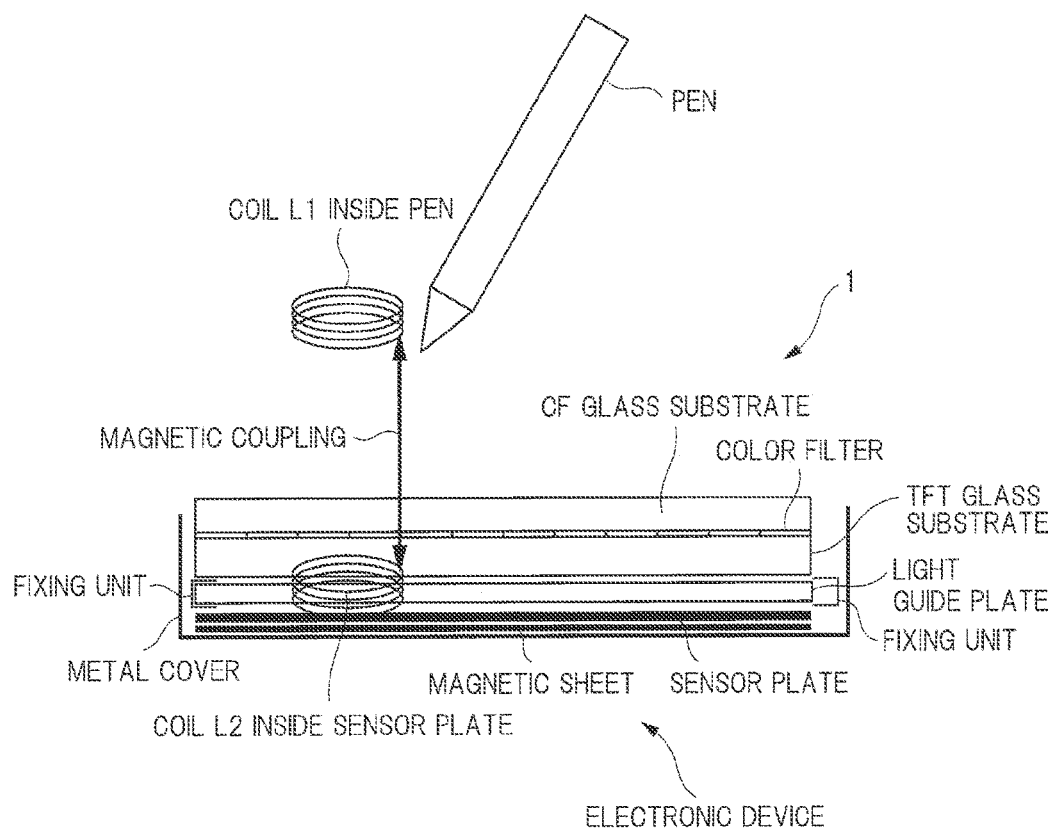
FIG. 1 is an explanatory diagram illustrating a relationship between an electronic device including a liquid crystal display device with a touch detection function and a pen.

Hereinafter, embodiments of the present invention will be described with reference to drawings. Note that the disclosures are provided by way of example, and any suitable variations easily conceived by a person with ordinary skill in the art while pertaining to the gist of the invention are, as a matter of course, included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention.

Further, in the specification and drawings, elements which are similar to those already mentioned with respect to previous drawings are denoted by the same reference characters, and detailed descriptions thereof will be suitably omitted.

The following description is given by exemplifying a liquid crystal display device with a touch detection function as a display device with a touch detection function. However, the invention is not limited thereto, and can be applied also to an OLED display device with a touch detection function. Further, there are the above-described two types of systems as the electromagnetic induction system, and the liquid crystal display device with a touch detection function according to the embodiments will be described by employing the latter system in which the battery is not necessarily mounted to the pen. Since the battery is not necessarily mounted to the pen, it is possible to reduce a size of the pen and/or to improve a degree of freedom in shape.

First Embodiment

<Basic Principle of Electromagnetic Induction System>

First, a description will be given regarding a basic principle of an electromagnetic induction system. FIG. 1 is an explanatory diagram schematically illustrating a relationship between an electronic device including a liquid crystal display device with a touch detection function and a pen. Further, FIGS. 2A to 2D are explanatory diagrams schematically illustrating the basic principle of the electromagnetic induction system.

In FIG. 1, an electronic device includes a liquid crystal display device 1 housed in a metal cover, a light guide plate, a sensor plate, and a magnetic sheet. The sensor plate is mounted between the liquid crystal display device 1 and the metal cover in the example illustrated in FIG. 1. The sensor plate is provided with a plurality of coils. FIG. 1 schematically illustrates one coil among the plurality of coils provided in the sensor plate as a coil L2 inside the sensor plate.

Further, a coil and a capacitive element are built in a pen that corresponds to an external proximity object. FIG. 1 does not illustrate the capacitive element while schematically illustrating the coil built in the pen as a coil L1 inside the pen. The coil L1 inside the pen is coupled to the coil L2 inside the sensor plate by a magnetic field.

Incidentally, a thin film transistor (TFT) glass substrate, a color filter and a color filter (CF) glass substrate, which are included in the liquid crystal display device 1, are drawn in FIG. 1 in order to schematically illustrate a structure of the liquid crystal display device 1. A TFT substrate is formed to include the TFT glass substrate and a TFT (not illustrated), and a color filter substrate is formed to include the CF glass substrate and the color filter. A liquid crystal layer (not illustrated) is held between the TFT substrate and the color filter substrate. Further, the light guide plate is fixed by a fixing unit to be sandwiched between the liquid crystal display device 1 and the sensor plate.

When the pen is close to the electronic device, the coil L1 inside the pen becomes close to the coil L2 inside the sensor plate. Accordingly, magnetic coupling between the coil L1 inside the pen (hereinafter, also referred to simply as the coil L1) and the coil L2 inside the sensor plate (hereinafter, also referred to simply as the coil L2) is generated, and the proximity of the pen is detected.

Such a detection will be described with reference to FIGS. 2A to 2D. FIG. 2A illustrates a state in which the coil L2 generates a magnetic field, and FIG. 2B illustrates a state in which the coil L1 generates a magnetic field.

In FIGS. 2A to 2D, the coil L2 and the capacitive element inside the pen (hereinafter, also referred to simply as the capacitive element) C are connected in parallel, thereby forming a resonant circuit. A coil of a single-turn winding is illustrated as an example of the coil L1, and the coil L1 has a pair of terminals. One terminal PT of the coil L1 is connected to an output of a transmission amplifier AP1 for a predetermined time, and is connected to an input of a reception amplifier AP2 for a predetermined time after elapse of the predetermined time at the time of detecting touch (during touch detection). Further, the other terminal of the coil L1 inside the sensor plate is connected to a ground voltage Vs during the touch detection.

FIGS. 2C and 2D are waveform diagrams illustrating an operation during the touch detection. The horizontal axis represents time in FIGS. 2C and 2D, FIG. 2C represents a waveform of the output of the transmission amplifier AP1, and FIG. 2D represents a waveform of an output of the reception amplifier AP2.

When one terminal PT of the coil L2 is connected to the output of the transmission amplifier AP1, a transmission signal IN with periodically changing voltage is supplied to the input of the transmission amplifier AP1. Accordingly, the transmission amplifier AP1 supplies a drive signal $\phi 1$ with periodically changing voltage, to one terminal of the coil L2 for a predetermined time (magnetic field generation period) TG depending on the change of the transmission signal IN as illustrated in FIG. 2C. Accordingly, the coil L2 generates a magnetic field. Magnetic lines at this time are indicated by $\phi G$ in FIG. 2A.

Since the magnetic lines $\phi G$ are generated around a winding of the coil L2, the magnetic field at an inner side of the coil L2 becomes strong. When the coil L1 is close to the coil L2, and a central axis LO of the coil L1 is present at the inner side of the coil L2 as illustrated in FIG. 2A, for example, the magnetic lines of the coil L2 reach the coil L1. That is, the coil L1 is arranged inside the magnetic field generated in the coil L2, and the coil L1 and the coil L2 are magnetically coupled. The coil L2 generates the magnetic field with periodically changing voltage, depending on the change of the drive signal $\phi 1$. Thus, an induced voltage is generated in the coil L1 according to action of mutual induction between the coil L2 and the coil L1. The capacitive element C is charged by the induced voltage generated by the coil L1.

After a predetermined time, the one terminal PT of the coil L2 is connected to an input of the reception amplifier AP2 for a predetermined time (magnetic field detection period) TD. If the capacitive element C is charged in the previous magnetic field generation period TG, the coil L1 generates a magnetic field by charge charged in the capacitive element C in the magnetic field detection period TD. Magnetic lines of the coil L1 generated by the charge charged in the capacitive element C are indicated by φD in FIG. 2B.

If the coil L1 inside the pen is close to the coil L2 inside the sensor plate during the touch detection, that is, in the magnetic field generation period TG and the magnetic field detection period TD, the charging of the capacitive element C is performed in the magnetic field generation period TG, and the magnetic lines φD of the coil L1 reach the coil L2 in the magnetic field detection period TD. Since the resonant circuit is configured using the coil L1 and the capacitive element C, the magnetic field generated by the coil L1 is changed depending on a time constant of the resonant circuit. As the magnetic field generated by the coil L1 is changed, an induced voltage is generated in the coil L2. A signal is changed in the one terminal PT of the coil L2 due to the induced voltage. This change of the signal is input to the reception amplifier AP2 as a detection signal φ2, and amplified therein, and output from the reception amplifier AP2 as a sense signal OUT in the magnetic field detection period TD.

Meanwhile, if the coil L1 inside the pen is close to the coil L2 inside the sensor plate during the touch detection, the capacitive element C is not charged, or a charge amount to be charged decreases in the magnetic field generation period TG. As a result, the magnetic lines OD of the magnetic field generated by the coil L1 do not reach the coil L2 in the magnetic field detection period TD. Thus, the detection signal φ2 in the one terminal PT of the coil L2 is not changed in the magnetic field detection period TD.

FIGS. 2C and 2D illustrate both states when the coil L1 inside the pen is close to and is not close to the coil L2 inside the sensor plate. That is, in FIGS. 2C and 2D, φ1 and φ2 on the left side illustrate a state in which the coil L1 is not close to the coil L2, and φ1 and φ2 on the right side illustrate a state in which the coil L1 is close to the coil L2. Thus, in FIG. 2D, the detection signal φ2 is not changed in the magnetic field detection period TD illustrated in the left side, and the detection signal φ2 is changed in the magnetic field detection period TD illustrated in the right side. It is possible to detect the touch by the pen by determining the case where the detection signal φ2 is changed as presence of the pen, and the case where the detection signal φ2 is not changed as absence of the pen.

Although FIGS. 2A to 2D illustrate the determination on the presence of the pen or the absence of the pen, it is possible to determine a distance between the pen and the sensor plate or writing pressure of the pen since a value of the detection signal φ2 is changed depending on a distance between the coil L1 and the coil L2.

Incidentally, when the terminal PT of the coil L2 is changed over from the output of the transmission amplifier AP1 to the input of the reception amplifier AP2, the terminal PT of the coil L2 is set to a floating state for a predetermined time until the energy stored in the coil L2 inside the sensor plate is discharged, and the terminal PT is connected to the input of the reception amplifier AP2 after the predetermined time.

In this manner, when the pen is present in the proximity (including contact with) of the coil L2 inside the sensor plate in the touch detection period, an output signal of the reception amplifier AP2 is changed in the magnetic field detection period TD. On the other hand, when the pen is not present in the proximity (including contact with) of the coil L2 inside the sensor plate, the output signal of the reception amplifier AP2 is not changed in the magnetic field detection period TD. That is, it is possible to detect whether the pen touches the proximity of the coil L2 inside the sensor plate using the output signal of the reception amplifier AP2. Further, the magnetic field energy to be applied from the coil L1 inside the pen to the coil L2 inside the sensor plate is changed in a case where the coil L2 inside the sensor plate and the coil L1 inside the pen are close to each other depending on the distance therebetween, and thus, it is also possible to determine the writing pressure of the pen from a value of the output signal of the reception amplifier AP2.

<Integrated Structure of Liquid Crystal Display Device and Sensor Plate>

The inventors of the present application has considered that an electronic device becomes costly in the case of separately preparing the liquid crystal display device 1 and the sensor plate as illustrated in FIG. 1 because the sensor plate is costly. Thus, the inventors have considered forming the sensor plate using a conductive layer (layer) inside the liquid crystal display device 1 such that the liquid crystal display device and the sensor plate are integrated. A description will be given regarding the liquid crystal display device that has been considered by the present inventors with reference to FIGS. 3A to 3C.

Figure 3A:
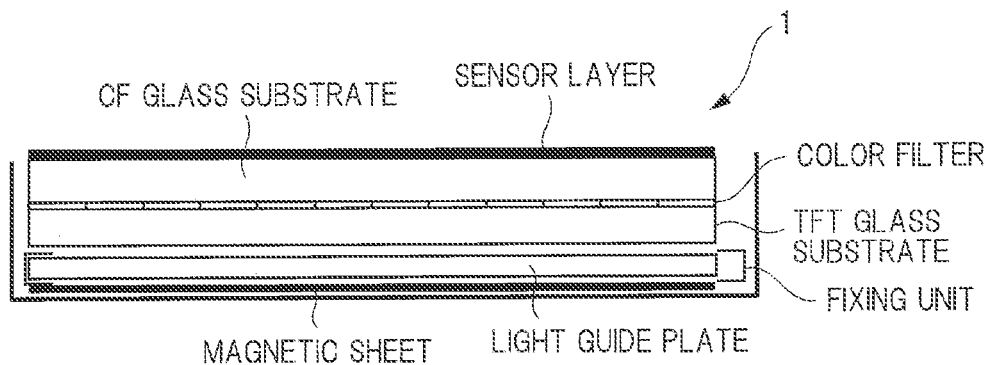
FIGS. 3A to 3C are cross-sectional views illustrating cross-sections of the liquid crystal display device.
Figure 3B:
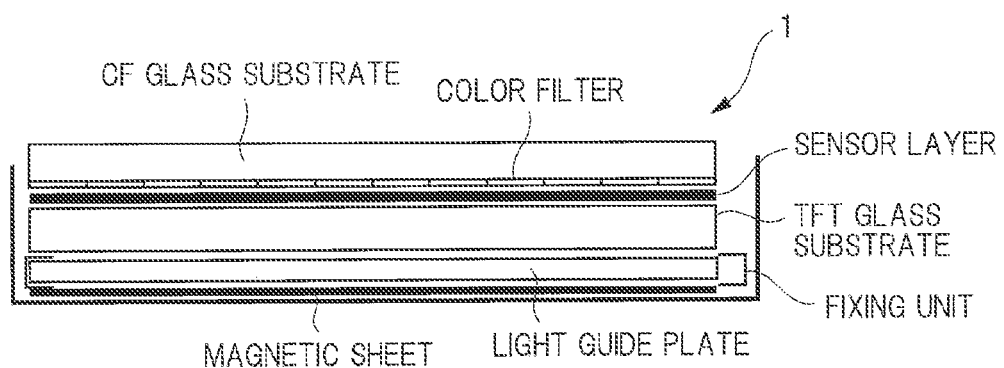
Figure 3C:
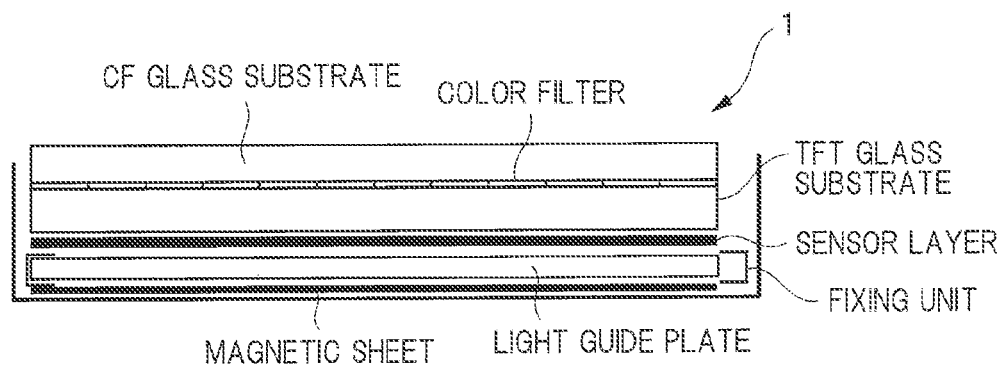

FIGS. 3A to 3C are cross-sectional views illustrating schematic cross-sections of the liquid crystal display device 1 with which the sensor plate is integrated, as a sensor layer (layer). FIGS. 3A to 3C are similar to FIG. 1, and thus, a different point will mainly be described. FIG. 3A is the cross-sectional view of a case where the sensor layer functioning as the sensor plate is formed on the CF glass substrate. FIG. 3B is the cross-sectional view of a case where the sensor layer is formed on the TFT glass substrate. Further, FIG. 3C is the cross-sectional view of a case where the sensor layer is formed on a rear surface of the TFT glass substrate. In FIG. 1, the sensor plate is prepared separately from the liquid crystal display device 1, and the sensor plate is provided between the light guide plate and the magnetic sheet. On the other hand, the sensor layer corresponding to the sensor plate is provided in the liquid crystal display device 1 in FIGS. 3A to 3C, and thus, it is possible to suppress an increase in price.

Figure 4:
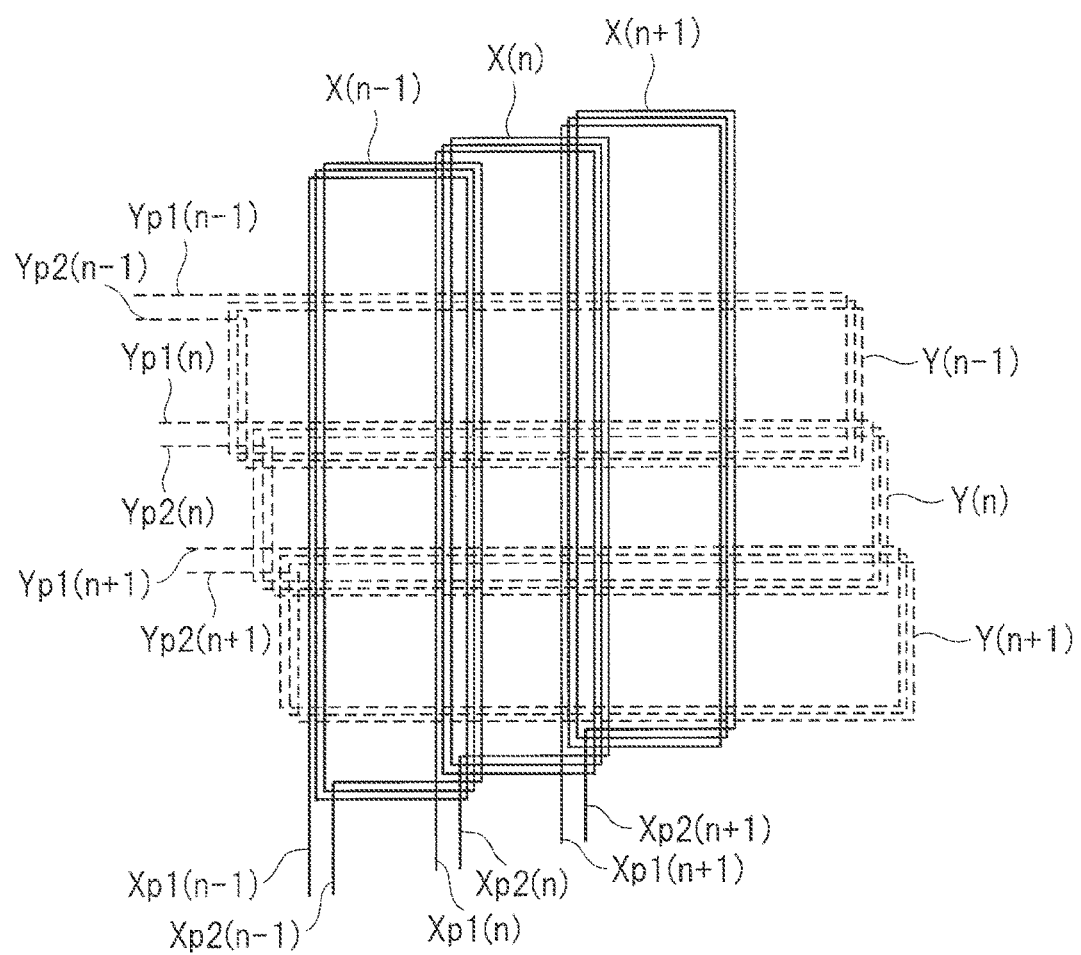
FIG. 4 is a plan view illustrating a configuration of a sensor layer.

FIG. 4 is a plan view illustrating a configuration of the sensor layer to be formed in FIGS. 3A to 3C. The sensor layer is provided with a plurality of coils arranged in a matrix form. That is, in FIG. 4, the sensor layer is provided with a plurality of coils X(0) to X(p), which extend in a vertical direction and are arranged side by side in a horizontal direction, and a plurality of coils Y(0) to Y(p) which extend in the horizontal direction and are arranged side by side in the vertical direction. FIG. 4 illustrates coils X(n−1) to X(n+1) and coils Y(n−1) to Y(n+1) among the plurality of coils. In the example illustrated in FIG. 4, each of the coils is formed as a coil of a plural-turn winding (a three-turn winding in FIG. 4).

The coils X(0) to X(p) are formed to have a partial overlap between the coils, adjacent to each other, in the coils X(0) to X(p) arranged in each column. When the coils X(n) to X(n+1) illustrated in FIG. 4 are exemplified, the coil X(n) is adjacent to the coils X(n−1) and X(n+1), and the coil X(n) has a part overlapping with each of the coil X(n−1) and the coil X(n+1). That is, the coils are formed such that each part of the windings of the coils X(n−1) and X(n+1) is arranged at an inner side of the winding of the coil X(n), thereby allowing the coils to be overlapped with each other. Each of the coils X(0) to X(p) has a pair of end portions, and a drive signal with a periodically changing voltage value is supplied to one-side end portions Xp1(0) to Xp1(p) among the respective pairs of end portions in the magnetic field generation period. On the other hand, a change of the voltage in the one-side end portions Xp1(0) to Xp1(p) is detected in the magnetic field detection period. Further, a predetermined voltage (for example, the ground voltage Vs) is supplied to the other-side end portions Xp2(0) to Xp2(p) of the coils X(0) to X(p) in the touch detection period.

It is possible to detect whether the pen touches or comes close to the coils X(0) to X(p) by detecting whether the voltage changes in the one-side end portions Xp1(0) to Xp1(p) of the coils X(0) to X(p) in the magnetic field detection period, as described in FIGS. 2A to 2D.

The coils Y(0) to Y(p) arranged in each row are the same as the coils X(0) to X(p). That is, the coils Y(0) to Y(p) are formed to have a partial overlap between the coils adjacent to each other. When the coils Y(n−1) to Y(n+1) are exemplified, the coils are formed such that each part of the windings of the coils Y(n−1) and X(Y+1) is arranged at an inner side of the winding of the coil Y(n), thereby allowing the coils to be overlapped with each other. A drive signal with a periodically changing voltage value is supplied to one-side end portions Yp1(0) to Yp1(p) of the coils Y(0) to Y(p) in the magnetic field generation period. On the other hand, a change of the voltage in the one-side end portions Yp1(0) to Yp1(p) is detected in the magnetic field detection period. Further, a predetermined voltage (for example, the ground voltage Vs) is supplied to the other-side end portions Yp2(0) to Yp2(p) of the coils Y(0) to Y(p) in the touch detection period. Accordingly, it is possible to detect whether the pen touches or comes close to the coils Y(0) to Y(p) by detecting whether the voltage changes in the one-side end portions Yp1(0) to Yp1(p) of the coils Y(0) to Y(p) in the magnetic field detection period during the touch detection period, as described in FIGS. 2A to 2D.

The coils X(0) to X(p) and the coils Y(0) to Y(p) are arranged to intersect with each other. Thus, it is possible to obtain a coordinate of a position touched by the pen by detecting that the pen touches or comes close to the coils X(0) to X(p), and that the pen touches or comes close to the coils Y(0) to Y(p). Although the coils X(0) to X(p) and the coils Y(0) to Y(p) are arranged to intersect with each other, an insulator is provided between each of the coils X(0) to X(p) and each of the coils Y(0) to Y(p).

Accordingly, it is possible to provide the liquid crystal display device capable of detecting the touch by the pen without using the sensor plate. Hereinafter, the technique of performing the detection of touch using the magnetic field will be also referred to as a magnetic field touch detection.

In the liquid crystal display device 1, a scan line, a signal wiring and a drive electrode, which will be described later, are formed between the TFT glass substrate and the color filter. These wirings (the scan line, the signal wiring, and the drive electrode) are used at the time of displaying an image, but it is possible to achieve the structure illustrated in FIG. 3B without adding the sensor layer by forming the coils X(0) to X(p) and/or the coils Y(0) to Y(p) using these wirings at the time of performing the touch detection. Accordingly, it is possible to provide the liquid crystal display device with the touch detection function, while suppressing an increase in the price of the liquid crystal display device 1. Hereinafter, a description will be given regarding an aspect of a case where the sensor layer is provided on the TFT glass substrate, as illustrated in FIG. 3B.

<Basic Principle of Capacitive System>

Since the basic principle of detection of touch by the pen has been described with reference to FIGS. 1 to 4, a basic principle of detection of touch by a finger will be described next. Here, the description will be given by exemplifying a capacitive system.

In the first embodiment, a detection electrode is formed on an upper surface side of the CF glass substrate illustrated in FIG. 3B. An electrode of the capacitive system is configured by this detection electrode and the drive electrode formed between the TFT glass substrate and the color filter.

Figure 5A:
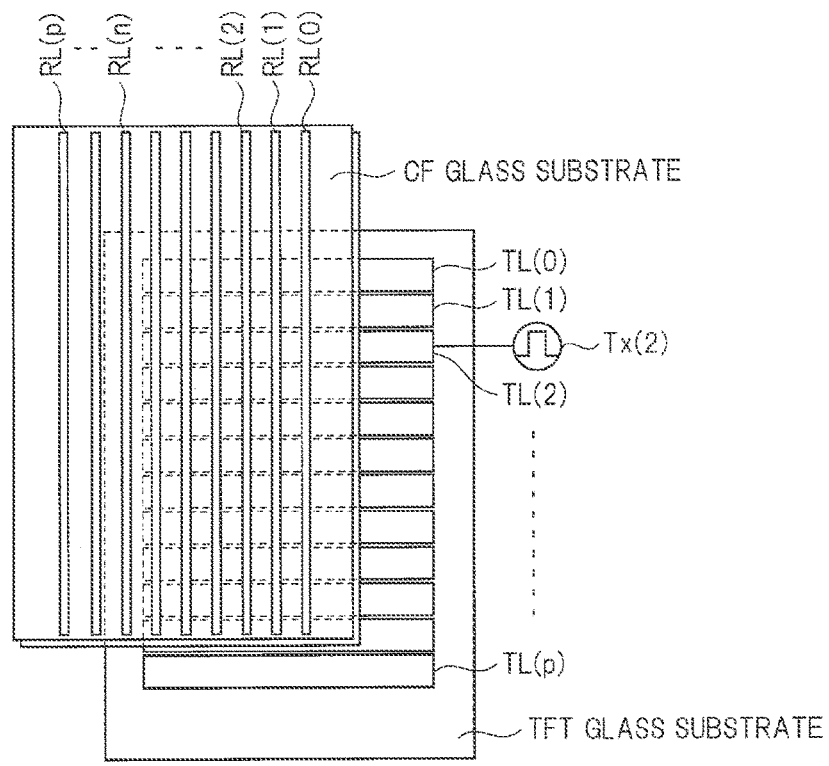
FIG. 5A is a plan view and FIG. 5B is a cross-sectional view, both of which schematically illustrate a configuration of a liquid crystal display device according to a first embodiment.
Figure 5B:
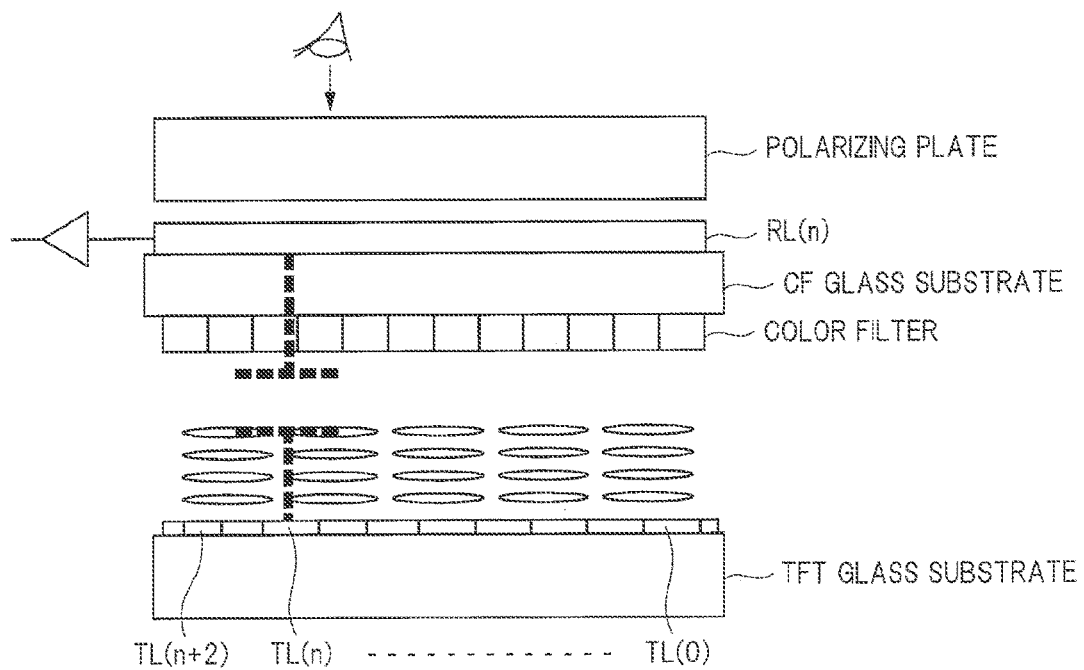

FIGS. 5A and 5B are diagrams schematically illustrating the configuration of the liquid crystal display device 1, FIG. 5A schematically illustrates a plane surface of the liquid crystal display device 1, and FIG. 5B schematically illustrates a cross-section of the liquid crystal display device 1. Reference signs TL(0) to TL(p) indicate the drive electrodes, and reference signs RL(0) to RL(p) indicate the detection electrodes in FIGS. 5A and 5B.

The drive electrodes TL(0) to TL(p) are formed in the TFT glass substrate. Each of the drive electrodes TL(0) to TL(p) extends in the horizontal direction (row direction) and is arranged in parallel in the vertical direction (column direction) in FIG. 5A. Further, the detection electrodes RL(0) to RL(p) are formed in the CF glass substrate. Each of the detection electrodes RL(0) to RL(p) extends in the vertical direction (column direction), and is arranged in parallel in the horizontal direction (row direction) in FIG. 5A.

The CF glass substrate and the TFT glass substrate are drawn to be separated from each other, in FIG. 5A, in order to allow clear understanding of the drive electrodes TL(0) to TL(p) and the detection electrodes RL(0) to RL(p). Meanwhile, the CF glass substrate is arranged on the upper side of the TFT glass substrate to overlap with each other as illustrated in FIG. 5B. That is, the drive electrodes TL(0) to TL(p) are formed on the upper side of the TFT glass substrate, the color filter is formed on the upper side of the drive electrodes TL(0) to TL(p), and the CF glass substrate is further formed on the upper side thereof. The detection electrodes RL(0) to RL(p) are formed on the upper side of the CF glass substrate, and a polarizing plate is further formed on the upper side thereof.

Although the description has been given in FIGS. 5A and 5B using the upper side in the case of being visually observed from the upper side, as illustrated in FIG. 5B, in order to make the description easy, as a matter of course, the upper side can be changed, to a lower side or a lateral side depending on a direction of being visually observed. Further, the capacitive element to be formed between a drive electrode TL(n) and a detection electrode RL(n) is illustrated by the broken line in FIG. 5B.

The drive electrodes TL(0) to TL(p) are physically separated from each other, and the detection electrodes RL(0) to RL(p) are also physically separated from each other. Although the drive electrodes TL(0) to TL(p) and the detection electrodes RL(0) to RL(p) are arranged to intersect with each other, the drive electrodes TL(0) to TL(p) and the detection electrodes RL(0) to RL(p) are physically separated from each other, as illustrated in FIG. 5B.

Here, a drive signal for display (display drive signal) is supplied to the drive electrodes TL(0) to TL(p) at the time of display, and a drive signal for touch detection is supplied thereto at the time of detecting a touch by the finger. In the first embodiment, the detection of the touch by the finger is performed using an electric field. Hereinafter, the detection of the touch, performed using the electric field, will be also referred to as an electric field touch detection so to be distinguished from the magnetic field touch detection. The drive signals corresponding to the display and the electric field touch detection are supplied to the drive electrodes TL(0) to TL(p). That is, the drive electrodes TL(0) to TL(p) are commonly used (used in common) at the time of display and at the time of electric field touch detection. It is possible to say that each of the drive electrodes TL(0) to TL(p) is a common electrode when seen from a viewpoint of being commonly used at the time of display. Thus, the drive electrodes TL(0) to TL(p) are referred to as the common electrodes in some cases in the present specification.

A drive signal Tx is supplied to the drive electrodes TL(0) to TL(p) in a period for the electric field touch detection. A signal with periodically changing voltage is supplied as the drive signal Tx to a drive electrode selected to detect the touch, and a predetermined fixed voltage, for example, is supplied as the drive signal Tx to a drive electrode which is not selected not to detect the touch. The drive electrodes TL(0) to TL(p) are sequentially selected, for example, in the period for the electric field touch detection. Although FIG. 5A illustrates a state in which the signal with the periodically changing voltage is supplied to the drive electrode TL(2) as a drive signal Tx(2), the drive electrode is sequentially selected from the drive electrode TL(0) to (p), and the drive signal with the periodically changing voltage is supplied to the drive electrode, for example.

On the other hand, a predetermined fixed voltage or a voltage in accordance with an image to be displayed is supplied to the drive electrodes TL(0) to TL(p) as the display drive signal in a period for the display.

Figure 6A:
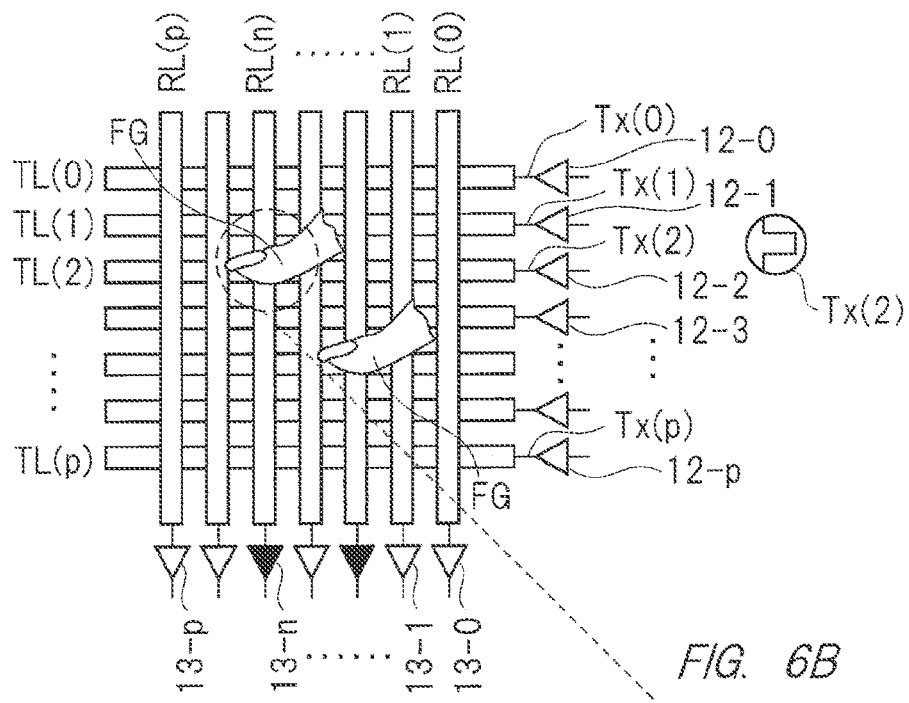
FIGS. 6A to 6C are explanatory diagrams illustrating a principle of a capacitive system.
Figure 6B:
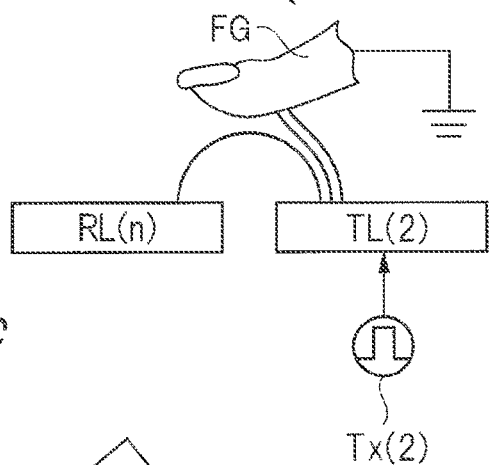
Figure 6C:
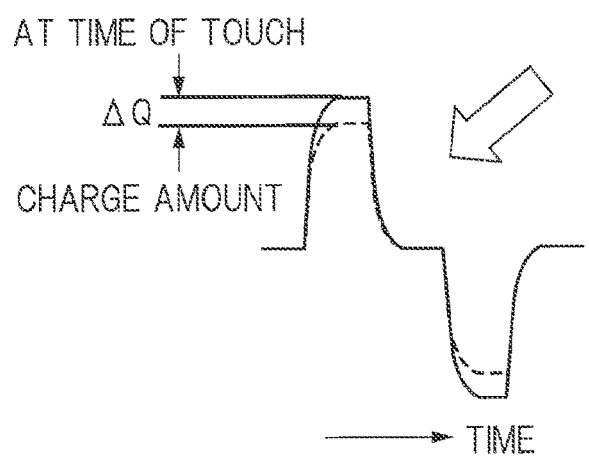

Next, a basic principle of the capacitive system will be described with reference to FIGS. 6A to 6C. In FIGS. 6A to 6C, reference signs TL(0) to TL(p) indicate the drive electrodes illustrated in FIGS. 5A and 5B, and reference signs RL(0) to RL(p) indicate the detection electrodes illustrated in FIGS. 5A and 5B. In FIG. 6A, the respective drive electrodes TL(0) to TL(p) extend in the row direction, and are arranged in parallel in the column direction. Further, the respective detection electrodes RL(0) to RL(p) extend in the column direction and are arranged in parallel in the row direction so as to intersect with the drive electrodes TL(0) to TL(p). The detection electrodes RL(0) to RL(p) are formed above the drive electrodes TL(0) to TL(p) such that a gap is formed between the detection electrodes RL(0) to RL(p) and the drive electrodes TL(0) to TL(p), as illustrated in FIG. 5B.

In FIG. 6A, each of 12-0 to 12-$p$ schematically illustrates a unit drive electrode driver. In FIG. 6A, the drive signals Tx(0) to Tx(p) are output from the unit drive electrode drivers 12-0 to 12-$p$. Further, each of 13-0 to 13-$p$ schematically illustrates a unit amplification unit. In FIG. 6A, a pulse signal illustrated as a solid line circle indicates a waveform of the drive signal Tx to be supplied to the selected drive electrode. The finger is illustrated by FG as an external detection object in FIG. 6A.

The pulse signal is supplied from the unit drive electrode driver 12-2 to the drive electrode TL(2) as the drive signal Tx(2) in the examples of FIGS. 6A to 6C. When the drive signal Tx(2), which is the pulse signal, is supplied to the drive electrode TL(2), an electric field is generated between the drive electrode TL(2) and the detection electrode RL(n) as illustrated in FIG. 6B. At this time, when the finger FG touches a position close to the drive electrode TL(2) of the liquid crystal panel, an electric field is also generated between the finger FG and the drive electrode TL(2), and the electric field generated between the drive electrode TL(2) and the detection electrode RL(n) is reduced. Accordingly, a charge amount between the drive electrode TL(2) and the detection electrode RL(n) is reduced. As a result, the charge amount generated in response to the supply of the drive signal Tx(2) is reduced by $\Delta Q$ at the time of the touch of the finger FG, compared to the time of the non-touch thereof, as illustrated in FIG. 6C. A difference in charge amount is represented, as a difference in voltage, in the detection signal Rx(n), which is supplied to the unit amplification unit 13-$n$ and amplified therein.

Incidentally, the horizontal axis represents time, and the vertical axis represents the charge amount in FIG. 6C. The charge amount increases (increases in the upper side in FIG. 6C) in response to a rise in voltage of the drive signal Tx(2), and the charge amount increases (increases in the lower side in FIG. 6C) in response to a drop in voltage of the drive signal Tx(2). At this time, an increasing amount of charge is changed depending on absence or presence of the touch of the finger FG. Further, in FIG. 6C, reset of the charge amount is performed before the charge amount increases in the lower side after increasing in the upper side, and reset is performed similarly before the charge amount increases in the upper side after increasing in the lower side. In this manner, the charge amount is vertically changed with the reset charge amount as a reference.

When the drive electrodes TL(0) to TL(p) are sequentially selected and the drive signals Tx(0) to Tx(p), which are the pulse signals, are supplied to the selected drive electrode, the detection signals Rx(0) to Rx(p), each of which has a voltage value in response to whether the finger FG touches the position close to each intersection point between the selected drive electrode and the plurality of detection electrodes RL(0) to RL(p), are output from each of the plurality of detection electrodes RL(0) to RL(p) intersecting with the selected drive electrode. Each of the detection signals Rx(0) to Rx(p) is sampled, and is converted into a digital signal using an analog/digital conversion (hereinafter, referred to as the A/D conversion) unit at a time at which a difference $\Delta Q$ is generated in the charge amount. A coordinate of a touched position is extracted by signal-processing of the digital signal converted by the A/D conversion unit.

<Overall Outline of Liquid Crystal Display Device>

Figure 7:
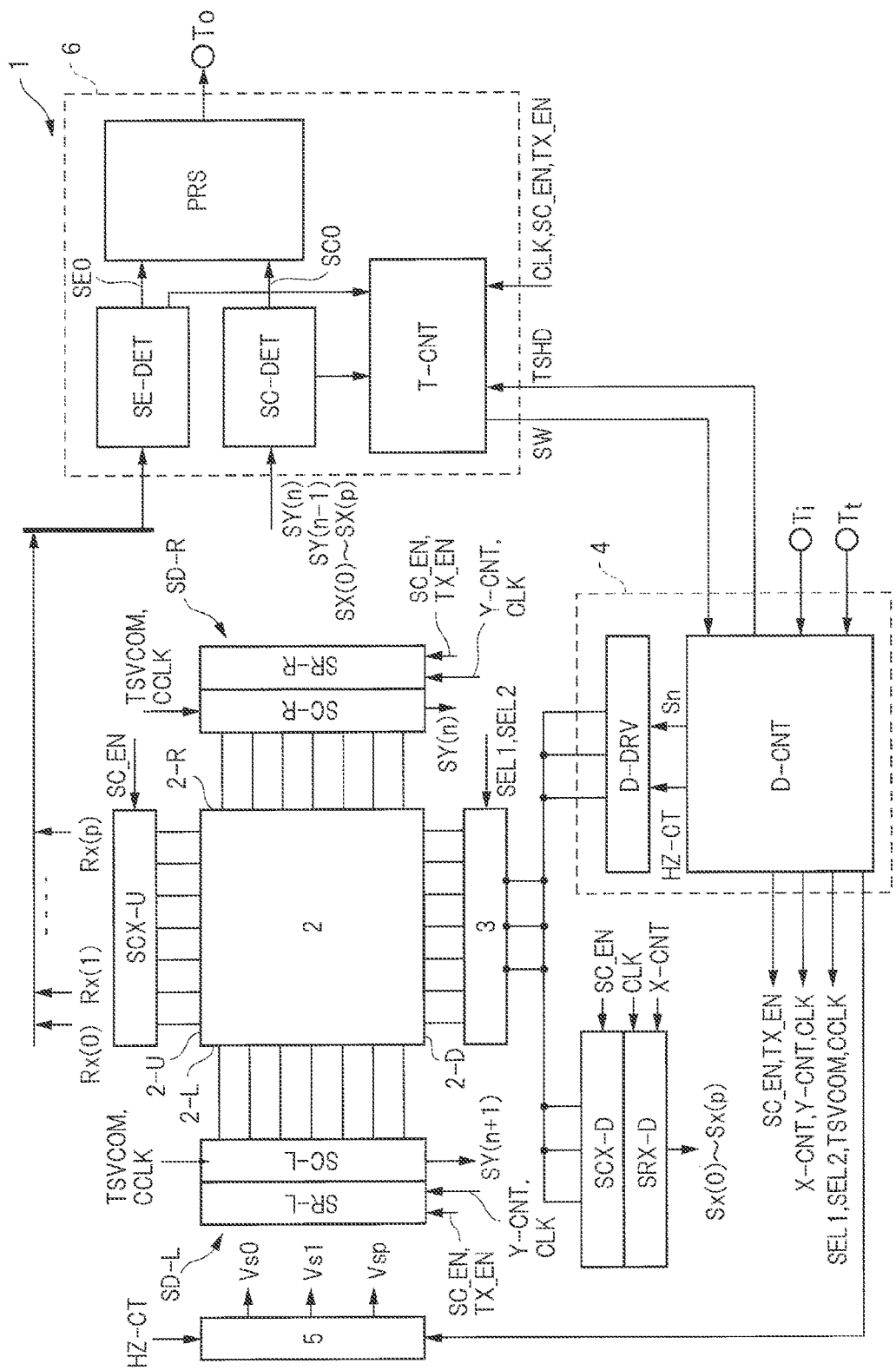
FIG. 7 is a block diagram illustrating a configuration of the liquid crystal display device according to the first embodiment.

FIG. 7 is a block diagram illustrating a configuration of the liquid crystal display device 1 according to the first embodiment. In FIG. 7, the liquid crystal display device 1 is provided with the display panel (liquid crystal panel), a display control device 4, a gate driver 5 and a touch control device 6. Further, the liquid crystal display device 1 is provided with changeover adjustment circuits SC-L, SC-R, SCX-U, and SCX-D and selection control circuits SR-L, SR-R and SRX-D. Since details of these devices and circuits included in the liquid crystal display device 1 will be described later, an overall outline thereof will be described here. The display panel is provided with a display area (display section) to perform display and a peripheral area (peripheral section). The display area is an active area, and the peripheral area is a non-active area, when seen from a viewpoint of the display. Reference numeral 2 represents the display area (active area) in FIG. 7.

The display area 2 includes a pixel array LCD in which a plurality of pixels are arranged in a matrix form. A plurality of signal lines, a plurality of drive electrodes, a plurality of scan lines, and a plurality of detection electrodes are arranged in the pixel array LCD. Here, the signal lines are arranged in each column of the pixel array LCD, the drive electrodes are arranged in rows of the pixel array LCD, the plurality of scan lines are arranged in each row of the pixel array LCD, and the detection electrodes are arranged in the columns of the pixel array LCD. That is, the signal wirings extend in the vertical direction (column direction), and are arranged in parallel in the horizontal direction (row direction) in FIG. 7. Further, the drive electrodes extend in the horizontal direction, and are arranged in parallel in the vertical direction. Further, the scan lines extend in the horizontal direction, and are arranged in parallel in the vertical direction, and the detection electrodes extend in the vertical direction, and are arranged in parallel in the horizontal direction. In this case, the pixel is arranged in a portion at which the signal line and the scan line intersect with each other. The pixel is selected by the signal line and the scan line, a voltage of the signal line and a voltage of the drive electrode at the time are applied to the selected pixel, and the selected pixel performs display according to a voltage difference between the signal line and the drive electrode, in the period of the display (display period).

The display control device 4 is provided with a control circuit D-CNT and a signal line driver D-DRV. The control circuit D-CNT receives a timing signal to be supplied to an external terminal Tt and image information to be supplied to an input terminal Ti, forms an image signal Sn according to the image information to be supplied to the input terminal Ti, and supplies the image signal Sn to the signal line driver D-DRV. The signal line driver D-DRV supplies the supplied image signal Sn to a signal line selector 3 in a time division manner in the display period. Further, the control circuit D-CNT receives the timing signal to be supplied to the external terminal Tt and a control signal SW from the touch control device 6, and forms various types of control signals. Examples of the control signal to be formed by the control circuit D-CNT include selection signals SEL1 and SEL2 to be supplied to the signal line selector 3, a synchronization signal TSHD, a clock signal CLK, a magnetic field enable signal SC_EN, an electric field enable signal TX_EN, a control signal TSVCOM with a periodically changing voltage, control signals TX-CNT and Y-CNT relating to the touch detection, a coil clock signal CCLK, a high impedance control signal HZ-CT, and the like.

The liquid crystal display device 1 according to the first embodiment is configured to be capable of performing the magnetic field touch detection and the electric field touch detection. The magnetic field enable signal SC_EN, among the signals to be formed by the control circuit D-CNT is an enable signal indicating implementation of the magnetic field touch detection, and the electric field enable signal TX-EN is an enable signal indicating implementation of the electric field touch detection. Further, the synchronization signal TSHD is a synchronization signal to identify the period in which the display is performed in the display area 2 (the display period) and the period in which the touch detection is performed (the touch detection period).

The signal line driver D-DRV supplies the image signal Sn to the signal line selector 3 in a time division manner according to the selection signals SEL1 and SEL2 in the display period. The signal line selector 3 is connected to the plurality of signal lines arranged in the display area 2, and supplies the supplied image signal to a suitable signal line according to the selection signals SEL1 and SEL2 in the display period. The gate driver 5 forms scan line signals Vs0 to Vsp according to the timing signal from the control circuit D-CNT, and supplies the scan line signal to the scan line inside the display area 2 in the display period. A pixel connected to a scan line to which a high-level scan line signal is supplied is selected, and the selected pixel performs display according to the image signal supplied to the signal line at the time, thereby performing the display, in the display period.

Further, the high impedance control signal HZ-CT from the control circuit D-CNT is supplied to the signal line driver D-DRV and the gate driver 5, although not particularly limited. Each output of the signal line driver D-DRV and the gate driver 5 is set to a high-impedance state by the high impedance control signal HZ-CT in the touch detection period, although not particularly limited.

The touch control device 6 is provided with a magnetic field detection circuit SC-DET to receive sense signals SX(0) to SX(p) and SY(n) and SY(n+1), an electric field detection circuit SE-DET to receive the detection signals Rx(0) to Rx(p), a processing circuit PRS, which processes a detection signal SC-0 from the magnetic field detection circuit SC-DET and a detection signal SE-0 from the electric field detection circuit SE-DET and extracts the coordinate of the touched position, and a control circuit T-CNT. The control circuit T-CNT receives the synchronization signal TSHD, the clock signal CLK, the magnetic field enable signal SC_EN, and the electric field enable signal TX_EN from the display control device 4, and controls the touch control device 6 to operate in synchronization with the display control device 4.

That is, the electric field detection circuit SE-DET, the magnetic field detection circuit SC-DET and the processing circuit PRS are controlled to operate while the synchronization signal TSHD indicates the touch detection period. Further, the control circuit T-CNT causes the magnetic field detection circuit SC-DET to operate at the time of magnetic field touch detection, and causes the electric field detection circuit SE-DET to operate at the time of electric field touch detection. Further, the control circuit T-CNT receives the detection signal from the magnetic field detection circuit SC-DET and the electric field detection circuit SE-DET, forms the control signal SW, and supplies the control signal to the control circuit D-CNT. The processing circuit PRS outputs the extracted coordinate from an external terminal To as coordinate information.

The display area 2 has sides 2-U and 2-D, which are parallel to the row of the pixel array LCD, and sides 2-R and 2-L which are parallel to the column of the pixel array LCD. Here, the side 2-U and the side 2-D are opposed to each other, and are arranged such that the plurality of drive electrodes and the plurality of scan lines in the pixel array LCD are sandwiched between the two sides. Further, the side 2-R and the side 2-L are opposed to each other, and are arranged such that the plurality of signal lines and the plurality of detection electrodes in the pixel array LCD are sandwiched between the two sides.

The changeover adjustment circuit SC-R is arranged in the peripheral area of the display panel along the side 2-R of the display area 2, and the changeover adjustment circuit SC-L is arranged in the peripheral area of the display panel along the side 2-L of the display area 2. The changeover adjustment circuit SC-R is connected to the plurality of drive electrodes arranged in the display area 2 on the side 2-R of the display area 2, and the changeover adjustment circuit SC-L is connected to the plurality of drive electrodes arranged in the display area 2 on the side 2-L of the display area 2. That is, the changeover adjustment circuits SC-R and SC-L are arranged in the peripheral area (the outer portion) of the display panel, and is connected to the drive electrode arranged in the display area 2 on the side of the display area 2.

The selection control circuit SR-R is arranged in the peripheral area of the display panel along the side 2-R of the display area 2, although not particularly limited, corresponds to the changeover adjustment circuit SC-R arranged along the same side 2-R, and controls the corresponding changeover adjustment circuit SC-R in the touch detection period. Further, the selection control circuit SC-L is arranged in the peripheral area of the display panel along the side 2-L of the display area 2, corresponds to the changeover adjustment circuit SC-L arranged along the same side 2-L, and controls the corresponding changeover adjustment circuit SC-L in the touch detection period.

That is, in a case where the magnetic field touch detection is designated by the magnetic field enable signal SC_EN in the touch detection period, the selection control circuits SR-R and SR-L control the changeover adjustment circuits SC-R and SC-L such that a coil is formed by the drive electrode arranged in the area that detects the touch. The changeover adjustment circuit SC-R or SC-L supplies a coil clock signal CCLK with a periodically changing voltage to the formed coil as a magnetic field drive signal.

Accordingly, when the pen (including the coil L1 and the capacitive element C) as illustrated in FIG. 1 is present in the area to detect the touch at the time of magnetic field touch detection, the voltage in the end portion of the coil is changed in the magnetic field detection period. This changing voltage is output from the changeover adjustment circuit SC-R or SC-L to the touch control device 6 as the sense signal SY(n) or SY(n+1). Incidentally, n is 0 to p−1 in the sense signals SY(n) and SY(n+1) illustrated in FIG. 7, and the changeover adjustment circuit and the selection control circuit are arranged on both the sides 2-R and 2-L of the display area 2 in the first embodiment, and the sense signal is alternately output in the touch detection period.

When the electric field touch detection is designated not by the magnetic field enable signal SC_EN but by the electric field enable signal TX_EN in the touch detection period, the control signal TSVCOM is supplied to the drive electrode arranged in the area to detect the touch from the changeover adjustment circuits SC-R and SC-L, as the electric field drive signal. Since the control signal TSVCOM has the periodically changing voltage, the voltage of the drive electrode arranged in the area to detect the touch is also periodically changed.

The plurality of detection electrodes are arranged in the display area 2 so as to intersect with the drive electrodes. When an intersection area at which the drive electrode arranged in the area to detect the touch and the detection electrode intersect with each other, or the vicinity thereof is touched by the finger, the detection signals Rx(0) to Rx(p) are changed as described with reference to FIGS. 6A to 6C. The detection signals Rx(0) to Rx(p) are supplied to the touch control device 6.

The changeover adjustment circuit SCX-U is arranged in the peripheral area of the display panel along the side 2-U of the display area 2, and the changeover adjustment circuit SCX-U is connected to the plurality of signal lines arranged in the display area 2 on the side 2-U. That is, the changeover adjustment circuit SCX-U is arranged in the peripheral area (the outer portion) of the display panel, and is connected to the plurality of signal lines on the side 2-U of the display area 2. Further, the changeover adjustment circuit SCX-D is connected to the plurality of signal lines arranged in the display area 2 via the signal line selector 3 arranged along the side 2-D of the display area 2.

In a case where the magnetic field touch detection is designated by the magnetic field enable signal SC_EN in the touch detection period, the changeover adjustment circuits SCX-U and SCX-D electrically connects the signal lines arranged in the display area 2, forms the plurality of coils having the signal line as the winding. The selection control circuit SRX-D supplies the magnetic field drive signal with a periodically changing voltage from the plurality of coils formed by the signal lines, to the coil formed using the signal line arranged in the area to detect the touch, in the touch detection period. Accordingly, the magnetic field is generated in the coil formed using the signal line arranged in the area to detect the touch in the magnetic field generation period. Further, a signal of voltage depending on whether absence or presence of the touch of the pen is generated in the magnetic field detection period, and the signal is supplied from the selection control circuit SRX-D to the touch control device 6, as the sense signals SX(0) to SX(p).

Incidentally, the signal line selector 3 electrically connects the signal line and the changeover adjustment circuit SCX-D when the coil having the signal line as the winding is formed by the changeover adjustment circuits SCX-U and SCX-D.

In a case where the magnetic field touch detection is designated in the touch detection period, the magnetic field detection circuit SC-DET in the touch control device 6 is operated by the magnetic field enable signal SC_EN. The magnetic field detection circuit SC-DET amplifies each of the sense signals SY(n), SY(n+1) and SX(0) to SX(p), and coverts each amplified signal into the digital signal, and supplies the converted signal to the processing circuit PRS as the detection signal SC-O. The processing circuit PRS extracts a coordinate of a position touched by the pen based on the supplied detection signal SC-O, and outputs the coordinate from the external terminal To as the position information.

On the other hand, in a case where the electric field touch detection is designated in the touch detection period, the electric field detection circuit SE-DET in the touch control device 6 is operated by the electric field enable signal TX_EN. The electric field detection circuit SE-DET amplifies each of the detection signals Rx(0) to Rx(p), converts each amplified detection signal into the digital signal, and supplies the converted signal to the processing circuit PRS as the detection signal SE-O. At this time, the drive electrode to which the control signal TSVCOM is supplied is determined based on the control signal Y-CNT and the clock signal CLK that have been supplied to the selection control circuits SR-R and SR-L. The processing circuit PRS specifies the drive electrode to which the control signal TSVCOM is supplied based on the control signal Y-CNT and the clock signal CLK. Accordingly, the coordinate of the position touched by the finger is extracted based on the detection signal SE-O, and is output from the external terminal To as the coordinate information.

The outline of the operations of the changeover adjustment circuits SC-R, SC-L, SCX-U, and SCX-D and the selection control circuits SR-R, SR-L, and SRX-D in the touch detection period has been described as above, and the circuits operate as follows in the display period.

That is, the changeover adjustment circuits SC-R and SC-L supply the display drive signal to the plurality of drive electrodes in the display period. Further, the changeover adjustment circuits SCX-U and SCX-D electrically separate the signal lines from each other. Accordingly, the image signal Sn from the signal line driver D-DRV is supplied to a suitable signal line by the signal line selector 3 in the display period. Further, since the display drive signal is supplied to the drive electrode, the scan line is set to a high level, so that the voltage difference, between the image signal supplied to the signal line and the display drive signal supplied to the drive electrode, is applied to the selected pixel, and accordingly, the display according to the image signal is performed.

In this first embodiment, the drive electrode is used in common as the winding of the coil for generation of the magnetic field, and as the electrode for generation of the electric field, and as the drive electrode for the display. Further, the signal line is used in common as the winding of the coil for generation of the magnetic field, and as the signal line for transmitting the image signal. Accordingly, it is possible to provide the liquid crystal display device 1 having both functions of the magnetic field touch detection and the electric field touch detection while suppressing the increase in the manufacturing cost.

In the first embodiment, the display drive signal, the electric field drive signal or the magnetic field drive signal is supplied to the drive electrode by the changeover adjustment circuits SC-R and SC-L, and the selection control circuits SR-R and SR-L. Thus, it is possible to say that an electrode driving circuit SD is configured using the changeover adjustment circuits SC-R and SC-L and the selection control circuits SR-R and SR-L. When considering in this way, it is also possible to say that the electrode driving circuit SD is provided with the changeover adjustment circuit SC and the selection control circuit SR. In this case, it is possible to say that the changeover adjustment circuit SC is provided with a first changeover adjustment circuit SC-R arranged along the side 2-R (a first side) of the display area 2 and a second changeover adjustment circuit SC-L arranged along the side 2-L (a second side) of the display area 2. Further, it is also possible to say that the selection control circuit SR is provided with a first electrode driving circuit SD-R arranged along the side 2-R of the display area 2 and a second electrode driving circuit SD-L arranged along the side 2-L of the display area 2.

Similarly, the image signal or the electric field drive signal is supplied to the signal line by the changeover adjustment circuits SCX-U and SCX-D and the selection control circuit SRX-D. Thus, it is possible to say that a signal line driving circuit is configured using the changeover adjustment circuits SCX-U and SCX-D and the selection control circuit SRX-D. In this case, it is also possible to say that the signal line driving circuit is configured using a first changeover adjustment circuit SCX-U arranged along the side 2-U of the display area 2, a second changeover adjustment circuit SCX-D arranged along the side 2-D of the display area 2, and the selection control circuit SRX-D.

<Module Configuration of Liquid Crystal Display Device 1>

Figure 8:
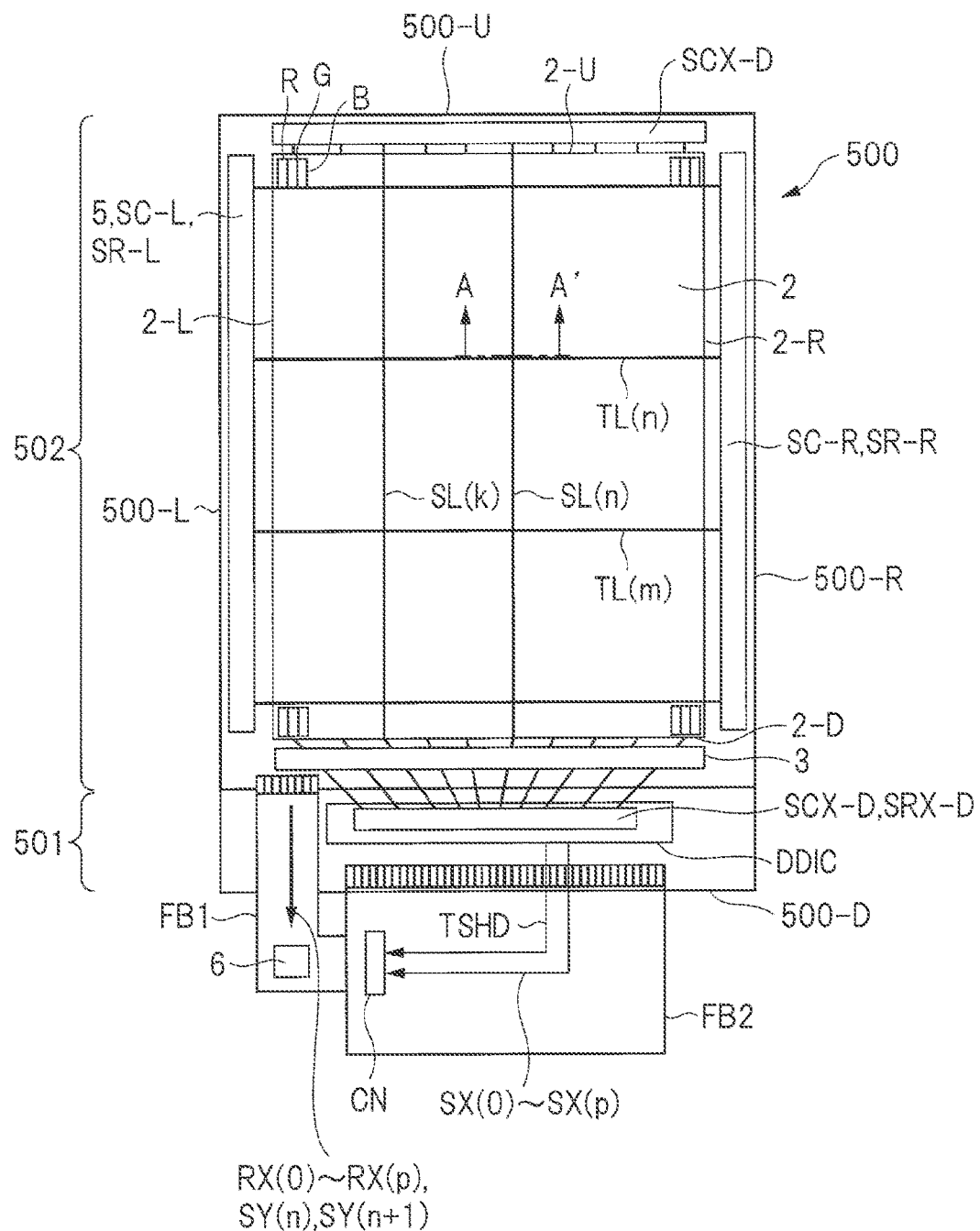
FIG. 8 is a plan view illustrating a configuration of a module to which the liquid crystal display device according to the first embodiment is mounted.

FIG. 8 is a schematic plan view illustrating the entire configuration of a module 500 to which the liquid crystal display device 1 is mounted. FIG. 8 is schematically drawn in accordance with the actual arrangement. In FIG. 8, reference numeral 501 represents an area in the TFT glass substrate illustrated in FIGS. 3B, 5A and 5B, and reference numeral 502 represents an area having the TFT glass substrate and the CF glass substrate illustrated in FIGS. 3B, 5A and 5B. The TFT glass substrate is integrated in the module 500. That is, the TFT glass substrate is used in common in the area 501 and the area 502, and the CF glass substrate or the like is further formed on an upper surface (surface opposing the TFT glass substrate) of the TFT glass substrate in the area 502 as illustrated in FIGS. 3B, 5A and 5B.

In FIG. 8, reference numeral 500-U represents a short side of the module 500, and reference numeral 500-D represents a side of the module 500, that is, a short side opposing the short side 500-U. Further, reference numeral 500-L represents a long side of the module 500, and reference numeral 500-R represents a side of the module, that is, a long side opposing the long side 500-L.

The gate driver 5, the changeover adjustment circuit SC-L and the selection control circuit SR-L illustrated in FIG. 7 are arranged in an area between the side 2-L of the display area 2 and the long side 500-L of the module 500 in the area 502. Further, the changeover adjustment circuit SC-R and the selection control circuit SR-R illustrated in FIG. 7 are arranged in an area between the side 2-R of the display area 2 (the active area) and the long side 500-R of the module 500. The changeover adjustment circuit SCX-U illustrated in FIG. 7 is arranged in an area between the side 2-U of the display area 2 (the active area) and the short side 500-U of the module 500.

Further, the signal line selector 3, the changeover adjustment circuit SCX-D, the selection control circuit SRX-D and the drive semiconductor device DDIC illustrated in FIG. 7 are arranged in an area between the side 2-D of the display area 2 and the short side 500-D of the module 500.

In this first embodiment, the signal line driver D-DRV and the control circuit D-CNT illustrated in FIG. 7 are built in a single semiconductor device. In the present specification, this single semiconductor device is illustrated as the drive semiconductor device DDIC. Further, the touch control device 6 illustrated in FIG. 7 is also built in a single semiconductor device. In the present specification, the semiconductor device with the built-in touch control device 6 is referred to as a touch semiconductor device 6 to be distinguished from the drive semiconductor device DDIC. As a matter of course, each of the drive semiconductor device DDIC and the touch semiconductor device 6 may be configured using a plurality of semiconductor devices. Further, the changeover adjustment circuit SCX-D and the selection control circuit SRX-D may be built in the drive semiconductor device DDIC, for example.

In this first embodiment, the changeover adjustment circuit SCX-D and the selection control circuit SRX-D are arranged in the area 501, and configured using a wiring and components formed in the TFT glass substrate in the area 501. An example of the components includes a switch component, and the switch component is, for example, an electric field effect transistor (hereinafter, referred to as a MOSFET). Further, the drive semiconductor device DDIC is mounted on the TFT glass substrate so as to cover the changeover adjustment circuit SCX-D and the selection control circuit SRX-D when seen in a plan view. Accordingly, it is possible to suppress an increase of a lower frame of the display area 2.

Further, components configuring the changeover adjustment circuits SC-R, SC-L and SCX-U and the selection control circuits SR-R and SR-L are also formed on the TFT glass substrate in the area 502.

The sense signals SY(n) and SY(n+1) and the detection signals Rx(0) to Rx(p), which have been described with reference to FIG. 7, are transmitted to a flexible cable FB1 via a wiring (not illustrated) arranged between the long sides 500-L and 500-R of the module 500 and the sides 2-L and 2-R of the display area 2. The touch semiconductor device 6 is mounted to the flexible cable FB1, and the detection signals Rx(0) to Rx(p) and the sense signals SY(n) and SY(n+1) are supplied to the touch semiconductor device 6 via a wiring in the flexible cable FB1. Further, a flexible cable FB2 is connected to the area 501, and a connector CN is mounted to the flexible cable FB2. The sense signals SX(0) to SX(p) are supplied from the selection control circuit SRX-D to the touch semiconductor device 6 via the connector CN. Further, the transmission and reception of signals between the touch semiconductor device 6 and the drive semiconductor device DDIC is performed via the connector CN. The synchronization signal TSHD is drawn, as an example of the signal to be transmitted and received, in FIG. 8.

The display area 2 includes the pixel array in which the plurality of pixels are arranged in the matrix form, which has been already described above, and the pixel array is provided with the plurality of drive electrodes TL(0) to TL(p) and the scan lines GL(0) to GL(p) arranged along the row of the array, and the plurality of signal lines SL(0) to SL(p) and the plurality of detection electrodes RL(0) to RL(p) arranged along the column of the array. FIG. 8 illustrates two drive electrodes TL(n) and TL(m) and two signal lines SL(k) and SL(n), for example. Incidentally, FIG. 8 does not illustrate the scan line and the detection electrode. The pixel is arranged at each intersection point of the signal lines SL(0) to SL(p) and the scan lines or the drive electrodes TL(0) to TL(p). Reference signs R, G and B, indicated on the four sides of the display area 2 illustrated in FIG. 8, represent pixels corresponding to three primary colors.

<Structure of Display Area>

Figure 9:
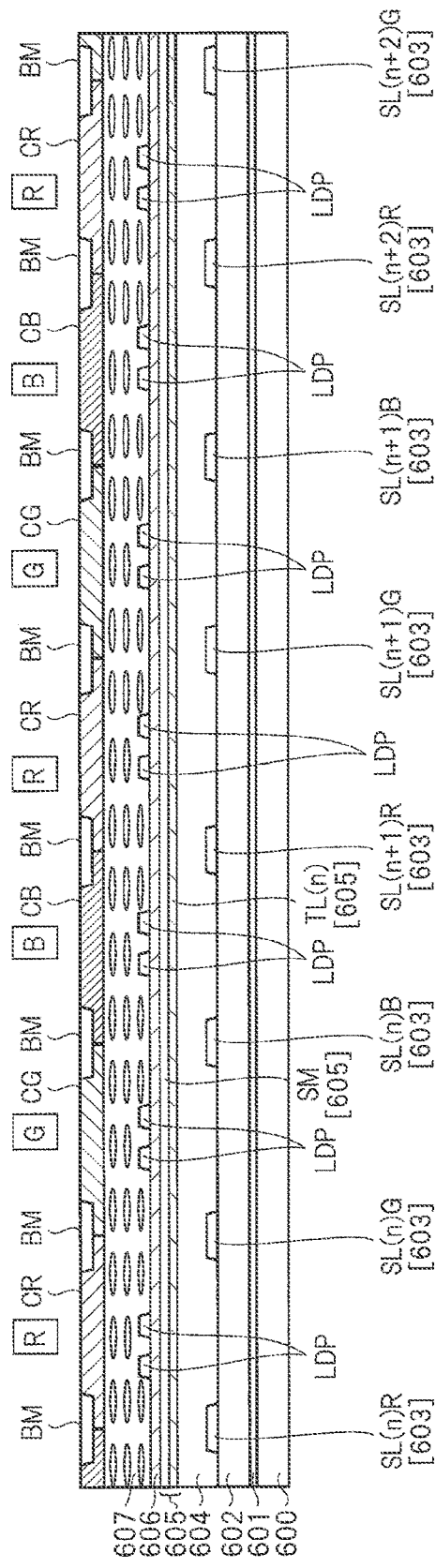
FIG. 9 is a cross-sectional view illustrating a cross-section of the liquid crystal display device according to the first embodiment.

FIG. 9 is a cross-sectional view illustrating a structure of the display area 2 included in the liquid crystal display device 1 according to the first embodiment. When seen from a viewpoint of the display, it is possible to say that the display area 2 (a first area), which serves as the display section of the display panel, is the area which is active (active area), and the area (a second area) of the peripheral section (the outer portion of the display area 2) of the display panel is the area which is not active(non-active area), or the peripheral area. In this case, the active area is surrounded by the sides 2-U, 2-D, 2-R and 2-L of the display area 2, when the description is given by exemplifying FIG. 8.

FIG. 9 illustrates an A-A' cross section of the display area 2 illustrated in FIG. 8. In this first embodiment, a single color pixel is displayed using three pixels corresponding, respectively, to the three primary colors of R(red), G (green) and B (blue) in order to perform color display. That is, it is possible to say that the one color pixel is configured using three subpixels. In this case, each signal line that transmits a color image signal in the display period includes three signal lines. The case of performing the color display is described with reference to FIG. 9 in order to illustrate the structure of the display area 2 in detail.

Reference signs of the signal lines to be used in FIG. 9 will be described prior to describing FIG. 9. Each of the signal lines SL(0) to SL(p) represents the signal line that transmits the color image signal in the display period. Each of the signal lines includes three signal lines that transmit the image signal to three subpixels. FIG. 9 distinguishes the three signal lines by attaching an alphabetical character of the corresponding subpixel next to the reference sign of the signal line. When the signal line SL(n) is exemplified, the signal line SL(n) includes signal lines SL(n)R, SL(n)G and SL(n)B. Here, the alphabetical character R attached next to the reference sign SL(n) represents the signal line that transmits the image signal to the subpixel corresponding to the red (R) of the three primary colors in the display period, the alphabetical character G attached next to the reference sign SL(n) represents the signal line that transmits the image signal to the subpixel corresponding to the green (G) of the three primary colors, and the alphabetical character B attached next to the reference sign SL(n) represents the signal line that transmits the image signal to the subpixel corresponding to the blue (B) of the three primary colors.

In FIG. 9, reference numeral 600 represents a TFT glass substrate. A first wiring layer (metal wiring layer) 601 is formed in the TFT glass substrate 600. A scan line GL(n) is configured using a wiring formed in the first wiring layer 601. An insulating layer 602 is formed on the first wiring layer 601, second wiring layers (metal wiring layers) 603 are formed on the insulating layer 602. The signal lines SL(n)R, SL(n)G and SL(n)B, signal lines SL(n+1)R, SL(n+1)G and SL(n+1)B and signal lines SL(n+2)R and SL(n+2)G are configured using the wirings formed in the second wiring layers 603. In FIG. 9, reference numeral 603 representing the second wiring layer is described in [ ] next to the reference signs of the signal lines in order to indicate that these signal lines are configured by the second wiring layers 603. For example, the signal line SL(n)G is indicated by SL(n)G[603].

An insulating layer 604 is formed on the second wiring layer 603, and a third wiring layer (metal wiring layer) 605 is formed on the insulating layer 604. The drive electrode TL(n) and an auxiliary electrode SM are configured using a wiring formed in the third wiring layer 605. Here, the drive electrode TL(n) is a transparent electrode (first electrode). Further, the auxiliary electrode SM (second electrode) has a lower resistance value than the drive electrode TL(n), and is formed to be electrically connected to the drive electrode TL(n). A resistance value of the drive electrode TL(n), which is the transparent electrode, is relatively high, but it is possible to reduce a resistance of the drive electrode using a combined resistance obtained by electrically connecting the auxiliary electrode SM to the drive electrode TL(n). Here, [605], attached to the reference signs of the drive electrode and the auxiliary electrode, also indicate that the electrodes are configured using the third wiring layer 605.

An insulating layer 606 is formed on the third wiring layer 605, and pixel electrodes LDP are formed on a top surface of the insulating layer 606. In FIG. 9, each reference sign of CR, CB and CG represents the color filter. A liquid crystal layer 607 is sandwiched between the color filters CR (red), CG (green) and CB (blue) and the insulating layer 606. Here, the pixel electrode LDP is provided at an intersection point between the scan line and the signal line, and the color filter CR, CG or CB corresponding to each of the pixel electrodes LDP is provided opposing the corresponding pixel electrode LDP. A black matrix BM is provided in each portion among the color filters CR, CG and CB Further, the color filters CR, CG and CB are formed on the liquid crystal layer side of the CF glass substrate, as illustrated in FIGS. 3B, 5A and 5B, although not illustrated in FIG. 9. Further, a fourth wiring layer is formed on the CF glass substrate, and the detection electrode RL(n) illustrated in FIGS. 5A and 5B is configured using a wiring in the fourth wiring layer. A polarizing plate is further arranged on a top surface of the detection electrode RL(n) as illustrated in FIGS. 5A and 5B.

<Pixel Array>

Figure 10:
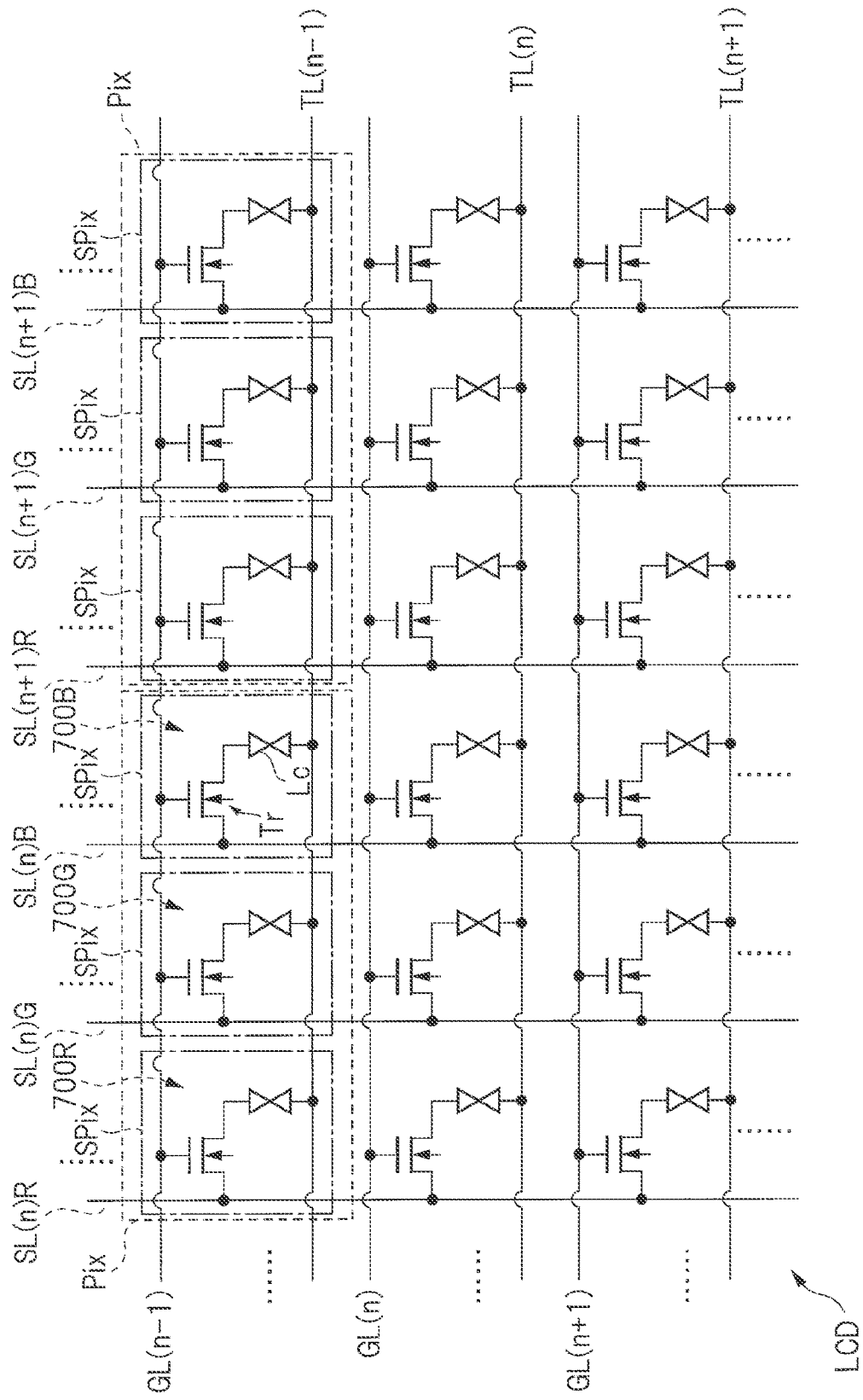
FIG. 10 is a circuit diagram illustrating a configuration of a display area of the liquid crystal display device according to the first embodiment.

Next, a description will be given regarding a circuit configuration of the display area 2. FIG. 10 is a circuit diagram illustrating the circuit configuration of the display area 2 illustrated in FIG. 8. In FIG. 10, the signal line is displayed in the same display format as that of FIG. 9. In FIG. 10, each one of a plurality of reference signs SPix, illustrated by a one-dot chain line, represents one liquid crystal display element (subpixel). The subpixels SPix are arranged in a matrix form in the display area 2, and configures a liquid crystal element array (the pixel array) LCD. The pixel array LCD is provided with the plurality of scan lines GL(0) to GL(p) arranged in each row and extending in the row direction, and the signal lines SL(0)R, SL(0)G, SL(0)B to SL(p)R, SL(p)G and SL(p)B arranged in each column and extending in the column direction. Further, the pixel array LCD includes the drive electrodes TL(0) to TL(p) arranged in each row and extending in the row direction, and the detection electrodes RL(0) to RL(p) arranged in each column and extending in the column direction.

FIG. 10 illustrates a part of the pixel array relating to scan lines GL(n−1) to GL(n+1), the signal lines SL(n)R, SL(n)G, SL(n)B to SL(n+1)R, SL(n+1)G, and SL(n+1)B, and drive electrodes TL(n−1) to TL(n+1). Incidentally, the detection electrodes RL(0) to RL(p) are not illustrated in FIG. 10.

The drive electrodes TL(n−1) to TL(n+1) are illustrated to be arranged in each row in FIG. 10 in order to make the description easy, but one drive electrode may be arranged with respect to a plurality of rows. Further, the detection electrode may be arranged such that one detection electrode is arranged with respect to a plurality of columns.

Each of the subpixels SPix, arranged at an intersection point between the row and the column of the pixel array LCD, is provided with a thin film transistor Tr formed in the TFT glass substrate 600 and a liquid crystal element LC of which one terminal is connected to a source of the thin film transistor Tr. In the pixel array LCD, gates of the thin film transistors Tr of the plurality of subpixels SPix arranged in the same row are connected to the scan line arranged in the same row, and drains of the thin film transistors Tr of the plurality of subpixels SPix arranged in the same column are connected to the signal line arranged in the same column. In other words, the plurality of subpixels SPix are arranged in the matrix form, the scan lines are arranged in each row, and the plurality of subpixels SPix arranged in a corresponding row are connected to the scan line. Further, the signal lines are arranged in each column, and the subpixels SPix arranged in a corresponding column are connected to the signal line. Further, the other ends of the liquid crystal elements LC of the plurality of subpixels SPix arranged in the same row are connected to the drive electrode arranged in same the row.

When the description is given regarding the example illustrated in FIG. 10, each gate of the thin film transistors Tr of the plurality of subpixels SPix arranged on an uppermost row is connected to the scan line GL(n−1) arranged in the uppermost row in FIG. 10. Further, each drain of the thin film transistors Tr of the plurality of subpixels SPix arranged in a leftmost column is connected to the signal line SL(n)R arranged in the leftmost column in FIG. 10. Further, each other end of the liquid crystal elements LC of the plurality of subpixels SPix arranged in the uppermost row is connected to the drive electrode TL(n−1) arranged in the uppermost row in FIG. 10.

As described above, the single subpixel SPix corresponds to one of the three primary colors. Accordingly, the three primary colors of R, G and B are configured of the three subpixels SPix. In FIG. 10, one color pixel Pix is formed using the three subpixels SPix, which are successively arranged in the same row, and the color is expressed by the pixel Pix. That is, the subpixel SPix indicated by 700R is set as a subpixel SPix(R) of R(red), the subpixel SPix indicated by 700G is set as a subpixel SPix(G) of G (green), and the subpixel SPix indicated by 700B is set as a subpixel SPix(B) of B (blue) in FIG. 10. Accordingly, the color filter CR for red is provided as the color filter in the subpixel SPix(R) indicated by 700R, the color filter CG for green is provided as the color filter in the subpixel SPix(G) indicated by 700G, and the color filter CB for blue is provided as the color filter in the subpixel SPix(B) indicated by 700B.

Further, an image signal corresponding to R is supplied from the signal line selector 3 to the signal line SL(n)R, an image signal corresponding to G is supplied from the signal line selector 3 to the signal line SL(n)G, and an image signal corresponding to B is supplied from the signal line selector 3 to the signal line SL(n)B among the signals each of which indicates one pixel.

The thin film transistor Tr of each of the subpixels SPix is an N-channel MOSFET, although not particularly limited. Pulsed scan line signals are supplied from the gate driver 5 (FIGS. 7 and 8) to the scan lines GL(0) to GL(p), which sequentially are set to high levels in this order. That is, voltages of the scan lines sequentially are set to high levels from the scan line GL(0) arranged in the upper row toward the scan line GL(p) arranged in the lower row, in the pixel array LCD. Accordingly, the thin film transistors Tr in the subpixels SPix are sequentially turned into a conductive state from the subpixel SPix arranged in the upper row toward the subpixel SPix arranged in the lower row, in the pixel array LCD.

When the thin film transistor Tr is turned into the conductive state, the image signal supplied to the signal line at the time is supplied to the liquid crystal element LC via the thin film transistor in the conductive state. The electric field of the liquid crystal element LC is changed depending on a voltage difference between a voltage of the display drive signal supplied to the drive electrodes TL(0) to TL(p) and a voltage of the supplied image signal, and the modulation of light passing through the liquid crystal element LC is changed. Accordingly, a color image, which corresponds to the image signal supplied to the signal lines SL(0)R, SL(0)G, SL(n)B to SL(p)R, SL(p)G, and SL(p)B, is displayed on the display area 2 B in synchronization with the scan line signal supplied to the scan lines GL(0) to GL(p).

It is possible to say that each of the plurality of subpixels SPix includes a selection terminal and a pair of terminals. In this case, the gate of the thin film transistor Tr configuring the subpixel SPix is the selection terminal of the subpixel SPix, the drain of the thin film transistor Tr is one terminal between the pair of terminals, and the other end of the liquid crystal element LC is the other terminal of the subpixel SPix.

Here, a correspondence between the arrangement of the display area 2 illustrated in FIGS. 7 and 8 and the circuit diagram illustrated in FIG. 10 will be described as follows.

The pixel array LCD includes a pair of sides substantially parallel to a row of the array, and a pair of sides substantially parallel to a column of the array. The pair of sides parallel to the row of the pixel array LCD are the first side and the second side corresponding to the short sides 2-U and 2-D of the display area 2 illustrated in FIGS. 7 and 8, and the pair of sides parallel to the column of the pixel LCD are a third side and a fourth side corresponding to the long sides 2-L and 2-R of the display area 2.

As illustrated in FIG. 8, the signal line selector 3 and the drive semiconductor device DDIC are arranged along the second side between the pair of sides parallel to the row, that is, the short side 2-D of the display area 2 in the pixel array LCD. The image signal from the drive semiconductor device DDIC is supplied to the signal lines SL(0)R, SL(0)G, SL(0)B to SL(p)R, SL(p)G and SL(p)B via the signal line selector 3 on the second side (the short side 2-D of the display area 2) in the pixel array LCD.

Further, the gate driver 5 is arranged along the third side between the pair of sides parallel to the column (the third side and the fourth side), that is, the long side 2-L of the display area 2 in the pixel array LCD. The scan line signal from the gate driver 5 is supplied to the scan lines GL(0) to GL(p) on the third side in the pixel array LCD. Although the gate driver 5 is arranged along the long side 2-L of the display area 2 in FIG. 8, two gate drivers 5 may be arranged along the long side 2-L (the third side of the pixel array LCD) and the long side 2-R (the fourth side of the pixel array LCD), respectively.

Although the pixel array LCD where the color display is performed in the display area 2 has been described in detail, it is possible to say that the pixel array LCD is configured of a plurality of the color pixels Pix (pixels) each of which is configured of the three subpixels SPix. When considered in this way, the plurality of pixels Pix are arranged in a matrix form, thereby configuring the pixel array LCD. The corresponding scan lines GL(0) to GL(p) and the corresponding drive electrodes TL(0) to TL(p) are arranged in each row of the pixel array LCD configured of the pixels Pix, and the signal lines SL(0) to SL(p) are arranged in each column thereof.

In this case, the three subpixels SPix are considered as a single pixel Pix, and the pixel Pix is considered to have the same configuration as the subpixel SPix. Each selection terminal of the pixels Pix arranged in the matrix form in the pixel array LCD are connected to the scan lines GL(0) to GL(p) arranged in the same row as the pixels Pix, and each one terminal of the pixels Pix is connected to the signal lines SL(0) to SL(p) arranged in the same column, and each other terminal of the pixels Pix is connected to the drive electrodes TL(0) to TL(p) arranged in the same column. As a matter of course, one drive electrode may correspond to a plurality of rows of the pixel array LCD. In such a case, the other terminals of the pixels Pix arranged in the plurality of rows are connected to the common drive electrode.

Even when considering that the pixel array LCD is configured of the plurality of pixels Pix in this manner, the correspondence between the arrangement of the display area 2 illustrated in FIGS. 7 and 8 and the circuit diagram illustrated in FIG. 10 is the same as the content that has been described above.

Although the description has been given regarding the case where the number of the subpixels SPix configuring the single color pixel Pix is three, the number is not limited thereto, and single color pixel may be configured of, for example, subpixels including white (W) or yellow (Y) in addition to R, G and B described above, or subpixels additionally including any one color or a plurality of colors among complementary colors (cyan (C), magenta (M) and yellow (Y)) of R, G and B described above.

<Outline of Electric Field Touch Detection And Magnetic Field Touch Detection>

Figure 11A:
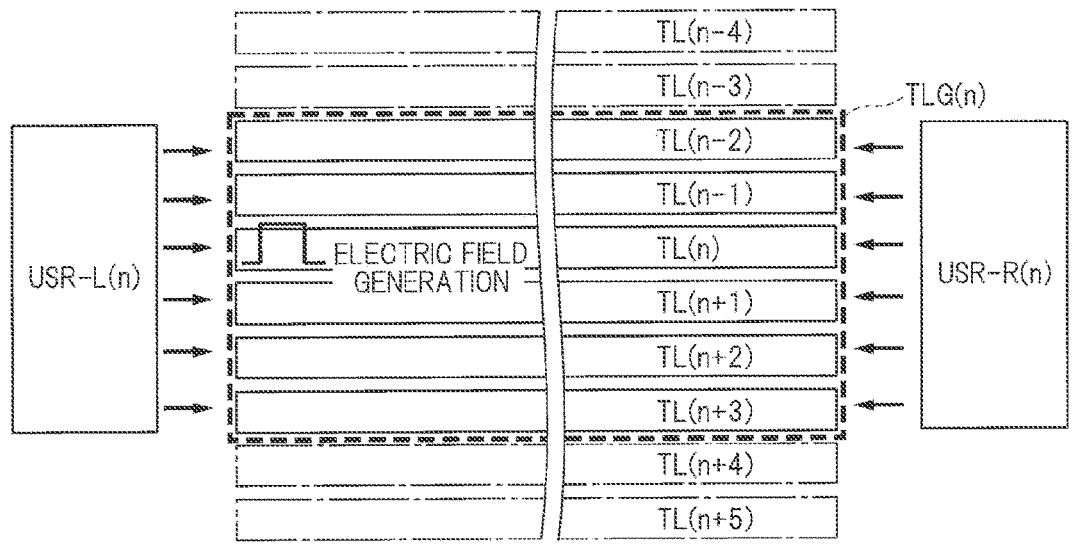
FIGS. 11A and 11B are explanatory diagrams that describe an electric field touch detection and a magnetic field touch detection according to the first embodiment.
Figure 11B:
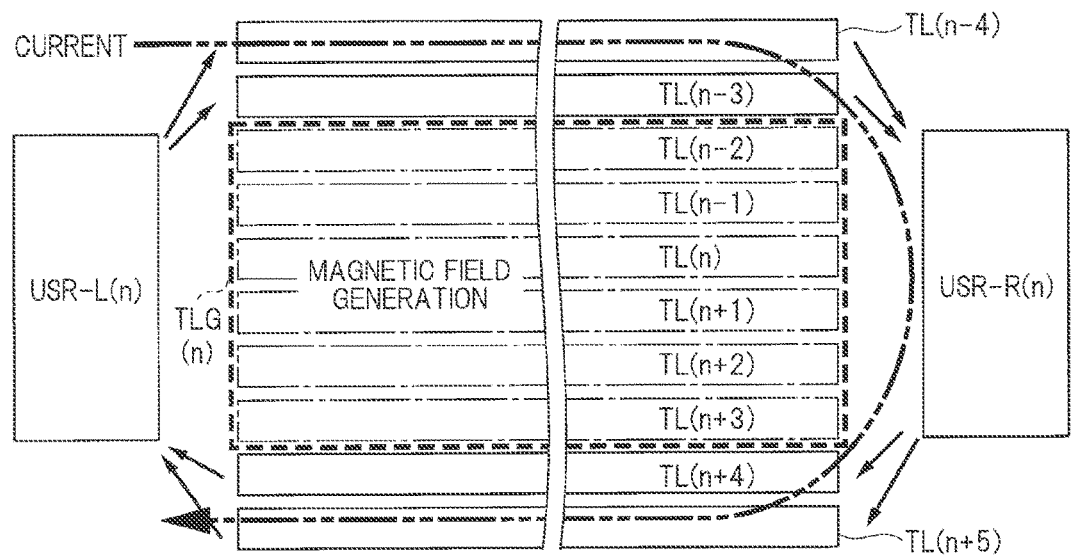

Next, a description will be given regarding outlines of the electric field touch detection and the magnetic field touch detection to be performed by the liquid crystal display device 1 according to the first embodiment, with reference to FIGS. 11A and 11B. FIG. 11A is an explanatory diagram for describing the outline of the electric field touch detection. Further, FIG. 11B is an explanatory diagram for describing the outline of the magnetic field touch detection.

The changeover adjustment circuit SC-R, which has been described with reference to FIG. 7, is configured using a plurality of unit changeover adjustment circuits USC-R(0) to USC-R(p), and the selection control circuit SR-R is also configured using a plurality of unit selection control circuits USR-R(0) to USR-R(p). Similarly, the changeover adjustment circuit SC-L is configured using a plurality of unit changeover adjustment circuits USC-L(0) to USC-L(p), and the selection control circuit SR-L is also configured using a plurality of unit selection control circuits USR-L(0) to USR-L(p). The unit changeover adjustment circuits USC-R(0) to USC-R(p) and USC-L(0) to USC-L(p) and the unit selection control circuits USR-R(0) to USR-R(p) and USR-L(0) to USR-L(p) have one-to-one correspondence to each other. Here, it is possible to say that the above-described first electrode driving circuit SD-R is configured using the unit electrode driving circuits USD-R (0) to USD-R (p), and the above-described second electrode driving circuit SD-L is configured using the unit electrode driving circuits USD-L (0) to USD-L (p), in a case where the unit electrode driving circuits USD-R and USD-L are configured using the unit selection control circuits and the unit changeover adjustment circuits corresponding to each other.

The plurality of drive electrodes TL(0) to TL(p) arranged in the display area 2 are divided into a plurality of groups TLG(0) to TLG(p) in the touch detection period, and each of the groups TLG(0) to TLG(p) is provided with the plurality of drive electrodes arranged to be adjacent to each other. Further, the unit changeover adjustment circuits USC-R(0) to USC-R(p) and USC-L(0) to USC-L(p) are allocated to the respective groups TLG(0) to TLG(p), and the unit selection control circuits USR-R(0) to USR-R(p) and USR-L(0) to USR-L(p) correspond to the respective groups TLG(0) to TLG(p).

In a case where the electric field touch detection is designated in the touch detection period, the unit selection control circuit controls the unit changeover adjustment circuits USC-R(0) to USC-R(p) and USC-L(0) to USC-L(p) such that the electric field is generated in the corresponding group of the drive electrodes. Further, the unit selection control circuit controls the unit changeover adjustment circuits USC-R(0) to USC-R(p) and USC-L(0) to USC-L(p) such that a strong magnetic field is generated in the corresponding group of the drive electrodes, in a case where the magnetic field touch detection is designated.

FIGS. 11A and 11B illustrate the unit selection control circuit USR-R(n) among the above-described unit selection control circuits USR-R(0) to USD-R(p), and the unit selection control circuit USR-L(n) among the above-described unit selection control circuits USR-L(0) to USR-L(p). Further, FIGS. 11A and 11B illustrate a group TLG(n) of the drive electrodes corresponding to the unit selection control circuit USR-R(n) and the unit selection control circuit USR-L(n).

First, the outline of the electric field touch detection will be described. In a case where the electric field touch detection is designated by the electric field enable signal TX_EN, the operation illustrated in FIG. 11A is performed. In FIG. 11A, reference signs TL(n−6) to TL(n+5) represent the drive electrodes arranged in the display area 2. As described above, the drive electrodes TL(0) to TL(p) are divided into the groups TLG(0) to TLG(p) in the touch detection period. In FIG. 11A, the drive electrodes TL(n−2) to TL(n+3) among the drive electrodes TL(0) to TL(p) are set as the group TLG(n) of the drive electrodes corresponding to the unit selection control circuit USR-R(n) and the unit selection control circuit USR-L(n). In the case of the electric field touch detection, the unit selection control circuits USR-R(n) and USR-L(n) control the unit changeover adjustment circuits USC-R(n) and USC-L(n) such that the electric field drive signal is supplied from the unit changeover adjustment circuits USC-R(n) and USC-L(n) to each of the drive electrodes TL(n−2) to TL(n+3) included in the corresponding group TLG(n). FIG. 11A does not illustrate the unit changeover adjustment circuits USC-R(n) and USC-L(n), but the electric field drive signal, which is supplied from the unit changeover adjustment circuits USC-R(n) and USC-L(n) to the drive electrodes TL(n−2) to TL(n+3) included in the group TLG(n), is illustrated by a solid line arrow. Further, a waveform of the electric field drive signal is drawn in the drive electrode TL(n).

This waveform of the electric field drive signal is a signal with temporally changing voltage, as illustrated in FIG. 11A. To be specific, the control signal TSVCOM with the periodically changing voltage is supplied to the drive electrodes TL(n−2) to TL(n+3) included in the corresponding group TLG(n). Accordingly, the electric field changing along with the passage of time is generated in the drive electrodes TL(n−2) to TL(n+3) included in the corresponding group TLG(n).

The drive electrodes TL(n−2) to TL(n+3) included in the group TLG(n) are proximately and successively arranged in the display area 2. Thus, the electric field is generated in an area in which the group TLG(n) is arranged in the display area 2. Accordingly, it is possible to detect whether the finger touches the area in which the group TLG(n) is arranged by detecting a change of the signal in the detection electrodes RL(0) to RL(p).

Incidentally, the drive electrodes TL(n−4) to TL(n−3) illustrated in FIG. 11A are included in a group TLG(n−1) adjacent to the group TL(n) in the touch detection period, and the drive electrodes TL(n+4) to TL(n+5) are included in a group TLG(n+1) adjacent to the group TL(n) in the touch detection period.

Next, the outline of the magnetic field touch detection will be described. In a case where the magnetic field touch detection is designated by the magnetic field enable signal CE_EN, the operation illustrated in FIG. 11B is performed. In this first embodiment, the coil using the drive electrodes as the winding is formed, and the magnetic field is generated by the coil at the time of magnetic field touch detection. In this case, a magnetic flux density is higher in an inner side of the coil, that is, the magnetic field is stronger in the inner side of the coil in the case of comparing the inner side and an outer side of the coil. Thus, in this first embodiment, the unit selection control circuits USR-R(n) and USR-L(n) control the unit changeover adjustment circuits USC-R(n) and USC-L(n) such that a coil is formed, using the drive electrodes, which are included in the groups TLG(n−1) and TLG(n+1) arranged to be adjacent to the corresponding group TLG(n), as a winding. That is, the drive electrodes in the groups adjacent to each other are connected in series in the unit changeover adjustment circuits USC-R(n) and USC-L(n) such that the area of the group TLG(n) is placed on the inner side of the coil at the time of forming the coil using the drive electrodes as the winding.

The group TLG(n) of the drive electrodes is configured of the drive electrodes TL(n−2) to TL(n+3) in FIG. 11B. Further, the group TLG(n−1), which is arranged to be adjacent to the group TLG(n), is provided with the drive electrodes TL(n−3) and TL(n−4), and the group TLG(n+1), which is arranged to be adjacent to the group TLG(n), is provided with the drive electrodes TL(n+4) and TL(n+5). The drive electrodes TL(n−4), TL(n−3), TL(n+4) and TL(n+5), which are included in the group TLG(n−1) and the group TLG(n+1) proximately arranged across the group TLG(n), are connected in series to each other in the unit changeover adjustment circuits USC-R(n) and USC-L(n) such that the area of the group TLG(n) is placed on the inner side of the coil.

Although FIG. 11B also does not illustrate the unit changeover adjustment circuits USC-R(n) and USC-L(n), the drive electrode TL(n−4) is connected to, for example, the drive electrode TL(n+4) in the unit changeover adjustment circuit USC-R(n), and the drive electrode TL(n+4) is connected to the drive electrode TL(n−3) in the unit changeover adjustment circuit USC-L(n). Further, the drive electrode TL(n−3) is connected to the drive electrode TL(n+5) in the unit changeover adjustment circuit USC-R(n). Accordingly, a coil using the drive electrodes TL(n−4), TL(n−3), TL(n+4) and TL(n+5) as a winding is formed. In this case, the coil of a two-turn winding is formed, and the unit changeover adjustment circuit USC-L(n) supplies periodically changing current to the drive electrode TL(n−4) as the magnetic field drive signal. At this time, the unit changeover adjustment circuit USC-L(n) supplies the ground voltage to the drive electrode TL(n+5). The magnetic field drive signal at this time is drawn in a solid line arrow, and flow of the current at this time is schematically illustrated in a two-dot chain line arrow in FIG. 11B.

Accordingly, the coil having the area of the group TLG(n) on the inner side thereof is formed. A magnetic field is generated by this coil in the magnetic field generation period, and a magnetic field from the pen is detected by this coil in the magnetic field detection period.

Incidentally, in a case where a magnetic field is generated in an area of the group TLG(n−1) including the drive electrodes TL(n−4) and TL(n−3), the drive electrodes TL(n−2) and TL(n−1) are used as the winding of the coil, for example. Further, in a case where a magnetic field is generated in an area of the group TLG(n+1) including the drive electrodes TL(n+4) and TL(n+5), the drive electrodes TL(n+2) and TL(n+3) are used as the winding of the coil, for example. When the drive electrodes arranged on the inner side of the coil are used as the winding at the time of forming another coil in this manner, the coils partially overlap with each other. When the coils overlap with each other, it is possible to prevent generation of an area in which a magnetic field becomes weak at the time of magnetic field touch detection, and it is possible to prevent reduction in detection accuracy.

In a case where the group TLG(n) is considered as a first group, the group TLG(n−1) is considered as a second group, and the group TLG(n+1) is considered as a third group, the first group is arranged between the second group and the third group when seen in a plan view. The coil is formed using the drive electrodes included in the respective second group and third group as the winding is formed, at the time of detecting whether the first group is touched by the pen generating the magnetic field is detected during the magnetic field touch detection. On the other hand, the electric field drive signal is supplied to the drive electrodes included in the first group, at the time of detecting whether the electric field is changed by the finger in the first group during the electric field touch detection.

Although the description has been given regarding the case where each of the groups TLG(n−1) to TLG(n+1) is provided with the plurality of drive electrodes in FIGS. 11A and 11B, each of the groups may be provided with only one drive electrode. Further, although the description has been given by exemplifying the two-turn winding, as a matter of course, the number of turns of the coil may be one, or the number of turns may be three or more.

<Configuration of Liquid Crystal Display Device Capable of Performing Magnetic Field Touch Detection>

Figure 12:
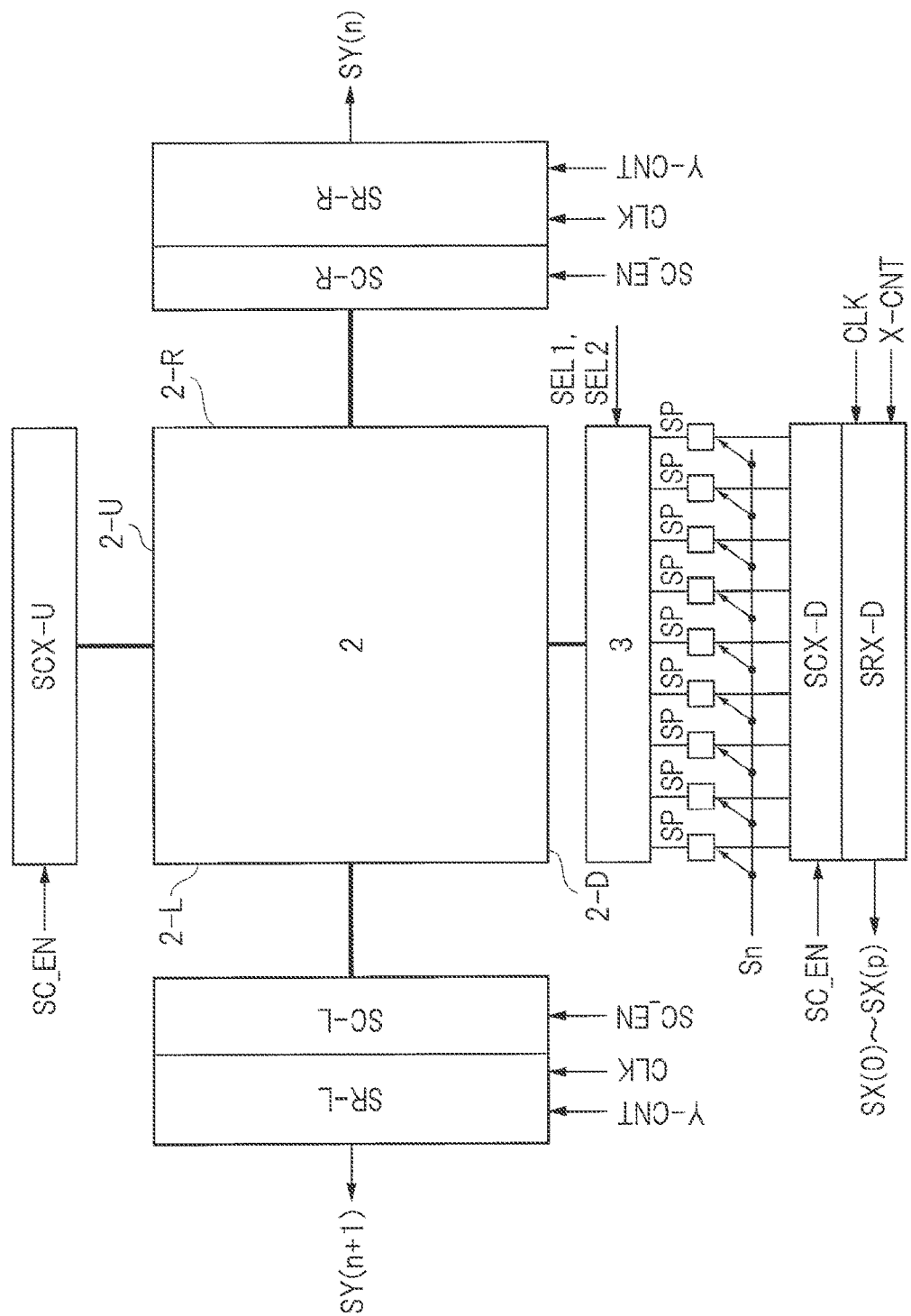
FIG. 12 is a block diagram illustrating a configuration of the liquid crystal display device according to the first embodiment.

First, a configuration of a liquid crystal display device capable of performing the magnetic field touch detection will be described before describing a liquid crystal display device capable of performing the electric field touch detection and the magnetic field touch detection. FIG. 12 is a block diagram illustrating a configuration of a semiconductor device capable of performing the magnetic field touch detection. Particularly, FIG. 12 only illustrates circuit parts of the liquid crystal display device 1 illustrated in FIG. 7, which are required for describing the magnetic field touch detection. In comparison with FIG. 7, the touch control device (touch semiconductor device) 6, the display control device (the drive semiconductor device DDIC) 4 and the gate driver 5 are not illustrated in FIG. 12. Further, only parts required for the magnetic field touch detection are illustrated regarding the changeover adjustment circuits SC-R and SC-L and the selection control circuits SR-R and SR-L.

Reference numeral 2 also represents the display area (active area) of the display panel in FIG. 12. The display area 2 is connected to the changeover adjustment circuit SCX-U on the side 2-U, and is connected to the changeover adjustment circuit SC-R and the selection control circuit SR-R on the side 2-R, and is connected to the changeover adjustment circuit SC-L and the selection control circuit SR-L on the side 2-L. Further, the display area 2 is connected to the signal line selector 3 on the side 2-D. In FIG. 12, a plurality of reference signs SP represent terminals, the plurality of terminals SP are connected to the signal line selector 3. The image signal Sn is supplied from the control circuit D-CNT illustrated in FIG. 7 to each of the terminals SP via the signal line driver D-DRV illustrated in FIG. 7. Further, the terminals SP are connected to the changeover adjustment circuit SCX-D and the selection control circuit SRX-D. The image signal Sn is supplied to each of the terminals SP in the display period. On the other hand, the magnetic field drive signal is supplied to the terminal SP in the magnetic field generation period during the touch detection period, and a signal according to a change of the magnetic field is transmitted from the terminal SP to the changeover adjustment circuit SCX-D and the selection control circuit SRX-D in the magnetic field detection period.

Figure 13:
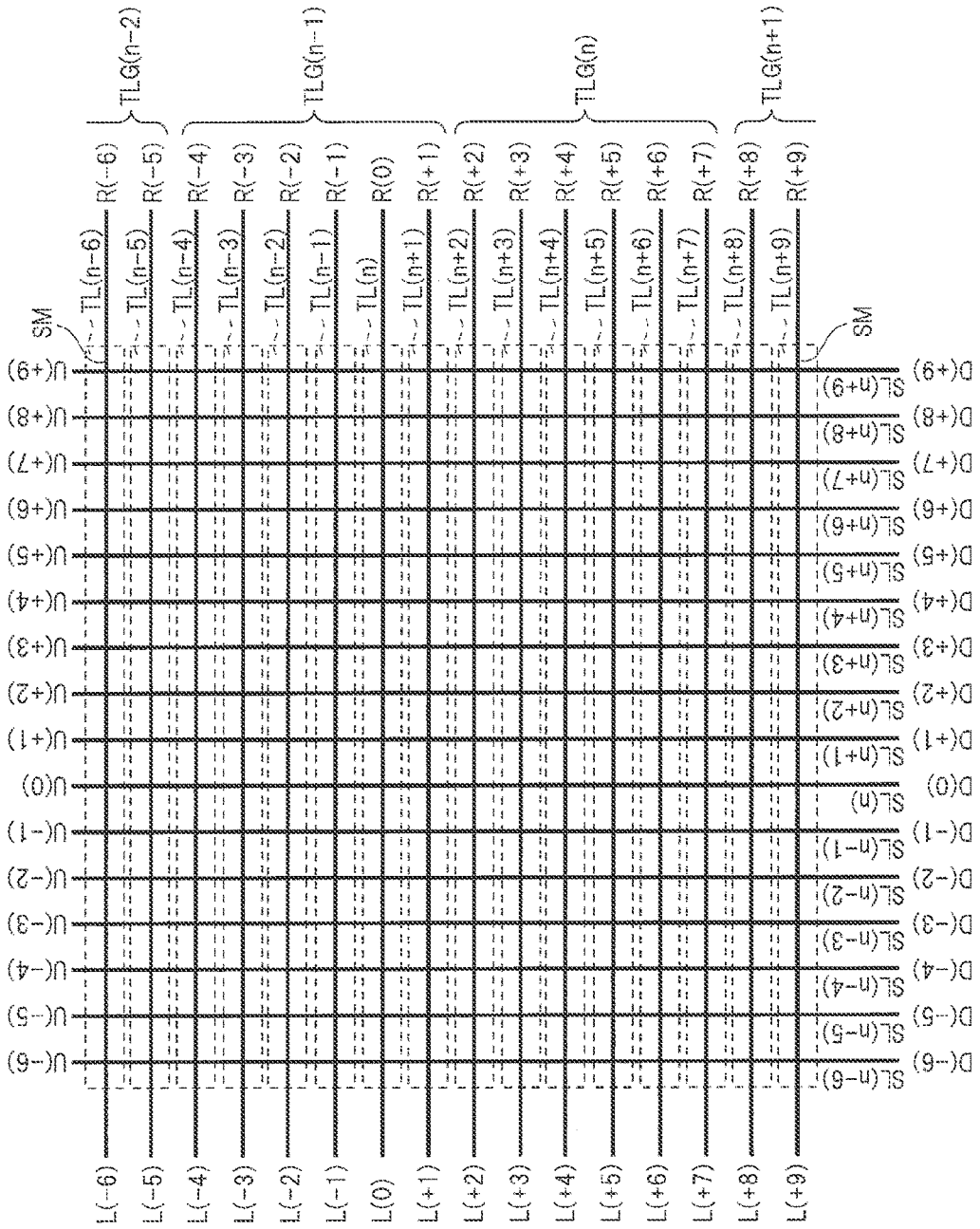
FIG. 13 is a plan view illustrating the configuration of a display area of the liquid crystal display device according to the first embodiment.
Figure 14:
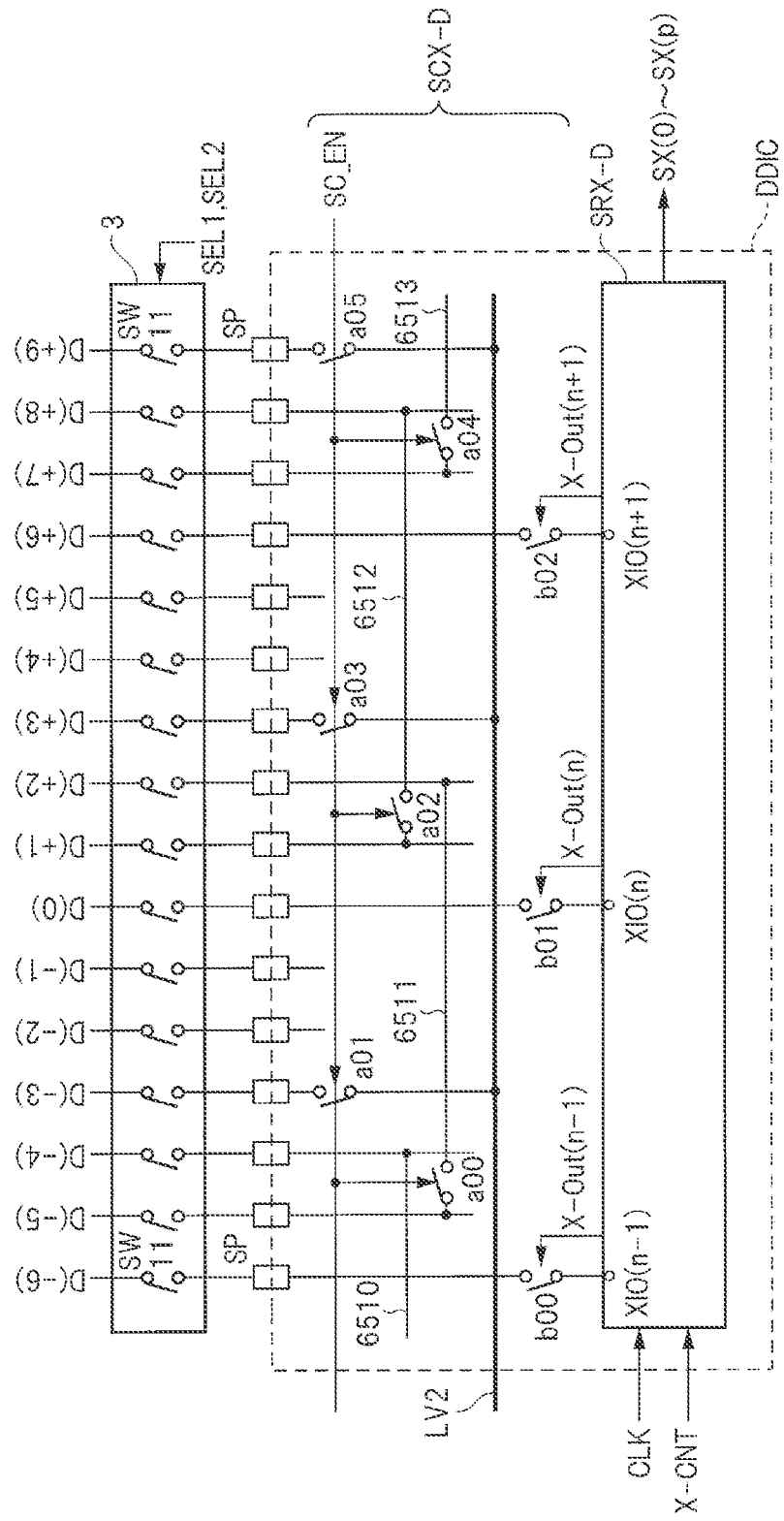
FIG. 14 is a block diagram illustrating configurations of a selection control circuit and a changeover adjustment circuit of the liquid crystal display device according to the first embodiment.
Figure 15:
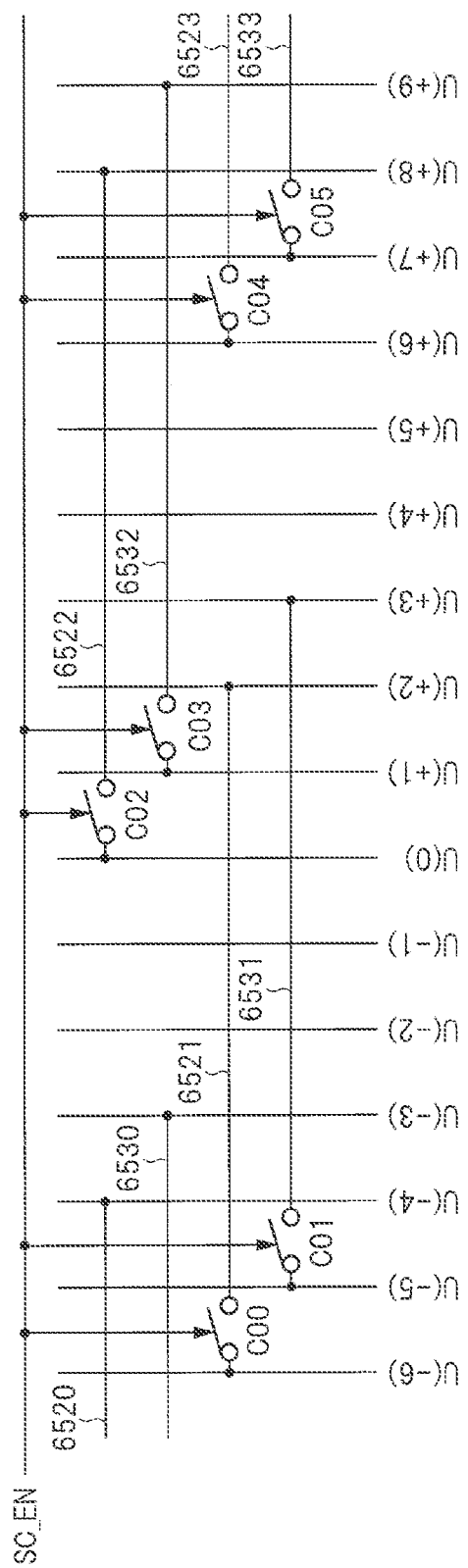
FIG. 15 is a circuit diagram illustrating the configuration of the changeover adjustment circuit of the liquid crystal display device according to the first embodiment.
Figure 16:
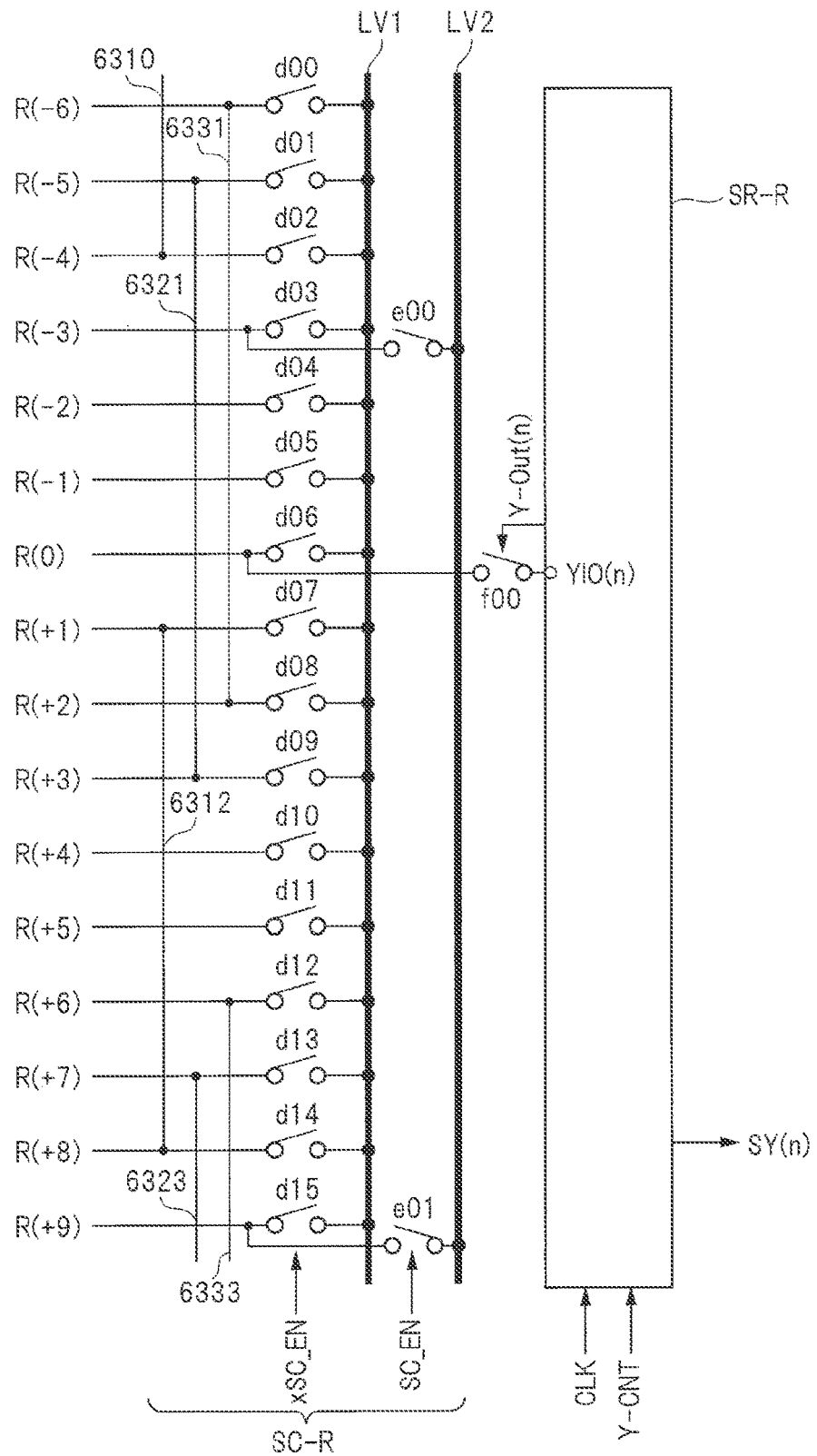
FIG. 16 is a circuit diagram illustrating the configuration of the changeover adjustment circuit of the liquid crystal display device according to the first embodiment.
Figure 17:
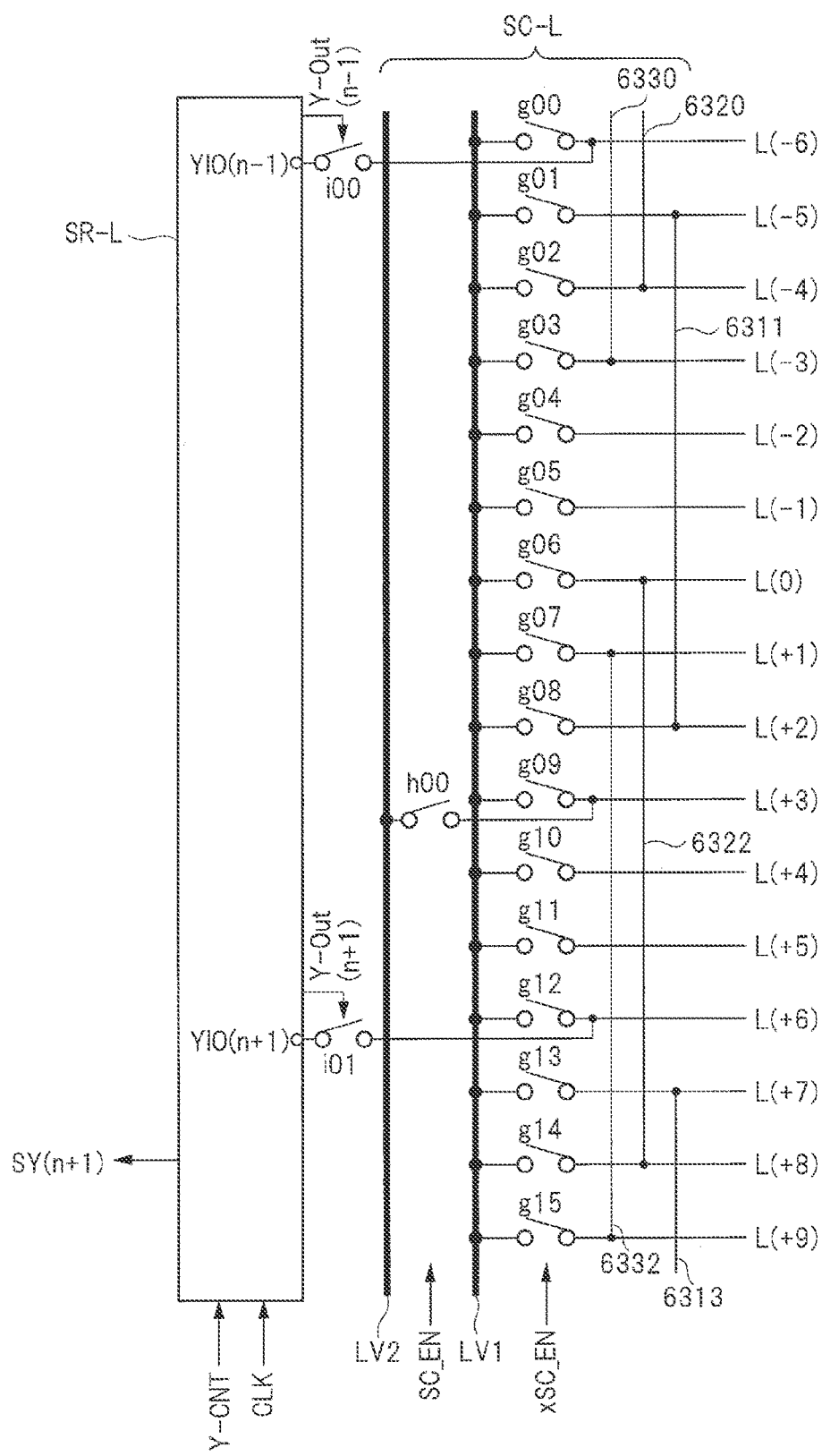
FIG. 17 is a circuit diagram illustrating the configurations of the changeover adjustment circuit and the selection control circuit of the liquid crystal display device according to the first embodiment.

A configuration of the display area 2 is illustrated in FIG. 13, configurations of the changeover adjustment circuit SCX-D and the selection control circuit SRX-D are illustrated in FIG. 14, and a configuration of the changeover adjustment circuit SCX-U is illustrated in FIG. 15 in order to avoid the complexity of the drawing. Further, configurations of the changeover adjustment circuit SC-R and the selection control circuit SR-R are illustrated in FIG. 16, and configurations of the changeover adjustment circuit SC-L and the selection control circuit SR-L are illustrated in FIG. 17. Hereinafter, the liquid crystal display device illustrated in FIG. 12 will be described with reference to FIGS. 13 to 17.

<<Configuration of Display Area 2>>

First, the configuration of the display area 2 will be described. The display area 2 is provided with the plurality of drive electrodes TL(0) to TL(p), the plurality of scan lines GL(0) to GL(p), the plurality of signal lines SL(0) to SL(p), the plurality of detection electrodes RL(0) to RL(p), and the plurality of pixels. Incidentally, each of the pixels is the color pixel and includes three subpixels in order to perform the color display. Further, each of the signal lines includes three signal lines corresponding to the subpixels. However, a case where the three subpixels are set as one pixel (color pixel) and the three signal lines (for example, SL(0)R, SL(0)G and SL(0)B) corresponding to the subpixels are set as one signal line (SL(0)) will be described hereinafter in order to make the description easy.

The drive electrodes TL(0) to TL(p) extend in the horizontal direction (the row direction), and are arranged in parallel in the vertical direction (the column direction) in the display area 2. Further, the scan lines GL(0) to GL(p) also extend in the horizontal direction and are arranged in parallel in the vertical direction. The signal lines SL(0) to SL(p) extend in the vertical direction and are arranged in parallel in the horizontal direction so as to intersect with the drive electrodes TL(0) to TL(p) and the scan lines GL(0) to GL(p). Further, the detection electrodes RL(0) to RL(p) also extend in the vertical direction and are arranged in parallel in the horizontal direction so as to intersect with the drive electrodes TL(0) to TL(p) and the scan lines GL(0) to GL(p). The pixel is arranged at an intersection point between the signal line and the scan line, and is connected to the corresponding signal line, drive electrode and scan line as described with reference to FIG. 10.

Further, the signal lines SL(0) to SL(p), the drive electrodes TL(0) to TL(p), the scan lines GL(0) to GL(p) and the detection electrodes RL(0) to RL(p) are formed using the wirings of the wiring layers which are different from each other as described with reference to FIG. 9, and are physically separated from each other. The auxiliary electrode SM, which has been described with reference to FIG. 9, is formed along the drive electrode and is connected to the drive electrode. In this case, dozens of the auxiliary electrodes are formed with respect to each of the drive electrodes TL(0) to TL(p), and are connected to the drive electrode. That is, dozens of the auxiliary electrodes are formed with respect to one drive electrode along the drive electrode, and are connected to the drive electrode. Accordingly, it is possible to achieve reduction in the combined resistance of the drive electrodes.

In FIG. 13, the drive electrodes TL(n−6) to TL(n+9) are illustrated by broken lines and the signal lines SL(n−6) to SL(n+9) are illustrated by solid lines, among the drive electrodes TL(0) to TL(p) and the signal lines SL(0) to SL(p). Further, one auxiliary electrode among the plurality of auxiliary electrodes, which are connected to the respective drive electrodes, is illustrated by a solid line SM in FIG. 13. Incidentally, FIG. 13 does not illustrate the pixel, the scan line, and the detection electrode in order to avoid the complexity of the drawing.

In FIG. 13, reference signs D(−6) to D(+9), reference signs U(−6) to U(+9), reference signs R(−6) to R(+9) and reference signs L(−6) to L(+9) represent connecting portions with FIGS. 14 to 16. That is, in FIG. 13, the reference signs D(−6) to D(+9) are connected to the reference signs D(−6) to D(+9) illustrated in FIG. 14, and the reference signs U(−6) to U(+9) are connected to the reference signs U(−6) to U(+9) illustrated in FIG. 15. Similarly, in FIG. 13, the reference signs R(−6) to R(+9) are connected to the reference signs R(−6) to R(+9) illustrated in FIG. 16, and the reference signs L(−6) to L(+9) are connected to the reference signs L(−6) to L(+9) illustrated in FIG. 17.

In the first embodiment, the coil using the signal line and the drive electrode, arranged in the display area 2, as the winding is formed in a case where the magnetic field touch detection is designated in the touch detection period. Here, a description will be given regarding a case where the coil X(n−1) (see FIG. 4) is formed, using the signal lines SL(n−6), SL(n−5), SL(n+2) and SL(n+3) among the signal lines SL(n−6) to (n+9) as the winding by signal wirings 6511, 6521 and 6531, and the coil X(n) (see FIG. 4) is formed using the signal lines SL(n), SL(n+1), SL(n+8) and SL(n+9) as the winding. Further, a description will be given regarding a case where the coil Y(n−1) (see FIG. 4) is formed, using the drive electrodes TL(n−6), TL(n−5), TL(n+2) and TL(n+3) among the drive electrodes TL(n−6) to TL(n+9) and the auxiliary electrodes SM connected respectively thereto as the winding by signal wirings 6512, 6522 and 6532. Similarly, a description will be given regarding a case where the coil Y(n) (see FIG. 4) is formed, using the drive electrodes TL(n), TL(n+1), TL(n+8) and TL(n+9) and the auxiliary electrodes SM connected respectively thereto as the winding.

<<Configurations of Changeover Adjustment Circuit SCX-D and Selection Control Circuit SRX-D>>

FIG. 14 illustrates the configurations of the changeover adjustment circuit SCX-D and the selection control circuit SRX-D. FIG. 14 illustrates a configuration corresponding to the signal lines SL(n−6) to SL(n+9). Further, FIG. 14 schematically illustrates a configuration of the signal line selector 3.

The image signal is supplied from the display control device 4 (FIG. 7) to each of the terminals SP in a time division manner in the display period. Incidentally, the reference sign SP is attached only to a terminal arranged at the rightmost side and a terminal arranged at the leftmost side in FIG. 14 in order to avoid the complexity of the drawing.

The signal line selector 3 includes a plurality of switches which are controlled according to the selection signals SEL1 and SEL2, and supplies the image signal supplied to the terminal SP to a suitable signal line. The switch in the signal line selector 3 selectively connects the terminal SP and the signal line in the display period, and connects all the signal lines and the terminals SP in a substantially simultaneous manner in the touch detection period. FIG. 14 illustrates a schematic switch SW11 (the reference sign SW11 is only attached to the rightmost side and the leftmost side) as the switch included in the signal line selector 3, in order to illustrate that the connections between the signal lines and the terminals SP are changed between the display period and the touch detection period. That is, the switch SW11 illustrated in FIG. 14 is drawn in order to express the connections between the signal lines SL(0) to SL(p) and the terminals SP in the touch detection period.

The changeover adjustment circuit SCX-D is provided with first switches a00 to a05 controlled by the magnetic field enable signal SC_EN, second switches b00 to b02 controlled by selection signals X-Out(n−1) to X-Out(n+1) from the selection control circuit SRX-D, and signal wirings 6510 to 6513.

The control circuit D-CNT (FIG. 7) sets the magnetic field enable signal SC_EN to a high level when the magnetic field touch detection is designated in the touch detection period. Further, when the magnetic field touch detection is not designated and in the display period, the control circuit D-CNT sets the magnetic field enable signal SC_EN to a low level. When the magnetic field enable signal SC_EN is set to a high level, the first switches a00 to a05 are turned into on-states. On the other hand, the first switches a00 to a05 are turned into off-states when the magnetic field enable signal SC_EN is set to a low level. Further, the switch SW11 in the signal line selector 3 is turned into an on-state in the touch detection period, and thus, the terminals SP and the signal lines SL(n−6) to SL(n+9) are electrically connected.

Accordingly, when the magnetic field touch detection is designated in the touch detection period, the signal line SL(n−5) is connected to the signal line SL(n+2) via the first switch a00 and the signal wiring 6511, and the signal line SL(n+1) is connected to the signal line SL(n+8) via the first switch a02 and the signal wiring 6512. Further, the signal line SL(n−4) is connected to a signal line (not illustrated) via the signal wiring 6510 and a first switch (not illustrated), and the signal line SL(n+7) is connected to a signal line (not illustrated) via the first switch a04 and the signal wiring 6513.

Further, when the magnetic field touch detection is designated in the touch detection period, the respective signal lines SL(n−3) and SL(n+9) are connected to a voltage wiring LV2 via the first switches a01 and a05. For example, the ground voltage Vs is supplied to the voltage wiring LV2 in the touch detection period. Further, when the magnetic field touch detection is designated in the touch detection period, the second switches b00 to b02 are turned into on-states according to the selection signals X-Out(n−1) to X-Out(n+1) from the selection control circuit SRX-D.

The control circuit D-CNT illustrated in FIG. 7 sets the control signals X-CNT and Y-CNT to high levels, for example, at the time of initiating the magnetic field touch detection. The selection control circuit SRX-D performs an operation to select the coil when the control signal X-CNT is set to a high level. For example, the selection control circuit SRX-D sets the selection signals to high levels in the order from the selection signals X-Out(0) to X-Out(p). Further, the selection control circuit SRX-D includes input/output nodes XIO(0) to XIO(p) corresponding to the respective coils X(0) to X(p). The selection control circuit SRX-D outputs the clock signal CLK from each of the input/output nodes XIO(0) to XIO(p) in the magnetic field generation period during the touch detection period in which the magnetic field touch detection is performed. Further, voltages of the input/output nodes XIO(0) to XIO(p) are output as the sense signals SX(0) to SX(p) in the magnetic field detection period during the touch detection period. Incidentally, FIG. 14 illustrates only input/output nodes XIO(n−1) to XIO(n+1) and the selection signals X-Out(n−1) to X-Out(n+1) corresponding to the coils X(n−1) to X(n+1).

Incidentally, the reference sign DDIC indicated by the broken line in FIG. 14 represents an area on which the touch semiconductor device is mounted. The touch semiconductor device DDIC is arranged so as to cover the changeover adjustment circuit SCX-D and the selection control circuit SRX-D described above, and an external terminal of the touch semiconductor device DDIC is connected to the terminal SP. The image signal is supplied from the external terminal, which is connected to the terminal SP, of the touch semiconductor device DDIC to the terminal SP in the display period. Further, the external terminal of the touch semiconductor device DDIC is set to a high-impedance state in the touch detection period.

<<Configuration of Changeover Adjustment Circuit SCX-U>>

FIG. 15 is a circuit diagram illustrating the configuration of the changeover adjustment circuit SCX-U. FIG. 15 illustrates a part of the changeover adjustment circuit SCX-U corresponding to the signal lines SL(n−6) to SL(n+9). The changeover adjustment circuit SCX-U includes third switches c00 to c05, which are controlled by the magnetic field enable signal SC_EN, and signal wirings 6520 to 6523 and 6530 to 6533. The third switches c00 to c05 are turned into on-states, since the magnetic field enable signal SC_EN of a high level is supplied thereto when the magnetic field touch detection is designated. On the other hand, the third switches c00 to c05 are turned into off-states, when the magnetic field touch detection is not designated and in the display period.

The signal line SL(n−6) is connected to the signal line SL(n+2) via the third switch c00 and the signal wiring 6521, and the signal line SL(n−5) is connected to the signal line SL(n+3) via the third switch c01 and the signal wiring 6531, in the changeover adjustment circuit SCX-U at the time of magnetic field touch detection. At this time, the signal line SL(n) is connected to the signal line SL(n+8) via the third switch c02 and the signal wiring 6522, and the signal line SL(n+1) is connected to the signal line SL(n+9) via the third switch c03 and the signal wiring 6532, in the changeover adjustment circuit SCX-U. Further, the signal line SL(n−4) is connected to a signal line (not illustrated) via a third switch (not illustrated) and the signal wiring 6520, and the signal line SL(n−3) is connected to a signal line (not illustrated) via a third switch (not illustrated) and the signal wiring 6520 at this time. Further, the signal line SL(n+6) is connected to a signal line (not illustrated) via the third switch c04 and the signal wiring 6523, and the signal line SL(n+7) is connected to a signal line (not illustrated) via the third switch c05 and the signal wiring 6533.

<<Operations of Changeover Adjustment Circuits SCX-D and SCX-D, and Selection Control Circuit SRX-D>>

When the magnetic field touch detection is designated, the signal line SL(n−5) and the signal line SL(n+2) are connected to each other, the signal line SL(n+1) and the signal line SL(n+8) are connected to each other, and the signal lines SL(n+3) and SL(n+9) are connected to the voltage wiring LV2, in the changeover adjustment circuit SCX-D. Further, when the magnetic field touch detection is designated, the signal line SL(n−6) and the signal line SL(n+2) are connected to each other, the signal line SL(n−5) and the signal line SL(n+3) are connected to each other, the signal line SL(n) and the signal line SL(n+8) are connected to each other, and the signal line SL(n+1) and the signal line SL(n+9) are connected to each other, in the changeover adjustment circuit SCX-U. Accordingly, when the magnetic field touch detection is designated, the signal lines SL(n−6), SL(n−5), SL(n+2) and SL(n+3), which are arranged in parallel to each other, are connected in series via the signal wirings 6511, 6521 and 6531 in the display area 2, and the coil X(n−1) is formed using these signal lines as a winding. Similarly, when the magnetic field touch detection is designated, the signal lines SL(n), SL(n+1), SL(n+8) and SL(n+9) are connected in series via the signal wirings 6512, 6522 and 6532, and the coil X(n) is formed using these signal lines as a winding.

At this time, one end portion of each of the coils X(n−1) and X(n) is connected to the voltage wiring LV2, and the ground voltage Vs is supplied thereto. When the coil X(n−1) or/and X(n) is selected by the selection control circuit SRX-D, the selection signal X-Out(n−1) or/and X-Out(n) is/are set to a high level/high levels. Accordingly, the other end portion of the selected coil X(n−1) or/and X(n) is connected to the input/output node XIO(n−1) or/and XIO(n) of the selection control circuit SRX-D via the second switch b00 or/and b01. The selection control circuit SRX-D outputs the clock signal CLK from the input/output nodes XIO(n−1) and X(n) as the magnetic field drive signal in the magnetic field generation period for the magnetic field touch detection. Thus, the magnetic field drive signal with the periodically changing voltage is supplied to the other end portion of the coil X(n−1) or/and X(n) in the magnetic field generation period. As a result, a magnetic field is generated in the coil X(n−1) or/and X(n), in the magnetic field generation period.

The selection control circuit SRX-D maintains only the selection signal X-Out(n−1) or X-Out(n), which corresponds to the coil X(n−1) or X(n) to be selected, to high levels, and changes the selection signal, which corresponds to the coil X(n) or X(n−1) not to be selected, to a low level, in the magnetic field detection period subsequent to the magnetic field generation period. Accordingly, the other end portion of the coil X(n−1) or X(n) to be selected is maintained in the state of being connected to the input/output node of the selection control circuit SRX-D, and the other end portion of the coil not to be selected is separated from the input/output node.

If the pen is present in the vicinity of the selected coil at the time of magnetic field touch detection, a change of the signal is generated in the end portion of the selected coil, as described with reference to FIGS. 2A to 2D. This change of the signal is transmitted to the input/output node of the selection control circuit SRX-D, and is output from the selection control circuit SRX-D as the sense signals SX(n−1) and SX(n). On the other hand, a change of the signal is not generated in the end portion of the selected coil, and such absence of the change is output as the sense signals SX(n−1) and SX(n), in a case where the pen is not present in the vicinity of the selected coil at the time of magnetic field touch detection.

Meanwhile, the first switches a00 to a05, the second switches b00 to b02 and the third switches c00 to c05 are turned into the off-states in the display period. Accordingly, the signal lines SL(n−6) to SL(n+9) are electrically separated from each other. The image signal is supplied from the display control device 4 to the terminal SP in the display period, and this makes the signal lines SL(n−6) to SL(n+9) capable of transmitting the image signal.

The changeover adjustment circuits SCX-U and SCX-D are arranged in the peripheral area of the display panel. That is, the changeover adjustment circuits SCX-U and SCX-D are arranged in the non-active area, which is the peripheral area of the display panel. Thus, the signal wirings 6510 to 6513, 6520 to 6533 and 6530 to 6533, provided in the changeover adjustment circuits SCX-U and SCX-D, can be formed using the wiring of the wiring layer provided in the outer portion of the display area 2. The first wiring layer 601, the second wiring layer 603 and the third wiring layer 605 are also formed in the non-active area, which is the outer portion of the display area 2, at the time of forming the first wiring layer 601, the second wiring layer 603 and the third wiring layer 605 illustrated in FIG. 9 in the display area 2 (the active area). Accordingly, a structure of the non-active area is the same as the structure illustrated in FIG. 9 except that the liquid crystal layer 607 is not present.

The signal wirings 6510 to 6513, 6520 to 6533 and 6530 to 6533 are configured using the wiring of the first wiring layer 601, the second wiring layer 603 or the third wiring layer 605 to be formed in the non-active area. In this embodiment, each of the signal wirings 6510 to 6513, 6520 to 6533 and 6530 to 6533 is formed using the wiring of the third wiring layer 605 which is the same as the third wiring layer 605 to form the drive electrodes TL(0) to TL(p). Accordingly, it is unnecessary to add a new wiring layer in order to form the signal wirings 6510 to 6513, 6520 to 6533 and 6530 to 6533, and it is possible to suppress the increase in the manufacturing cost. As a matter of course, the signal wirings 6510 to 6513, 6520 to 6533 and 6530 to 6533 are not limited to be formed using the wiring of the third wiring layer, and may be formed using the wiring of the first wiring layer 601 or the second wiring layer 603.

<<Configurations of Changeover Adjustment Circuit SC-R and Selection Control Circuit SR-R>>

FIG. 16 is a circuit diagram illustrating configurations of parts of the changeover adjustment circuit SC-R and the selection control circuit SR-R corresponding to the drive electrodes TL(n−6) to TL(n+9), in the changeover adjustment circuit SC-R and the selection control circuit SR-R. Here, as described above, a description will be given regarding a case where the coil Y(n−1) (see FIG. 4) is formed, using the drive electrodes TL(n−6), TL(n−5), TL(n+2) and TL(n+3) and the auxiliary electrodes SM respectively connected thereto as the winding by signal wirings 6311, 6331 and 6321 at the time of magnetic field touch detection. Similarly, a description will be given regarding a case where the coil Y(n) (see FIG. 4) is formed, using the drive electrodes TL(n), TL(n+1), TL(n+8) and TL(n+9) and the auxiliary electrodes SM respectively connected thereto as the winding by signal wirings 6312, 6322 and 6332. These coils are configured by functions of the changeover adjustment circuit SC-R illustrated in FIG. 16 and the changeover adjustment circuit SC-L (FIG. 17) to be described later.

The changeover adjustment circuit SC-R is provided with fourth switches d00 to d15, fifth switches e00 and e01, a sixth switch f00, and the signal wirings 6310, 6312, 6321, 6323, 6331 and 6333. The respective fourth switches d00 to d15 are connected between the drive electrodes TL(n−6) to TL(n+9), and a voltage wiring LV1 in the changeover adjustment circuit SC-R. In this case, the dozens of auxiliary electrodes SM are connected to each of the drive electrodes TL(n−6) to TL(n+9), and these auxiliary electrodes SM are also connected to the corresponding fourth switches. The auxiliary electrodes SM connected to the respective drive electrodes and fourth switches are not illustrated in FIG. 16 in order to avoid the complexity of the drawing. Further, the drive electrodes TL(n−6) to TL(n+9) will be referred also including the auxiliary electrodes SM connected to the drive electrodes TL(n−6) to TL(n+9) in the following description.

The fifth switches e00 and e01 are connected between the respective drive electrodes TL(n−3) and TL(n+9), and the voltage wiring LV2 in the changeover adjustment circuit SC-R. The ground voltage Vs is supplied to the voltage wirings LV1 and LV2, although not particularly limited. An inverted magnetic field enable signal xSC_EN is supplied to the fourth switches d00 to d15 as a switch control signal, and the magnetic field enable signal SC_EN is supplied to the fifth switches e00 and e01 as the switch control signal. Here, the inverted magnetic field enable signal xSC_EN is an enable signal which is formed by phase inversion of the magnetic field enable signal SC_EN. That is, the magnetic field enable signal SC_EN is set to a high level at the time of magnetic field touch detection, while the inverted magnetic field enable signal xSC_EN is set to a high level when the magnetic field touch detection is not designated and in the display period.

The sixth switch f00 is connected between the drive electrode TL(n) and an input/output node YIO(n) of the selection control circuit SR-R in the changeover adjustment circuit SC-R, and is controlled by a selection signal Y-Out(n) from the selection control circuit SR-R.

The signal wiring 6331 connects the drive electrode TL(n−6) and the drive electrode TL(n+2), the signal wiring 6321 connects the drive electrode TL(n−5) and the drive electrode TL(n+3), and the signal wiring 6312 connects the drive electrode TL(n+1) and the drive electrode TL(n+8) in the changeover adjustment circuit SC-R. Further, the signal wiring 6310 connects the drive electrode TL(n−4) and a drive electrode (not illustrated), the signal wiring 6323 connects the drive electrode TL(n+7) and a drive electrode (not illustrated), and the signal wiring 6333 connects the drive electrode TL(n+6) and a drive electrode (not illustrated) in the changeover adjustment circuit SC-R.

The fourth switches d00 to d15 are turned into on-states when the inverted magnetic field enable signal xSC_EN is set to a high level, and turned into off-states when the inverted magnetic field enable signal xSC_EN is set to a low level. Thus, the drive electrodes TL(n−6) to TL(n+9) are electrically separated from the voltage wiring LV1 at the time of magnetic field touch detection, and the drive electrodes TL(n−6) to TL(n+9) are electrically connected to the voltage wiring LV1, for example, in the display period, by the fourth switches d00 to d15.

Further, the fifth switches e00 and e01 are turned into on-states when the magnetic field enable signal SC_EN is set to a high level, and turned into off-states when the magnetic field enable signal SC_EN is set to a low level. Thus, the drive electrodes TL(n−3) and TL(n+9) are connected to the voltage wiring LV2 at the time of magnetic field touch detection, and the drive electrodes TL(n−3) and TL(n+9) are electrically separated from the voltage wiring LV2, for example, in the display period, in the changeover adjustment circuit SC-R.

The selection control circuit SR-R performs the same operation as the selection control circuit SRX-D in cooperation with the selection control circuit SR-L illustrated in FIG. 17. That is, it is possible to say that the selection control circuit SR-RL, which performs the same operation as the selection control circuit SRX-D, is configured using the selection control circuit SR-R and the selection control circuit SR-L. In this case, the selection control circuit SR-RL performs the operation to select the coil when the control signal X-CNT is set to a high level. For example, the selection control circuit SR-RL sets the selection signals to high levels in the order from selection signals Y-Out(0) to Y-Out(p). Further, the selection control circuit SR-RL includes input/output nodes YIO(0) to YIO (p) corresponding to the respective coils Y(0) to Y(p). The selection control circuit SR-RL outputs the clock signal CLK from each of the input/output nodes YIO(0) to YIO (p) in the magnetic field generation period for the magnetic field touch detection. Further, voltages of the input/output nodes YIO(0) to YIO (p) are output as sense signals SY(0) to SY(p) in the magnetic field detection period for the magnetic field touch detection.

In the first embodiment, an even (including zero)-numbered selection signal Y-Out(n), an even-numbered input/output node YIO(n), and an even-numbered sense signal SY(n) are allocated to the selection control circuit SR-R among the selection signals Y-Out(0) to Y-Out(p), the input/output nodes YIO(0) to YIO (p), and the sense signals SY(0) to SY(p) described above. Accordingly, an odd-numbered selection signal Y-Out(n+1), odd-numbered input/output nodes YIO(n−1) and YIO(n+1), and an odd-numbered sense signal SY(n+1) are allocated to the selection control circuit SR-L. Thus, an even-numbered coil is selected by the selection control circuit SR-R, and an odd-numbered coil is selected by the selection control circuit SR-L among the coils Y(0) to Y(p) to be formed in the display area 2 during the magnetic field touch detection.

Only the input/output node YIO(n) and the selection signal Y-Out(n) which correspond to the coil Y(n), among the even-numbered coils, are illustrated in the selection control circuit SR-R illustrated in FIG. 16. When the control signal Y-CNT is set to a high level and the coil Y(n) as the even-numbered coil is selected, the selection control circuit SR-R sets the selection signal Y-Out(n) to a high level.

<<Configurations of Changeover Adjustment Circuit SC-L and Selection Control Circuit SR-L>>

FIG. 17 is a circuit diagram illustrating configurations of parts of the changeover adjustment circuit SC-L and the selection control circuit SR-L corresponding to the drive electrodes TL(n−6) to TL(n+9) in the changeover adjustment circuit SC-L and the selection control circuit SR-L.

The changeover adjustment circuit SC-L is provided with seventh switches g00 to g15, an eighth switch h00, ninth switches i00 and i01, and the signal wirings 6311, 6313, 6320, 6322, 6330 and 6332. The respective seventh switches g00 to g15 are connected between the drive electrodes TL(n−6) to TL(n+9) and the voltage wiring LV1 in the changeover adjustment circuit SC-L.

Further, the eighth switch h00 is connected between the drive electrode TL(n+3) and the voltage wiring LV2 in the changeover adjustment circuit SC-L. The inverted magnetic field enable signal xSC_EN is supplied to the seventh switches g00 to g15 as the switch control signal, and the magnetic field enable signal SC_EN is supplied to the eighth switch h00 as the switch control signal.

The ninth switch i00 is connected between the drive electrode TL(n−6) and the input/output node YIO(n−1) of the selection control circuit SR-L in the changeover adjustment circuit SC-L, and is controlled by the selection signal Y-Out(n−1) from the selection control circuit SR-L. Further, the ninth switch i01 is connected between the drive electrode TL(n+6) and the input/output node YIO(n+1) of the selection control circuit SR-L in the changeover adjustment circuit SC-L, and is controlled by the selection signal Y-Out(n+1) from the selection control circuit SR-L.

The signal wiring 6311 connects the drive electrode TL(n−5) and the drive electrode TL(n+2), the signal wiring 6322 connects the drive electrode TL(n) and the drive electrode TL(n+8), and the signal wiring 6332 connects the drive electrode TL(n+1) and the drive electrode TL(n+9), in the changeover adjustment circuit SC-L. Further, the signal wiring 6320 connects the drive electrode TL(n−4) and a drive electrode (not illustrated), the signal wiring 6330 connects the drive electrode TL(n−3) and a drive electrode (not illustrated), and the signal wiring 6313 connects the drive electrode TL(n+7) and a drive electrode (not illustrated), in the changeover adjustment circuit SC-R.

The seventh switches g00 to g15 are turned into on-states when the inverted magnetic field enable signal xSC_EN is set to a high level, and turned into off-states when the inverted magnetic field enable signal xSC_EN is set to a low level. Thus, the drive electrodes TL(n−6) to TL(n+9) are electrically separated from the voltage wiring LV1 at the time of magnetic field touch detection, and the drive electrodes TL(n−6) to TL(n+9) are electrically connected to the voltage wiring LV1, for example, in the display period, by the seventh switches g00 to g15.

Further, the eighth switch h00 is turned into an on-state when the magnetic field enable signal SC_EN is set to a high level, and turned into an off-state when the magnetic field enable signal SC_EN is set to a low level. Thus, the drive electrode TL(n+3) is connected to the voltage wiring LV2 at the time of magnetic field touch detection, and the drive electrode TL(n+3) is electrically separated from the voltage wiring LV2, for example, in the display period, in the changeover adjustment circuit SC-L.

As described with reference to FIG. 16, the selection control circuit SR-L performs the same operation as the selection control circuit SRX-D in cooperation with the selection control circuit SR-R. The selection control circuit SR-L selects an odd-numbered coil Y(n+1) at the time of magnetic field touch detection. That is, when the control signal Y-CNT is set to a high level, the selection signals Y-Out(n−1) and Y-Out(n+1) of high levels are output at the time of selecting the odd-numbered coils Y(n−1) and Y(n+1).

For example, the selection control circuit SR-L outputs the selection signal Y-Out(n−1) of a high level. Accordingly, the ninth switch i00 is turned into an on-state, and the input/output node YIO(n−1) is connected to the drive electrode TL(n+6) in the changeover adjustment circuit SC-L. Similarly, when the selection signal Y-Out(n+1) is set to a high level, the input/output node TIO (n+1) and the drive electrode TL(n+6) are connected via the ninth switch i01 which has turned into an on-state, in the changeover adjustment circuit SC-L.

<<Operations of Changeover Adjustment Circuits SC-R and SC-L, and Selection Control Circuits SR-R and SR-L>>

When the magnetic field touch detection is designated, the fourth switches d00 to d15 and the seventh switches g01 to g15 are turned into off-states. Accordingly, the drive electrodes TL(n−6) to TL(n+9) are electrically separated from the voltage wiring LV1.

At this time, the drive electrode TL(n−6) and the drive electrode TL(n+2) are connected to each other in the changeover adjustment circuit SC-R, among the drive electrodes TL(n−6) to TL(n+9) arranged in parallel to each other in the display area 2. Similarly, the drive electrode TL(n−5) and the drive electrode TL(n+3) are connected to each other, and the drive electrode TL(n+1) and the drive electrode TL(n+8) are connected to each other, in the changeover adjustment circuit SC-R. At this time, the fifth switches e00 and e01 are turned into the on-states, and thus, the drive electrodes TL(n−3) and TL(n+9) are connected to the voltage wiring LV2 in the changeover adjustment circuit SC-R.

Further, the drive electrode TL(n−5) and the drive electrode TL(n+2) are connected, the drive electrode TL(n) and the drive electrode TL(n+8) are connected, and the drive electrode TL(n+1) and the drive electrode TL(n+9) are connected in the changeover adjustment circuit SC-L. At this time, the eighth switch h00 is turned into the on-state, and thus, the drive electrode TL(n+3) is connected to the voltage wiring LV2.

Accordingly, when the magnetic field touch detection is designated, the drive electrodes TL(n−6), TL(n−5), TL(n+2) and TL(n+3), arranged in parallel to each other in the display area 2, are connected in series via the signal wirings 6311, 6331 and 6321, and the coil Y(n−1) having these drive electrodes as the winding is formed. Similarly, when the magnetic field touch detection is designated, the drive electrodes TL(n), TL(n+1), TL(n+8) and TL(n+9) are connected in series via the signal wirings 6312, 6322 and 6332, and the coil Y(n) having these drive electrodes as the winding is formed.

At this time, one end portion of each of the coils Y(n−1) and Y(n) is connected to the voltage wiring LV2, and the ground voltage Vs is supplied thereto. When the coil Y(n) is selected by the selection control circuit SR-R, the selection signal Y-Out(n) is set to a high level. Accordingly, the other end portion of the selected coil Y(n) is connected to the input/output node YIO(n) of the selection control circuit SR-R via the sixth switch f00. The selection control circuit SR-R outputs the clock signal CLK from the input/output node YIO(n) as the magnetic field drive signal, in the magnetic field generation period for the magnetic field touch detection. Thus, the magnetic field drive signal with the periodically changing voltage is supplied to the other end portion of the coil Y(n) in the magnetic field generation period. As a result, a magnetic field is generated in the coil Y(n) in the magnetic field generation period.

In the magnetic field detection period subsequent to the magnetic field generation period, the selection control circuit SR-R maintains only the selection signal X-Out(n), which corresponds to the coil Y(n) to be selected, in a high level. Accordingly, the other end portion of the selected coil Y(n) is maintained in the state of being connected to the input/output node of the selection control circuit SR-R.

If the pen is present in the vicinity of the selected coil at the time of magnetic field touch detection, a change of the signal is generated in the end portion of the selected coil as described with reference to FIGS. 2A to 2D. This change of the signal is transmitted to the input/output node of the selection control circuit SR-R, and is output from the selection control circuit SR-R as the sense signal SY(n). On the other hand, the change of the signal is not generated in the end portion of the selected coil, and such absence of the change is output as the sense signal SY(n), in a case where the pen is not present in the vicinity of the selected coil at the time of magnetic field touch detection.

In the same manner, the selection control circuit SR-L outputs a sense signal SY(n−1) according to the absence or presence of the pen in the vicinity of the selected coil, in the case of selecting the coil Y(n−1).

Meanwhile, the fourth switches d00 to d15 and the seventh switches g00 to g15 are turned into the on-states in the display period. Accordingly, each of the drive electrodes TL(n−6) to TL(n+9) is connected to the voltage wiring LV1. Since the ground voltage Vs is supplied to the voltage wiring LV1 in this embodiment, the ground voltage Vs is supplied to the drive electrodes TL(n−6) to TL(n+9) as the display drive signal.

The changeover adjustment circuits SC-R and SC-L are arranged in the peripheral area of the display panel. That is, the changeover adjustment circuits SC-R and SC-L are arranged in the non-active area outside the display area 2 (the active area). Thus, the signal wirings 6310 to 6313, 6320 to 6323 and 6330 to 6333, provided in the changeover adjustment circuits SC-R and SC-L, can be formed using the wiring of the wiring layer provided in the outer portion of the display area 2. The first wiring layer 601, the second wiring layer 603 and the third wiring layer 605 are also formed in the non-active area, which is the peripheral area of the display panel, at the time of forming the first wiring layer 601, the second wiring layer 603 and the third wiring layer 605 illustrated in FIG. 9 in the display area 2 (the active area). Accordingly, a structure of the non-active area is the same as the structure illustrated in FIG. 9 except that the liquid crystal layer 607 is not present.

The signal wirings 6310 to 6313, 6320 to 6323 and 6330 to 6333 are formed, using the wiring of the first wiring layer 601, the second wiring layer 603 or the third wiring layer 605 to be formed in the non-active area. In this embodiment, each of the signal wirings 6310 to 6313, 6320 to 6323 and 6330 to 6333 is formed, using the wiring of the second wiring layer 603 which is the same as the second wiring layer 603 to form the signal lines SL(0) to SL(p). Accordingly, it is unnecessary to add a new wiring layer in order to form the signal wirings 6310 to 6313, 6320 to 6323 and 6330 to 6333, and it is possible to suppress the increase in the manufacturing cost. As a matter of course, the signal wirings 6310 to 6313, 6320 to 6323 and 6330 to 6333 are not limited to be formed using the wirings of the second wiring layer, and may be formed using the wiring of the first wiring layer 601 or the third wiring layer 605.

It is possible to extract a coordinate of a position to which the pen is proximate by knowing the proximity (including contact) of the pen through the sense signals SX(n−1), SX(n) and SY(n−1), SY(n) in the above-described manner.

<Configuration of Liquid Crystal Display Device Capable of Performing Magnetic Field Touch Detection and Electric Field Touch Detection>

Figure 18:
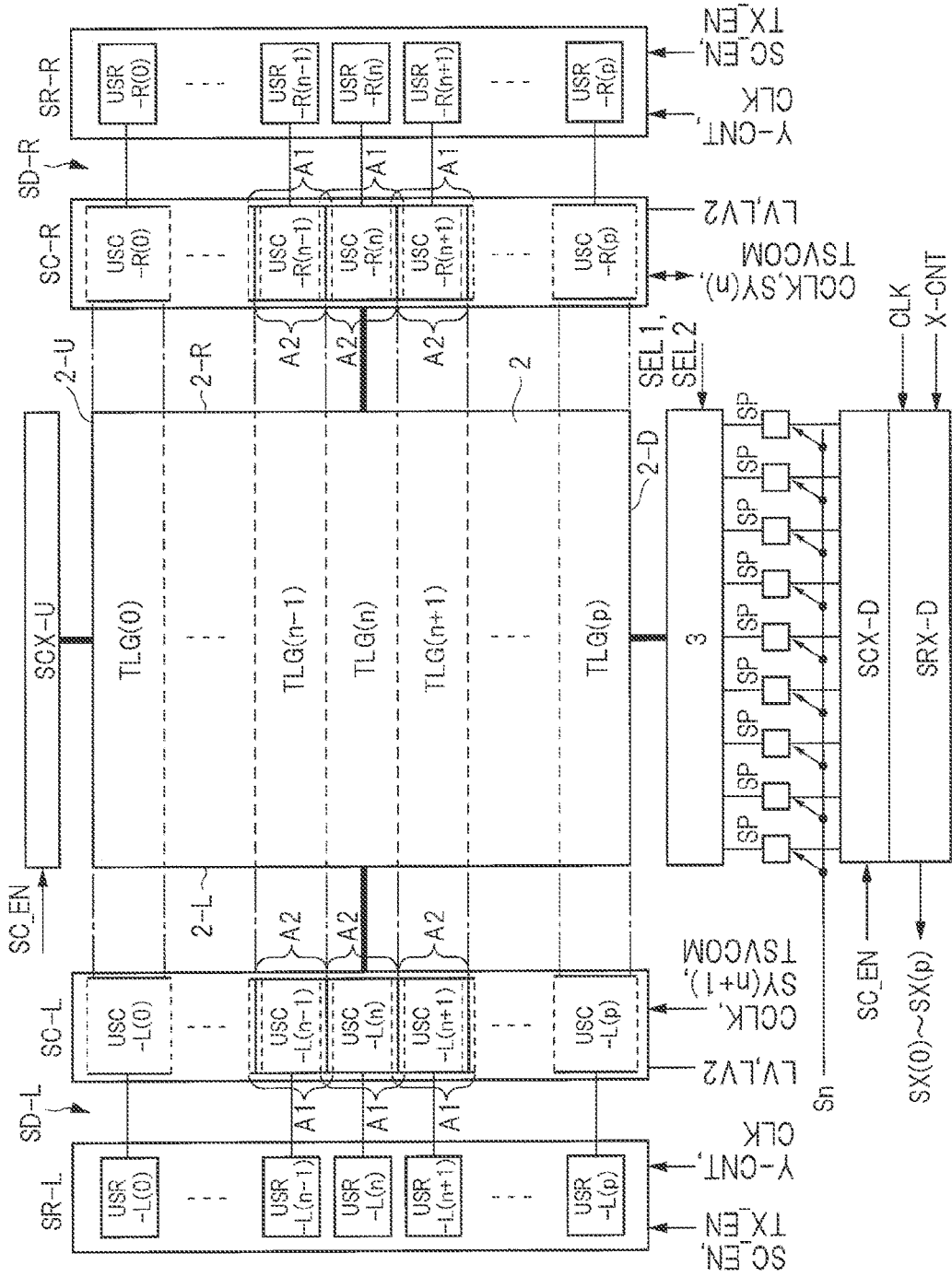
FIG. 18 is a block diagram illustrating the configuration of the liquid crystal display device according to the first embodiment.

FIG. 18 is a block diagram illustrating the configuration of the liquid crystal display device 1 according to the first embodiment. FIG. 18 mainly illustrates the display area 2, the changeover adjustment circuits SCX-U, SCX-D, SC-R and SC-L and the selection control circuits SRX-D, SR-R and SR-L in the liquid crystal display device 1 illustrated in FIG. 7, as similar to FIG. 12. In FIG. 18, the changeover adjustment circuits SC-R and SC-L and the selection control circuits SR-R and SR-L are changed from the liquid crystal display device that has been described with reference to FIG. 12, in order to enable the electric field touch detection, as described with reference to FIG. 7.

The display area 2, the changeover adjustment circuits SCX-U and SCX-D and the selection control circuit SRX-D illustrated in FIG. 18, are the same as the display area 2, the changeover adjustment circuits SCX-U and SCX-D and the selection control circuit SRX-D that have been described with reference to FIG. 12. That is, the display area 2 illustrated in FIG. 18 has the configuration of FIG. 13 that has been described above, and the changeover adjustment circuit SCX-U has the configuration of FIG. 15. Further, the changeover adjustment circuit SCX-D and the selection control circuit SRX-D illustrated in FIG. 18 have the configuration of FIG. 14 that have been described above. The terminal SP and the signal line selector 3 illustrated in FIG. 18 are also the same as the terminal SP and the signal line selector 3 that have been described with reference to FIG. 12. Thus, the descriptions regarding the display area 2, the changeover adjustment circuits SCX-U and SCX-D, the selection control circuit SRX-D, the terminal SP, and the signal line selector 3 will be omitted here except for a necessary case for the sake of description.

Further, the detailed configurations of the changeover adjustment circuits SC-R and SC-L and the selection control circuits SR-R and SR-L will not be described in FIG. 18, in order to avoid the complexity of the drawing, and be described later with reference to FIGS. 19 and 20. Thus, a description will be given regarding outlines of the changeover adjustment circuits SC-R and SC-L and the selection control circuits SR-R and SR-L.

As described with reference to FIGS. 11A and 11B, the changeover adjustment circuit SC-R is configured using the plurality of unit changeover adjustment circuits USC-R(0) to USC-R(p), and the selection control circuit SR-R is also configured using the plurality of unit selection control circuits USR-R(0) to USR-R(p).

The plurality of drive electrodes TL(0) to TL(p), which are arranged in the display area 2, are divided into the plurality of groups TLG(0) to TLG(p) as illustrated by the broken lines in FIG. 18 at the time of magnetic field touch detection and at the time of electric field touch detection. The groups TLG(0) to TLG(p) of the drive electrodes have been already described by exemplifying the group TLG(n) with reference to FIGS. 11A and 11B, an electric field is generated by the drive electrode in the group TLG(n) at the time of electric field touch detection, and a strong magnetic field is generated in the group TLG(n) at the time of magnetic field touch detection. Each of the groups TLG(0)

to TLG(p) is provided with the plurality of drive electrodes which are arranged to be adjacent to each other. The number of the provided drive electrodes is the same among the groups, although not particularly limited. These groups TLG(0) to TLG(p) of the drive electrodes have one-to-one correspondences with the unit selection control circuits USR-R(0) to USD-R (p), and USR-L(0) to USR-L(p).

Each of the unit changeover adjustment circuits USC-R (0) to USC-R(p) and USC-L(0) to USC-L(p) has one-to-one correspondence with each of the unit selection control circuits USR-R(0) to USR-R(p), and USR-L(0) to USC-L (p). The unit changeover adjustment circuit is connected to a drive electrode provided in a group which corresponds to the corresponding unit selection control circuit, and predetermined drive electrodes provided in groups proximately arranged across the corresponding group. A description is given as follows when the unit changeover adjustment circuit USC-R(n) is exemplified, for example.

That is, the unit changeover adjustment circuit USC-R(n) corresponds to the unit selection control circuit USR-R(n), and thus is connected to a drive electrode provided in the group TLG(n) corresponding to the unit selection control circuit USR-R(n), and predetermined drive electrodes in the groups TLG(n−1) and TLG(n+1) arranged across this group TLG(n). The unit changeover adjustment circuit USC-R(n) has a range A1 of the drive electrodes to be coupled in FIG. 18, although schematically illustrated. A range in which the unit changeover adjustment circuit USC-R(n) is connected to the drive electrodes arranged in the group TLG(n) is illustrated by A2, the range A1 is wider than the range A2, and the unit changeover adjustment circuit USC-R(n) is connected to the predetermined drive electrodes arranged in the groups TLG(n−1) and TLG(n+1) arranged across the group TLG(n), in range sections exceeding the range A2. The other unit changeover adjustment circuits are configured in the same manner as above. Thus, the ranges A1 overlap with each other between the unit changeover adjustment circuits.

The predetermined drive electrodes coupled in the overlapping range are used as the winding to configure the coil at the time of magnetic field touch detection, and used as the electrodes to generate an electric field at the electric field touch detection. For example, when specific drive electrodes arranged in the group TLG(n) are considered, the specific drive electrodes are used as the winding to form the coil at the time of generating a magnetic field or detecting a magnetic field in the group TLG(n−1) or TLG(n+1), and used as the electrodes to generate the electric field at the time of generating the electric field in the group TLG(n).

A description will be given as follows regarding the operations at the time of electric field touch detection, and at the time of magnetic field touch detection by exemplifying the unit selection control circuits USR-R(n) and USR-L(n).

When the electric field enable signal TX_EN is set to a high level and the electric field touch detection is designated, the unit selection control circuits USR-R(n) and USR-L(n) controls the corresponding unit changeover adjustment circuits USC-R(n) and USC-L(n) to supply the electric field drive signal to the drive electrode in the corresponding group TLG(n). The voltage of the drive electrode in the group TLG(n) is periodically changed according to the electric field drive signal, and thus, the periodically changing electric field is generated in the area of the group TLG(n).

On the other hand, when the magnetic field enable signal SC_EN is set to a high level and the magnetic field touch detection is designated, the unit selection control circuit USR-R(n) controls the unit changeover adjustment circuit USC-R(n) such that the predetermined drive electrodes, in the respective groups TLG(n−1) and TLG(n+1) close to the group TLG(n), are connected in series so as to generate a magnetic field in the corresponding group TLG(n). Similarly, the unit selection control circuit USR-L(n) also controls the unit changeover adjustment circuit USC-L(n) such that the predetermined drive electrodes in the respective groups TLG(n−1) and TLG(n+1) are connected in series. According to such control, the coil is formed, using the predetermined drive electrodes, arranged on the outer side of the group TLG(n) corresponding to the unit selection control circuits USR-R(n) and USR-L(n), as the winding by the signal wirings. A strong magnetic field is generated in the area of the corresponding group TLG(n) by supplying the magnetic field drive signal to the coil, in the magnetic field generation period. Further, a magnetic field from the pen is detected by the coil in the magnetic field detection period.

Although the description has been given by exemplifying the unit selection control circuits USR-R(n) and USR-L(n), the other unit selection control circuits operate in the same manner.

<<Configurations of Changeover Adjustment Circuit SC-R and Selection Control Circuit SR-R>>

Figure 19:
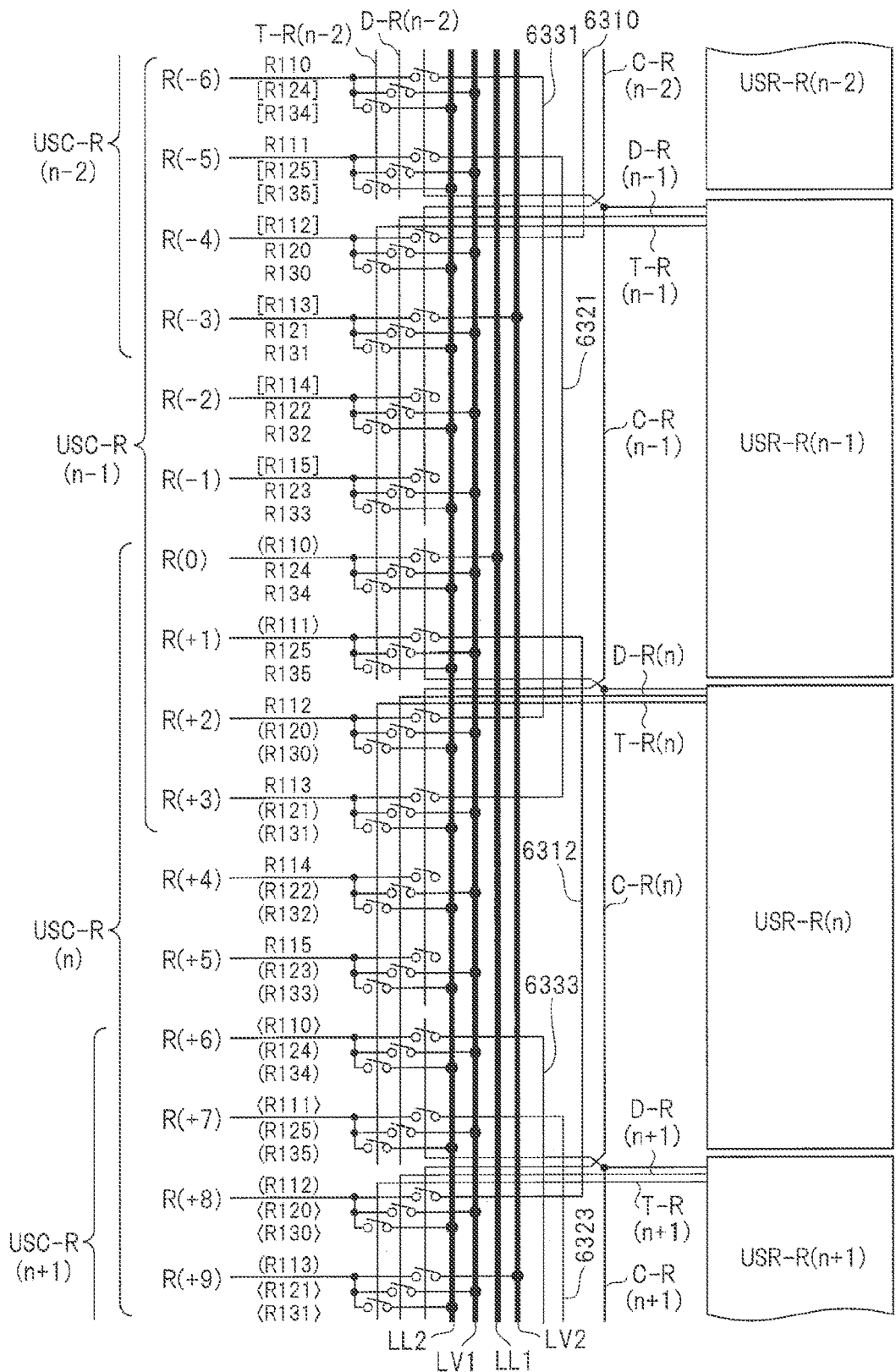
FIG. 19 is a circuit diagram illustrating the configurations of the selection control circuit and the changeover adjustment circuit of the liquid crystal display device according to the first embodiment.

FIG. 19 is a circuit diagram illustrating the configurations of the changeover adjustment circuit SC-R and the selection control circuit SR-R. Although the selection control circuit SR-R is configured using the plurality of unit selection control circuits USR-R(0) to USR-R(p), FIG. 19 only illustrates the unit selection control circuits USR-R(n−2) to USR-R(n+1) corresponding to the drive electrodes TL(n−6) to TL(n+9) illustrated in FIG. 13 among these unit selection control circuits. Further, the changeover adjustment circuit SC-R is also configured using the plurality of unit changeover adjustment circuits USC-R(0) to USC-R(p), but FIG. 19 only illustrates the unit changeover adjustment circuits USC-R(n−2) to USC-R(n+1) corresponding to the unit selection control circuits USR-R(n−2) to USR-R(n+1) among the plurality of unit changeover adjustment circuits. Incidentally, reference signs R(−6) to R(+9) illustrated in FIG. 19 are connected, respectively, to the reference signs R(−6) to R(+9) illustrated in FIG. 13.

In this first embodiment, the plurality of drive electrodes TL(0) to TL(p) are divided into the plurality of groups TLG(0) to TLG(p) of the drive electrodes in the touch detection period, which has been already described above. In this first embodiment, each of the groups TLG(0) to TLG(p) is divided so as to include six drive electrodes, which are arranged to be close to each other, in the touch detection period. That is, the drive electrodes TL(0) to TL(p) are divided into groups each of which includes six drive electrodes in the touch detection period, as illustrated in FIG. 13. When the description is given by exemplifying FIG. 13, the group TLG(n−1) includes six drive electrodes of the drive electrodes TL(n−4) to TL(n+1), and the group TLG(n) includes six drive electrodes of the drive electrodes TL(n+2) to TL(n+7). Further, the group TLG(n−2) includes six drive electrodes including the drive electrodes TL(n−6) and TL(n−5), and the group TL(n+1) includes six drive electrodes including the drive electrodes TL(n+8) and TL(n+9).

Each of the unit selection control circuits USR-R(0) to USR-R(p) has the same configuration, and performs the same operation. As described with reference to FIG. 18, the unit selection control circuits USR-R(0) to USR-R(p) are controlled by the control signal Y-CNT, the clock signal CLK, the magnetic field enable signal SC_EN, and the electric field enable signal TX_N. Each of the unit selection control circuits configuring the selection control circuit forms and outputs magnetic field control signals C-R(0) to C-R(p), electric field control signals T-R(0) to T-R(p), and display control signals D-R(0) to D-R(p) based on the control signal Y-CNT, the clock signal CLK, the magnetic field enable signal SC_EN, and the electric field enable signal TX_EN. Here, the unit selection control circuit will be described using unit selection control circuits USR-R(n−1) and USR-R(n) illustrated in FIG. 19 as representatives. The unit selection control circuit USR-R(n−1) outputs a magnetic field control signal C-R(n−1), an electric field control signal T-R(n−1), and a display control signal D-R(n−1), and the unit selection control circuit USR-R(n) outputs a magnetic field control signal C-R(n), an electric field control signal T-R(n), and a display control signal D-R(n).

Although the unit changeover adjustment circuits USC-R(0) to USC-R(p) respectively correspond to the unit selection control circuits USR-R(0) to USR-R(p), the unit changeover adjustment circuit is connected to the drive electrodes more than the drive electrodes included in the group which corresponds to the corresponding unit selection control circuit, as described with reference to FIG. 18. That is, the unit changeover adjustment circuit is connected to the drive electrodes arranged in the group which corresponds to the corresponding unit selection control circuit, and the predetermined drive electrodes arranged to be close to this group. Since each of the unit changeover adjustment circuits USC-R(0) to USC-R(p) has the same configuration, a description will be given, using unit changeover adjustment circuits USC-R(n−1) and USC-R(n) corresponding to the unit selection control circuits USR-R(n−1) and USR-R(n), as representatives. Incidentally, FIG. 19 illustrates some of configurations of the unit changeover adjustment circuits USC-R(n−2) and USC-R(n+1), which correspond to the unit selection control circuits USR-R(n−2) and USR-R(n+1), other than the unit changeover adjustment circuits USC-R(n−1) and USC-R(n) to be used as the representatives for the description.

First, the configuration will be described using the unit changeover adjustment circuit USC-R(n−1). The unit changeover adjustment circuit USC-R(n−1) includes tenth switches R110 to R115, eleventh switches R120 to R125, twelfth switches R130 to R135, and the signal wirings 6321 and 6331. Here, each of the tenth switches R110 to R115, the eleventh switches R120 to R125 and the twelfth switches R130 to R135 is turned into an on-state by a high-level control signal, and turned into an off-state by a low-level control signal.

The eleventh switches R120 to R125 are connected between each of the drive electrodes TL(n−4) to TL(n+1), which are arranged in the group TLG(n−1) corresponding to the unit selection control circuit USR-R(n−1), and the voltage wiring LV1, and are controlled by the display control signal D-R(n−1) from the unit selection control circuit USR-R(n−1). The twelfth switches R130 to R135 are connected between each of the drive electrodes TL(n−4) to TL(n+1), which are arranged in the group TLG(n−1), and a signal wiring LL2, and are controlled by the electric field control signal T-R(n−1) from the unit selection control circuit USR-R(n−1).

The tenth switch R110 is connected between the predetermined drive electrode TL(n−6) in the group TLG(n−2) arranged next to the group TLG(n−1) and the signal wiring 6331, and the tenth switch R111 is connected between the predetermined drive electrode TL(n−5) in the group TLG(n−2) and the signal wiring 6321, among the tenth switches R110 to R115. These tenth switches R110 and R111 are controlled by the magnetic field control signal C-R(n−1) from the unit selection control circuit USR-R(n−1) corresponding to the group TLG(n−1). Further, the tenth switch R112 is connected between the predetermined drive electrode TL(n+2) in the group TL(n) arranged next to the group TLG(n−1) and the signal wiring 6331, and the tenth switch R113 is connected between the predetermined drive electrode TL(n+3) in the group TL(n) and the signal wiring 6321, among the tenth switches R112 to R115. These tenth switches R112 and R113 are controlled by the magnetic field control signal C-R(n−1) from the unit selection control circuit USR-R(n−1).

The other tenth switches R114 and R115 are connected to the drive electrodes TL(n+4) and TL(n+5) in the group TLG(n), and are controlled by the magnetic field control signal C-R(n−1) from the unit selection control circuit USR-R(n−1). Each of the tenth switches R114 and R115 has one terminal being connected to the drive electrode as described above, and the other terminal being in a floating state. Thus, the drive electrodes TL(n+4) and TL(n+5) are not electrically connected to any parts even when the tenth switches R114 and R115 are turned into on-states. Thus, the tenth switches R114 and R115 are not necessarily provided, but it is possible to maintain sequentially in the tenth switches by providing these switches as in the first embodiment, thereby facilitating the manufacture thereof.

As similar to the unit changeover adjustment circuit USC-R(n−1), each of the unit changeover adjustment circuits, except for the unit changeover adjustment circuit USC-R(n−1), is provided with the tenth switches R110 to R115, the eleventh switches R120 to R125, the twelfth switches R130 to R135, and the signal wirings. For example, the tenth switches R110 to R115 included in the unit changeover adjustment circuit USC-R(n) are represented by (R110) to (R115), the eleventh switches R120 to R125 are represented by (R120) to (R125), and the twelfth switches R130 to R135 are represented by (R130) to (R135) in FIG. 19. In this case, the tenth switches (R110) to (R115) are controlled by the magnetic field control signal C-R(n) from the unit selection control circuit USR-R(n) corresponding to the group TLG(n). Further, the eleventh switches (R120) to (R125) are controlled by the display control signal D-R(n), and the twelfth switches (R130) to (R135) are controlled by the electric field control signal T-R(n).

The eleventh switches (R120) to (R125) are connected between the drive electrodes TL(n+2) to TL(n+7) in the group TLG(n) and the voltage wiring LV1, and the twelfth switches (R130) to (R135) are connected between the drive electrodes TL(n+2) to TL(n+7) and the signal wiring LL2, in the unit changeover adjustment circuit USC-R(n).

The tenth switch (R110) is connected between the predetermined drive electrode TL(n) in the neighboring group TLG(n−1) and the signal wiring LL1, and the tenth switch (R111) is connected between the predetermined drive electrode TL(n+1) in the group TLG(n−1), and the signal wiring 6312, in the unit changeover adjustment circuit USR-R(n). Further, the tenth switch (R112) is connected between the predetermined drive electrode TL(n+8) in the neighboring group TLG(n+1) and the signal wiring 6312, and the tenth switch (R113) is connected between the predetermined drive electrode TL(n+9) in the group TLG(n+1) and the voltage wiring LV2. Incidentally, as similar to the tenth switches R114 and R115, each of the tenth switches (R114) and (R115) is provided such that one terminal thereof is connected to the drive electrode in the group TLG(n+1) arranged next to the group TLG(n), although not illustrated in FIG. 19. As a matter of course, the tenth switches (R114) and (R115) are not necessarily provided.

Incidentally, the tenth switches R112 and R113 included in the unit changeover adjustment circuit USC-R(n−2) are represented by [R112] and [R113], and the eleventh switches R124 and R125 are represented by [R124] and [R125], and the twelfth switches R134 and R135 are represented by [R134] and [R135] in FIG. 19. Further, the tenth switches R110 and R111 included in the unit changeover adjustment circuit USC-R(n+1) are represented by <R110> and <R111>, the eleventh switches R120 and R121 are represented by <R120> and <R121>, and the twelfth switches R130 and R131 are represented by <R130> and <R131> in FIG. 19. Further, reference numeral 6310 represents the signal wiring included in the unit changeover adjustment circuit USC-R(n−2), and reference numerals 6323 and 6333 represent the signal wirings included in the unit changeover adjustment circuit USC-R(n+1) in FIG. 19.

For example, the ground voltage is supplied to the voltage wirings LV1 and LV2 in FIG. 19. The control signal TSV-COM with a periodically changing voltage is supplied to the signal wiring LL2 at the time of electric field touch detection. Further, the coil clock signal CCLK with the periodically changing voltage is supplied to the signal wiring LL1 in the magnetic field generation period during the magnetic field touch detection. Meanwhile, the sense signal SY(n) is transmitted to the signal wiring LL1 in the magnetic field generation period during the magnetic field touch detection.

Incidentally, the ground voltage Vs may be supplied to one wiring of the voltage wiring LV1 and the signal wiring LL2, and a voltage higher than the ground voltage Vs may be supplied to the other wiring thereof at the time of electric field touch detection. In this case, a desired drive electrode is set to be alternately connected to the voltage wiring LV1 and the signal wiring LL2 at the time of electric field touch detection. Accordingly, a voltage of the desired drive electrode is periodically changed at the time of electric field touch detection, which is similar to a case in which a periodic drive signal is supplied. That is, it is possible to generate an electric field in the desired drive electrode at the time of electric field touch detection.

<<Configurations of Changeover Adjustment Circuit SC-L and Selection Control Circuit SR-L>>

Figure 20:
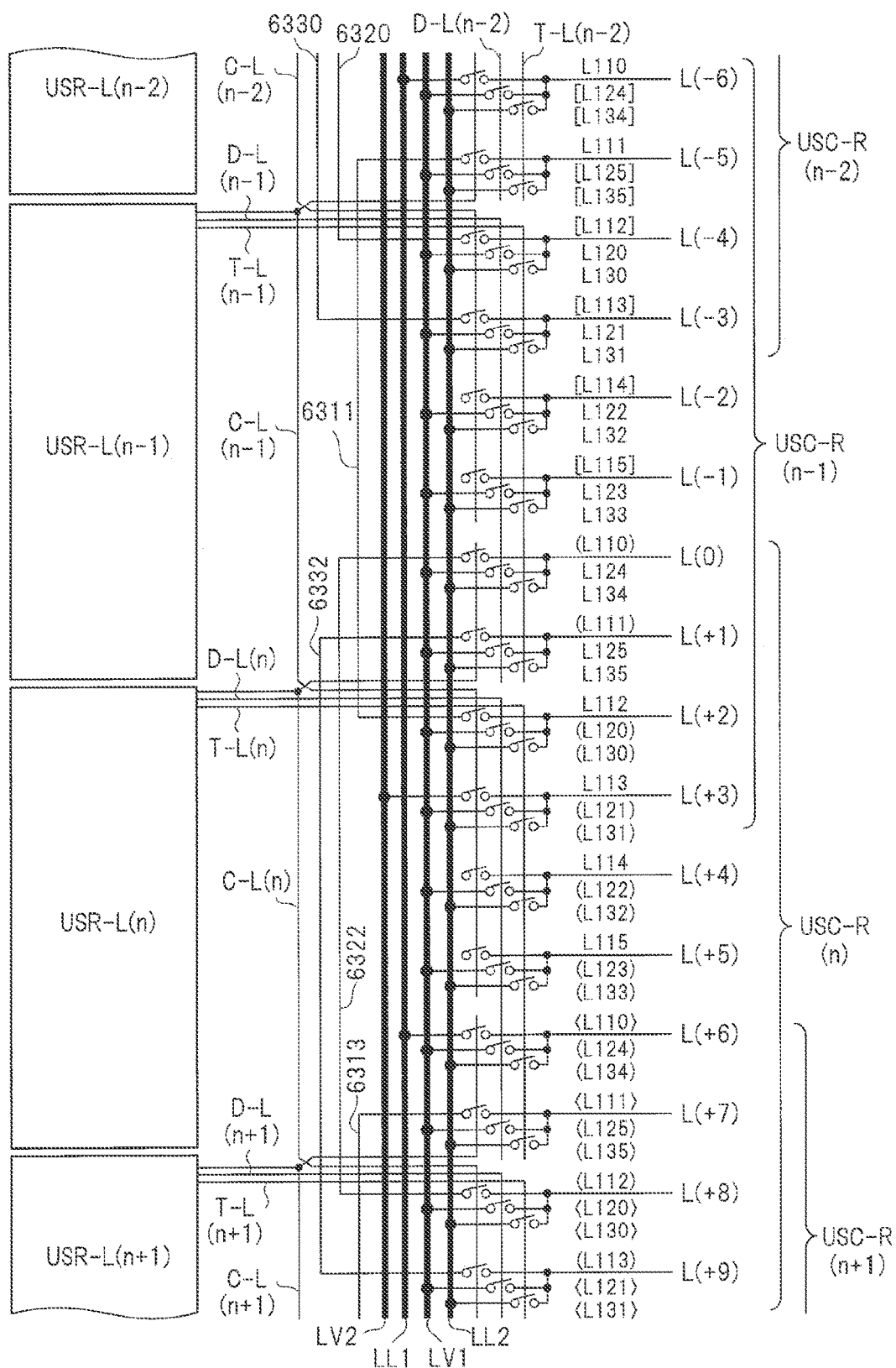
FIG. 20 is a circuit diagram illustrating the configurations of the selection control circuit and the changeover adjustment circuit of the liquid crystal display device according to the first embodiment.

FIG. 20 is a circuit diagram illustrating the configurations of the changeover adjustment circuit SC-L and the selection control circuit SR-L. Although the selection control circuit SR-L is also configured using the plurality of unit selection control circuits USR-L(0) to USR-L(p), FIG. 20 only illustrates unit selection control circuits USR-L(n−2) to USR-L(n+1) corresponding to the drive electrodes TL(n−6) to TL(n+9) illustrated in FIG. 13 among these unit selection control circuits. Further, the changeover adjustment circuit SC-L is also configured using the plurality of unit changeover adjustment circuits USC-L(0) to USC-L(p), but FIG. 20 only illustrates unit changeover adjustment circuits USC-L(n−2) to USC-L(n+1) corresponding to the unit selection control circuits USR-L(n−2) to USR-L(n+1) among the plurality of unit changeover adjustment circuits. Incidentally, the reference signs L(−6) to L(+9) illustrated in FIG. 20 are also connected, respectively, to the reference signs L(−6) to L(+9) illustrated in FIG. 13.

Each of the unit selection control circuits USR-L(0) to USR-L(p) also has the same configuration, and performs the same operation. As described with reference to FIG. 18, the unit selection control circuits USR-L(0) to USR-L(p) are controlled by the control signal Y-CNT, the clock signal CLK, the magnetic field enable signal SC_EN, and the electric field enable signal TX_EN. Each of the unit selection control circuits configuring the selection control circuit forms and outputs magnetic field control signals C-L(0) to C-L(p), electric field control signals T-L(0) to T-L(p), and display control signals D-L(0) to D-L(p) based on the control signal Y-CNT, the clock signal CLK, the magnetic field enable signal SC_EN, and the electric field enable signal TX_EN. Here, a description will be given using unit selection control circuits USR-L(n−1) and USR-L(n) illustrated in FIG. 20 as representatives. The unit selection control circuit USR-L(n−1) outputs the magnetic field control signal C-L(n−1), the electric field control signal T-L(n−1), and the display control signal D-L(n−1), and the unit selection control circuit USR-L(n) outputs the magnetic field control signal C-L(n), the electric field control signal T-L(n), and the display control signal D-L(n).

Although the unit changeover adjustment circuits USC-L(0) to USC-L(p) correspond to the unit selection control circuits USR-L(0) to USR-L(p), the unit changeover adjustment circuit is connected to the drive electrodes more than the drive electrodes included in the group which corresponds to the corresponding unit selection control circuit, as described with reference to FIG. 18. That is, the unit changeover adjustment circuit is connected to the drive electrodes arranged in the group which corresponds to the corresponding unit selection control circuit, and the predetermined drive electrodes arranged to be close to this group. Since each of the unit changeover adjustment circuits USC-L(0) to USC-L(p) also has the same configuration, a description will be given using unit changeover adjustment circuits USC-L(n−1) and USC-L(n) corresponding to the unit selection control circuits USR-L(n−1) and USR-L(n) as representatives. Incidentally, FIG. 20 illustrates some of configurations of the unit changeover adjustment circuits USC-L(n−2) and USC-L(n+1) corresponding to the unit selection control circuits USR-L(n−2) and USR-L(n+1), other than the unit changeover adjustment circuits USC-L(n−1) and USC-L(n) to be used as the representatives for the description.

First, the configuration will be described using the unit changeover adjustment circuit USC-L(n−1). The unit changeover adjustment circuit USC-L(n−1) includes thirteenth switches L110 to L115, fourteenth switches L120 to L125, fifteenth switches L130 to L135, and the signal wiring 6311. Here, each of the thirteenth switches L110 to L115, the fourteenth switches L120 to L125 and the fifteenth switches L130 to L135 is turned into an on-state by a high-level control signal, and is turned into an off-state by a low-level control signal.

The fourteenth switches L120 to L125 are connected between each of the drive electrodes TL(n−4) to TL(n+1), which are arranged in the group TLG(n−1) corresponding to the unit selection control circuit USR-L(n−1), and the voltage wiring LV1, and are controlled by the display control signal D-L(n−1) from the unit selection control circuit USR-L(n−1). The fifteenth switches L130 to L135 are connected between each of the drive electrodes TL(n−4) to TL(n+1), arranged in the group TLG(n−1), and the signal wiring LL2, and are controlled by the electric field control signal T-L(n−1) from the unit selection control circuit USR-L(n−1).

The thirteenth switch L110 is connected between the predetermined drive electrode TL(n−6) in the group TLG(n−2) arranged next to the group TLG(n−1) and the signal wiring LL1, and the thirteenth switch L111 is connected between the predetermined drive electrode TL(n−5) in the group TLG(n−2) and the signal wiring 6311, among the thirteenth switches L110 to L115. These thirteenth switch L110 and L111 are controlled by the magnetic field control signal C-L(n−1) from the unit selection control circuit USR-L(n−1) corresponding to the group TLG(n−1). Further, the thirteenth switch L112 is connected between the predetermined drive electrode TL(n+2) in the group TL(n) arranged next to the group TLG(n−1) and the signal wiring 6311, and the thirteenth switch L113 is connected between the predetermined drive electrode TL(n+3) in the group TL(n) and the voltage wiring LV2, among the thirteenth switches L112 to L115. These thirteenth switches L112 and L113 are controlled by the magnetic field control signal C-L(n−1) from the unit selection control circuit USR-L(n−1).

The other thirteenth switches L114 and L115 are connected to the drive electrodes TL(n+4) and TL(n+5) in the group TLG(n), and are controlled by the magnetic field control signal C-L(n−1) from the unit selection control circuit USR-L(n−1). Each of the thirteenth switches L114 and L115 also has one terminal being connected to the drive electrode as described above, and the other terminal being in the floating state, as similar to the above-described tenth switches R114 and R115. Accordingly, it is possible to maintain sequentiality in the thirteenth switches, thereby facilitating the manufacture thereof.

As similar to the unit changeover adjustment circuit USC-L(n−1), each of the unit changeover adjustment circuits, except for the unit changeover adjustment circuit USC-L(n−1), is provided with the thirteenth switches L110 to L115, the fourteenth switches L120 to L125, the fifteenth switches L130 to L135 and the signal wirings. For example, the thirteenth switches L110 to L115 included in the unit changeover adjustment circuit USC-L(n) are represented by (L110) to (L115), the fourteenth switches L120 to L125 are represented by (L120) to (L125), and the fifteenth switches L130 to L135 are represented by (L130) to (L135) in FIG. 20. In this case, the thirteenth switches (L110) to (L115) are controlled by the magnetic field control signal C-L(n) from the unit selection control circuit USR-L(n) corresponding to the group TLG(n). Further, the fourteenth switches (L120) to (L125) are controlled by the display control signal D-L(n), and the fifteenth switches (L130) to (L135) are controlled by the electric field control signal T-L(n).

In the unit changeover adjustment circuit USC-L(n), the fourteenth switches (L120) to (L125) are connected between the drive electrodes TL(n+2) to TL(n+7) in the group TLG(n) and the voltage wiring LV1, and the fifteenth switches (L130) to (L135) are connected between the drive electrodes TL(n+2) to TL(n+7) and the signal wiring LL2.

In the unit changeover adjustment circuit USR-L(n), the thirteenth switch (L110) is connected between the predetermined drive electrode TL(n) in the neighboring group TLG (n−1) and the signal wiring 6322, and the thirteenth switch (L111) is connected between the predetermined drive electrode TL(n+1) in the group TLG(n−1) and the signal wiring 6332. Further, the thirteenth switch (L112) is connected between the predetermined drive electrode TL(n+8) in the neighboring group TLG(n+1) and the signal wiring 6322, and the thirteenth switch (L113) is connected between the predetermined drive electrode TL(n+9) in the group TLG (n+1) and the signal wiring 6332. Incidentally, as similar to the thirteenth switches L114 and L115, each of the thirteenth switches (L114) and (L115) is provided such that one terminal thereof is connected to the drive electrode in the group TLG(n+1), although not illustrated in FIG. 20.

Incidentally, the thirteenth switches L112 and L113 included in the unit changeover adjustment circuit USC-L (n−2) are represented by [L112] and [L113], the fourteenth switches L124 and L125 are represented by [L124] and [L125], and the fifteenth switches L134 and L135 are represented by [L134] and [L135] in FIG. 20. Further, the thirteenth switch L110 and L111 included in the unit changeover adjustment circuit USC-L(n+1) are represented by <L110> and <L111>, the fourteenth switches L120 and L121 are represented by <L120> and <L121>, and the fifteenth switches L130 and L131 are represented by <L130> and <L131> in FIG. 20. Further, reference numerals 6320 and 6330 represent the signal wirings included in the unit changeover adjustment circuit USC-L(n−2), and reference numeral 6313 represents the signal wiring included in the unit changeover adjustment circuit USC-L(n+1) in FIG. 20.

Although the voltage wirings LV1 and LV2 and the signal wirings LL1 and LL2 in FIG. 20 are the same as those of FIG. 19, and thus will not be described, the signal wiring LL1 transmits the sense signal SY(n+1) instead of the sense signal SY(n) in the magnetic field detection period.

Incidentally, the ground voltage Vs may be supplied to one wiring of the voltage wiring LV1 and the signal wiring LL2, and a voltage higher than the ground voltage Vs may be supplied to the other wiring, at the time of electric field touch detection. In this case, a desired drive electrode is set to be alternately connected to the voltage wiring LV1 and the signal wiring LL2 at the time of electric field touch detection. Accordingly, a voltage of the desired drive electrode is periodically changed at the time of electric field touch detection, which is similar to a configuration in which a periodic drive signal is supplied. That is, it is possible to generate an electric field in the desired drive electrode at the time of electric field touch detection.

<<Operation of Electric Field Touch Detection>>

Next, an operation of the electric field touch detection will be described with reference to FIGS. 13, 19 and 20.

When the electric field enable signal TX_EN is set to a high level and the electric field touch detection is designated, a unit selection control circuit, which corresponds to a group of drive electrodes (selected drive electrodes) that generate an electric field, sets the electric field control signal T-R to a high level. Further, a unit selection control circuit, which corresponds to a group of drive electrodes (unselected drive electrodes) that do not generate an electric field, sets the electric field control signal T-R to a low level. Further, the respective unit selection control circuits form the magnetic field control signals C-R(0) to C-R(p) of low levels and the display control signals D-R(0) to D-R(p) of low levels, in a case where the electric field touch detection is designated.

A description will be given by exemplifying a case where an electric field is generated in the group TLG(n−1) and an electric field is not generated in the group TLG(n) arranged next to the group TLG(n−1) in order to detect whether the finger touches or comes close to the group TLG(n−1). In this case, the unit selection control circuit USR-R(n−1) corresponding to the group TLG(n−1) forms and outputs the electric field control signal T-R(n−1) of a high level. At this time, the unit selection control circuit USR-L(n−1) corresponding to the group TLG(n−1) also forms and outputs the electric field control signal T-R(n−1) of a high level.

Accordingly, the eleventh switches R120 to R125 are turned into the off-states, and the twelfth switches R130 to R135 are turned into the on-states in the corresponding unit changeover adjustment circuit USC-R(n−1). Similarly, the fourteenth switches L120 to L125 are turned into the off-states, and the fifteenth switches L130 to L135 are turned into the on-states in the corresponding unit changeover adjustment circuit USC-L(n−1). As a result, each of the drive electrodes TL(n−4) to TL(n+1) included in the group TLG(n−1) is connected to the signal wiring LL2 on the side 2-R and the side 2-L of the display area 2. Since the control signal TSVCOM with the periodically changing voltage is supplied to the signal wiring LL2 at the time of electric field touch detection, the control signal TSVCOM is supplied to the drive electrodes TL(n−4) to TL(n+1) as the electric field drive signal. Accordingly, voltages of the drive electrodes TL(n−4) to TL(n+1) are periodically changed according to the electric field drive signal. As a result, a periodically changing electric field is generated in the area of the group TLG(n−1). In other words, the electric field drive signal with the periodically changing voltage is supplied to the drive electrode in the group TLG(n−1) to generate the electric field.

Meanwhile, the unit selection control circuits USR-R(n) and USR-L(n), which correspond to the group TLG(n) that does not generate the electric field, form and successively output the electric field control signals T-R(n) and T-L(n) of low levels. Accordingly, the twelfth switches R130 to R135 and the fifteenth switches L130 to L135 are turned into the off-states in the unit changeover adjustment circuits USC-R(n) and USC-L(n) corresponding to the unit selection control circuits USR-R(n) and USR-L(n). Thus, the drive electrodes TL(n+2) to TL(n+7) in the group TLG(n) are successively separated from the signal wiring LL2 on the sides 2-R and 2-L of the display area 2. That is, the control signal TSVCOM is not supplied to the drive electrode in the group TLG(n), and the electric field is not generated.

The unit selection control circuits USR-R(n−1), USR-R(n), USR-L(n−1) and USR-L(n) output the magnetic field control signals C-R(n−1), C-R(n), C-L(n−1) and C-L(n) of low levels at the time of electric field touch detections. Thus, the tenth switches R110 to R115 and (R110) to (R115) and the thirteenth switches L110 to L115 and (L110) to (L115) are turned into the off-states in the respective unit changeover adjustment circuits USC-R(n−1), USC-R(n), USC-L(n−1) and USC-L(n).

It is possible to detect whether the finger touches or comes close to the group TLG(n−1) by detecting a change of the signal in the detection electrodes RL(0) to RL(p) when the electric field is generated in the group TLG(n−1). For example, the selection control circuits SR-R and SR-L change the electric field control signals to high levels, for example, sequentially from T-R(0) and T-L(0) to T-R(p) and T-L(p). That is, the electric field is generated sequentially from the groups TLG(0) to TLG(p) of the drive electrodes. A change of the signal in the detection electrodes RL(0) to RL(p) when the electric field is generated in the respective groups, is supplied to the touch control device 6 (FIG. 7) as the detection signals Rx(0) to Rx(p). Accordingly, it is possible to extract the coordinate of the position touched by the finger in the touch control device 6.

<<Operation of Magnetic Field Touch Detection>>

When the magnetic field enable signal CE_EN is set to a high level and the magnetic field touch detection is designated, the unit selection control circuit, which corresponds to the group that generates the magnetic field, sets the magnetic field control signals C-R and C-L to high levels. Further, the control circuit D-CNT (FIG. 7) forms the coil clock signal CCLK for the magnetic field generation, although not particularly limited. In this first embodiment, the control circuit D-CN generates the coil clock signal CCLK for the magnetic field generation with the periodically changing voltage in the magnetic field generation period during the magnetic field touch detection, and supplies the generated coil clock signal CCLK to the signal wiring LL1. Meanwhile, the unit selection control circuit, which corresponds to the group that does not generate the magnetic field, sets the magnetic field control signals C-R and C-L to low levels. Further, the respective unit selection control circuits form the electric field control signals T-R(0) to T-R(p), T-L(0) to T-L(p) of low levels and the display control signals D-R(0) to D-R(p), D-L(0) to D-L(p) of low levels, although not particularly limited, in a case where the magnetic field touch detection is designated.

A description will be given by exemplifying a case where a magnetic field is generated in the group TLG(n−1) and a magnetic field is not generated in the group TLG(n) arranged next to the group TLG(n−1) in order to detect whether the pen touches or comes close to the group TLG(n−1). In this case, the unit selection control circuit USR-R(n−1) corresponding to the group TLG(n−1) forms and outputs the magnetic field control signal C-R(n−1) of a high level. At this time, the unit selection control circuit USR-L(n−1) corresponding to the group TLG(n−1) also forms and outputs the magnetic field control signal C-L(n−1) of a high level. Meanwhile, the unit selection control circuits USR-R(n) and USR-L(n) corresponding to the group TLG(n) form and output the magnetic field control signals C-R(n) and C-L(n) of low levels.

When the magnetic field control signals C-R(n−1) and C-L(n−1) are set to high levels, the tenth switches R110 to R115 in the unit changeover adjustment circuit USC-R(n−1) are turned into the on-states, and the thirteenth switches L110 to L115 in the unit changeover adjustment circuit USC-L(n−1) are also turned into the on-states. As described above, the other terminal of each of the tenth switches R114 and R115 and the thirteenth switches L114 and L115 is in the floating state. Thus, the drive electrodes TL(n−2) and TL(n−1), arranged in the group TLG(n−1), are turned into floating state. Further, since the electric field control signals T-R(n−1) and T-L(n−1) and the display control signals D-R(n−1) and D-L(n−1) are set to low levels, the eleventh switches, the twelfth switches, the fourteenth switches and the fifteenth switches, included in the unit changeover adjustment circuits USC-R(n−1) and USC-L(n−1), are also turned into the off-states. Accordingly, the drive electrodes TL(n−4) to TL(n+1), arranged in the group TLG(n−1), are turned into floating state.

When the tenth switches R110, R111, R112 and R113 are turned into the on-states in the unit changeover adjustment circuit USC-R(n−1), the drive electrode TL(n−6) and the drive electrode TL(n+2) are connected via the signal wiring 6331, and the drive electrode TL(n−5) and the drive electrode TL(n+3) are connected to the signal wiring 6321. Further, when the thirteenth switches L110, L111, L112 and L113 are turned into the on-states in the unit changeover adjustment circuit USC-L(n−1), the drive electrode TL(n−5) and the drive electrode TL(n+2) are connected to the signal wiring 6311, the drive electrode TL(n−6) is connected to the signal wiring LL1, and the drive electrode TL(n+3) is connected to the voltage wiring LV2. Accordingly, the coil Y(n−1) is formed, using the drive electrodes TL(n−6), TL(n−5), TL(n+2) and TL(n+3) as the winding by the signal wirings 6311, 6321 and 6331, as similar to the description that has been given with reference to FIGS. 16 and 17. That is, the coil having the area of the group TLG(n−1) of the drive electrodes on the inner side is formed.

At this time, the magnetic field control signals C-R(n) and C-L(n) of low levels are output from the unit selection control circuits USR-R(n) and USR-L(n), and thus, the tenth switches R110 to R115 and the thirteenth switches (L110) to (L115) in the unit changeover adjustment circuits USC-R(n) and USC-L(n) are turned into the off-states. As a result, the coil Y(n) is not formed. Further, since the electric field control signals T-R(n) and T-L(n) and the display control signals D-R1 (n) and D-L(n) are set to low levels at this time, the eleventh switches, the twelfth switches, the fourteenth switches and the fifteenth switches in the unit changeover adjustment circuits USC-R(n) and USC-L(n) are also turned into the off-states. Accordingly, the drive electrode TL(n+3) to TL(n+9) in the group TLG(n) arranged next to the group TLG(n−1) are turned into the floating state.

The coil clock signal CCLK is supplied to the signal wiring LL1, and the ground voltage is supplied to the voltage wiring LV2, in the magnetic field generation period during the magnetic field touch detection. The ground voltage is supplied to the drive electrode TL(n+2) via the thirteenth switch L113, and the coil clock signal CCLK is supplied to the drive electrode TL(n−6) via the thirteenth switch L110, in the unit changeover adjustment circuit USC-L(n−1). As a result, a magnetic field is generated by the coil Y(n−1) configured using the drive electrodes arranged in parallel to each other across the area of the group TLG(n−1) in the magnetic field generation period. Further, a change of the signal in the signal wiring LL1 is output as the sense signal SY(n−1) in the magnetic field detection period. Accordingly, it is possible to perform detection on whether the pen touches or comes close to the coil Y(n−1).

Although the description has been given regarding the example in which the magnetic field is generated in the group TLG(n−1) and detected, the coil Y(n) having the drive electrodes TL(n), TL(n+1), TL(n+8) and TL(n+9), which are arranged in parallel to each other across the area of the group TLG(n), as the winding is formed by the signal wirings 6312, 6322 and 6332, for example, in a case where a magnetic field is generated in the group TLG(n) and detected. In this case, the coil Y(n) is connected to the voltage wiring LV2 and the signal wiring LL1 in the unit changeover adjustment circuit USC-R(n). That is, the coil clock signal CCLK is supplied to the coil Y(n) via the unit changeover adjustment circuit USC-R(n) in the magnetic field generation period, and the change of the signal of the signal wiring LL1 in the unit changeover adjustment circuit USC-R(n) is output as the sense signal SY(n) in the magnetic field detection period.

Although the description has been given by exemplifying the groups TLG(n−1) and TLG(n), the same description may be applied even in a case where a magnetic field is generated in another group, and detected.

The changeover adjustment circuits SC-R and SC-L are arranged in the peripheral area of the display panel in the same manner as described with reference to FIGS. 16 and 17. Further, the signal wirings 6310 to 6313, 6320 to 6323 and 6330 to 6333, which have been described with reference to FIGS. 19 and 20, are the same as the signal wirings 6310 to 6313, 6320 to 6323 and 6330 to 6333 illustrated in FIGS. 16 and 17. That is, these signal wirings are formed using the wirings of the second wiring layer 603, as similar to the signal lines SL(0) to SL(p). Thus, it is unnecessary to add a new wiring layer in order to form these wiring layers, and it is possible to suppress the increase in the manufacturing cost.

<<Operation in Display Period>>

The unit selection control circuits USR-R(0) to USR-R(p) sets the display control signals D-R(0) to R-R (p) to high levels in the display period, although not particularly limited. Further, the electric field control signals T-R(0) to T-R(p) and the magnetic field control signals C-R(0) to C-R(p) are set to low levels. At this time, the unit selection control circuits USR-L(0) to USR-L(p) also output the display control signals D-L(0) to D-L(p) of high levels, the electric field control signals T-L(0) to T-L(p) of low levels, and the magnetic field control signals C-L(0) to C-L(p) of low levels.

Accordingly, the tenth switches and the twelfth switches in the respective unit changeover adjustment circuits USC-R(0) to USC-R(p) are turned into the off-states, and the eleventh switches are turned into the on-states. Similarly, the thirteenth switches and the fifteenth switches in the respective unit changeover adjustment circuits USC-L(0) to USC-L(p) are turned into the off-states, and the fourteenth switches are turned into the on-states. Accordingly, each of the drive electrodes TL(0) to TL(p) is connected to the voltage wiring LV1 via the eleventh switch in the changeover adjustment circuit SC-R, and is connected to the voltage wiring LV1 via the fourteenth switch also in the changeover adjustment circuit SC-L. As a result, the ground voltage is supplied to the drive electrodes TL(0) to TL(p) as the display drive voltage in the display period, and the display is performed depending on a voltage difference between the voltage of the image signal and the drive voltage for display in the signal line.

Although the description has been given by exemplifying the coil of a two-turn winding, as the coils Y(n−1) and Y(n) to be formed at the time of magnetic field touch detection, a coil of a single-turn winding may be used, and the coil of a three or more than three-turn winding may be used. It is possible to change the number of turns of the coil by changing the number of the drive electrodes to be connected to each other in the respective unit changeover adjustment circuits USC-R(0) to USC-R(p) and USC-L(0) to USC-L(p) at the time of magnetic field touch detection. Further, it is possible to use any drive electrode as the winding of the coil.

Since the display control signals are set to low levels at the time of electric field touch detection, the drive electrodes, not detecting the touch, in the group, are turned into the floating states, but it may be set such that a predetermined voltage, for example, the ground voltage is supplied. However, when voltages of the drive electrodes in the group, which detects the touch, are changed by setting the drive electrodes, not detecting the touch, in the group, to the floating state, it is possible to reduce charge and discharge of a parasitic capacitance of the drive electrodes, not detecting the touch, in the group, and accordingly, it is possible to acquire speedup in detection.

Further, the drive electrodes except for the drive electrode to which the coil clock signal CCLK is supplied, are turned into the floating state in the magnetic field generation period. Accordingly, it is possible to reduce charge and discharge of a parasitic capacitance of the drive electrode to which the coil clock signal CCLK is not supplied in the magnetic field generation period, and accordingly, it is possible to acquire speedup in detection.

Second Embodiment

Figure 21:
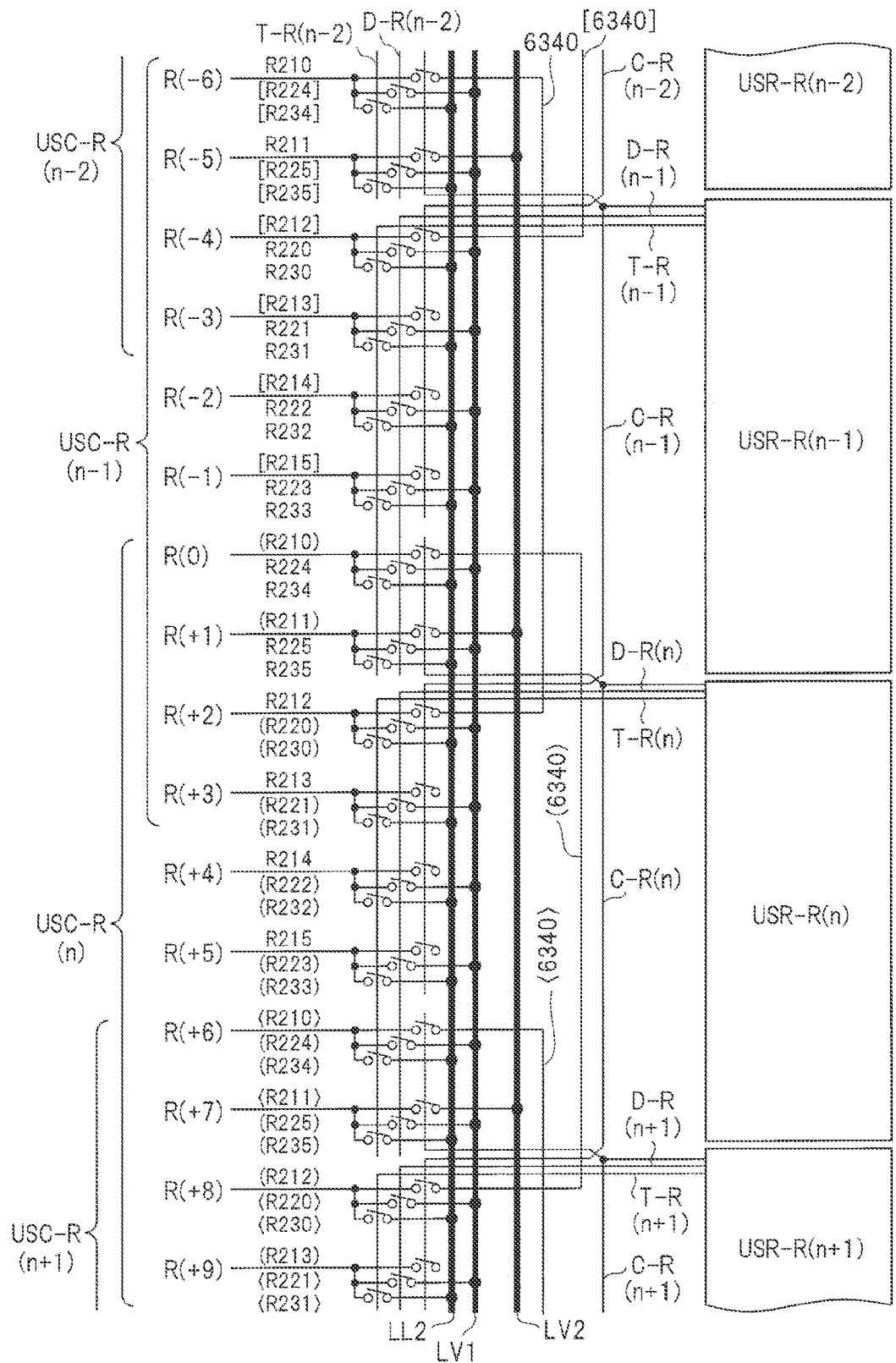
FIG. 21 is a circuit diagram illustrating the configurations of a selection control circuit and a changeover adjustment circuit of a liquid crystal display device according to a second embodiment.
Figure 22:
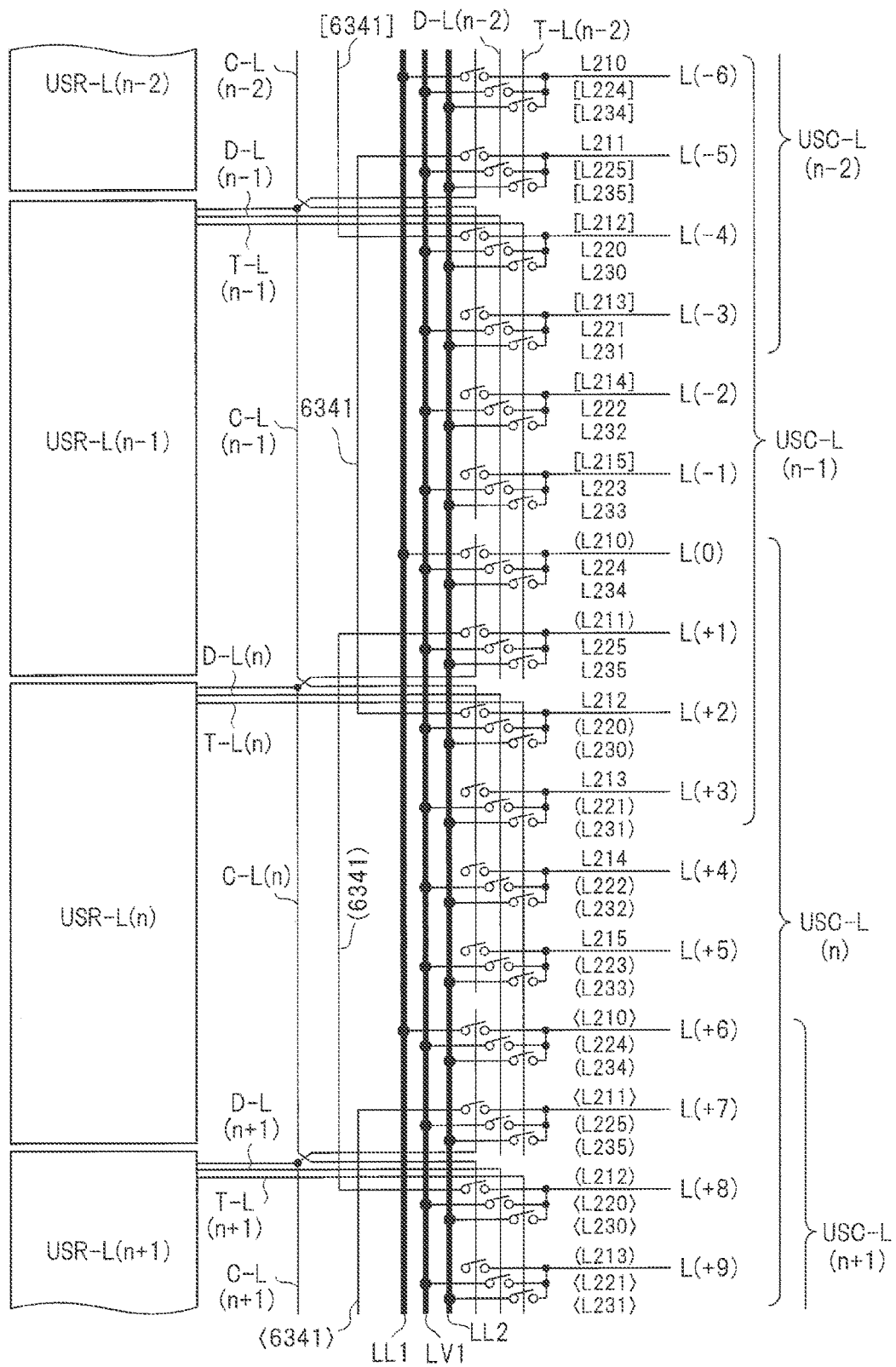
FIG. 22 is a circuit diagram illustrating the configurations of the selection control circuit and the changeover adjustment circuit of the liquid crystal display device according to the second embodiment.

FIGS. 21 and 22 are circuit diagrams illustrating configurations of a selection control circuit and a changeover adjustment circuit of a liquid crystal display device according to a second embodiment. As similar to FIGS. 19 and 20, FIGS. 21 and 22 also illustrate the unit selection control circuits USR-R(n−2) to USR-R(n+1) and USR-L(n−2) to USR-L(n+1) which correspond to the drive electrodes TL(n−6) to TL(n+9) illustrated in FIG. 13. Further, the unit changeover adjustment circuits USC-R(n−2) to USC-R(n+

1) and USC-L(n−2) to USC-L(n+1), which correspond to these unit selection control circuits, are illustrated. The configurations illustrated in FIGS. 21 and 22 are similar to those of FIGS. 19 and 20, and a difference therebetween will mainly be described here. Incidentally, reference signs R(−6) to R(+9) illustrated in FIG. 21 are connected to the same reference signs of FIG. 13, and reference signs R(−6) to R(+9) illustrated in FIG. 21 are connected to the same reference signs of FIG. 13.

The coils each of which has the two-turn winding are formed using the drive electrodes at the time of magnetic field touch detection in the first embodiment. On the other hand, each coil is configured using a coil of a 1.5-turn winding at the time of magnetic field touch detection in the second embodiment. Further, the number of voltage wirings, and signal wirings to transmit the coil clock signal CCLK are reduced, as compared to the first embodiment.

Configurations of the unit selection control circuits USR-R(n−2) to USR-R(n+1) and USR-L(n−2) to USR-L(n+1) are the same as those of the unit selection control circuits illustrated in FIGS. 19 and 20, and thus, the description thereof will be omitted here.

<Configuration of Unit Changeover Adjustment Circuit USR-R>

A configuration of the unit changeover adjustment circuit USC-R will be described using the unit changeover adjustment circuit USC-R(n−1) as a representative. The unit changeover adjustment circuit USC-R(n−1) is provided with sixteenth switches R210 to R215, seventeenth switches R220 to R225, eighteenth switches R230 to R235, and a signal wiring 6340. Here, the seventeenth switches R220 to R225 are connected between the drive electrodes TL(n−4) to TL(n+1), arranged in the group TLG(n−1) which corresponds to the corresponding unit selection control circuit USR-R(n−1), and the voltage wiring LV1. Further, the eighteenth switches R230 to R235 are connected between the drive electrodes TL(n−4) to TL(n+1) in the group TLG(n−1) and the signal wiring LL2. The seventeenth switches R220 to R225 are controlled by the display control signal D-R(n−1) from the corresponding unit selection control circuit USR-R(n−1), and the eighteenth switches R230 to R235 are controlled by the electric field control signal T-R(n−1) from the unit selection control circuit USR-R(n−1).

The sixteenth switch R210 is connected between the drive electrode TL(n−6), which is arranged in the group TLG(n−2) arranged next to the group TLG(n−1), and the signal wiring 6340, and the sixteenth switch 211 is connected between the drive electrode TL(n−5) arranged in the group TLG(n−2) and the voltage wiring LV2. Further, the sixteenth switch R212 is connected between the drive electrode TL(n+2), which is arranged in the group TLG(n) arranged next to the group TLG(n−1), and the signal wiring 6340. Further, each of the sixteenth switches R213 to R215 has one terminal being connected to the drive electrodes TL(n+3) to TL(n+5) in the group TLG(n), and the other terminal being in a floating state. These sixteenth switches R213 to R215 are the same as the tenth switches R114 and R115 that have been described above, and thus, the description thereof will be omitted. The sixteenth switches R210 to R215 are controlled by the magnetic field control signal C-R(n−1) from the corresponding unit selection control circuit USR-R(n−1).

The other unit changeover adjustment circuits also have the same configuration as the unit changeover adjustment circuit USC-R(n−1) described above. In FIG. 21, the sixteenth switches configuring the unit changeover adjustment circuit USC-R(n) are represented by (R210) to (R215), the seventeenth switches are represented by (R220) to (R225), the eighteenth switches are represented by (R230) to (R235), and the signal wiring is represented by (6340). Similarly, the sixteenth switches R212 to R215 are represented by [R212] to [R215], the seventeenth switches R224 and R225 are represented by [R224] and [R225], the eighteenth switches R234 and R235 are represented by [R234] and [R235], and the signal wiring 6340 is represented by [6340], in the unit changeover adjustment circuit USC-R(n−2). Further, the sixteenth switches R210 and R211 are represented by <R210> and <R211>, the seventeenth switches R220 and R221 are represented by <R220> and <R221>, the eighteenth switches R230 and R231 are represented by <R230> and <R231>, and the signal wiring 6340 is represented by <6340>, in the unit changeover adjustment circuit USC-R(n+1).

The sixteenth switches R210 to R213, which are included in the unit changeover adjustment circuit corresponding to the unit selection control circuit (for example, USR-R(n−1)), are divided into two sets in this second embodiment, and are connected to predetermined electrodes in the two groups (TLG(n−2) and TLG(n)) arranged across the group (TLG(n−1)) corresponding to the unit selection control circuit. That is, the sixteenth switches are divided into the sixteenth switches R210 and R211, and the sixteenth switches R212 and R213, and are connected to the predetermined electrode in the group TLG(n−2), and the predetermined electrode in the group TLG(n).

<Configuration of Unit Changeover Adjustment Circuit USR-L>

Next, a configuration of the unit changeover adjustment circuit USC-L will be described using the unit changeover adjustment circuit USC-L(n−1) illustrated in FIG. 22 as a representative. The unit changeover adjustment circuit USC-L(n−1) is provided with nineteenth switches L210 to L215, twentieth switches L220 to L225, twenty-first switches L230 to L235, and a signal wiring 6341. Here, the twentieth switches L220 to L225 are connected between the drive electrodes TL(n−4) to TL(n+1), which are arranged in the group TLG(n−1) which corresponds to the corresponding unit selection control circuit USR-L(n−1), and the voltage wiring LV1. Further, the twenty-first switches L230 to L235 are connected between the drive electrodes TL(n−4) to TL(n+1) in the group TLG(n−1) and the signal wiring LL2. The twentieth switches L220 to L225 are controlled by the display control signal D-L(n−1) from the corresponding unit selection control circuit USR-L(n−1), and the twenty-first switches L230 to L235 are controlled by the electric field control signal T-L(n−1) from the unit selection control circuit USR-L(n−1).

The nineteenth switches L210 is connected between the drive electrode TL(n−6) arranged in the group TLG(n−2) and the signal wiring LL1, and the nineteenth switches L211 is connected between the drive electrode TL(n−5) arranged in the group TLG(n−2) and the signal wiring 6341. Further, the nineteenth switch 212 is connected between the drive electrode TL(n+2), which is arranged in the group TLG(n) arranged next to the group TLG(n−1), and the signal wiring 6341. Further, each of the nineteenth switches L213 to L215 has one terminal being connected to each of the drive electrodes TL(n+3) to TL(n+5) in the group TLG(n), and the other terminal being in a floating state. These nineteenth switches L213 to L215 are the same as the tenth switches R114 and R115 that have been described above, and the description thereof will be omitted. The nineteenth switches L210 to L215 are controlled by the magnetic field control signal C-L(n−1) from the corresponding unit selection control circuit USR-L(n−1).

The other unit changeover adjustment circuit has the same configuration as the unit changeover adjustment circuit USC-L(n−1) described above. In FIG. 22, the nineteenth switches configuring the unit changeover adjustment circuit USC-L(n) are represented by (L210) to (L215), and the twentieth switches are represented by (L220) to (L225), the twenty-first switches are represented by (L230) to (L235), and the signal wiring is represented by (6341). Similarly, the nineteenth switches L212 to L215 are represented by [L212] to [L215], the twentieth switches L224 and L225 are represented by [L224] and [L225], the twenty-first switches L234 and L235 are represented by [L234] and [L235], and the signal wiring 6341 is represented by [6341], in the unit changeover adjustment circuit USC-L(n−2). Further, the nineteenth switches L210 and L211 are represented by <L210> and <L211>, the twentieth switches L220 and L221 are represented by <L220> and <L221>, the twenty-first switches L230 and L231 are represented by <L230> and <L231>, and the signal wiring 6341 is represented by <6341>, in the unit changeover adjustment circuit USC-L(n+1).

The nineteenth switches L210 to L212, which are included in the unit changeover adjustment circuit corresponding to the unit selection control circuit (for example, USR-L(n−1)), are divided into two sets in this second embodiment, and are connected to predetermined electrodes in the two groups (TLG(n−2) and TLG(n)) arranged across the group (TLG(n−1)) corresponding to the unit selection control circuit.

<Magnetic Field Touch Detection>

Next, a description will be given regarding an operation when the magnetic field touch detection is designated with reference to FIGS. 21 and 22. The operations of the electric field touch detection and the display period are the same as the operations that have been described with reference to FIGS. 19 and 20, and thus, the description thereof will be omitted here. Here, a description will be also given by exemplifying a case where it is detected whether the area of the group TLG(n−1) of the drive electrodes is touched by the pen, and the detection of the touch by the pen is not performed on the area of the group TLG(n) during the magnetic field touch detection.

The unit selection control circuit USR-R(n−1) and USR-L(n−1), which correspond to the group TLG(n−1), output the magnetic field control signals C-R(n−1) and C-L(n−1) of high levels, in order to detect the touch by the pen in the area of the group TLG(n−1). On the other hand, the unit selection control circuits USR-R(n) and USR-L(n), which correspond to the group TLG(n), output the magnetic field control signals C-R(n) and C-L(n) of low levels, since the touch by the pen is not detected in the area of the group TLG(n). Further, since the magnetic field touch detection is designated, the electric field control signals T-R(n−1), T-R(n), T-L(n−1), and T-L(n) are set to low levels. Similarly, the display control signals D-R(n−1), D-R(n), D-L(n−1), and D-L(n) are also set to low levels.

The control circuit D-CNT supplies the periodically changing coil clock signal CCLK to the signal wiring LL1, in the magnetic field generation period during the magnetic field touch detection. Further, the ground voltage is supplied to the voltage wiring LV2 in the period for the magnetic field touch detection.

When the magnetic field control signal C-R(n−1) is set to a high level, the sixteenth switches R210 to R212 are turned into on-states in the unit changeover adjustment circuit USC-R(n−1). Accordingly, the drive electrode TL(n−6) in the group TLG(n−2) is connected to the signal wiring 6340 via the sixteenth switch R210, and the drive electrode TL(n−5) is connected to the voltage wiring LV2 via the sixteenth switch R211, in the unit changeover adjustment circuit USC-R(n−1). Further, the drive electrode TL(n+2) in the group TLG(n) is connected to the signal wiring 6340 via the sixteenth switch R212 in the unit changeover adjustment circuit USC-R(n−1).

Meanwhile, when the magnetic field control signal C-L(n−1) is set to a high level, the nineteenth switches L210 to L212 are turned into on-states in the unit changeover adjustment circuit USC-L(n−1). Accordingly, the drive electrode TL(n−6) in the group TLG(n−2) is connected to the signal wiring LL1 via the nineteenth switches L210, and the drive electrode TL(n−5) is connected to the signal wiring 6341 via the nineteenth switches L211 in the unit changeover adjustment circuit USC-L(n−1). Further, the drive electrode TL(n+2) in the group TLG(n) is connected to the signal wiring 6341 via the nineteenth switches L212 in the unit changeover adjustment circuit USC-L(n−1).

Accordingly, the drive electrodes TL(n−6), TL(n−5) and TL(n+2), arranged in parallel to each other across the area of the group TLG(n−1), are connected in series between the voltage wiring LV2 and the signal wiring LL1. Accordingly, the coil of one and half turn (1.5-turn) winding is formed, using these drive electrodes as the winding.

Since the coil clock signal CCLK is supplied to the signal wiring LL1 in the magnetic field generation period, a magnetic field, which is changed according to the coil clock signal CCLK, is generated in the coil using the drive electrodes as the winding. If the pen is present in the vicinity of the area of the group TLG(n−1), the capacitive element inside the pen is charged by the magnetic field energy generated in the coil. The coil inside the pen generates the magnetic field by an electric charge charged in the capacitive element inside the pen, in the magnetic field detection period. A signal of the signal wiring LL1 is changed by the magnetic field energy from the pen. This change is output as the sense signal SY(n−1).

When the coil is formed using the drive electrodes (n−6), TL(n−5) and TL(n+2), the magnetic field control signals C-R(n) and C-L(n) from the unit selection control circuits USR-R(n) and USR-L(n) are set to low levels, the sixteenth switches (R210) to (R215) and the nineteenth switches (L210) to (L215) in the unit changeover adjustment circuits USC-R(n) and USC-L(n) are turned into off-states. Thus, the drive electrodes are not connected to the signal wirings (6340) and (6341), the voltage wiring LV2, and the signal wiring LL1 in the unit changeover adjustment circuits USC-R(n) and USC-L(n), and the coil is not formed.

The signal wirings 6340, (6340), [6340], <6340> and 6341, (6341), [6341] and <6341> are formed, using the wirings of the second wiring layer 603, in the peripheral area of the display panel, also in the second embodiment. Thus, it is unnecessary to add a new wiring layer in order to form these signal wirings, and it is possible to suppress the increase in the manufacturing cost.

Further, it is possible to reduce the number of voltage wirings and signal wirings to be arranged along the side 2-R and the side 2-L of the display area 2, in the second embodiment. As compared to the first embodiment, the signal wiring LL1 to transmit the coil clock signal CCLK is not necessarily arranged on the side 2-R. Further, the voltage wiring LV2 to supply a voltage (ground voltage) to the coil at the time of magnetic field touch detection is not necessarily arranged on the side 2-L. Accordingly, it is possible to narrow the frame.

Further, the second embodiment may also be configured such that the ground voltage Vs is supplied to one wiring of the voltage wiring LV1 and the signal wiring LL2, and a voltage higher than the ground voltage Vs is supplied to the other wiring at the time of electric field touch detection. In this case, a desired drive electrode is set to be alternately connected to the voltage wiring LV1 and the signal wiring LL2 at the time of electric field touch detection. Accordingly, a voltage of the desired drive electrode is periodically changed at the time of electric field touch detection, which is similar to a configuration in which a periodic drive signal is supplied. That is, it is possible to generate an electric field in the desired drive electrode at the time of electric field touch detection.

Third Embodiment

Figure 23:
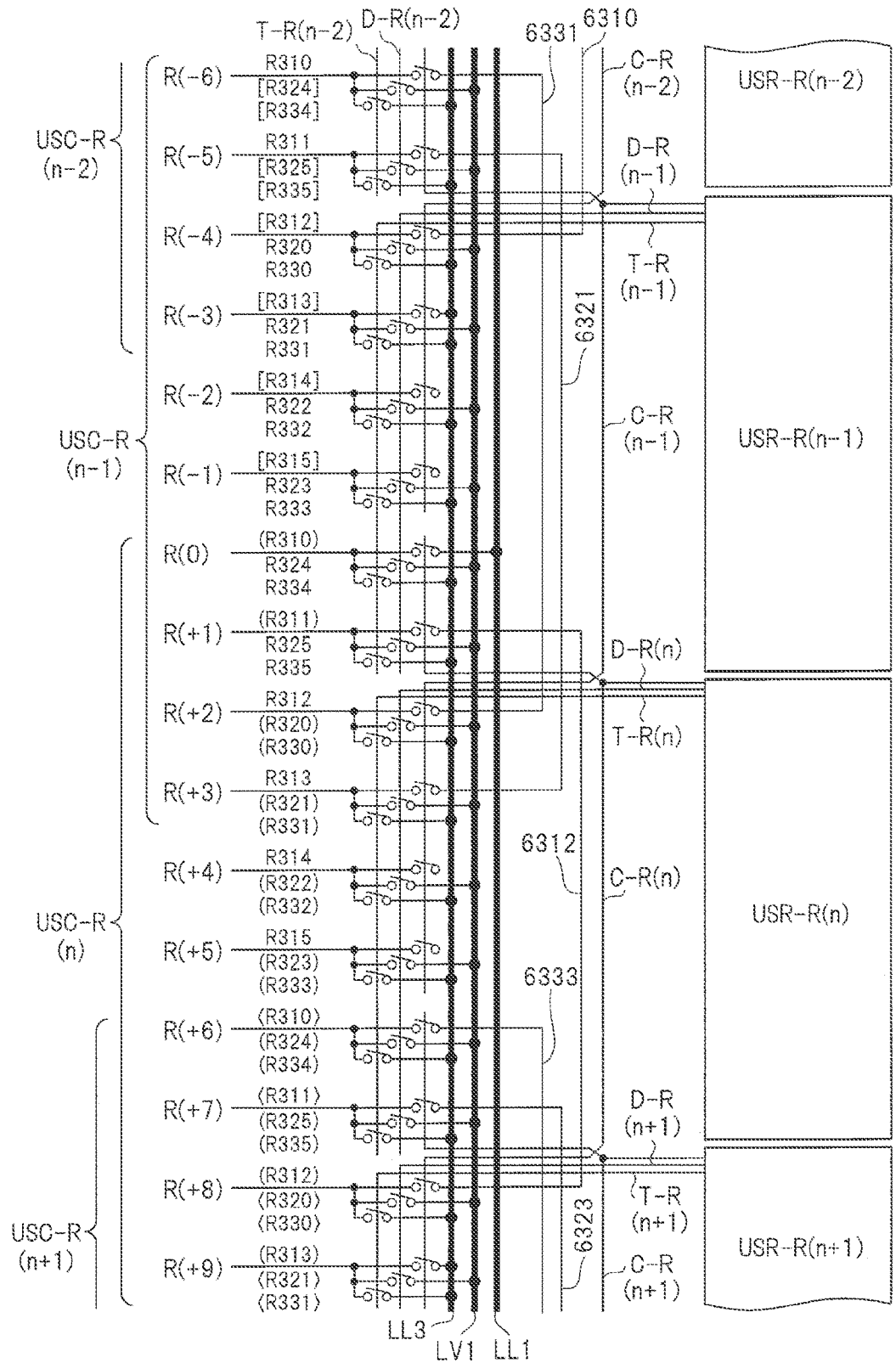
FIG. 23 is a circuit diagram illustrating the configurations of a selection control circuit and a changeover adjustment circuit of a liquid crystal display device according to a third embodiment.
Figure 24:
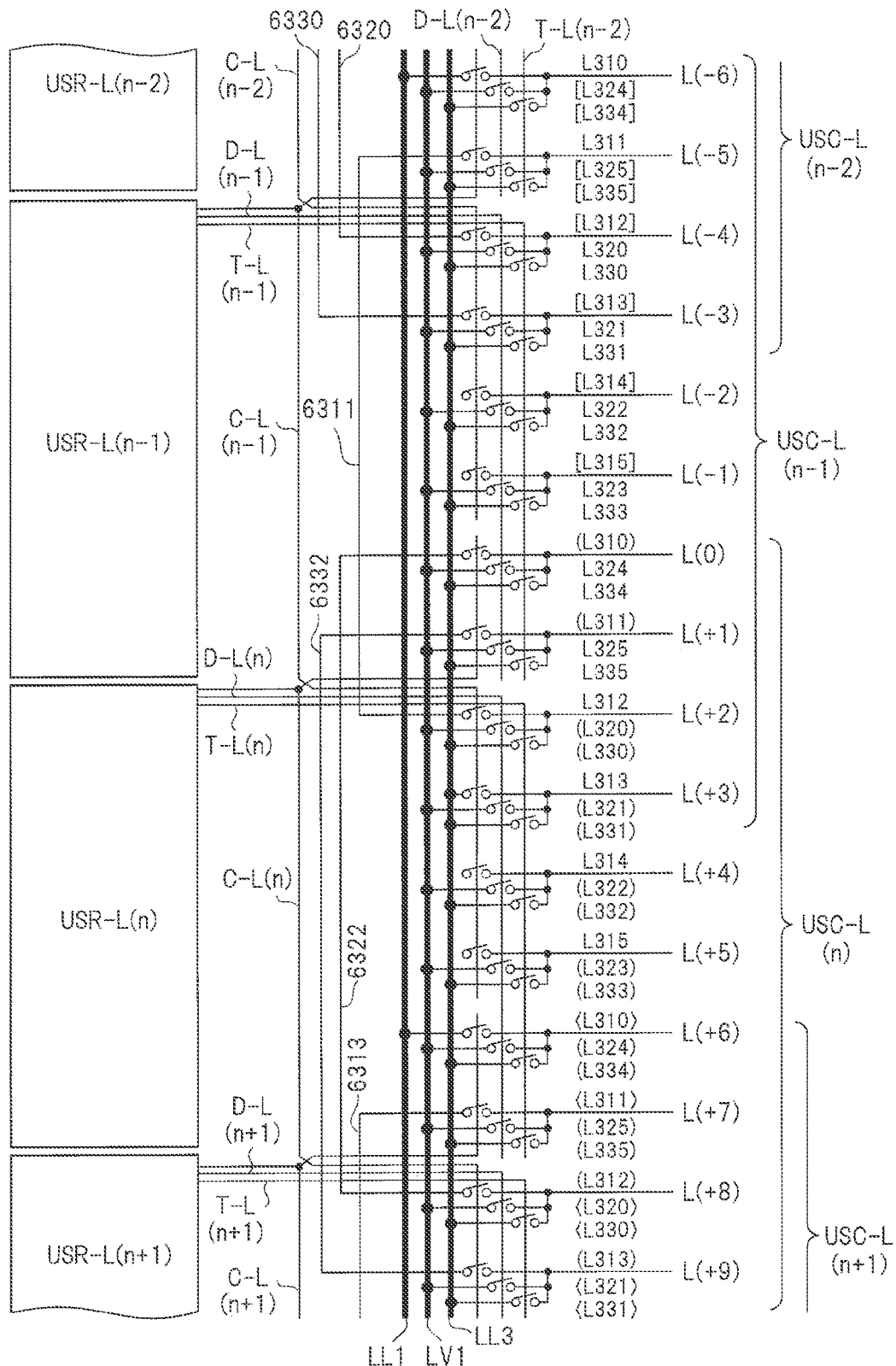
FIG. 24 is a circuit diagram illustrating the configurations of the selection control circuit and the changeover adjustment circuit of the liquid crystal display device according to the third embodiment.

FIGS. 23 and 24 are circuit diagrams illustrating configurations of a selection control circuit and a changeover adjustment circuit of a liquid crystal display device according to a third embodiment. As similar to FIGS. 19 and 20, FIGS. 23 and 24 also illustrate the unit selection control circuits USR-R(n−2) to USR-R(n+1), and USR-L(n−2) to USR-L(n+1) which correspond to the drive electrodes TL(n−6) to TL(n+9) illustrated in FIG. 13. Further, the unit changeover adjustment circuits USC-R(n−2) to USC-R(n+1) and USC-L(n−2) to USC-L(n+1), which correspond to these unit selection control circuits, are illustrated. The configurations illustrated in FIGS. 23 and 24 are similar to those of FIGS. 19 and 20, and a difference therebetween will mainly be described here, as well. Incidentally, reference signs R(−6) to R(+9) illustrated in FIG. 23 are connected to the same reference signs of FIG. 13, and reference signs R(−6) to R(+9) illustrated in FIG. 24 are connected to the same reference signs of FIG. 13.

Configurations of the unit selection control circuits USR-R(n−2) to USR-R(n+1) and USR-L(n−2) to USR-L(n+1) are the same as those of the unit selection control circuits illustrated in FIGS. 19 and 20, and thus, the description thereof will be omitted here, as well. The number of wirings to be connected to the changeover adjustment circuits SC-R and SC-L is reduced while maintaining the number of turns of the coil to be formed at the time of magnetic field touch detection as two, as similar to the first embodiment, in this third embodiment.

<Configuration of Unit Changeover Adjustment Circuit USR-R>

A configuration of the unit changeover adjustment circuit USC-R will be described using the unit changeover adjustment circuits USC-R(n−1) and USC-R(n) illustrated in FIG. 23 as representatives. The unit changeover adjustment circuit USC-R(n−1) is provided with twenty-second switches R310 to R315, twenty-third switches R320 to R325, twenty-fourth switches R330 to R335, and the signal wirings 6321 and 6331. Here, the twenty-third switches R320 to R325 are connected between the drive electrodes TL(n−4) to TL(n+1), arranged in the group TLG(n−1) which corresponds to the corresponding unit selection control circuit USR-R(n−1), and the voltage wiring LV1. Further, the twenty-fourth switches R330 to R335 are connected between the drive electrodes TL(n−4) to TL(n+1) in the group TLG(n−1) and a signal wiring LL3. The twenty-third switches R320 to R325 are controlled by the display control signal D-R(n−1) from the corresponding unit selection control circuit USR-R(n−1), and the twenty-fourth switches R330 to R335 are controlled by the electric field control signal T-R(n−1) from the unit selection control circuit USR-R(n−1).

The twenty-second switch R310 is connected between the drive electrode TL(n−6), arranged in the group TLG(n−2) which is arranged next to the group TLG(n−1), and the signal wiring 6331, and the twenty-second switch R311 is connected between the drive electrode TL(n−5) arranged in the group TLG(n−2) and the signal wiring 6321. Further, the twenty-second switch R312 is connected between the drive electrode TL(n+2), arranged in the group TLG(n) which is arranged next to the group TLG(n−1), and the signal wiring 6331, and the twenty-second switch R313 is connected between the drive electrode TL(n+3) in the group TLG(n) and the signal wiring 6321. Further, each of the twenty-second switches R314 and R315 has one terminal being connected to each of the drive electrodes TL(n+4) and TL(n+5) in the group TLG(n), and the other terminal being in a floating state. These twenty-second switches R314 and R315 are the same as the tenth switches R114 and R115 that have been described above, and thus, the description thereof will be omitted. The twenty-second switches R310 to R315 are controlled by the magnetic field control signal C-R(n−1) from the corresponding unit selection control circuit USR-R(n−1).

Further, the unit changeover adjustment circuit USC-R(n) is also provided with the twenty-second switches to the twenty-fourth switches, as similar to the unit changeover adjustment circuit USC-R(n−1). Here, the twenty-second switches are represented by (R310) to (R315), the twenty-third switch are represented by (R320) to (R325), and the twenty-fourth switch are represented by (R330) to (R335). The twenty-third switches (R320) to (R325) are connected between the drive electrodes TL(n+2) to TL(n+7), arranged in the group TLG(n), and the voltage wiring LV1, as similar to the twenty-third switches R320 to R325, and are controlled by the display control signal D-R(n). Further, the twenty-fourth switches (R330) to (R335) are connected between the drive electrodes TL(n+2) to TL(n+7) and the signal wiring LL3, as similar to the twenty-fourth switches R330 to R335, and are controlled by the electric field control signal T-R(n).

The unit changeover adjustment circuit USC-R(n) is provided with the signal wiring 6312 instead of the signal wirings 6321 and 6331, differently from the unit changeover adjustment circuit USC-R(n−1). The twenty-second switch (R311) is connected between this signal wiring 6312 and the drive electrode TL(n+1) arranged in the next group TLG(n−1), and the twenty-second switch (R312) is connected between the drive electrode TL(n+8) arranged in the next group TLG(n+1) and the signal wiring 6312. Further, the twenty-second switch (R310) is connected between the drive electrode TL(n) in the group TLG(n−1) and the signal wiring LL1, and the twenty-second switch (R313) is connected between the drive electrode TL(n+9) in the next group TLG(n+1) and the signal wiring LL3. Although not illustrated in FIG. 23, each of the twenty-second switches (R314) and (R315) has one terminal being connected to the drive electrode in the group TLG(n+1), and the other terminal being in a floating state. The twenty-second switches (R314) and (R315) are the same as the tenth switches R114 and R115 that have been described above, and thus, the description thereof will be omitted. These twenty-second switches (R310) to (R315) are controlled by the magnetic field control signal C-R(n).

A unit changeover adjustment circuit having the same configuration as the configuration of the above-described unit changeover adjustment circuit USC-R(n−1) and a unit changeover adjustment circuit having the same configuration as the configuration of the above-described unit changeover adjustment circuit USC-R(n) are alternately provided in the changeover adjustment circuit SC-R. For example, the unit changeover adjustment circuit USC-R(n−2) has the same configuration as the unit changeover adjustment circuit USC-R(n), and the unit changeover adjustment circuit USC-R(n+1) has the same configuration as the unit changeover adjustment circuit USC-R(n−1).

Incidentally, the signal wiring 6310 corresponds to the signal wiring 6312, and the signal wirings 6323 and 6333 correspond to the signal wirings 6331 and 6321 in FIG. 23. Further, the twenty-second switches of the unit changeover adjustment circuit USC-R(n−2) are represented by [R312] to [R315], and are controlled by the magnetic field control signal C-R(n−2) in FIG. 23. Further, the twenty-third switches [R324] and [R325] and the twenty-fourth switches [R334] and [R335], which configure the unit changeover adjustment circuit USC-R(n−2), are illustrated in FIG. 23. In FIG. 23, <R310> and <R311> represent the twenty-second switches included in the unit changeover adjustment circuit USC-R(n+1), <R320> and <R321> represent the twenty-third switches included in the unit changeover adjustment circuit USC-R(n+1), and <R330> and <R331> represent the twenty-fourth switches included in the unit changeover adjustment circuit USC-R(n+1).

The twenty-second switches R310 to R313, which are included in the unit changeover adjustment circuit corresponding to the unit selection control circuit (for example, USR-R(n−1)), are also divided into two sets in this third embodiment, and are connected to predetermined electrodes in the two groups (TLG(n−2) and TLG(n)) arranged across the group (TLG(n−1)) corresponding to the unit selection control circuit.

<Configuration of Unit Changeover Adjustment Circuit USR-L>

Next, a configuration of the unit changeover adjustment circuit USC-L will be described using the unit changeover adjustment circuits USC-L(n−1) and USC-L(n) illustrated in FIG. 24 as representatives. The unit changeover adjustment circuit USC-L(n−1) is provided with twenty-fifth switches L310 to L315, twenty-sixth switches L320 to L325, twenty-seventh switches L330 to L335, and the signal wiring 6311. Here, the twenty-sixth switches L320 to L325 are connected between the drive electrodes TL(n−4) to TL(n+1), arranged in the group TLG(n−1) which corresponds to the corresponding unit selection control circuit USR-L(n−1), and the voltage wiring LV1. Further, the twenty-seventh switches L330 to L335 are connected between the drive electrodes TL(n−4) to TL(n+1) in the group TLG(n−1) and the signal wiring LL3. The twenty-sixth switches L320 to L325 are controlled by the display control signal D-L(n−1) from the corresponding unit selection control circuit USR-L(n−1), and the twenty-seventh switches L330 to L335 are controlled by the electric field control signal T-L(n−1) from the unit selection control circuit USR-L(n−1).

The twenty-fifth switch L310 is connected between the drive electrode TL(n−6) arranged in the group TLG(n−2) and the signal wiring LL1, and the twenty-fifth switch L311 is connected between the drive electrode TL(n−5) arranged in the group TLG(n−2) and the signal wiring 6311. Further, the twenty-fifth switch L312 is connected between the drive electrode TL(n+2), arranged in the group TLG(n) arranged next to the group TLG(n−1), and the signal wiring 6311, and the twenty-fifth switch L313 is connected between the drive electrode TL(n+3) in the group TLG(n) and the signal wiring LL3. Further, each of the twenty-fifth switches L314 and L315 has one terminal being connected to each of the drive electrodes TL(n+4) and TL(n+5) in the group TLG(n), and the other terminal being in a floating state. These twenty-fifth switches L314 and L315 are the same as the tenth switches R114 and R115 that have been described above, and thus, the description thereof will be omitted. The twenty-fifth switches L310 to L315 are controlled by the magnetic field control signal C-L(n−1) from the corresponding unit selection control circuit USR-L(n−1).

The unit changeover adjustment circuit USC-L(n) is provided with the signal wirings 6322 and 6332 instead of the signal wiring 6311, differently from the unit changeover adjustment circuit USC-L(n−1). The twenty-fifth switch (L310) is connected between the signal wiring 6322 and the drive electrode TL(n) arranged in the next TLG(n−1), and the twenty-fifth switch (L311) is connected between the drive electrode TL(n+1) in the group TLG(n−1) and the signal wiring 6332. Further, the twenty-second switch (L310) is connected between the drive electrode TL(n+8) in the next group TLG(n+1) and the signal wiring 6322, and the twenty-second switch (L313) is connected between the drive electrode TL(n+9) in the group TLG(n+1) and the signal wiring 6332. Although not illustrated in FIG. 24, each of the twenty-fifth switches (L314) and (L315) has one terminal being connected to the drive electrode in the group TLG(n+1), and the other terminal being in a floating state. These twenty-fifth switches (L314) and (L315) are the same as the tenth switches R114 and R115 that have been described above, and thus, the description thereof will be omitted. These twenty-second switches (L310) to (L315) are controlled by the magnetic field control signal C-R(n).

A unit changeover adjustment circuit having the same configuration as the configuration of the above-described unit changeover adjustment circuit USC-L(n−1) and a unit changeover adjustment circuit having the same configuration as the configuration of the above-described unit changeover adjustment circuit USC-L(n) are alternately provided in the changeover adjustment circuit SC-L. For example, the unit changeover adjustment circuit USC-L(n−2) has the same configuration as the unit changeover adjustment circuit USC-L(n), and the unit changeover adjustment circuit USC-L(n+1) has the same configuration as the unit changeover adjustment circuit USC-L(n−1).

Incidentally, the signal wirings 6320 and 6311 correspond to the signal wirings 6322 and 6332, and the signal wiring 6313 corresponds to the signal wiring 6311 in FIG. 24. Further, the twenty-fifth switches of the unit changeover adjustment circuit USC-R(n−2) are represented by [L312] to [L315], and are controlled by the magnetic field control signal C-L(n−2) in FIG. 24. Further, the twenty-sixth switches [L324] and [L325] and the twenty-seventh switches [L334] and [L335], which configure the unit changeover adjustment circuit USC-L(n−2), are illustrated in FIG. 24. In FIG. 24, <L310> and <L311> represent the twenty-fifth switches included in the unit changeover adjustment circuit USC-L(n+1), <L320> and <L321> represent the twenty-sixth switches included in the unit changeover adjustment circuit USC-L(n+1), and <L330> and <L331> represent the twenty-fifth switches included in the unit changeover adjustment circuit USC-L(n+1).

The unit changeover adjustment circuit USC-L(n−1) and the unit changeover adjustment circuit USC-R(n) have the same configuration except that the drive electrode to be connected, and the control signal (the magnetic field control signal, the electric field control signal, and the display control signal) to be supplied are different from each other.

Similarly, the unit changeover adjustment circuit USC-L(n) and the unit changeover adjustment circuit USC-R(n−1) have the same configuration except that the drive electrode to be connected, and the control signal (the magnetic field control signal, the electric field control signal, and the display control signal) to be supplied are different from each other.

The twenty-fifth switches L310 to L313, which are included in the unit changeover adjustment circuit corresponding to the unit selection control circuit (for example, USR-L(n−1)), are also divided into two sets in this third embodiment, and are connected to predetermined electrodes in the two groups (TLG(n−2) and TLG(n)) arranged across the group (TLG(n−1)) corresponding to the unit selection control circuit.

<Magnetic Field Touch Detection>

Next, a description will be given regarding the operation when the magnetic field touch detection is designated with reference to FIGS. 23 and 24. In this third embodiment, the control circuit D-CNT (FIG. 7) changes a control signal to be supplied to the signal wiring LL3 between the time of magnetic field touch detection and the time of electric field touch detection. That is, the control circuit D-CNT supplies the ground voltage to the signal wiring LL3 at the time of magnetic field touch detection, and supplies the control signal TSVCOM to the signal wiring LL3 at the time of electric field touch detection. Accordingly, the signal wiring LL3 operates as the signal wiring LL2 that has been described in the first embodiment at the time of electric field touch detection. Further, the control circuit D-CNT supplies the periodically changing coil clock signal CCLK to the signal wiring LL1 in the magnetic field generation period for the magnetic field touch detection. Incidentally, the ground voltage is supplied to the voltage wiring LV1 as similar to the second embodiment.

The electric field touch detection is performed in a state that the control signal TSVCOM is supplied to the signal wiring LL3. The operations of the electric field touch detection and the display period are the same as the operations that have been described with reference to FIGS. 19 and 20, and thus, the description thereof will be omitted here.

Here, a description will be also given by exemplifying a case where it is detected whether the area of the group TLG(n−1) of the drive electrodes is touched by the pen, and the detection of the touch by the pen is not performed on the area of the group TLG(n) during the magnetic field touch detection.

The unit selection control circuit USR-R(n−1) and USR-L(n−1), which correspond to the group TLG(n−1), output the magnetic field control signals C-R(n−1) and C-L(n−1) of high levels in order to detect the touch by the pen in the area of the group TLG(n−1). On the other hand, the touch by the pen is not detected in the area of the group TLG(n), and thus, the unit selection control circuits USR-R(n) and USR-L(n), which correspond to the group TLG(n), output the magnetic field control signals C-R(n) and C-L(n) of low levels. Further, since the magnetic field touch detection is designated, the electric field control signals T-R(n−1), T-R(n), T-L(n−1), and T-L(n) are set to low levels. Similarly, the display control signals D-R(n−1), D-R(n), D-L(n−1), and D-L(n) are set to low levels.

The control circuit D-CNT supplies the periodically changing coil clock signal CCLK to the signal wiring LL1 in the magnetic field generation period during the magnetic field touch detection. Further, the control circuit D-CNT supplies the ground voltage to the signal wiring LL3 at the time of magnetic field touch detection.

When the magnetic field control signal C-R(n−1) is set to a high level, the twenty-second switches R310 to R313 are turned into on-states in the unit changeover adjustment circuit USC-R(n−1). Accordingly, the drive electrode TL(n−6) in the group TLG(n−2) is connected to the signal wiring 6321 via the twenty-second switch R310, and the drive electrode TL(n−5) is connected to the signal wiring 6331 via the twenty-second switch R311 in the unit changeover adjustment circuit USC-R(n−1). Further, the drive electrode TL(n+2) in the group TLG(n) is connected to the signal wiring 6331 via the twenty-second switch R312, and the drive electrode TL(n+3) is connected to the signal wiring 6321 via the twenty-second switch R313 in the unit changeover adjustment circuit USC-R(n−1).

Meanwhile, when the magnetic field control signal C-L(n−1) is set to a high level, the twenty-fifth switches L310 to L313 are turned into on-states in the unit changeover adjustment circuit USC-L(n−1). Accordingly, the drive electrode TL(n−6) in the group TLG(n−2) is connected to the signal wiring LL1 via the twenty-fifth switch L310, and the drive electrode TL(n−5) is connected to the signal wiring 6311 via the twenty-fifth switch L311 in the unit changeover adjustment circuit USC-L(n−1). Further, the drive electrode TL(n+2) in the group TLG(n) is connected to the signal wiring 6311 via the twenty-fifth switch L312, and the drive electrode TL(n+3) is connected to the signal wiring LL3 via the twenty-fifth switch L313 in the unit changeover adjustment circuit USC-L(n−1).

Accordingly, the drive electrodes TL(n−6), TL(n−5), TL(n+2) and TL(n+3), which are arranged in parallel to each other across the area of the group TLG(n−1), are connected between the signal wiring LL3 and the signal wiring LL1 in series. That is, the coil of a two-turn winding, using these drive electrodes as the winding, is connected between the signal wiring LL3 and the signal wiring LL1.

Since the ground voltage is supplied to the signal wiring LL3 and the coil clock signal CCLK is supplied to the signal wiring LL1 in the magnetic field generation period, a magnetic field, which is changed according to the coil clock signal CCLK, is generated in the coil using the drive electrodes as the winding. If the pen is present in the vicinity of the area of the group TLG(n−1), the capacitive element inside the pen is charged by the magnetic field energy generated in the coil. The coil inside the pen generates the magnetic field by an electric charge charged in the capacitive element inside the pen, in the magnetic field detection period. A signal of the signal wiring LL1 is changed by the magnetic field energy from the pen. This change is output as the sense signal SY(n−1).

When the coil is formed using the drive electrodes (n−6), TL(n−5) and TL(n+2), the magnetic field control signals C-R(n) and C-L(n) from the unit selection control circuits USR-R(n) and USR-L(n) are set to low levels, the twenty-second switches (R310) to (R313) and the twenty-fifth switches (L310) to (L313) in the unit changeover adjustment circuits USC-R(n) and USC-L(n) are turned into the off-states. Thus, the drive electrodes are not connected to the signal wirings 6312, 6322 and 6332 in the unit selection control circuits USR-R(n) and USR-L(n) and the signal wirings LL1 and LL3, and the coil is not formed.

On the other hand, a description will be given as follows regarding a case where it is detected whether the area of the group TLG(n) of the drive electrodes is touched by the pen, and the detection of the touch by the pen is not performed on the area of the group TLG(n−1) during the magnetic field touch detection.

In this case, the magnetic field control signals C-R(n) and C-L(n) are set to high levels, and the magnetic field control signals C-R(n−1) and C-L(n−1) are set to low levels. The twenty-fifth switches (R310) to (R313) and (L310) to (L313) are turned into on-states in the unit changeover adjustment circuits USC-R(n) and USC-L(n), by high-level magnetic field control signals C-R(n) and C-L(n). When these twenty-fifth switches are turned into the on-states, the drive electrodes TL(n), TL(n+1), TL(n+8) and TL(n+9), which are arranged in parallel to each other across the group TLG(n), are connected in series between the signal wiring LL3 and the signal wiring LL1. Accordingly, the coil of a two-turn winding is formed between the signal wiring LL3 and the signal wiring LL1.

At this time, the drive electrodes TL(n−6), TL(n−5), TL(n+2) and TL(n+3), which are arranged across the group TLG(n−1), are not connected between the signal wiring LL3 and the signal wiring LL1 as the twenty-second switches R310 to R313 and the twenty-fifth switches L310 to L313 are set to the off-states. As a result, the coil having these drive electrode as the winding is not formed.

The signal wiring LL3 and the signal wiring LL1 arranged in the changeover adjustment circuit SC-L are used at the time of generating the magnetic field in the group TLG(n−1) in this third embodiment. That is, the coil is connected between the signal wiring LL3 and the signal wiring LL1 arranged in the changeover adjustment circuit SC-L. The ground voltage is supplied to the signal wiring LL3 and the coil clock signal CCLK is supplied to the signal wiring LL1 in the magnetic field generation period. Further, the ground voltage is supplied to the signal wiring LL3, and the change of the signal in the signal wiring LL1 is output as the sense signal SY(n+1) in the magnetic field detection period.

Further, the signal wiring LL3 and the signal wiring LL1 arranged in the changeover adjustment circuit SC-R are used at the time of generating the magnetic field in the group TLG(n) adjacent to the group TLG(n−1). That is, the coil is connected between the signal wiring LL3 and the signal wiring LL1 arranged in the changeover adjustment circuit SC-R. The ground voltage is supplied to the signal wiring LL3 arranged in the changeover adjustment circuit SC-L, and the coil clock signal CCLK is supplied to the signal wiring LL1 in the magnetic field generation period. Further, the ground voltage is supplied to the signal wiring LL3 arranged in the changeover adjustment circuit SC-L, and the change of the signal in the signal wiring LL1 is output as the sense signal SY(n) in the magnetic field detection period.

In this manner, the sense signals SY(n) and SY(n+1) are alternately output from the changeover adjustment circuit SC-R arranged along the side 2-R of the display area 2 and the changeover adjustment circuit SC-L arranged along the side 2-L in the third embodiment. Further, the signal wiring LL3 is used as the voltage wiring to supply the ground voltage at the time of magnetic field touch detection, and is used as the signal wiring to transmit the control signal TSVCOM at the time of electric field touch detection. That is, the signal wiring LL3 is used in common at the time of magnetic field touch detection and at the time of electric field touch detection. Accordingly, it is possible to reduce the number of wirings to be arranged along the sides of the display area 2, and it is possible to narrow the frame.

The signal wirings 6310 to 6313, 6321 to 6323 and 6330 to 6333 are also formed, using the wirings of the second wiring layer 603, in the peripheral area of the display panel, also in this third embodiment. Thus, it is unnecessary to add a new wiring layer in order to form these signal wirings, and it is possible to suppress the increase in the manufacturing cost.

The third embodiment may also be configured such that the ground voltage Vs is supplied to one wiring of the voltage wiring LV1 and the signal wiring LL2 (LL3), and a voltage higher than the ground voltage Vs is supplied to the other wiring at the time of electric field touch detection. In this case, a desired drive electrode is set to be alternately connected to the voltage wiring LV1 and the signal wiring LL2 (LL3) at the time of electric field touch detection. Accordingly, a voltage of the desired drive electrode is periodically changed at the time of electric field touch detection, which is similar to a configuration in which a periodic drive signal is supplied. That is, it is possible to generate an electric field in the desired drive electrode at the time of electric field touch detection.

Fourth Embodiment

Figure 25:
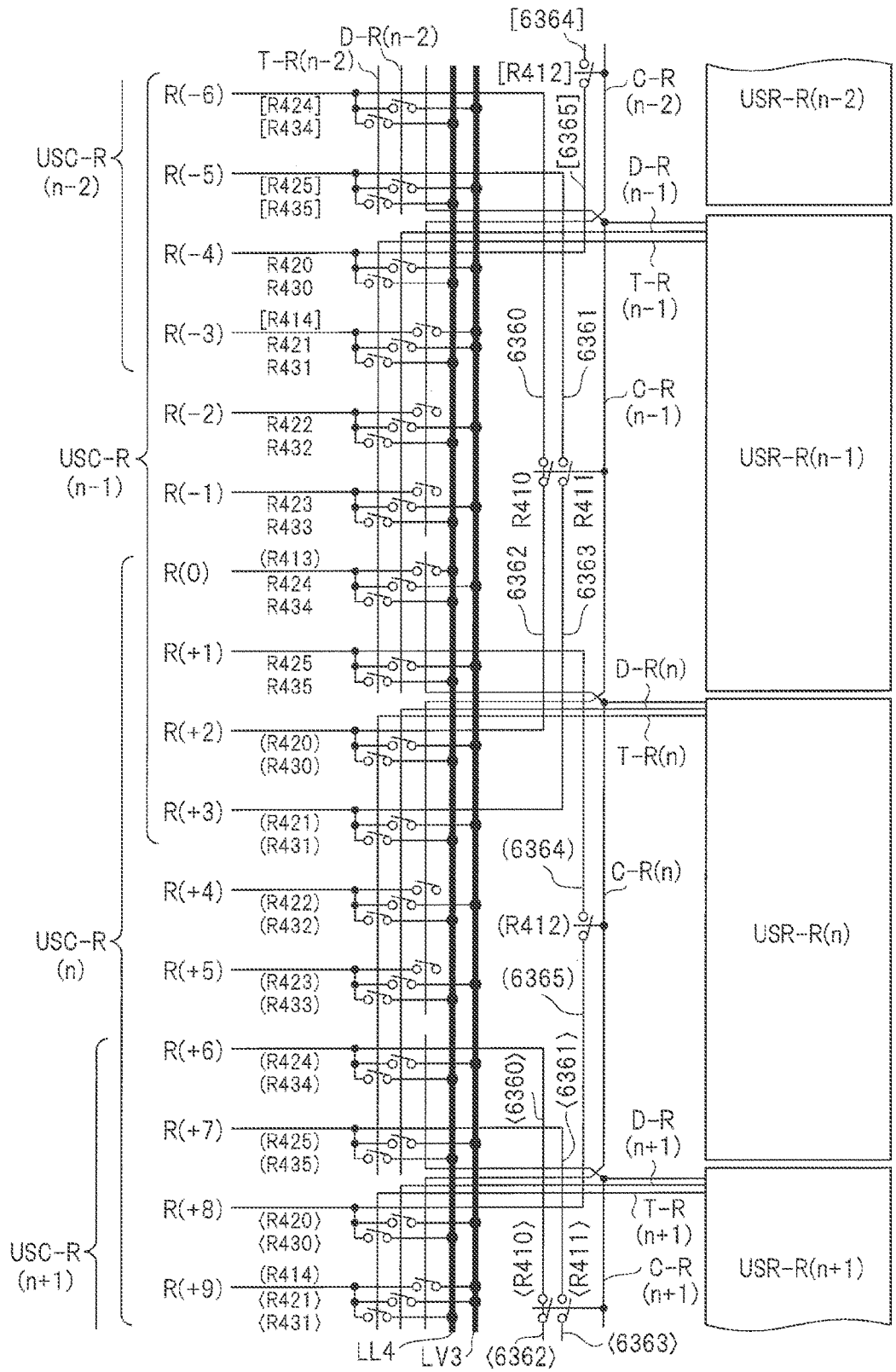
FIG. 25 is a circuit diagram illustrating the configurations of a selection control circuit and a changeover adjustment circuit of a liquid crystal display device according to a fourth embodiment.
Figure 26:
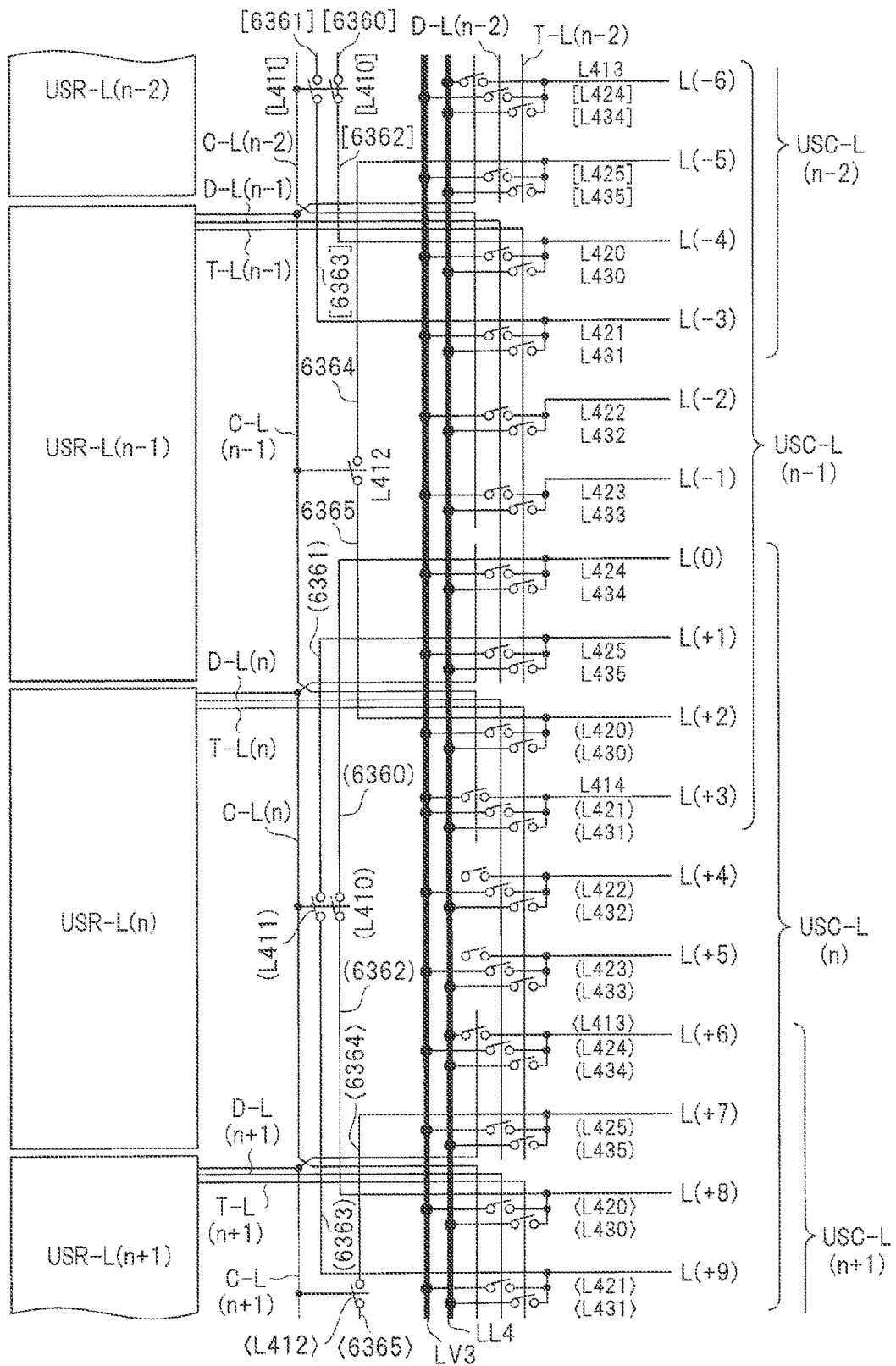
FIG. 26 is a circuit diagram illustrating the configurations of the selection control circuit and the changeover adjustment circuit of the liquid crystal display device according to the fourth embodiment.

FIGS. 25 and 26 are circuit diagrams illustrating configurations of a selection control circuit and a changeover adjustment circuit of a liquid crystal display device according to a fourth embodiment. As similar to FIGS. 19 and 20, FIGS. 25 and 26 also illustrate the unit selection control circuits USR-R(n−2) to USR-R(n+1), and USR-L(n−2) to USR-L(n+9) which correspond to the drive electrodes TL(n−6) to TL(n+9) illustrated in FIG. 13. Further, the unit changeover adjustment circuits USC-R(n−2) to USC-R(n+1) and USC-L(n−2) to USC-L(n+1), which correspond to these unit selection control circuits, are illustrated. The configurations illustrated in FIGS. 25 and 26 are similar to those of FIGS. 19 and 20, and a difference therebetween will mainly be described here, too. Incidentally, reference signs R(−6) to R(+9) illustrated in FIG. 25 are connected to the same reference signs of FIG. 13, and reference signs R(−6) to R(+9) illustrated in FIG. 26 are connected to the same reference signs of FIG. 13.

Configurations of the unit selection control circuits USR-R(n−2) to USR-R(n+1) and USR-L(n−2) to USR-L(n+1) are the same as those of the unit selection control circuits illustrated in FIGS. 19 and 20, and thus, the description thereof will be omitted. The number of wirings to be provided in the changeover adjustment circuits SC-R and SC-L is reduced in this fourth embodiment. Further, it is possible to reduce the number of switches to be included in the changeover adjustment circuits SC-R and SC-L.

<Configuration of Unit Changeover Adjustment Circuit USC-R>

First, a configuration of the unit changeover adjustment circuit USC-R will be described using the unit changeover adjustment circuits USC-R(n−1) and USC-R(n) illustrated in FIG. 25 as representatives. The unit changeover adjustment circuit USC-R(n−1) is provided with twenty-eighth switches R410 and R411, twenty-ninth switches R420 to R425, thirtieth switches R430 to R435, and signal wirings 6360 to 6363. Here, the twenty-ninth switches R420 to R425 are connected between the drive electrodes TL(n−4) to TL(n+1), arranged in the group TLG(n−1) which corresponds to the corresponding unit selection control circuit USR-R(n−1), and a voltage wiring LV3. Further, the thirtieth switches R430 to R435 are connected between the drive electrodes TL(n−4) to TL(n+1) in the group TLG(n−1) and a signal wiring LL4. The twenty-ninth switches R420 to R425 are controlled by the display control signal D-R(n−1) from the corresponding unit selection control circuit USR- R(n−1), and the thirtieth switches R430 to R435 are controlled by the electric field control signal T-R(n−1) from the unit selection control circuit USR-R(n−1).

The twenty-eighth switch R410 is connected between the signal wiring 6360, which is connected to the drive electrode TL(n−6) arranged in the group TLG(n−2) arranged next to the group TLG(n−1), and the signal wiring 6362 which is connected to the drive electrode TL(n+2) arranged in the group TLG(n) arranged next to the group TLG(n−1). Further, the twenty-eighth switch R411 is connected between the signal wiring 6361, which is connected to the drive electrode TL(n−5) arranged in the group TLG(n−2), and the signal wiring 6363 which is connected to the drive electrode TL(n+3) arranged in the group TLG(n). Each of these twenty-eighth switches R410 and R411 is controlled by the magnetic field control signal C-R(n−1) from the unit selection control circuit USR-R(n−1).

Further, the unit changeover adjustment circuit USC-R(n) is provided with twenty-eighth switches (R412) to (R414), twenty-ninth switches (R420) to (R425), thirtieth switches (R430) to (R435), and signal wirings (6364) and (6365). Here, the twenty-ninth switches (R420) to (R425) are connected between the drive electrodes TL(n+2) to TL(n+7), which are arranged in the group TLG(n), and the voltage wiring LV3, as similar to the twenty-ninth switches R420 to R425, and are controlled by the display control signal D-R(n). Further, the thirtieth switches (R430) to (R435) are connected between the drive electrodes TL(n+2) to TL(n+7) and the signal wiring LL4 as similar to the thirtieth switches R430 to R435, and are controlled by the electric field control signal T-R(n).

The twenty-eighth switch (R412) is connected between the signal wiring (6364), which is connected to the drive electrode TL(n+1) arranged in the group TLG(n−1), and the signal wiring (6365) which is connected to the drive electrode TL(n+8) arranged in the group TLG(n+1). Further, the twenty-eighth switch (R413) is connected between the drive electrode TL(n) in the group TLG(n−1) and the signal wiring LL4, and the twenty-eighth switch (R414) is connected between the drive electrode TL(n+9) in the group TLG(n+1) and the voltage wiring LV3. These twenty-eighth switches (R412) to (R414) are controlled by the magnetic field control signal C-R(n) from the corresponding unit selection control circuit USR-R(n).

FIG. 25 illustrates a switch of which one terminal is connected to a drive electrode and which is controlled by a magnetic field control signal without attaching a reference sign thereto. For example, a switch which is connected to the drive electrode TL(n−2) and is controlled by the magnetic field control signal T-R(n−1) is illustrated. These switches without being attached with any reference sign are the same as the tenth switches R114 and R115 that have been described above. Thus, the reference sign and description thereof will be omitted regarding these switches.

A unit changeover adjustment circuit having the same configuration as the configuration of the above-described unit changeover adjustment circuit USC-R(n−1) and a unit changeover adjustment circuit having the same configuration as the configuration of the above-described unit changeover adjustment circuit USC-R(n) are alternately provided in the changeover adjustment circuit SC-R. For example, the unit changeover adjustment circuit USC-R(n−2) has the same configuration as the unit changeover adjustment circuit USC-R(n), and the unit changeover adjustment circuit USC-R(n+1) has the same configuration as the unit changeover adjustment circuit USC-R(n−1).

Reference signs [ ] are attached, instead of reference signs ( ) with respect to the twenty-ninth switches to the thirtieth switches and the signal wirings included in the unit changeover adjustment circuit USC-R(n−2) in FIG. 25. For example, the twenty-eighth switch (R412) is drawn as [R412] by attaching the reference sign [ ] instead of the reference sign ( ) in the unit changeover adjustment circuit USC-R(n−2). Similarly, reference signs < > are attached with respect to the twenty-ninth switches to the thirtieth switches and the signal wirings included in the unit changeover adjustment circuit USC-R(n+1). When the twenty-eighth switches R410 and R411 are exemplified, the twenty-eighth switches R410 and R411 are drawn as <R410>, and <R411> in the unit changeover adjustment circuit USC-R (n+1).

The twenty-eighth switches R410 and R411, which are included in the unit changeover adjustment circuit corresponding to the unit selection control circuit (for example, USR-R(n−1)), are selectively connected to between the predetermined drive electrodes in the two groups (TLG(n−2) and TLG(n)) arranged across the group (TLG(n−1)) corresponding to the unit selection control circuit, according to the magnetic field control signal C-R(n−1), in the fourth embodiment.

<Configuration of Unit Changeover Adjustment Circuit USC-L>

Next, a configuration of the unit changeover adjustment circuit USC-L will be described using the unit changeover adjustment circuits USC-L(n−1) and USC-L(n) illustrated in FIG. 26 as representatives. The unit changeover adjustment circuit USC-L(n−1) is provided with thirty-first switches L412 to L414, thirty-second switches L420 to L425, thirty-third switches L430 to L435, and the signal wirings 6364 and 6365. Here, the thirty-second switches L420 to L425 are connected between the drive electrodes TL(n−4) to TL(n+1), arranged in the group TLG(n−1) which corresponds to the corresponding unit selection control circuit USR-L(n−1), and the voltage wiring LV3. Further, the thirty-third switches L430 to L435 are connected between the drive electrodes TL(n−4) to TL(n+1) in the group TLG(n−1) and the signal wiring LL4. The thirty-second switches L420 to L425 are controlled by the display control signal D-L(n−1) from the corresponding unit selection control circuit USR-L(n−1), and the thirty-third switches L430 to L435 are controlled by the electric field control signal T-L(n−1) from the unit selection control circuit USR-L(n−1).

The thirty-first switch L412 is connected between the signal wiring 6364, which is connected to the drive electrode TL(n−6) arranged in the group TLG(n−2), and the signal wiring 6365 which is connected to the drive electrode TL(n+2) arranged in the group TLG(n). Further, the thirty-first switch L413 is connected between the drive electrode TL(n−6) arranged in the group TLG(n−2) and the signal wiring LL4, and the thirty-first switch L414 is connected between the drive electrode TL(n+3) arranged in the group TLG(n) and the voltage wiring LV4. Each of these thirty-first switches L412 to L414 is controlled by the magnetic field control signal C-L(n−1) from the corresponding unit selection control circuit USR-L(n−1).

Further, the unit changeover adjustment circuit USC-L(n) is provided with thirty-first switches (L410) and (L411), thirty-second switches (L420) to (L425), thirty-third switches (L430) to (L435), and signal wirings (6360) to (6363). Here, the thirty-second switches (L420) to (L425) are connected between the drive electrodes TL(n+2) to TL(n+7), arranged in the group TLG(n) which corresponds to the unit selection control circuit USR-L(n), and the voltage wiring LV3. Further, the thirty-third switches (L430) to (L435) are connected between the drive electrodes TL(n+2) to TL(n+7) in the group TLG(n) and the signal wiring LL4. The thirty-second switches (L420) to (L425) are controlled by the display control signal D-L(n) from the corresponding unit selection control circuit USR-L(n), and the thirty-third switches (L430) to (L435) are controlled by the electric field control signal T-L(n) from the unit selection control circuit USR-L(n).

The thirty-first switch (L410) is connected between the signal wiring (6360), which is connected to the drive electrode TL(n) arranged in the group TLG(n−1) arranged next to the group TLG(n), and the signal wiring (6362) which is connected to the drive electrode TL(n+8) arranged in the group TLG(n+1) arranged next to the group TLG(n). Further, the thirty-first switch (L411) is connected between the signal wiring (6361), which is connected to the drive electrode TL(n+1) arranged in the group TLG(n−1), and the signal wiring (6363) which is connected to the drive electrode TL(n+9) arranged in the group TLG(n+1). Each of these thirty-first switches (L410) and (L411) is controlled by the magnetic field control signal C-L(n) from the unit selection control circuit USR-L(n).

A unit changeover adjustment circuit having the same configuration as the configuration of the above-described unit changeover adjustment circuit USC-L(n−1) and a unit changeover adjustment circuit having the same configuration as the configuration of the above-described unit changeover adjustment circuit USC-L(n) are alternately provided in the changeover adjustment circuit SC-L. For example, the unit changeover adjustment circuit USC-L(n−2) has the same configuration as the unit changeover adjustment circuit USC-L(n), and the unit changeover adjustment circuit USC-L(n+1) has the same configuration as the unit changeover adjustment circuit USC-L(n−1).

In FIG. 26, reference signs [ ] are attached, instead of reference signs ( ), with respect to the thirty-first switches to the thirty-third switches, and the signal wirings which are included in the unit changeover adjustment circuit USC-L(n−2). For example, the thirty-first switches (L410) and (L411) are attached with the reference signs [ ], instead of the reference signs ( ), and are drawn as [L410] and [L411] in the unit changeover adjustment circuit USC-L(n−2). Similarly, reference signs < > are attached with respect to the thirty-first switches to the thirty-third switches, and the signal wirings which are included in the unit changeover adjustment circuit USC-L(n+1). When the thirty-first switch L412 is exemplified, the thirty-first switch R412 is drawn as <L412> in the unit changeover adjustment circuit USC-L(n+1).

As understood from the above description regarding the configurations of the unit changeover adjustment circuits USC-R and USC-L, the configuration of the unit changeover adjustment circuit USC-R(n+1) and the configuration of the unit changeover adjustment circuit USC-L(n) are the same, and the configuration of the unit changeover adjustment circuit USC-R(n) and the configuration of the unit changeover adjustment circuit USC-L(n+1) are the same, except for the drive electrode and the control signal for use to be connected. The unit changeover adjustment circuit USC-R(n+1) and the unit changeover adjustment circuit USC-L(n+1) operate as a set, and the unit changeover adjustment circuit USC-R(n) and the unit changeover adjustment circuit USC-L(n) operate as a set, at the time of magnetic field touch detection, and accordingly the coil is formed.

<Magnetic Field Touch Detection>

Next, a description will be given regarding the operation when the magnetic field touch detection is designated with reference to FIGS. 25 and 26. In this fourth embodiment, the control circuit D-CNT (FIG. 7) changes a signal and a voltage to be supplied to the signal wiring LL4 and the voltage wiring LV4 depending on whether the electric field touch detection is designated, the magnetic field touch detection is designated, or it is the display period.

That is, the control circuit D-CNT supplies the control signal TSVCOM to the signal wiring LL4 when the electric field touch detection is designated. On the other hand, the control circuit D-CNT supplies the coil clock signal CCLK to the signal wiring LL4 in the magnetic field generation period, and stops the supply of the coil clock signal CCLK to the signal wiring LL4 and sets the signal wiring LL4 to a high-impedance state in the magnetic field detection period, in a case where the magnetic field touch detection is designated. Further, the control circuit D-CNT supplies the ground voltage to the voltage wiring LV3 when the magnetic field touch detection is designated, and supplies the voltage of the display drive signal to the voltage wiring LV3 in the display period. When the voltage of the display drive signal is the ground voltage, the control circuit D-CNT supplies the ground voltage to the voltage wiring LV3 in the display period and at the time of magnetic field touch detection.

The electric field touch detection is performed in a state that the control signal TSVCOM is supplied to the signal wiring LL4. The operations of the electric field touch detection and the display period are the same as the operations that have been described with reference to FIGS. 19 and 20, and thus, the description thereof will be omitted here.

Here, a description will also be given by exemplifying a case where it is detected whether the area of the group TLG(n−1) of the drive electrodes is touched by the pen, and the detection of the touch by the pen is not performed on the area of the group TLG(n) during the magnetic field touch detection.

The unit selection control circuit USR-R(n−1) and USR-L(n−1), which correspond to the group TLG(n−1), output the magnetic field control signals C-R(n−1) and C-L(n−1) of high levels in order to detect the touch by the pen in the area of the group TLG(n−1). On the other hand, the touch by the pen is not detected in the area of the group TLG(n), and thus, the unit selection control circuits USR-R(n) and USR-L(n), which correspond to the group TLG(n), output the magnetic field control signals C-R(n) and C-L(n) of low levels. Further, since the magnetic field touch detection is designated, the electric field control signals T-R(n−1), T-R(n), T-L(n−1), and T-L(n) are set to low levels. Similarly, the display control signals D-R(n−1), D-R(n), D-L(n−1), and D-L(n) are also set to low levels.

The control circuit D-CNT supplies the periodically changing coil clock signal CCLK to the signal wiring LL4 in the magnetic field generation period during the magnetic field touch detection. Further, the control circuit D-CNT supplies the ground voltage to the voltage wiring LV3 at the time of magnetic field touch detection.

When the magnetic field control signal C-R(n−1) is set to a high level, the twenty-eighth switches R410 and R411 are turned into on-states in the unit changeover adjustment circuit USC-R(n−1). Accordingly, the drive electrode TL(n−6) in the group TLG(n−2) is connected to the drive electrode TL(n+2) in the group TLG(n) via the twenty-eighth switch R410 and the signal wirings 6360 and 6362 in the unit changeover adjustment circuit USC-R(n−1). Further, the drive electrode TL(n−5) in the group TLG(n−2) is connected to the drive electrode TL(n+3) in the group TLG(n) via the twenty-eighth switch R411 and the signal wirings 6361 and 6363.

Meanwhile, when the magnetic field control signal C-L (n−1) is set to a high level, the thirty-first switches L412 to L414 are turned into on-states in the unit changeover adjustment circuit USC-L(n−1). Accordingly, the drive electrode TL(n−5) in the group TLG(n−2) is connected to the drive electrode TL(n+2) in the group TLG(n) via the thirty-first switch L412 and the signal wirings 6364 and 6365 in the unit changeover adjustment circuit USC-L(n−1). At this time, the drive electrode TL(n−5) in the group TLG(n−2) is connected to the signal wiring LL4 via the thirty-first switch L413, and the drive electrode TL(n+3) in the group TLG(n) is connected to the voltage wiring LV3 via the thirty-first switch L414.

Accordingly, the drive electrodes TL(n−6), TL(n−5), TL(n+2) and TL(n+3), which are arranged in parallel to each other across the area of the group TLG(n−1), are connected in series between the voltage wiring LV3 and the signal wiring LL4. That is, the coil of a two-turn winding, using these drive electrodes as the winding, is connected between the voltage wiring LV3 and the signal wiring LL4.

Since the ground voltage is supplied to the voltage wiring LV3, and the coil clock signal CCLK is supplied to the signal wiring LL4 in the magnetic field generation period, a magnetic field, which is changed according to the coil clock signal CCLK, is generated in the coil using the drive electrodes as the winding. If the pen is present in the vicinity of the area of the group TLG(n−1), the capacitive element inside the pen is charged by the magnetic field energy generated in the coil. The coil inside the pen generates the magnetic field in the magnetic field detection period, by the energy charged in the capacitive element inside the pen. A signal of the signal wiring LL4 is changed by the magnetic field energy from the pen. This change is output as the sense signal SY(n−1).

Since the magnetic field control signals C-R(n) and C-L(n) from the unit selection control circuits USR-R(n) and USR-L(n) are set to low levels when the coil is formed using the drive electrodes (n−6), TL(n−5), L(n+2) and TL(n+3), the twenty-eighth switches (R410), (R411) and the thirty-first switches (L412) to (L414) in the unit changeover adjustment circuits USC-R(n) and USC-L(n) are turned into off-states, and accordingly, the coil is not formed.

On the other hand, a description will be given as follows regarding a case where it is detected whether the area of the group TLG(n) of the drive electrodes is touched by the pen, and the detection of the touch by the pen is not performed on the area of the group TLG(n−1) during the magnetic field touch detection.

In this case, the magnetic field control signals C-R(n) and C-L(n) are set to high levels, and the magnetic field control signals C-R(n−1) and C-L(n−1) are set to low levels. The twenty-eighth switches (R412) to (R414) and the thirty-first switches (L410) and (L411) are turned into the on-states in the unit changeover adjustment circuits USC-R(n) and USC-L(n), by high-level magnetic field control signals C-R(n) and C-L(n). When these twenty-eighth switches and thirty-first switches are turned into the on-states, the drive electrodes TL(n), TL(n+1), TL(n+8) and TL(n+9), which are arranged in parallel to each other across the group TLG(n), are connected in series between the voltage wiring LV3 and the signal wiring LL4. Accordingly, the coil of a two-turn winding is formed between the voltage wiring LV3 and the signal wiring LL4.

At this time, the drive electrodes TL(n−6), TL(n−5), TL(n+2) and TL(n+3), which are arranged across the group TLG(n−1), are not connected between the voltage wiring LV3 and the signal wiring LL4 since the twenty-eighth switches R410 and R411 and the thirty-first switches L412 to L414 are in the off-states. As a result, the coil having these drive electrode as the winding is not formed.

The voltage wiring LV3 and the signal wiring LL4, which are arranged in the changeover adjustment circuit SC-L, are used at the time of generating a magnetic field in the group TLG(n−1) in this fourth embodiment. That is, the coil is connected between the voltage wiring LV3 and the signal wiring LL4, which are arranged in the changeover adjustment circuit SC-L. The coil clock signal CCLK is supplied to the signal wiring LL4 arranged in the changeover adjustment circuit SC-L, in the magnetic field generation period. Further, a change of the signal in the signal wiring LL4, which is arranged in the changeover adjustment circuit SC-L, is output as the sense signal SY(n+1) in the magnetic field detection period.

On the other hand, the voltage wiring LV3 and the signal wiring LL4 arranged in the changeover adjustment circuit SC-R are used at the time of generating a magnetic field in the group TLG(n) adjacent to the group TLG(n−1). That is, the coil is connected between the voltage wiring LV3 and the signal wiring LL4, which are arranged in the changeover adjustment circuit SC-R. The coil clock signal CCLK is supplied to the signal wiring LL4 arranged in the changeover adjustment circuit SC-R, in the magnetic field generation period. Further, the change of the signal in the signal wiring LL4 arranged in the changeover adjustment circuit SC-R is output as the sense signal SY(n) in the magnetic field detection period.

In this manner, the sense signals SY(n−1) and SY(n) are alternately output from the changeover adjustment circuit SC-R arranged along the side 2-R of the display area 2, and the changeover adjustment circuit SC-L arranged along the side 2-L in the fourth embodiment. Further, the signal wiring LL4 is used as the signal wiring that supplies the coil clock signal CCLK to be used as the magnetic field drive signal at the time of magnetic field touch detection, and is used as the signal wiring that supplies the control signal TSVCOM to be used as the electric field drive signal at the time of electric field touch detection. Further, the voltage wiring LV3 is used as the voltage wiring to supply the ground voltage at the time of magnetic field touch detection, and is used as the voltage wiring to supply the display drive signal in the display period. That is, the voltage wiring LV3 and the signal wiring LL4 are used in common at the time of magnetic field touch detection, at the time of electric field touch detection and at the time of display. Accordingly, it is possible to reduce the number of wirings to be arranged along the sides of the display area 2, and it is possible to narrow the frame. Further, it is possible to reduce the number of the twenty-eighth switches and the thirty-first switches in this fourth embodiment.

The signal wirings 6360 to 6365 and (6360) to (6365) are formed, using the wirings of the second wiring layer 603, in the peripheral area of the display panel, also in this fourth embodiment. Thus, it is unnecessary to add a new wiring layer in order to form these signal wirings, and it is possible to suppress the increase in the manufacturing cost.

The fourth embodiment may also be configured such that the ground voltage Vs is supplied to one wiring of the voltage wiring LV3 and the signal wiring LL4, and a voltage higher than the ground voltage Vs is supplied to the other wiring at the time of electric field touch detection. In this case, a desired drive electrode is set to be alternately connected to the voltage wiring LV3 and the signal wiring LL4 at the time of electric field touch detection. Accordingly, a voltage of the desired drive electrode is periodically changed at the time of electric field touch detection, which is similar to a configuration in which a periodic drive signal is supplied. That is, it is possible to generate an electric field in the desired drive electrode at the time of electric field touch detection.

Fifth Embodiment

Figure 27:
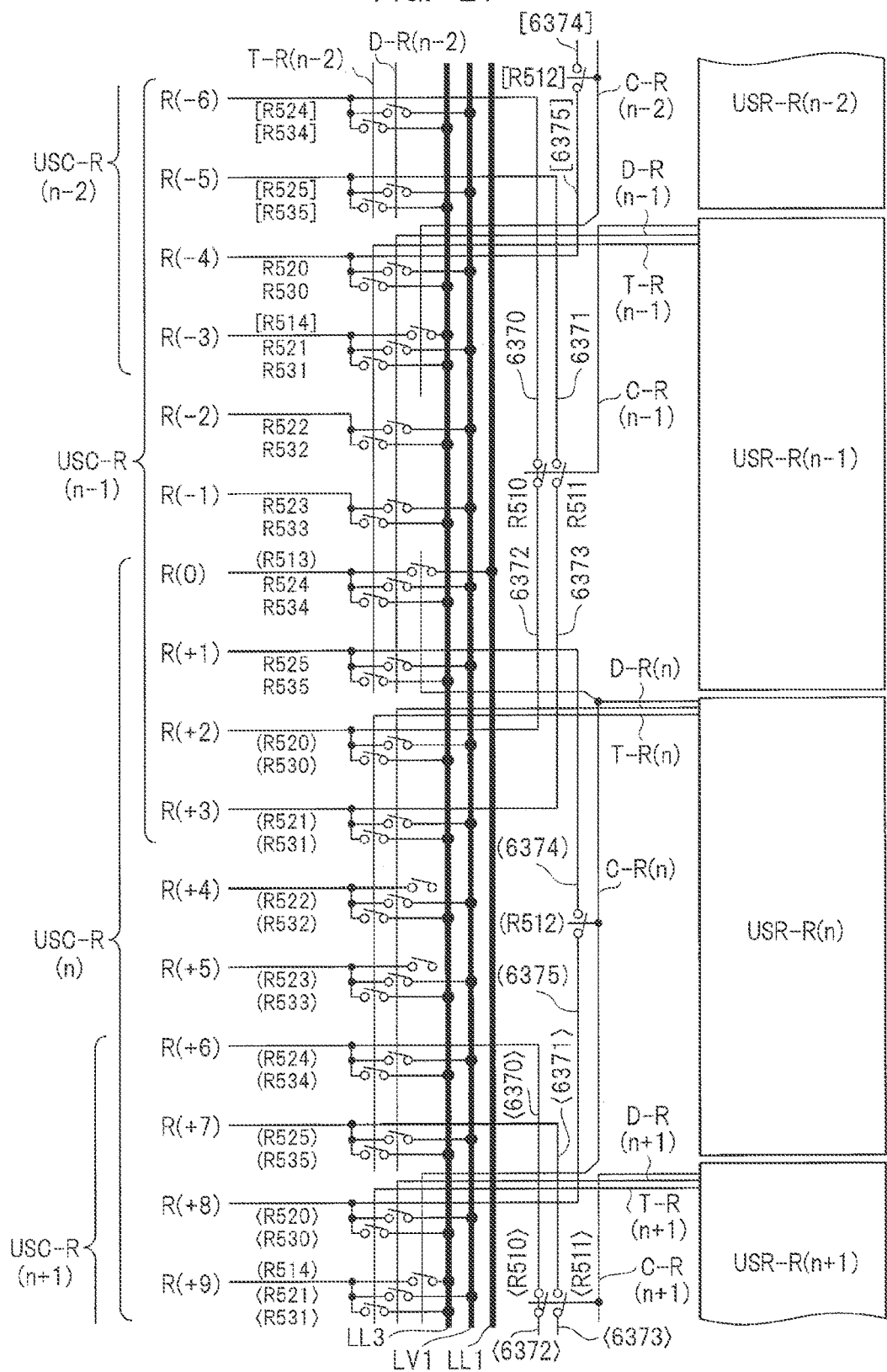
FIG. 27 is a circuit diagram illustrating the configurations of a selection control circuit and a changeover adjustment circuit of a liquid crystal display device according to a fifth embodiment.
Figure 28:
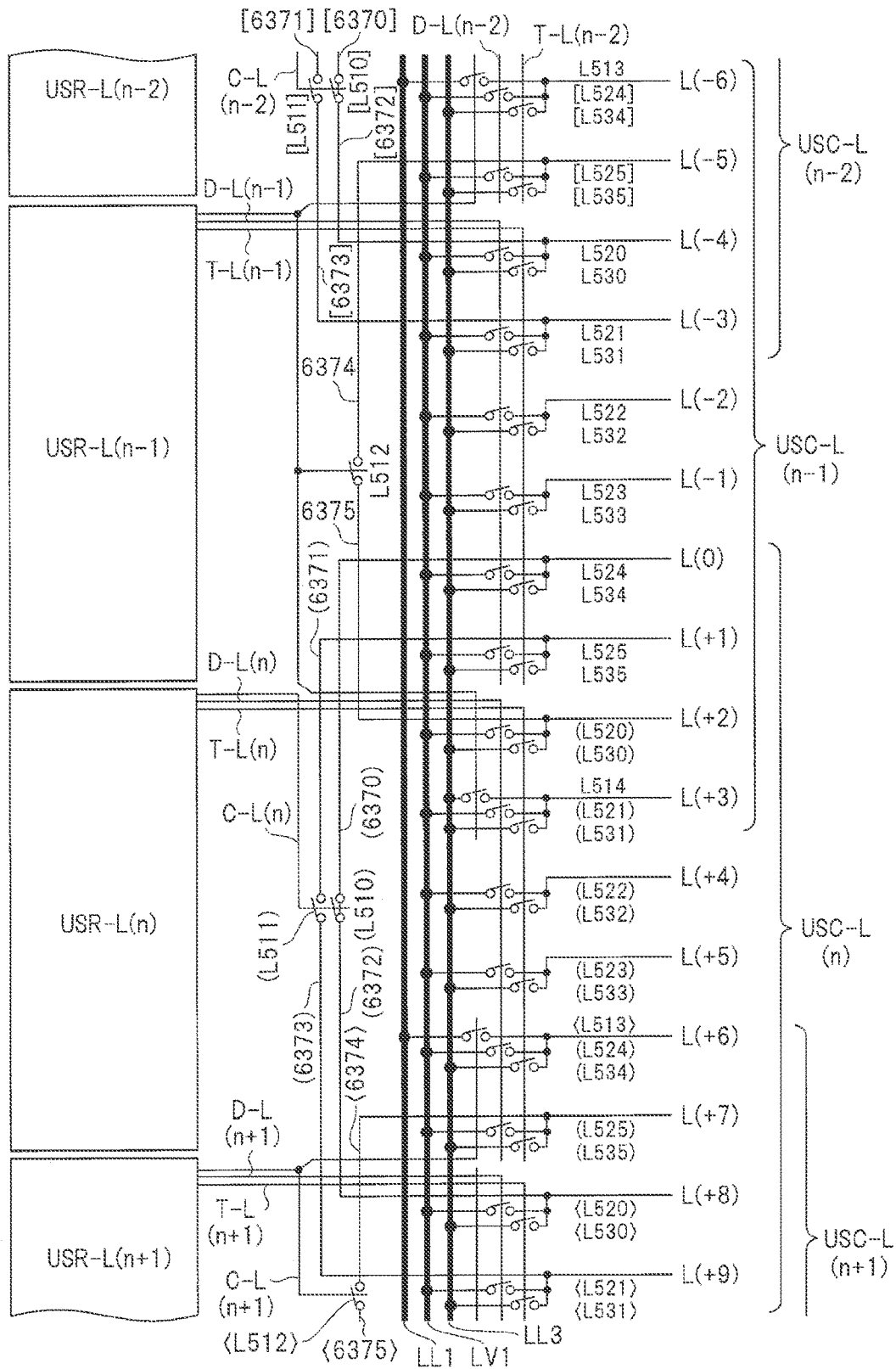
FIG. 28 is a circuit diagram illustrating the configurations of the selection control circuit and the changeover adjustment circuit of the liquid crystal display device according to the fifth embodiment.

FIGS. 27 and 28 are circuit diagrams illustrating configurations of a selection control circuit and a changeover adjustment circuit of a liquid crystal display device according to a fifth embodiment. As similar to FIGS. 19 and 20, FIGS. 27 and 28 also illustrate the unit selection control circuits USR-R(n−2) to USR-R(n+1), and USR-L(n−2) to USR-L(n+1) which correspond to the drive electrodes TL(n−6) to TL(n+9) illustrated in FIG. 13. Further, the unit changeover adjustment circuits USC-R(n−2) to USC-R(n+1) and USC-L(n−2) to USC-L(n+9), which correspond to these unit selection control circuits, are illustrated. The configurations illustrated in FIGS. 27 and 28 are similar to those of FIGS. 25 and 26, and a difference therebetween will mainly be described here. Incidentally, reference signs R(−6) to R(+9) illustrated in FIG. 27 are connected to the same reference signs of FIG. 13, and reference signs R(−6) to R(+9) illustrated in FIG. 28 are connected to the same reference signs of FIG. 13.

Configurations of the unit selection control circuits USR-R(n−2) to USR-R(n+1) and USR-L(n−2) to USR-L(n+1) are the same as those of the unit selection control circuits illustrated in FIGS. 19 and 20, and thus, the description thereof will be omitted.

<Configuration of Unit Changeover Adjustment Circuit USC-R>

A configuration of the unit changeover adjustment circuit USC-R will be described using the unit changeover adjustment circuits USC-R(n−1) and USC-R(n) illustrated in FIG. 27 as representatives. The unit changeover adjustment circuit USC-R(n−1) is provided with thirty-fourth switches R510 and R511, thirty-fifth switches R520 to R525, thirty-sixth switches R530 to R535, and signal wirings 6370 to 6373. Here, the thirty-fifth switches R520 to R525 are connected between the drive electrodes TL(n−4) to TL(n+1), arranged in the group TLG(n−1) which corresponds to the corresponding unit selection control circuit USR-R(n−1), and the voltage wiring LV1. Further, the thirty-sixth switches R530 to R535 are connected between the drive electrodes TL(n−4) to TL(n+1) in the group TLG(n−1) and the signal wiring LL3. The thirty-fifth switches R520 to R525 are controlled by the display control signal D-R(n−1) from the corresponding unit selection control circuit USR-R(n−1), and the thirty-sixth switches R530 to R535 are controlled by the electric field control signal T-R(n−1) from the unit selection control circuit USR-R(n−1).

The thirty-fourth switch R510 is connected between the signal wiring 6370, which is connected to the drive electrode TL(n−6) arranged in the group TLG(n−2) arranged next to the group TLG(n−1), and the signal wiring 6372, which is connected to the drive electrode TL(n+2) arranged in the group TLG(n) arranged next to the group TLG(n−1). Further, the thirty-fourth switch R511 is connected between the signal wiring 6371, which is connected to the drive electrode TL(n−5) arranged in the group TLG(n−2), and the signal wiring 6373 which is connected to the drive electrode TL(n+3) arranged in the group TLG(n). Each of these thirty-fourth switches R510 and R511 is controlled by the magnetic field control signal C-R(n−1) from the unit selection control circuit USR-R(n−1).

Further, the unit changeover adjustment circuit USC-R(n) is provided with thirty-fourth switches (R512) to (R514), thirty-fifth switches (R520) to (R525), thirty-sixth switches (R530) to (R535), and signal wirings (6374) and (6375). Here, the thirty-fifth switches (R520) to (R525) are connected between the drive electrodes TL(n+2) to TL(n+7), which are arranged in the group TLG(n), and the voltage wiring LV1, as similar to the thirty-fifth switches R520 to R525, and are controlled by the display control signal D-R(n). Further, the thirty-sixth switches (R530) to (R535) are connected between the drive electrodes TL(n+2) to TL(n+7) and the signal wiring LL3, as similar to the thirty-sixth switches R530 to R535, and are controlled by the electric field control signal T-R(n).

The thirty-fourth switch (R512) is connected between the signal wiring (6374), which is connected to the drive electrode TL(n+1) arranged in the group TLG(n−1), and the signal wiring (6375), which is connected to the drive electrode TL(n+8) arranged in the group TLG(n+1). Further, the thirty-fourth switch (R513) is connected between the drive electrode TL(n) in the group TLG(n−1) and the signal wiring LL1, and the thirty-fourth switch (R514) is connected between the drive electrode TL(n+9) in the group TLG(n+1) and the signal wiring LL3. These thirty-fourth switches (R512) to (R514) are controlled by the magnetic field control signal C-R(n) from the corresponding unit selection control circuit USR-R(n).

FIG. 25 illustrates a switch of which one terminal is connected to a drive electrode and which is controlled by a magnetic field control signal without attaching a reference sign thereto. These switches without being attached with any reference sign are the same as the tenth switches R114 and R115 that have been described above. Thus, the reference sign and description thereof will be omitted regarding these switches.

A unit changeover adjustment circuit having the same configuration as the configuration of the above-described unit changeover adjustment circuit USC-R(n−1) and a unit changeover adjustment circuit having the same configuration as the configuration of the above-described unit changeover adjustment circuit USC-R(n) are alternately provided in the changeover adjustment circuit SC-R. For example, the unit changeover adjustment circuit USC-R(n−2) has the same configuration as the unit changeover adjustment circuit USC-R(n), and the unit changeover adjustment circuit USC-R(n+1) has the same configuration as the unit changeover adjustment circuit USC-R(n−1).

Reference signs [ ] are attached, instead of reference signs ( ) with respect to the thirty-fourth switches to the thirty-sixth switches and the signal wirings included in the unit changeover adjustment circuit USC-R(n−2) in FIG. 27. For example, the thirty-fourth switch (R512) is drawn as [R512] by attaching the reference sign [ ] instead of the reference sign ( ) in the unit changeover adjustment circuit USC-R(n−2). Similarly, reference signs < > are attached with respect to the thirty-fourth switches to the thirty-sixth switches and the signal wirings included in the unit changeover adjustment circuit USC-R(n+1). When the thirty-fourth switches R510 and R511 are exemplified, the thirty-fourth switches R510 and R511 are drawn as <R510>, and <R511> in the unit changeover adjustment circuit USC-R(n+1).

The thirty-fourth switches R510 and R511, which are included in the unit changeover adjustment circuit corresponding to the unit selection control circuit (for example, USR-R(n−1)), are selectively connected to between the predetermined drive electrodes in the two groups (TLG(n−2) and TLG(n)) arranged across the group (TLG(n−1)) corresponding to the unit selection control circuit, according to the magnetic field control signal C-R(n−1), in the fifth embodiment.

<Configuration of Unit Changeover Adjustment Circuit USC-L>

Next, a configuration of the unit changeover adjustment circuit USC-L will be described using the unit changeover adjustment circuits USC-L(n−1) and USC-L(n) illustrated in FIG. 28 as representatives. The unit changeover adjustment circuit USC-L(n−1) is provided with thirty-seventh switches L512 to L514, thirty-eighth switches L520 to L525, thirty-ninth switches L530 to L535, and the signal wirings 6374 and 6375. Here, the thirty-eighth switches L520 to L525 are connected between the drive electrodes TL(n−4) to TL(n+1), arranged in the group TLG(n−1) which corresponds to the corresponding unit selection control circuit USR-L(n−1), and the voltage wiring LV1. Further, the thirty-ninth switches L530 to L535 are connected between the drive electrodes TL(n−4) to TL(n+1) in the group TLG(n−1) and the signal wiring LL3. The thirty-eighth switches L520 to L525 are controlled by the display control signal D-L(n−1) from the corresponding unit selection control circuit USR-L(n−1), and the thirty-ninth switches L530 to L535 are controlled by the electric field control signal T-L(n−1) from the unit selection control circuit USR-L(n−1).

The thirty-seventh switch L512 is connected between the signal wiring 6374, which is connected to the drive electrode TL(n−6) arranged in the group TLG(n−2), and the signal wiring 6375 which is connected to the drive electrode TL(n+2) arranged in the group TLG(n). Further, the thirty-seventh switch L513 is connected between the drive electrode TL(n−6) arranged in the group TLG(n−2) and the signal wiring LL1, and the thirty-seventh switch L514 is connected between the drive electrode TL(n+3) arranged in the group TLG(n) and the signal wiring LL3. Each of these thirty-seventh switches L512 to L514 is controlled by the magnetic field control signal C-L(n−1) from the corresponding unit selection control circuit USR-L(n−1).

Further, the unit changeover adjustment circuit USC-L(n) is provided with thirty-seventh switches (L510) and (L511), thirty-eighth switches (L520) to (L525), thirty-ninth switches (L530) to (L535), and signal wirings (6370) to (6373). Here, the thirty-eighth switches (L520) to (L525) are connected between the drive electrodes TL(n+2) to TL(n+7), arranged in the group TLG(n) which corresponds to the unit selection control circuit USR-L(n), and the voltage wiring LV1. Further, the thirty-ninth switches (L530) to (L535) are connected between the drive electrodes TL(n+2) to TL(n+7) in the group TLG(n) and the signal wiring LL3. The thirty-eighth switches (L520) to (L525) are controlled by the display control signal D-L(n) from the corresponding unit selection control circuit USR-L(n), and the thirty-eighth switches (L530) to (L535) are controlled by the electric field control signal T-L(n) from the unit selection control circuit USR-L(n).

The thirty-seventh switch (L510) is connected between the signal wiring (6370), which is connected to the drive electrode TL(n) arranged in the group TLG(n−1) arranged next to the group TLG(n), and the signal wiring (6372) which is connected to the drive electrode TL(n+8) arranged in the group TLG(n+1) arranged next to the group TLG(n). The thirty-seventh switch (L511) is connected between the signal wiring (6371), which is connected to the drive electrode TL(n+1) arranged in the group TLG(n−1), and the signal wiring (6373) which is connected to the drive electrode TL(n+9) arranged in the group TLG(n+1). Each of these thirty-seventh switches (L510) and (L511) is controlled by the magnetic field control signal C-L(n) from the unit selection control circuit USR-L(n).

The unit changeover adjustment circuit having the same configuration as the configuration of the above-described unit changeover adjustment circuit USC-L(n−1) and the unit changeover adjustment circuit having the same configuration as the configuration of the above-described unit changeover adjustment circuit USC-L(n) are alternately provided also in the changeover adjustment circuit SC-L, as similar to the above-described changeover adjustment circuit SC-R. For example, the unit changeover adjustment circuit USC-L(n−2) has the same configuration as the unit changeover adjustment circuit USC-L(n), and the unit changeover adjustment circuit USC-L(n+1) has the same configuration as the unit changeover adjustment circuit USC-L(n−1).

Reference signs [ ] are attached, instead of reference signs ( ), with respect to the thirty-seventh switches to the thirty-ninth switches and the signal wirings included in the unit changeover adjustment circuit USC-L(n−2) in FIG. 28. For example, the thirty-seventh switches (L510) and (L511) are drawn as [L510] and [L511] by attaching the reference signs [ ] instead of the reference signs ( ) in the unit changeover adjustment circuit USC-L(n−2). Similarly, reference signs < > are attached with respect to the thirty-seventh switches to the thirty-ninth switches and the signal wirings included in the unit changeover adjustment circuit USC-L(n+1). When the thirty-seventh switch L512 is exemplified, the thirty-seventh switch L512 is drawn as <L512> in the unit changeover adjustment circuit USC-L(n+1).

As understood from the above description regarding the unit changeover adjustment circuits USC-R and USC-L, the configuration of the unit changeover adjustment circuit USC-R(n+1) and the configuration of the unit changeover adjustment circuit USC-L(n) are the same, and the configuration of the unit changeover adjustment circuit USC-R(n) and the configuration of the unit changeover adjustment circuit USC-L(n+1) are the same, except for the drive electrode and the control signal for use to be connected. The unit changeover adjustment circuit USC-R(n+1) and the unit changeover adjustment circuit USC-L(n+1) operate as a set, and the unit changeover adjustment circuit USC-R(n) and the unit changeover adjustment circuit USC-L(n) operate as a set at the time of magnetic field touch detection, and accordingly the coil is formed.

<Magnetic Field Touch Detection>

Next, a description will be given regarding an operation when the magnetic field touch detection is designated with reference to FIGS. 27 and 28. As similar to the description in the third embodiment, the voltage wiring LV1 and the signal wirings LL1 and LL3 are provided in each of the changeover adjustment circuits SC-R and SC-L in the fifth embodiment. As similar to the description in the third embodiment, the control circuit D-CNT (FIG. 7) changes a signal to be supplied to the signal wiring LL3 between the time of magnetic field touch detection and the time of electric field touch detection in this fifth embodiment. That is, the control circuit D-CNT supplies the ground voltage to the signal wiring LL3 at the time of magnetic field touch detection, and supplies the control signal TSVCOM to the signal wiring LL3 at the time of electric field touch detection. Further, the control circuit D-CNT supplies the periodically changing coil clock signal CCLK to the signal wiring LL1 in the magnetic field generation period for the magnetic field touch detection. Incidentally, a voltage of the display drive signal is supplied to the voltage wiring LV1.

The electric field touch detection is performed in a state that the control signal TSVCOM is supplied to the signal wiring LL3. The operations of the electric field touch detection and the display period are the same as the operations that have been described with reference to FIGS. 19 and 20.

Here, a description will also be given by exemplifying a case where it is detected whether the area of the group TLG(n−1) of the drive electrodes is touched by the pen, and the detection of the touch by the pen is not performed on the area of the group TLG(n) during the magnetic field touch detection.

The unit selection control circuit USR-R(n−1) and USR-L(n−1), which correspond to the group TLG(n−1), output the magnetic field control signals C-R(n−1) and C-L(n−1) of high levels in order to detect the touch by the pen in the area of the group TLG(n−1). On the other hand, the unit selection control circuits USR-R(n) and USR-L(n), which correspond to this group TLG(n), output the magnetic field control signals C-R(n) and C-L(n) of low levels since the touch by the pen is not detected in the area of the group TLG(n). Further, since the magnetic field touch detection is designated, the electric field control signals T-R(n−1), T-R(n), T-L(n−1), and T-L(n) are set to low levels. Similarly, the display control signals D-R(n−1), D-R(n), D-L(n−1), and D-L(n) are also set to low levels.

The control circuit D-CNT supplies the periodically changing coil clock signal CCLK to the signal wiring LL1 in the magnetic field generation period during the magnetic field touch detection. Further, the control circuit D-CNT supplies the ground voltage to the signal wiring LL3 at the time of magnetic field touch detection.

When the magnetic field control signal C-R(n−1) is set to a high level, the thirty-fourth switches R510 and R511 are turned into on-states in the unit changeover adjustment circuit USC-R(n−1). Accordingly, the drive electrode TL(n−6) in the group TLG(n−2) is connected to the drive electrode TL(n+2) in the group TLG(n) via the thirty-fourth switch R510, and the signal wirings 6370 and 6372 in the unit changeover adjustment circuit USC-R(n−1). Further, the drive electrode TL(n−5) in the group TLG(n−2) is connected to the drive electrode TL(n+3) in the group TLG(n) via the thirty-fourth switch R511, and the signal wirings 6371 and 6373.

Meanwhile, when the magnetic field control signal C-L(n−1) is set to a high level, the thirty-seventh switches L512 to L514 are turned into on-states in the unit changeover adjustment circuit USC-L(n−1). Accordingly, the drive electrode TL(n−5) in the group TLG(n−2) is connected to the drive electrode TL(n+2) in the group TLG(n) via the thirty-seventh switch L512, and the signal wirings 6374 and 6375 in the unit changeover adjustment circuit USC-L(n−1). At this time, the drive electrode TL(n−5) in the group TLG(n−2) is connected to the signal wiring LL1 via the thirty-seventh switch L513, and the drive electrode TL(n+3) in the group TLG(n) is connected to the signal wiring LL3 via the thirty-seventh switch L514.

Accordingly, the drive electrodes TL(n−6), TL(n−5), TL(n+2) and TL(n+3), which are arranged in parallel to each other across the area of the group TLG(n−1), are connected in series between the signal wiring LL1 and the signal wiring LL3. That is, the coil Y(n−1) of a two-turn winding (FIG. 4), using these drive electrodes as the winding, is connected between the signal wiring LL1 and the signal wiring LL3.

Since the ground voltage is supplied to the signal wiring LL3 and the coil clock signal CCLK is supplied to the signal wiring LL1 in the magnetic field generation period, a magnetic field, which is changed according to the coil clock signal CCLK, is generated in the coil using the drive electrodes as the winding. If the pen is present in the vicinity of the area of the group TLG(n−1), the capacitive element inside the pen is charged by the magnetic field energy generated in the coil. The coil inside the pen generates the magnetic field in the magnetic field detection period, by the energy charged in the capacitive element inside the pen. A signal of the signal wiring LL1 is changed by the magnetic field energy from the pen. This change is output as the sense signal SY(n−1).

When the coil is formed using the drive electrodes (n−6), TL(n−5), TL(n+2) and TL(n+3), the magnetic field control signals C-R(n) and C-L(n) from the unit selection control circuits USR-R(n) and USR-L(n) are set to low levels, the thirty-fourth switches (R510) and (R511) and the thirty-seventh switches (L512) to (L514) in the unit changeover adjustment circuits USC-R(n) and USC-L(n) are turned into off-states, and accordingly, the coil is not formed.

On the other hand, a description will be given as follows regarding a case where it is detected whether the area of the group TLG(n) of the drive electrodes is touched by the pen, and the detection of the touch by the pen is not performed on the area of the group TLG(n−1) during the magnetic field touch detection.

In this case, the magnetic field control signals C-R(n) and C-L(n) are set to high levels, and the magnetic field control signals C-R(n−1) and C-L(n−1) are set to low levels. The thirty-fourth switches (R512) to (R514) and the thirty-seventh switches (L510) and (L511) are turned into the on-states in the unit changeover adjustment circuits USC-R(n) and USC-L(n), by high level magnetic field control signals C-R(n) and C-L(n). When these thirty-fourth switches and the thirty-seventh switches are turned into the on-states, the drive electrodes TL(n), TL(n+1), TL(n+8) and TL(n+9), which are arranged in parallel to each other across the group TLG(n), are connected in series between the signal wiring LL3 and the signal wiring LL1. Accordingly, the coil Y(n) (FIG. 4) of a two-turn winding is formed between the signal wiring LL3 and the signal wiring LL1.

At this time, the drive electrodes TL(n−6), TL(n−5), TL(n+2) and TL(n+3), which are arranged across the group TLG(n−1), are not connected between the signal wiring LL1 and the signal wiring LV4 since the thirty-fourth switches R510 and R511 and the thirty-seventh switches L512 to L514 are set to the off-states. As a result, the coil having these drive electrode as the winding is not formed.

The signal wiring LL3 and the signal wiring LL1 arranged in the changeover adjustment circuit SC-L are used at the time of generating the magnetic field in the group TLG(n−1) in this fifth embodiment. That is, the coil is connected between the signal wiring LL1 and the signal wiring LL3 arranged in the changeover adjustment circuit SC-L. The coil clock signal CCLK is supplied to the signal wiring LL3 arranged in the changeover adjustment circuit SC-L. Further, a change of the signal in the signal wiring LL3, arranged in the changeover adjustment circuit SC-L, is output as the sense signal SY(n+1) in the magnetic field detection period.

On the other hand, the signal wiring LL1 and the signal wiring LL3 arranged in the changeover adjustment circuit SC-R are used at the time of generating the magnetic field in the group TLG(n) adjacent to the group TLG(n−1). That is, the coil is connected between the signal wiring LL1 and the signal wiring LL3 arranged in the changeover adjustment circuit SC-L. The coil clock signal CCLK is supplied to the signal wiring LL3 arranged in the changeover adjustment circuit SC-L, in the magnetic field generation period. Further, a change of the signal in the signal wiring LL3, arranged in the changeover adjustment circuit SC-L, is output as the sense signal SY(n) in the magnetic field detection period.

In this manner, the sense signals SY(n−1) and SY(n) are alternately output from the changeover adjustment circuit SC-R arranged along the side 2-R of the display area 2 and the changeover adjustment circuit SC-L arranged along the side 2-L in the fifth embodiment. Further, the signal wiring LL3 is used as the voltage wiring to supply the ground voltage at the time of magnetic field touch detection, and is used as the signal wiring to supply the control signal TSVCOM to be used as the electric field drive signal at the time of electric field touch detection. That is, the signal wiring LL3 is used in common at the time of magnetic field touch detection and at the time of electric field touch detection. Accordingly, it is possible to reduce the number of wirings to be arranged along the sides of the display area 2, and it is possible to narrow the frame. Further, it is possible to reduce the number of the twenty-eighth switches and the thirty-first switches in this fifth embodiment.

The signal wirings 6370 to 6375, (6370) to (6375), to [6375], and <6370> to <6375> are formed, using the wirings of the second wiring layer 603, in the peripheral area of the display panel, also in the fifth embodiment. Thus, it is unnecessary to add a new wiring layer in order to form these signal wirings, and it is possible to suppress the increase in the manufacturing cost.

This embodiment may also be configured such that the ground voltage Vs is supplied to one wiring of the voltage wiring LV1 and the signal wiring LL3, and a voltage higher than the ground voltage Vs is supplied to the other wiring at the time of electric field touch detection. In this case, a desired drive electrode is set to be alternately connected to the voltage wiring LV1 and the signal wiring LL3 at the time of electric field touch detection. Accordingly, a voltage of the desired drive electrode is periodically changed at the time of electric field touch detection, which is similar to a configuration in which a periodic drive signal is supplied. That is, it is possible to generate an electric field in the desired drive electrode at the time of electric field touch detection.

As above, the configurations described in the respective second to fifth embodiments can be applied to the changeover adjustment circuits SC-R and SC-L and the selection control circuits SR-R and SR-L which have been described in the first embodiment. That is, the changeover adjustment circuit and the selection control circuit, which have been described with reference to FIGS. 21 to 28, can be used as the changeover adjustment circuits SC-R and SC-L and the selection control circuits SR-R and SR-L which have been described with reference to FIGS. 7 to 18, instead of the changeover adjustment circuit and the selection control circuit which have been described with reference to FIGS. 19 and 20.

Sixth Embodiment

FIGS. 29A to 29G are timing diagrams illustrating operations of a liquid crystal display device according to a sixth embodiment. Here, a description will be given by exemplifying a case where the changeover adjustment circuits SC-R and SC-L and the selection control circuits SR-R and SR-L, which have been described in the fifth embodiment, are applied to the liquid crystal display device which has been described in the first embodiment. That is, a description will be given regarding a case where the changeover adjustment circuit and the selection control circuit, illustrated in FIGS. 27 and 28, are used as the changeover adjustment circuits SC-R and SC-L and the selection control circuits SR-R and SR-L illustrated in FIGS. 7, 17 and 18.

Figure 29:
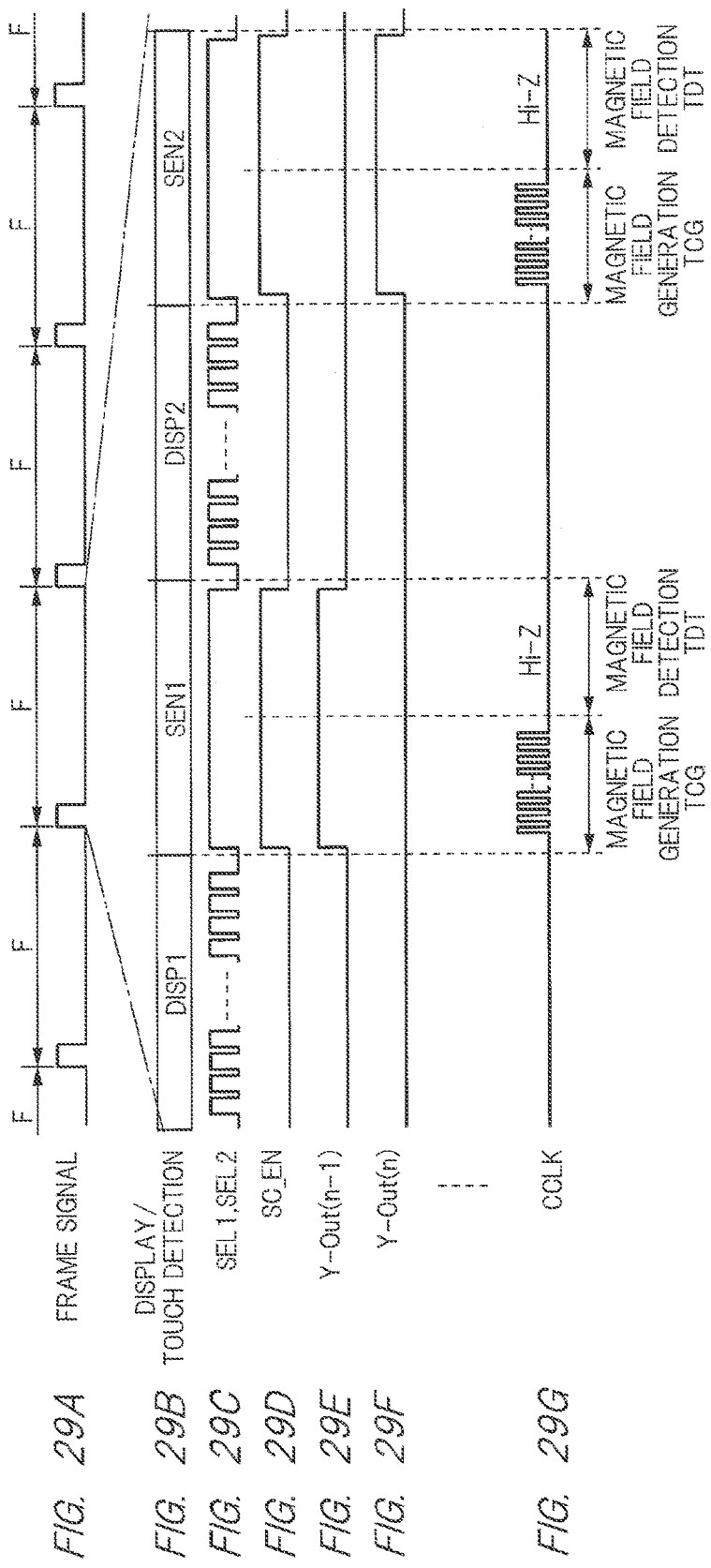
FIGS. 29A to 29G are timing diagrams illustrating an operation of a liquid crystal display device according to a sixth embodiment.

The horizontal axis in FIGS. 29A to 29G represents time. FIG. 29A illustrates a periodically generated frame signal, and the liquid crystal display device performs display for one screen, for example, in a single frame period F defined by the frame signal. The control circuit D-CNT illustrated in FIG. 7 performs control such that a plurality of the display periods and a plurality of the touch detection periods are alternately generated in the single frame period F in this sixth embodiment. FIGS. 29B to 29G illustrate timings in the single frame period F among a plurality of the frame periods F. That is, the timings illustrated in FIGS. 29B to 29G are generated in each of the plurality of frame periods F.

Here, FIG. 29B schematically illustrates the display period and the touch detection period generated in the single frame period F. FIG. 29C illustrates waveforms of the selection signals SEL1 and SEL2 to be supplied to the signal line selector 3 (FIG. 7). FIG. 29D illustrates a waveform of the magnetic field enable signal SC_EN. Further, FIGS. 29E and 29F illustrate waveforms of the selection signals Y-Out (n−1) and Y-Out(n) among the selection signals from the selection control circuits SR-R and SR-L, and FIG. 29G illustrates a waveform of the coil clock signal CCLK.

The control circuit D-CNT performs control such that a display period DISP1 (DISP2) and a touch detection period SEN1 (SEN2) are alternately generated in time series manner in the respective frame periods F as illustrated in FIG. 29B. FIGS. 29A to 29G illustrate a case where the magnetic field touch detection of the touch detection is designated.

That is, the image signal Sn is supplied to the signal line selector 3 from the signal line driver D-DRV (FIG. 7), and the selection signals SEL1 and SEL2 are alternately set to high levels in the display period DISP1 (DISP2), so that the image signal is supplied to a suitable signal line. Incidentally, FIG. 29C illustrates the selection signals SELL and SEL2 using a single waveform in order to illustrate changes of the selection signals SEL1 and SEL2. Further, the changeover adjustment circuits SC-R and SC-L and the selection control circuits SR-R and SR-L are controlled such that the display drive signal is supplied from the changeover adjustment circuits SC-R and SC-L to the drive electrodes TL(0) to TL(p) in the display period DISP1 (DISP2). Further, the gate driver 5 is controlled such that a suitable scan signal is supplied from the gate driver 5 (FIG. 7) to the scan lines GL(0) to GL(p). Accordingly, the display is performed in response to the image signal Sn in the display area 2 (FIG. 7), in the display period DISP1 (DISP2).

As illustrated in FIG. 29D, the control circuit D-CNT sets the magnetic field enable signal SC_EN to a high level in the touch detection period SEN1 (SEN2). Accordingly, the selection control circuits SR-R and SR-L sets the selection signals Y-Out(0) to Y-Out(p) to a high level in this order, for example. The selection signal Y-Out(n−1) is set to a high level in the touch detection period SEN1, and the selection signal Y-Out(n) is set to a high level in the subsequent touch detection period SEN2 in FIGS. 29A to 29G. Here, when a description is given regarding a relationship between the selection signals Y-Out(0) to Y-Out(p), and the magnetic field control signals C-R(0) to C-R(p) and C-L(0) to C-L(p), the selection signals Y-Out and the magnetic field control signals C-R and C-L have one-to-one correspondence. That is, a fact that the selection signal Y-Out(n−1) is set to a high level means that the magnetic field control signals C-R(n−1) and C-L(n−1) are set to high levels, and a fact that the selection signal Y-Out(n) is set to a high level means that the magnetic field control signals C-R(n) and C-L(n) are set to high levels.

The touch detection period SEN1 (SEN2) includes a magnetic field generation period TCG to generate a magnetic field and a magnetic field detection period TDT subsequently to the magnetic field generation period TCG. In this case, the magnetic field is generated by the coil, and the magnetic field energy is supplied to the pen in the magnetic field generation period TCG. A magnetic field generated by the pen is detected in the magnetic field detection period TDT. The control circuit D-CNT supplies the coil clock signal CCLK to the signal wiring LL1 in the magnetic field generation period TCG, and stops the supply of the coil clock signal CCLK and sets the signal wiring LL1 to a high-impedance state (Hi-Z) in the magnetic field detection period TDT.

When the selection signal Y-Out(n−1), that is, the magnetic field control signals C-R(n−1) and C-L(n−1) are set to high levels, the coil Y(n−1) using the drive electrodes as the winding is formed as described with reference to FIGS. 27 and 28. The coil clock signal CCLK is supplied to the coil Y(n−1) via the signal wiring LL1 in the magnetic field generation period TCG. As a result, a magnetic field according to a change in the coil clock signal CCLK is generated by the coil Y(n−1) in the area of the group TLG(n−1). Further, a change of the signal in the signal wiring LL1 is transmitted to the touch semiconductor device 6 in the magnetic field detection period TDT. Accordingly, it is possible to perform detection on whether the pen touches or comes close to the group TLG(n−1), as described with reference to FIGS. 2A to 2D.

Next, the control circuit D-CNT sets the magnetic field enable signal SC_EN to a low level, and performs the display operation in the display period DISP2. The control circuit D-CNT sets the magnetic field enable signal SC_EN to a high level again after the display period DISP2.

The selection control circuits SR-R and SR-L set the selection signal Y-Out(n), that is, the magnetic field control signals C-R(n) and C-L(n) to high levels in synchronization with such a change of the magnetic field enable signal SC_EN to a high level. The coil clock signal CCLK is supplied from the control circuit D-CNT to the signal wiring LL1 in the magnetic field generation period TCG during the touch detection period SEN2 in which the selection signal Y-Out(n) is set to a high level. Further, the control circuit D-CNT stops the supply of the coil clock signal CCLK such that the signal wiring LL1 is set to the high-impedance state in the magnetic field detection period TDT. Accordingly, the coil Y(n) is formed as described with reference to FIGS. 27 and 28, a magnetic field is generated according to the coil clock signal CCLK in the magnetic field generation period TCG, and a change, caused according to presence or absence and/or an intensity of the magnetic field, is transmitted to the touch semiconductor device 6 via the signal wiring LL1 in the magnetic field detection period TDT. Accordingly, it is possible to detect whether the pen touches or comes close to the area of the group TLG(n).

In FIGS. 27 and 28, the thirty-fourth switches and the thirty-seventh switches in which the selection signal (the magnetic field control signal) is set to a high level are turned into the on-states, and the other thirty-fourth switches, thirty-seventh switches and thirty-fifth switches, thirty-sixth switches, thirty-eighth switches, and thirty-ninth switches are turned into the off-states. Thus, the drive electrodes, except for the drive electrodes forming the coil, are turned into the floating states, and set to the high-impedance states.

Further, the high impedance control signal HZ-CT is supplied from the control circuit D-CNT to the gate driver 5 and the signal line driving circuit D-DRV in this sixth embodiment. The control circuit D-CNT performs control such that each output of the gate driver 5 and the signal line driving circuit D-DRV is set to a high-impedance state by the high impedance control signal HZ-CT when the magnetic field touch detection is designated. Accordingly, the signal lines SL(0) to SL(p) and the scan lines GL(0) to GL(p) are turned into the floating states, and are set to the high-impedance states at the time of magnetic field touch detection. As a result, the drive electrodes that do not form the coil, and the signal lines and the scan lines are set to the high-impedance state. Accordingly, it is possible to reduce the parasitic capacitance to be charged when the coil is driven by the coil clock signal CCLK, and it is possible to achieve reduction of the magnetic field generation period, and improvement of accuracy in the magnetic field detection.

Although the description has been given by exemplifying the case where the changeover adjustment circuit and the selection control circuit described in the fifth embodiment are used as the changeover adjustment circuits SC-R and SC-L and the selection control circuits SR-R and SR-L illustrated in FIGS. 7, 17 and 18, it is obvious that the changeover adjustment circuit and the selection control circuit described in the other embodiments may be used as the changeover adjustment circuits SC-R and SC-L and the selection control circuits SR-R and SR-L illustrated in FIGS. 7, 17 and 18.

Seventh Embodiment

FIGS. 30A to 30H are timing diagrams illustrating operations of a liquid crystal display device according to a seventh embodiment. Here, a description will be also given by exemplifying the liquid crystal display device in which the changeover adjustment circuit and the selection control circuit, which have been described in the fifth embodiment, are used as the changeover adjustment circuits SC-R and SC-L and the selection control circuits SR-R and SR-L illustrated in FIGS. 7, 17 and 18.

Figure 30:
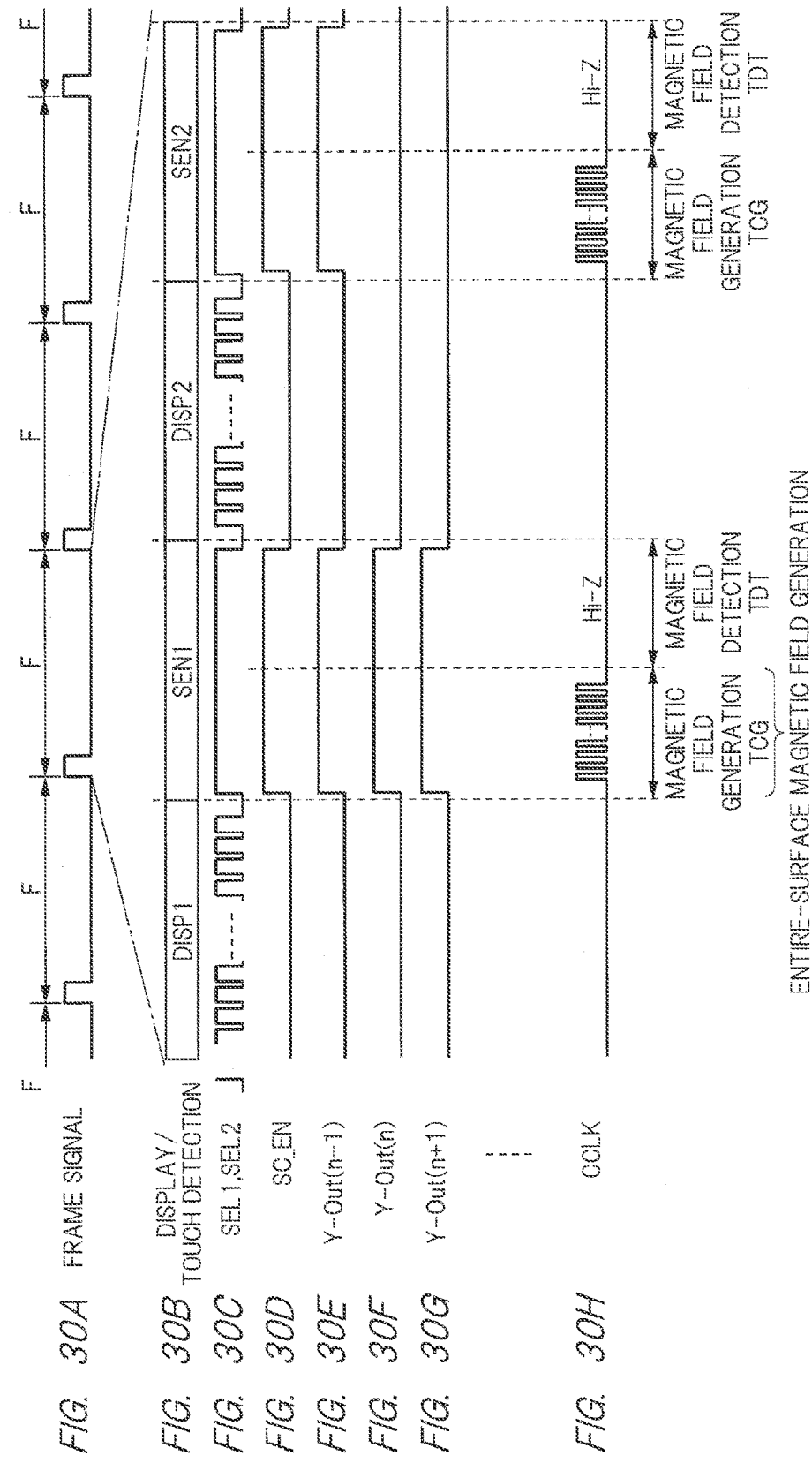
FIGS. 30A to 30H are timing diagrams illustrating an operation of a liquid crystal display device according to a seventh embodiment.

The timing diagrams illustrated in FIGS. 30A to 30H are similar to the timing diagrams illustrated in FIGS. 29A to 29G, and thus, only a difference therebetween will mainly be described here. The horizontal axis in FIGS. 30A to 30H represents time. Further, FIGS. 30A to 30D are the same as FIGS. 29A to 29D, and FIG. 30H is the same as FIG. 29G. FIGS. 30E to 30G illustrate timings of the selection signal (the magnetic field control signal) to be output from the selection control circuits SR-R and SR-L as similar to FIGS. 29E and 29F.

The selection signal (the magnetic field control signal), from the selection control circuit corresponding to the area to detect the touch by the pen (the area of the group TLG), is set to a high level, and is maintained at a high level during the touch detection period SEN in the sixth embodiment. At this time, the selection signal (the magnetic field control signal), from the selection control circuit corresponding to the area that does not detect the touch (the area of the group TLG), is set to a low level. On the other hand, the selection control circuit is controlled by the control circuit D-CNT (FIG. 7) such that the plurality of selection signals are set to high levels during a predetermine touch detection, for example, in the seventh embodiment.

For example, the control circuit D-CNT controls the selection control circuits SR-R and SR-L such that high level selection signals Y-Out(0) to Y-Out(p) are output from the respective selection control circuits SR-R and SR-L in the first touch detection period SEN, in a case where the magnetic field touch detection is instructed. Accordingly, all the coils Y(0) to Y(p) are formed by the drive electrodes TL(0) to TL(p). In this state, the coil clock signal CCLK is supplied to all the coils Y(0) to Y(p) via the signal wiring LL1 in the magnetic field generation period TCG during the first touch detection period SEN. Accordingly, the magnetic field is generated in all the coils Y(0) to Y(p). The selection signals Y-Out(0) to Y-Out(p) are maintained at a high level in the first touch detection period SEN such that the signal wiring LL1 is connected to all the coils Y(0) to Y(p) in the magnetic field detection period TDT during the first touch detection period SEN.

When the pen touches or comes close to the display area 2 in the first touch detection period SEN, the magnetic field energy generated in any one of the coils is applied to the pen, and such magnetic field energy is stored in the pen in the magnetic field generation period TCG. A magnetic field is generated from the pen based on the magnetic field energy stored in the pen, in the magnetic field detection period subsequent to the magnetic field generation period TCG, and the magnetic field energy is applied to any one of the coils. Accordingly, a change of the signal is generated in the signal wiring LL1. This change of the signal is transmitted to the touch semiconductor device 6. The touch semiconductor device 6 supplies the control signal SW (FIG. 7), which indicates whether to be touched by the pen, to the control circuit D-CNT based on whether the signal is changed.

The control circuit D-CNT controls the selection control circuits SR-R and SR-L such that a predetermined coil among the coils Y(0) to Y(p) is formed in the subsequent touch detection period SEN, for example, in a case where the control signal SW indicates the touch by the pen. The coil clock signal CCLK is supplied to the formed predetermined coil via the signal wiring LL1 in the magnetic field generation period TCG, and a change of the signal in the signal line LL1 is detected in the magnetic field detection period TDT. Subsequently, the control circuit D-CNT controls the selection control circuits SR-R and SR-L such that the coil to be formed is sequentially replaced. Accordingly, when any area in the display area 2 is touched by the pen, it is possible to extract the area. On the other hand, in a case where the touch is not detected in the first touch detection period SEN, the operation of the magnetic field touch detection is not performed. Accordingly, it is possible to achieve the reduction in power consumption or the like.

FIGS. 30A to 30H illustrate a case where coils to be formed in the display area 2 are the coils Y(n−1) to Y(p) in order to avoid the complexity of the drawing, and further, to acquire the consistency with FIGS. 29A to 29G. The seventh embodiment will be described in detail based on the examples illustrated in FIGS. 30A to 30H. Incidentally, the selection signal Y-Out(n−1) corresponds to the magnetic field control signals C-R(n−1) and C-L(n−1), the selection signal Y-Out(n) corresponds to the magnetic field control signals C-R(n) and C-L(n), and the selection signal Y-Out(n+1) corresponds to the magnetic field control signals C-R(n+1) and C-L(n+1) also in FIGS. 30A to 30H.

The touch detection period SEN1 is assumed to be the first touch detection period in FIGS. 30A to 30H. The control circuit D-CNT controls the selection control circuits SR-R and SR-L such that the selection signals Y-Out(n−1) to Y-Out(p) are set to high levels in the first touch detection period SEN1. Accordingly, the coils Y(n−1) and Y(n) are formed as described with reference to FIGS. 27 and 28. The coils Y(n+1) to Y(p) are also formed in the same manner. The coil clock signal CCLK is supplied to each of the formed coils Y(n−1) to Y(p) via the signal wiring LL1 in the magnetic field generation period TCG. As a result, each of the coils Y(n−1) to Y(p) generates a magnetic field that changes according to the coil clock signal CCLK in the magnetic field generation period TCG during the first touch detection period SEN1.

Since the selection signals Y-Out(n−1) to Y-Out(p) are maintained at a high level in the magnetic field detection period TDT during the first touch detection period SEN, each of the coils Y(n−1) to Y(p) is in the state of being connected to the signal wiring LL1. Accordingly, a change of the signal is generated in the signal wiring LL1 when the magnetic field energy from the pen is applied to any one of the coils. This change of the signal is transmitted to the touch semiconductor device 6. The touch semiconductor device 6 determines whether the display area 2 is touched by the pen from the transmitted change of the signal, and supplies the control signal SW (FIG. 7), which indicates presence or absence of the touch, to the control circuit D-CNT.

The control circuit D-CNT performs the display operation in the display period DISP2 after the first touch detection period SEN1. Thereafter, the magnetic field enable signal SC_EN is set to a high level, again. Accordingly, the subsequent touch detection period SEN2 is started. The control circuit D-CNT controls the selection control circuits SR-R and SR-L such that the selection signal Y-Out(n−1) is set to a high level, and the other selection signals Y-Out(n) to Y-Out(p) are maintained at a low level in the subsequent touch detection period SEN2. Accordingly, the coil Y(n−1) is formed, and a magnetic field is generated in the magnetic field generation period TCG, and the detection of the magnetic field is performed in the magnetic field detection period TDT, as described with reference to FIGS. 27 and 28.

Subsequently, the control circuit D-CNT controls the selection control circuits SR-R and SR-L such that the selection signals are set to high levels in the order from the selection signals Y-Out(n) to Y-Out(p) in every touch detection period.

In this seventh embodiment, all the coils (Y(n−1) to Y(p) in FIGS. 30A to 30H) are formed in the first touch detection period SEN1, and the coil clock signal CCLK is supplied to the respective coils in the magnetic field generation period TCG during the touch detection period SEN1. Accordingly, the magnetic field is generated in the entire surface of the display area 2 (an entire-surface magnetic field generation). Thus, a change of the signal in the signal wiring LL1 is detected in the touch detection period SEN1 during the magnetic field detection period TDT, and accordingly, it is possible to detect whether any area in the display area 2 is touched by the pen. In a case where any area in the display area 2 is detected, as it is touched, in the touch detection period SEN1, the coil is sequentially formed in the subsequent touch detection period SEN2, and the detection on whether any area is touched is performed in the touch detection period thereafter. Further, the operation of the magnetic field touch detection is stopped in a case where the touch is not detected in the first touch detection period SEN1. Accordingly, it is possible to achieve the reduction in power consumption.

Further, since the magnetic field is generated in the entire surface of the display area 2 in the magnetic field generation period TCG during the first touch detection period SEN1, it is possible to generate the strong magnetic field, to increase the magnetic field energy to the pen, and to achieve the improvement of the detection accuracy.

Incidentally, the plurality of coils are connected to the signal wiring LL1 at the time of magnetic field touch detection in FIGS. 27 and 28, signal wirings corresponding to the plurality of coils may be provided. Further, although the description has been given by exemplifying the case where the changeover adjustment circuit and the selection control circuit described in the fifth embodiment are used as the changeover adjustment circuits SC-R and SC-L and the selection control circuits SR-R and SR-L illustrated in FIGS. 7, 17 and 18, it is obvious that the changeover adjustment circuit and the selection control circuit described in the other embodiments may be used as the changeover adjustment circuits SC-R and SC-L and the selection control circuits SR-R and SR-L illustrated in FIGS. 7, 17 and 18.

Eighth Embodiment

FIGS. 31A to 31D are timing diagrams illustrating operations of a liquid crystal display device according to an eighth embodiment. Here, a description will be also given by exemplifying the liquid crystal display device in which the changeover adjustment circuit and the selection control circuit, which have been described in the fifth embodiment, are used as the changeover adjustment circuits SC-R and SC-L and the selection control circuits SR-R and SR-L illustrated in FIGS. 7, 17 and 18. As a matter of course, the liquid crystal display device is not limited thereto, and may be a liquid crystal display device in a case where the changeover adjustment circuit and the selection control circuit, which have been described in the first embodiment or the second to fourth embodiments, are used as the changeover adjustment circuits SC-R and SC-L and the selection control circuits SR-R and SR-L illustrated in FIGS. 7, 17 and 18.

Figure 31:
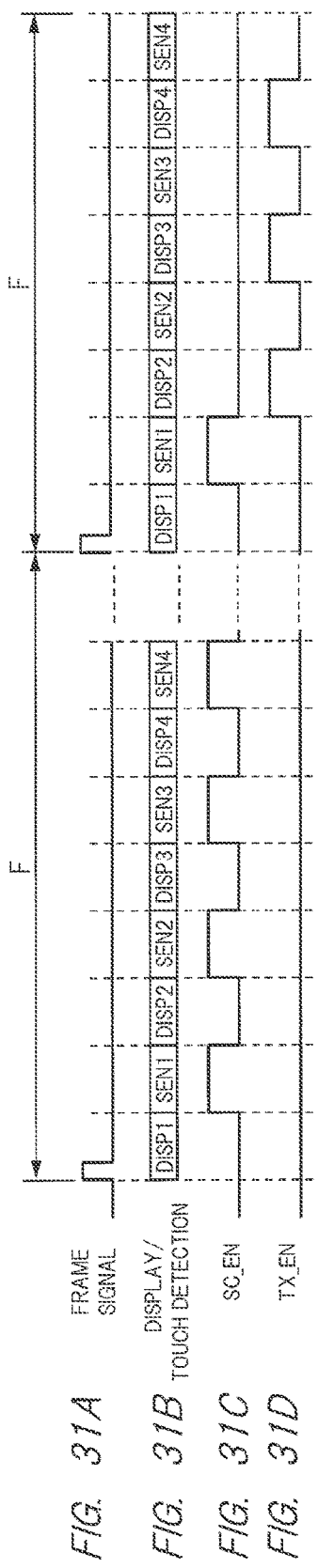
FIGS. 31A to 31D are timing diagrams illustrating an operation of a liquid crystal display device according to an eighth embodiment.

The horizontal axis in FIGS. 31A to 31D represents time. FIG. 31A is a frame signal illustrating the frame period F. FIG. 31B schematically illustrates the display period DISP and the touch detection period SEN to be alternately generated in the frame period F. In FIG. 31B, the display periods generated in temporal order are represented by DISP1 to DISP4, and similarly, the touch detection periods generated in order are represented by SEN1 to SEN4. FIG. 31C illustrates a waveform of the magnetic field enable signal SC_EN, and FIG. 31D illustrates a waveform of the electric field enable signal TX_EN.

As illustrated in FIG. 7, the control circuit D-CNT forms the magnetic field enable signal SC_EN and the electric field enable signal TX_EN. In this eighth embodiment, the control circuit D-CNT sets the magnetic field enable signal SC_EN or the electric field enable signal TX_EN to a high level during the single frame period F according to the control signal SW from the touch semiconductor device 6. That is, the magnetic field enable signal SC_EN or the electric field enable signal TX_EN is set to a high level during the subsequent touch detection periods SEN2 to SEN4 according to a result detected in the first touch detection period SEN1. Incidentally, the display periods DISP1 to DISP4 are the same as the display periods DISP1 and DISP2, which have been described in the sixth and seventh embodiments, and the description thereof will be omitted.

First, the control circuit D-CNT sets the magnetic field enable signal SC_EN to a high level, and sets the electric field enable signal TX_EN to a low level in the first touch detection period SEN1. Further, the control circuit D-CNT controls the selection control circuits SR-R and SR-L such that all the coils Y(0) to Y(p), which extend in the horizontal direction (the row direction) and arranged in parallel in the vertical direction (the column direction), are formed in the touch detection period SEN1. That is, the control circuit D-CNT controls the selection control circuits SR-R and SR-L such that each of the magnetic field control signals C-R(0) to C-R(p) and C-L(0) to C-L(p), which have been described with reference to FIGS. 27 and 28, is set to a high level, and each of the electric field control signals T-R(0) to T-R(p) and T-L(0) to T-L(p) is set to a low level. Further, the control circuit D-CNT controls the selection control circuits SR-R and SR-L such that each of the display control signals D-R(0) to D-R(p) and D-L(0) to D-L(p) is set to a low level.

Accordingly, each of the coils Y(0) to Y(p) is connected to the signal wiring LL1 in the touch detection period SEN1. The control circuit D-CNT supplies the coil clock signal CCLK to the signal wiring LL1 in the touch detection period SEN1 during the magnetic field generation period TCG. As a result, each of the coils Y(0) to Y(p) generates a magnetic field according to a change of the coil clock signal CCLK. That is, the magnetic field is generated in the entire surface of the display area 2 (the entire-surface magnetic field generation) in the magnetic field generation period TCG during the touch detection period SEN1.

In the touch detection period SEN1, the control circuit D-CNT controls the selection control circuits SR-R and SR-L to continuously output high level magnetic field control signals C-R(0) to C-R(p) and C-L(0) to C-L(p) also in the magnetic field detection period TDT. Accordingly, each of the coils Y(0) to Y(p) is connected to the signal wiring LL1 also in the magnetic field detection period TDT. If any area of the display area 2 is touched by the pen in the touch detection period SEN1, a signal of the coil corresponding to the area being touched is changed. This change of the signal is transmitted to the touch semiconductor device 6 via the signal wiring LL1. Incidentally, the control circuit D-CNT stops the supply of the coil clock signal CCLK to the signal wiring LL1 to set the signal wiring LL1 to the high-impedance state in the magnetic field detection period TDT, which has been already described above.

The touch semiconductor device 6 forms the control signal SW, which indicates whether to be touched by the pen, based on the change of the supplied signal via the signal wiring LL1, and supplies the control signal SW to the control circuit D-CNT.

In a case where the control signal SW indicates the touch by the pen, the control circuit D-CNT sets the magnetic field enable signal SC_EN to a high level in the subsequent touch detection periods SEN2 to SEN4. When a high level magnetic field enable signal SC_EN is supplied to the selection control circuits SR-R and SR-L, the selection control circuits SR-R and SR-L form the magnetic field control signals C-R(0) to CR (p), and C-L(0) to C-L(p) such that the coils are sequentially formed in the subsequent touch detection periods SEN2 to SEN4. For example, the selection control circuits SR-R and SR-L output the magnetic field control signal such that the coil Y(0) is formed in the touch detection period SEN2, the selection control circuits SR-R and SR-L output the magnetic field control signal such that the coil Y(1) is formed in the touch detection period SEN3, and the selection control circuits SR-R and SR-L output the magnetic field control signal such that the coil Y(2) is formed in the touch detection period SEN4.

Accordingly, the coil Y(0) generates a magnetic field in the magnetic field generation period TCG during the touch detection period SEN1, and the detection of the magnetic field is performed using the coil Y(0) in the magnetic field detection period TDT. Thereafter, the coil Y(1) generates a magnetic field and the detection of the magnetic field is performed using the coil Y(1) in the touch detection period SEN2, the coil Y(2) generates a magnetic field in the touch detection period SEN3 and the detection of the magnetic field is performed using the coil Y(2) in the magnetic field detection period TDT in the same manner. Further, the coil Y(3) generates a magnetic field, and the detection of the magnetic field is performed using the coil Y(3) in the touch detection period SEN4.

Further, the coils X(0) to X(p), which extend in the vertical direction (the column direction) and arranged in parallel in the horizontal direction (the row direction), are formed by the changeover adjustment circuits SCX-U and SCX-D and the selection control circuit SRX-D (FIG. 7), which have been described in the first embodiment, in the touch detection periods SEN2 to SEN4. The coil clock signal CCLK is supplied to the formed coil, and a magnetic field is generated in the formed coil in the magnetic field generation period TCG. Further, a change of the signal from the formed coil is supplied to the touch semiconductor device 6 as the sense signals SX(0) to SX(p) in the magnetic field detection period TDT.

The magnetic field detection circuit SC-DET amplifies each of the sense signals SY(n), SY(n+1) and SX(0) to SX(p), and coverts each amplified signal into the digital signal, and supplies the converted signal to the processing circuit PRS as the detection signal SC-0 in the touch semiconductor device 6, as described with reference to FIG. 7. The processing circuit PRS extracts a coordinate of a position touched by the pen, and outputs the coordinate from the external terminal To as the position information.

In a case where the control signal SW from the touch semiconductor device 6 indicates that the touch by the pen is not detected in the first touch detection period SEN1, the control circuit D-CNT sets the magnetic field enable signal SC_EN to a low level, and sets the electric field enable signal TX_EN to a high level in the subsequent touch detection periods SEN2 to SEN4. The frame period F on the left side represents a frame period in a case where the touch by the pen is detected, and the frame period F on the right side represents a frame period in a case where the touch by the pen is not detected, in FIGS. 31A to 31D. The control circuit D-CNT sets the magnetic field enable signal SC_EN to a high level in the first touch detection period SEN1, even in the frame period F on the right side, in FIGS. 31A to 31D. As similar to the description that has been already given above, the control circuit D-CNT controls the selection control circuits SR-R and SR-L in the first touch detection period SEN1 such that the coils Y(0) to Y(p) are formed and the entire-surface magnetic field generation is performed in the magnetic field generation period TCG. Further, a signal of the coil is transmitted to the touch semiconductor device 6 via the signal wiring LL1 in the magnetic field detection period TDT. The control signal SW, which indicates whether any area of the display area 2 is touched by the pen, is formed in the touch semiconductor device 6 based on the supplied signal, and the formed control signal SW is supplied to the control circuit D-CNT.

Here, any area of the display area 2 is not touched by the pen, and thus, the control signal SW, which indicates that the touch by the pen is not detected, is supplied from the touch semiconductor device 6 to the control circuit D-CNT. The control circuit D-CNT receives this control signal SW, and sets the magnetic field enable signal SC_EN to a low level, and sets the electric field enable signal TX_EN to a high level in the subsequent touch detection periods SEN2 to SEN4.

The selection control circuits SR-R and SR-L sequentially form the electric field control signals T-R(0) to T-R(p) and T-L(0) to T-L(p) by changing the electric field enable signal TX_EN to a high level. In a case where an electric field is generated in order from the groups TLG(0) to TLG(p) of the drive electrodes, for example, the selection control circuits SR-R and SR-L set the electric field control signals T-R(0) and T-L(0), which correspond to the group TLG(0), to high levels in the touch detection period SEN2. Incidentally, the other electric field control signals T-R(1) to T-R(p) and T-L(1) to TL(p) are set to low levels at this time.

When the electric field control signals T-R(0) and T-L(0) are set to high levels in the touch detection period SEN2, the control signal TSVCOM with the periodically changing voltage is supplied to the drive electrode arranged in the group TLG(0) as the electric field drive signal, and accordingly, an electric field is generated in the group TLG(0). Signals of the detection electrodes RL(0) to RL(p), which have been described with reference to FIG. 7, are supplied to the touch semiconductor device 6 as the detection signals Rx(0) to Rx(p) in the touch detection period SEN2.

The selection control circuits SR-R and SR-L change the electric field control signals T-R(1) and T-L(1) to high levels in the touch detection period SEN3 subsequent to the touch detection period SEN2. Accordingly, an electric field is generated in the group TLG(2), and the detection signals Rx(0) to Rx(p) at the time are supplied to the touch semiconductor device 6. Thereafter, an electric field is generated in each of the touch detection periods, and the detection signals Rx(0) to Rx(p) at the time are supplied to the touch semiconductor device 6 in the same manner.

In the touch semiconductor device 6, the electric field detection circuit SE-DET amplifies the detection signals Rx(0) to Rx(p), and coverts each amplified signal into a digital signal, and supplies the converted signal to the processing circuit PRS as the detection signal SE-O, and accordingly, a coordinate of a position touched by the finger is extracted in the processing circuit PRS and is output, as described with reference to FIG. 7.

Further, the control circuit D-CNT sets the gate driver 5 (FIG. 7) and the signal line driving circuit D-DRV to high-impedance states through the high impedance control signal HZ-CT in the touch detection period SEN1, in this eighth embodiment. Accordingly, the scan lines GL(0) to GL(p) are set to high-impedance states, and the signal lines SL(0) to SL(p) are also set to high-impedance states at the time of driving the coils Y(0) to Y(p) each of which uses the drive electrodes as the winding. Further, the drive electrode to which the magnetic field drive signal is not supplied is set to a high-impedance state. As a result, it is possible to achieve the reduction of the parasitic capacitance to be charged and discharged when the voltage of the drive electrode is changed by the magnetic field drive signal.

The detection of the touch according to the electric field touch detection is automatically performed when the touch is not detected by the magnetic field touch detection in the single frame period F, in this eighth embodiment. That is, the changeover to a more suitable touch detection system is automatically performed in the single frame period F.

Although the description has been given regarding the example in which the entire-surface magnetic field generation is performed using the coils Y(0) to Y(p), the entire-surface magnetic field generation may be performed using the coils X(0) to X(p). In this case, when the touch by the pen is detected, the magnetic field touch detection may be performed in order from the coils X(0) to X(p) or the magnetic field touch detection may be performed in order from the coils Y(0) to Y(p). Further, although the example in which the entire-surface magnetic field generation is performed has been described, a partial magnetic field generation may be performed using a plurality of coils, instead of the entire-surface magnetic field generation.

Further, the magnetic fields (electric fields) generated in the touch detection periods SEN2 to SEN4 are not generated in order, and a magnetic field (electric field) may be generated in any of the groups TLG.

Ninth Embodiment

Figure 32:
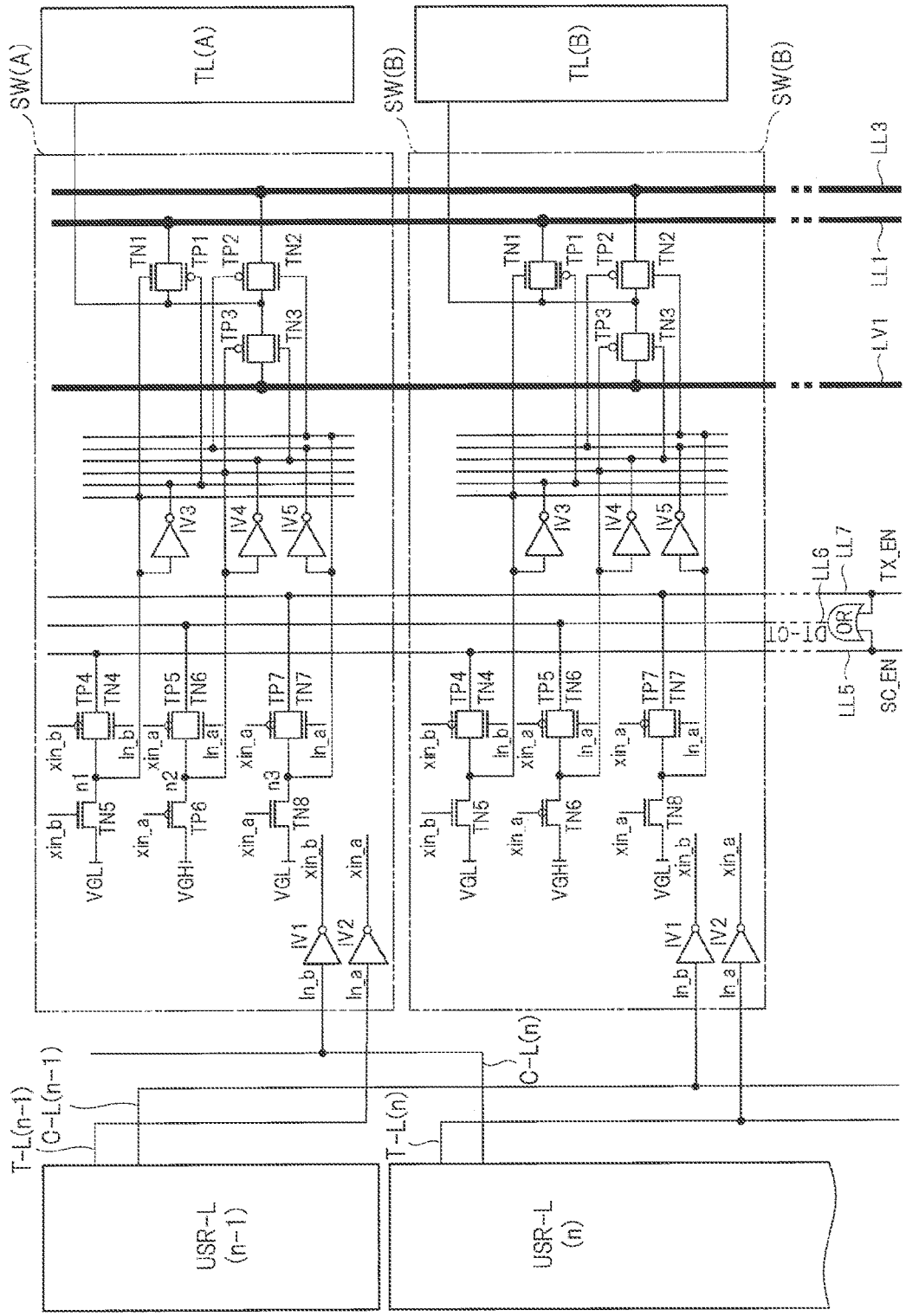
FIG. 32 is a circuit diagram illustrating a configuration of a liquid crystal display device according to a ninth embodiment.

FIG. 32 is a circuit diagram illustrating a configuration of a liquid crystal display device according to a ninth embodiment. FIG. 32 illustrates circuits configuring the changeover adjustment circuits USC-R and USC-L. Here, configurations of switch circuits SW(A) and SW(B) in the changeover adjustment circuits USC-R and USC-L, which are connected to drive electrodes TL(A) and TL(B) among a plurality of drive electrodes included in the groups TLG(n−1) and TLG(n) of the drive electrodes corresponding to the unit selection control circuits USR-L(n−1) and USR-L(n), are illustrated. Incidentally, FIG. 32 does not illustrate the signal wirings to connect the drive electrodes included in the changeover adjustment circuits USC-R and USC-L.

The unit selection control circuit USR-L(n−1) sets the magnetic field control signal C-L(n−1) to a high level when the magnetic field touch detection is designated and a magnetic field is generated in the group TLG(n−1), and sets the magnetic field control signal C-L(n−1) to a low level when the magnetic field is not generated. Further, the unit selection control circuit USR-L(n−1) sets the electric field control signal T-L(n−1) to a high level when the electric field touch detection is designated and an electric field is generated in the group TLG(n−1), and sets the electric field control signal T-L(n−1) to a low level when the electric field is not generated.

As similar to the unit selection control circuit USR-L(n−1), the unit selection control circuit USR-L(n) sets the magnetic field control signal C-L(n) to a high level when a magnetic field is generated in the group TLG(n), and sets the magnetic field control signal C-L(n) to a low level when the magnetic field is not generated. Further, the unit selection control circuit USR-L(n) sets the electric field control signal T-L(n) to a high level when an electric field is generated in the group TLG(n), and sets the electric field control signal T-L(n) to a low level when the electric field is not generated.

Further, the respective unit selection control circuits USR-L(n−1) and USR-L(n) set the electric field control signals T-L(n−1) and T-L(n) to low levels in a case where the magnetic field touch detection is designated, and set the magnetic field control signals C-L(n−1) and C-L(n) to low levels in a case where the electric field touch detection is designated.

The electric field control signal T-L(n−1), output from the unit selection control circuit USR-L(n−1), is supplied to the switch circuit SW(A) connected to the drive electrode TL(A), and the electric field control signal T-L(n), output from the unit selection control circuit USR-L(n), is supplied to the switch circuit SW(B) connected to the drive electrode TL(B). Here, the drive electrode TL(A) is one (predetermined) drive electrode among the plurality of drive electrodes to be used as the winding of the coil, at the time of generating the magnetic field in the area of the group TLG(n) including the drive electrode TL(B). Similarly, the drive electrode TL(B) is one (predetermined) drive electrode among the plurality of drive electrodes to be used as the winding of the coil, at the time of generating the magnetic field in the area of the group TLG(n−1) including the drive electrode TL(A). Further, the drive electrodes TL(A) and TL(B) will be described here as the drive electrodes to which the coil clock signal CCLK is supplied from the signal wiring LL1 when the coil is formed.

Each of the switch circuits SW(A) and SW(B) included in the unit changeover adjustment circuit has the same configuration. Further, the common circuit is provided with respect to the switch circuits SW(A) and SW(B). Next, a configuration of the switch circuit SW will be described using the switch circuit SW(A) as a representative.

The switch circuit SW(A) is provided with N-channel MOSFETs (hereinafter, referred to as the N-type FETs) TN1 to TN8, P-channel MOSFETs (hereinafter, referred to as P-type FETs) TP1 to TP7, and inverter circuits IV1 to IV5. Each of the N-type FET and the P-type FET has a gate, a drain, and a source, and the gate is referred to as a gate terminal while the drain or the source is referred to as a first terminal and the source or the drain is referred to as a second terminal in the present specification, since the drain and the source are changed by a voltage at the time.

The first terminal of the N-type FET TN1 is connected to the signal wiring LL1, and the second terminal is connected to the drive electrode TL(A). The second terminal of the P-type FET TP1 is connected to the signal wiring LL1 and the first terminal is connected to the drive electrode TL(A) so as to be connected in parallel to the N-type FET TN1. The first terminal of the N-type FET TN2 is connected to the signal wiring LL3, and the second terminal is connected to the drive electrode TL(A). The second terminal of the P-type FET TP2 is connected to the signal wiring LL3, and the first terminal is connected to the drive electrode TL(A) so as to be connected in parallel to the N-type FET TN2. Further, the first terminal of the N-type FET TN3 is connected to the voltage wiring LV1, and the second terminal is connected to the drive electrode TL(A). The second terminal of the P-type FET TP3 is connected to the voltage wiring LV1, and the first terminal is connected to the drive electrode TL(A) so as to be connected in parallel to the N-type FET TN3.

The N-type FET TN1 and the P-type FET TP1 are turned into on-states by signals to be supplied to the respective gates thereof in a substantially simultaneous manner. It is possible to reduce the resistance at the on-state as they are connected in parallel to each other. Although the description has been given by exemplifying the N-type FET TN1 and the P-type FET TP1, the N-type FETs TN2 and TN3 and the P-type FETs TP2 and TP3 have the same configuration, and it is possible to reduce the resistance at the on-states.

The first terminal and the second terminal of the N-type FET TN4 are connected to the second terminal and the first terminal of the P-type FET TP4, and the first terminal of the N-type FET TN4 and the second terminal of the P-type FET TP4 are connected to a signal wiring LL5 to which the magnetic field enable signal SC_EN is supplied. Further, the second terminal of the N-type FET TN5 and the first terminal of the P-type FET TP4 are connected to the first terminal of the N-type FET TN5, and the second terminal of the N-type FET TN5 is connected to a predetermined voltage VGL. A node n1 to which the N-type FET TN5, the N-type FET TN4, and the P-type FET TP4 are connected is connected to the gate of the N-type FET TN1, and further, the node n1 is connected to the gate of the P-type FET TP1 via the inverter circuit IV3.

The first terminal and the second terminal of the N-type FET TN6 are connected to the second terminal and the first terminal of the P-type FET TP5, and the first terminal of the N-type FET TN6 and the second terminal of the P-type FET TP5 are connected to a signal wiring LL6. Further, the second terminal of the N-type FET TN6 and the first terminal of the P-type FET TP5 are connected to the second terminal of the P-type FET TP6, and the first terminal of the P-type FET TP6 is connected to a predetermined voltage VGH. A node n2 to which the N-type FET TN6, the P-type FET TP5, and the P-type FET TP6 are connected is connected to the gate of the P-type FET TP3, and further, the node n2 is connected to the gate of the N-type FET TN3 via the inverter circuit 1V4.

Further, the first terminal and the second terminal of the N-type FET TN7 are connected to the second terminal and the first terminal of the P-type FET TP7, and the first terminal of the N-type FET TN7 and the second terminal of the P-type FET TP7 are connected to a signal wiring LL7 to which the electric field enable signal TX_EN is supplied. Further, the second terminal of the N-type FET TN7 and the first terminal of the P-type FET TP7 are connected to the first terminal of the N-type FET TN8, and the second terminal of the N-type FET TN8 is connected to the predetermined voltage VGL. A node n3 to which the N-type FET TN7, the P-type FET TP7, and the N-type FET TN8 are connected is connected to the gate of the N-type FET TN2, and further, the node n3 is connected to the gate of the P-type FET TP2 via the inverter circuit IV5.

The electric field control signal T-L(n−1) from the unit selection control circuit USR-L(n−1) is supplied to the inverter circuit IV2 as an input signal In_a. The inverter circuit IV2 forms an output signal xin_a which is phase-inverted with respect to the input signal In_a. On the other hand, the magnetic field control signal C-L(n) from the unit selection control circuit USR-L(n) is supplied to the inverter circuit IV1 as an input signal In_b. The inverter circuit IV1 forms an output signal xin_b which is phase-inverted with respect to the input signal In_b.

The electric field control signal T-L(n−1) supplied to the switch circuit SW(A) is supplied to the gates of the N-type FETs TN6 and TN7 as the signal In_a. In addition, the phase-inverted signal xin_a is supplied to the gates of the P-type FETs TP5 and TP7 and the N-type FET TN8. Further, the magnetic field control signal T-L(n) supplied to the switch circuit SW(A) is supplied to the gate of the N-type FET TN4 as the signal In_b. In addition, the phase-inverted signal xin_b is supplied to the gates of the P-type FET TP4 and the N-type FET TN5.

The switch circuit SW(B) has the same configuration as the switch circuit SW(A) except that the drive electrode to be connected is different and that the input signal to be supplied is different. That is, the drive electrode TL(B), instead of the drive electrode TL(A), is connected to the switch circuit SW(B). Further, the electric field control signal TL(n) from the unit selection control circuit USC-L(n) is supplied as the input signal In_a, and the magnetic field control signal C-L(n−1) from the unit selection control circuit USC-L(n−1) is supplied as the input signal In_b.

The touch control signal DT-CT, which is formed by the common circuit with respect to the unit changeover adjustment circuits, is supplied to the signal wiring LL5. The common circuit is configured using a two-input OR circuit OR in this ninth embodiment. The magnetic field enable signal SC_EN is supplied to one input of the two-input OR circuit OR, and the electric field enable signal TX_EN is supplied to the other input thereof. The electric field enable signal TX_EN is set to a high level in a case where the electric field touch detection is designated in the touch detection period. Further, the magnetic field enable signal SC_EN is set to a high level in a case where the magnetic field touch detection is designated. Thus, the two-input OR circuit OR outputs a high level touch control signal DT-CT when the magnetic field touch detection or the electric field touch detection is designated in the touch detection period.

The ground voltage is supplied as the above-described predetermined voltage VGL, for example, and a power-supply voltage having a voltage value higher than the ground voltage is supplied as the predetermined voltage VGH. Further, the control circuit D-CNT supplies the ground voltage to the above-described voltage wiring LV1.

The control circuit D-CNT supplies the control signal TSVCOM having a periodically changing voltage value to the above-described signal wiring LL3 when the electric field touch detection is designated, and supplies the ground voltage to the above-described signal wiring LL3 when the magnetic field touch detection is designated. Further, the control circuit D-CNT supplies the coil clock signal CCLK to the signal wiring LL1 in the magnetic field generation period TCG when the magnetic field touch detection is designated, and stops the supply of the coil clock signal CCLK and sets the signal wiring LL1 to a high-impedance state in the magnetic field detection period TDT.

<Operation of Electric Field Touch Detection>

First, a description will be given regarding an operation at the time of electric field touch detection. Here, a description will be given regarding a case where the drive electrodes arranged in the group TLG(n−1) are driven by the electric field drive signal, and the drive electrodes arranged in the group TLG(n) are not driven. In other words, a description will be given regarding a case where it is detected whether the area of the group TLG(n−1) is touched by the finger.

In this case, the unit selection control circuit USR-L(n−1) corresponding to the group TLG(n−1) outputs a high level electric field control signal T-L(n−1), and the unit selection control circuit USR-L(n) corresponding to the group TLG(n) outputs a low level electric field control signal T-L(n). Further, the magnetic field control signals C-L(n−1) and C-L(n) are set to low levels.

The output signal xin_a of the inverter circuit IV2 in the switch circuit SW(A) is set to a low level by a high level electric field control signal T-L(n−1). Further, the output signal xin_b of the inverter circuit IV1 in the switch circuit SW(A) is set to a high level by a low level magnetic field control signal C-L(n). Accordingly, the N-type FETs TN5, TN6 and TN7 are turned into on-states, and the P-type FETs TP5 and TP7 are turned into on-states. When the N-type FET TN5 is turned into the on-state, the ground voltage (VGL) is supplied to the gate terminal of the N-type FET TN1, and a high-level voltage is supplied from the inverter circuit IV3 to the gate terminal of the P-type FET TP1. As a result, the N-type FET TN1 and the P-type FET TP1 are turned into off-states, and the drive electrode TL(A) and the signal wiring LL1 are separated from each other.

Since the electric field enable signal TX_EN is set to a high level during the electric field touch detection, the signal wirings LL6 and LL7 are set to high levels. A high level voltage of the signal line LL6 is supplied to the gate terminal of the P-type FET TP3 via the N-type FET TN6 and the P-type FET TP6. Further, a high level voltage is supplied from the inverter circuit IV4 to the gate terminal of the N-type FET TN3. Accordingly, the P-type FET TP3 and the N-type FET TN3 are turned into off-states, and the drive electrode TL(A) and the voltage wiring LV1 are separated from each other. On the other hand, a high level voltage of the signal wiring LL7 is supplied to the gate terminal of the N-type FET TN2 via the N-type FET TN7 and the P-type FET TP8. Further, at this time, a high-level voltage from the inverter circuit IV5 is supplied to the gate terminal of the P-type FET TP2. As a result, the N-type FET TN2 and the P-type FET TP2 are turned into on-states, and the drive electrode TL(A) is connected to the signal wiring LL3 via the N-type FET TN2 and the P-type FET TP2.

Since the control signal TSVCOM with the periodically changing voltage is supplied to the signal wiring LL3 at the time of electric field touch detection, this signal TSVCOM is supplied to the drive electrode TL(A) as the electric field drive signal. Accordingly, a voltage of the drive electrode TL(A) is periodically changed, and an electric field is generated. Although the description has been given by exemplifying the drive electrode TL(A) included in the group TLG(n−1) here, the other drive electrodes included in the group TLG(n−1) are driven in the same manner.

Since the electric field control signal T-L(n) is set to a low level in the switch circuit SW(B), the output signal xin_a of the inverter circuit IV2 is set to a high level. Accordingly, the P-type FET TP6 and the N-type FET TN8 in the switch circuit SW(B) are turned into on-states. As a result, a high-level voltage (VGH) is supplied to the gate terminal of the P-type FET TP3 via the P-type FET TP6, and a low-level voltage is supplied to the gate terminal of the N-type FET TN3 from the inverter circuit IV4. Further, a low-level (VGL) voltage is supplied to the gate terminal of the N-type FET TN2 via the N-type FET TN8, and a high-level voltage is supplied to the gate terminal of the P-type FET TP2 from the inverter circuit IV5. Accordingly, the N-type FETs TN1 to TN3 and the P-type FETs TP1 to TP3 are turned into off-states, and the drive electrode TL(B) is separated from the voltage wirings LV1 and LV4 and the signal wiring LL1. As a result, the control signal TSVCOM is not supplied to the drive electrodes arranged in the group TLG(n), and the drive electrodes therein are turned into floating states.

<Operation of Magnetic Field Touch Detection>

When the magnetic field enable signal SC_EN is set to a high level, the magnetic field touch detection is designated. At this time, the electric field enable signal TX_EN is set to a low level. Further, the control circuit D-CNT supplies the ground voltage to the signal wiring LL3 in the magnetic field touch detection, supplies the coil clock signal CCLK to the signal wiring LL1 in the magnetic field generation period TCG, and sets the signal wiring LL1 to a high-impedance state in the magnetic field detection period TDT.

Here, a description will be given regarding a case where a magnetic field is generated in the group TLG(n−1), and the magnetic field is not generated in the group TLG(n). In other words, a description will be given regarding a case where it is detected whether the area of the group TLG(n−1) is touched by the pen. In this case, the unit selection control circuit USR-L(n−1) corresponding to the group TLG(n−1) sets the magnetic field control signal C-L(n−1) to a high level, and the unit selection control circuit USR-L(n) corresponding to the group TLG(n) sets the magnetic field control signal C-L(n) to a low level. Further, both of the electric field control signals T-L(n−1) and T-L(n) are set to low levels at this time.

The magnetic field control signal C-L(n−1) is supplied to the switch circuit corresponding to the drive electrodes arranged in the groups TLG(n−2) and TLG(n) arranged across the group TLG(n−1). The magnetic field control signal C-L(n−1) is supplied to the switch circuit SW(B) corresponding to the drive electrode TL(B) among the drive electrodes arranged in the group TLG(n) in FIG. 32.

The magnetic field control signal C-L(n−1) is supplied to the inverter circuit IV1 in the switch circuit SW(B) as the input signal In_b, and the inverter circuit IV1 forms a low level output signal xin_b. Accordingly, the N-type FET TN4 and the P-type FET TP4 are turned on-states, and the N-type FET TN5 is turned into an off-state in the switch circuit SW(B). As a result, the gate terminal of the N-type FET TN1 is connected to the signal wiring LL5 via the N-type FET TN4 and the P-type FET TP4, so that a high level magnetic field enable signal SC_EN is supplied, and the N-type FET TN1 is turned into the on-state. Further, since a low-level voltage is supplied from the inverter circuit IV3 to the gate terminal of the P-type FET TP1 at this time, the P-type FET TP1 is also turned into the on-state. Further, the signal wiring LL1 is set to a high-impedance state in the magnetic field detection period TDT. Thus, a voltage of the signal wiring LL1 is changed according to a change of the signal in the drive electrode TL(B), and is transmitted to the touch semiconductor device 6 as the sense signal SY.

Accordingly, the drive electrode TL(B) is connected to the signal wiring LL1 via the N-type FET TN1 and the P-type FET TP1. Since coil clock signal CCLK is supplied to the signal wiring LL1 in the magnetic field generation period TCG during the magnetic field touch detection, a voltage of the drive electrode TL(B) is changed according to the coil clock signal CCLK, a magnetic field having the group TLG(n−1) on the inner side thereof is generated.

On the other hand, the magnetic field control signal C-L(n) is set to a low level in the switch circuit SW(A), the N-type FET TN5 is turned into an on-state, and the N-type FET TN4 and the P-type FET TP4 are turned into off-states. As a result, the N-type FET TN1 and the P-type FET TP1 in the switch circuit SW(A) are turned into the off-states together. Thus, the drive electrode TL(A) is separated from the signal wiring LL1. That is, the coil clock signal CCLK is not supplied to the drive electrode TL(A), and the drive electrode TL(A) is set to a high-impedance state.

Since the electric field control signal T-L(n) is set to a low level in the magnetic field touch detection, the N-type FET TN8 and the P-type FET TP6 in the respective switch circuits SW(A) and SW(B) are turned into on-states, and the N-type FETs TN6 and RN7 and the P-type FETs TP5 and TP7 are turned into off-states. As a result, the P-type FETs TP2 and TP3 and the N-type FETs TN2 and TN3 in the switch circuits SW(A) and SW(B) are turned into the off-states, and the drive electrodes TL(A) and TL(B) are separated from the voltage wiring LV1 and the signal wiring LL3.

In this manner, the magnetic field, which is changed according to the coil clock signal CCLK, is generated in the group TLG(n−1), in the magnetic field generation period TCG.

In FIG. 32, the N-type FET TN1 and the P-type FET TP1 in the switch circuit SW(A) are turned into on-states in a case where the unit selection control circuit USR-L(n) generates the magnetic field control signal C-L(n) of a high level, and the coil clock signal CCLK is supplied to the drive electrode TL(B), and a magnetic field is generated in the group TLG(n) in the magnetic field generation period TCG. The other switch circuits (not illustrated) also perform the same operation.

<Operation in Display Period>

The control circuit D-CNT (FIG. 7) performs control such that each of the unit selection control circuits outputs a low level magnetic field control signal and a high level electric field control signal in the display period. Further, the magnetic field enable signal SC_EN and the electric field enable signal TX_EN are set to low levels at this time.

When the electric field control signals T-L(n−1) and TL(n) are set to high levels, the N-type FETs TN6 and TN7 and the P-type FETs TP5 and TP7 are turned into on-states, and the N-type FET TN8 and the P-type FET TP6 are turned into off-states in the respective switch circuits SW(A) and SW(B). As a result, a low level voltage in the signal wiring LL6 is transmitted to the gate terminal of the P-type FET TP3, and a low-level voltage in the signal wiring LL7 is transmitted to the gate terminal of the N-type FET TN2. At this time, a high-level voltage is supplied from the inverter circuit IV4 to the gate terminal of the N-type FET TN3, and a high-level voltage is supplied from the inverter circuit IV5 to the gate terminal of the P-type FET TP2. Further, the magnetic field control signals C-L(n−1) and C-L(n) are set to low levels, and thus, the N-type FET TN1 and the P-type FET TP1 are turned into the off-states as similar to the description in <Operation of Electric Field Touch Detection>.

As a result, the drive electrodes TL(A) and TL(B) are connected to the voltage wiring LV1 via the P-type FET TP3 and the N-type FET TN3. In this case, the ground voltage is supplied to the voltage wiring LV1, and the ground voltage is supplied to the respective drive electrodes as the display drive signal. Incidentally, the voltage to be supplied to the voltage wiring LV1 is not limited to the ground voltage in the display period. Further, in the display period, the voltage to be supplied to the voltage wiring LV1 may be a voltage with a changing voltage value according to pixel information.

Although the description has been described regarding the switch circuit connected to the drive electrode to which the coil clock signal CCLK is supplied in the magnetic field generation period TCG in FIG. 32, it is possible to obtain a switch circuit, which is connected to the drive electrode to which the ground voltage is supplied at the time of magnetic field touch detection, also with the same configuration as the switch circuit illustrated in FIG. 32. That is, the N-type FET TN1 and the P-type FET TP1 may be changed to be connected between the drive electrode and the signal wiring LL3, in the switch circuit connected to the drive electrode to which the ground voltage is supplied at the time of magnetic field touch detection. Further, the N-type FETs TN1, TN4 and TN5, the P-type FETs TP1 and TP4 and the inverter circuit IV3 may be removed, in the switch circuit to be connected to the drive electrode which is not used in the magnetic field generation.

Tenth Embodiment

Figure 33:
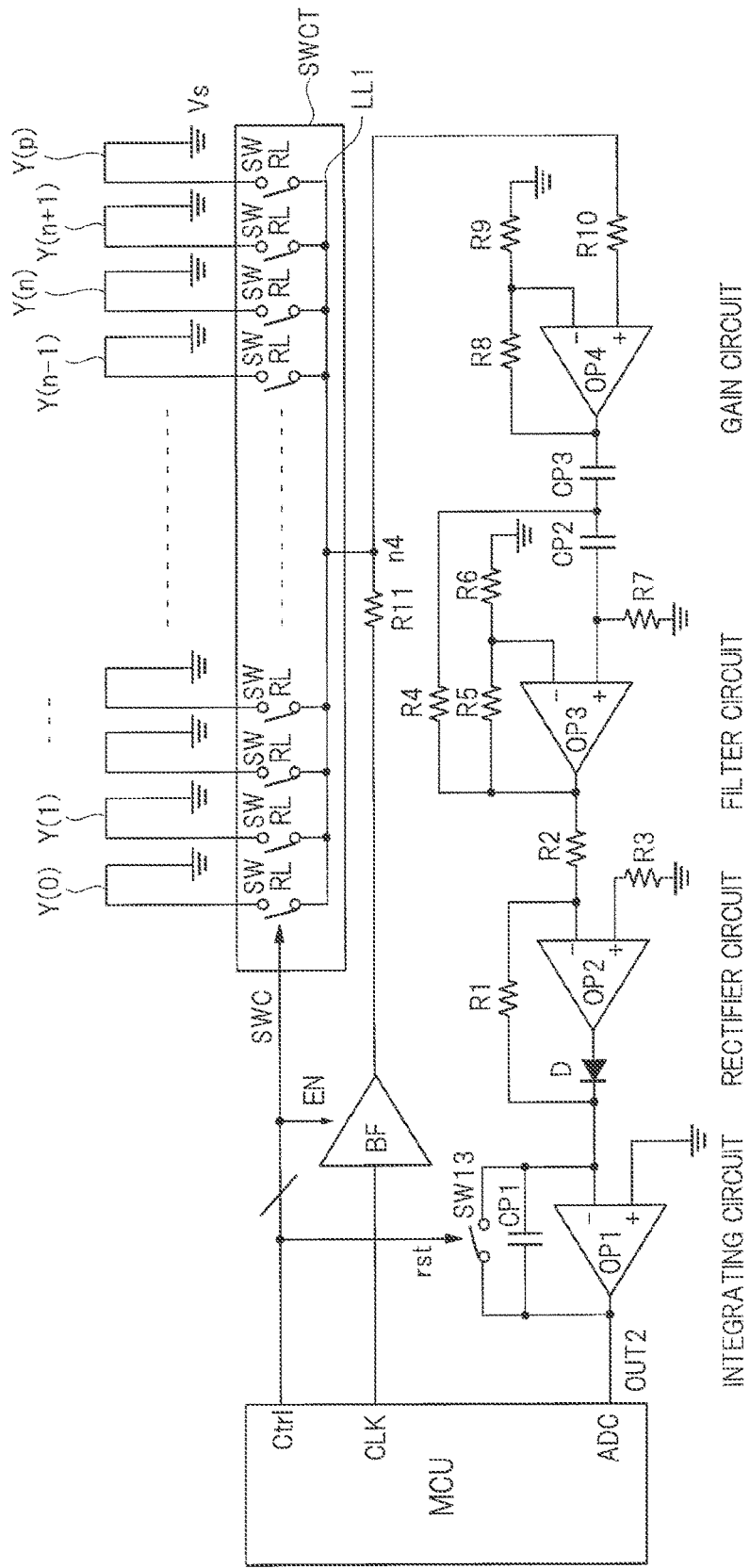
FIG. 33 is a circuit diagram illustrating a configuration of a liquid crystal display device according to a tenth embodiment.

FIG. 33 is a circuit diagram illustrating an example of a magnetic field detection circuit to be used in the liquid crystal display device 1 according to a tenth embodiment. In FIG. 33, reference signs Y(0) to Y(p) represent the coils to be formed in the touch detection period. Further, a reference sign SWCT represents a switch unit which includes a plurality of switches SWRL to be controlled by a switch control signal SWC. Here, the switch SWRL corresponds to the thirty-fourth switch (R513) and the thirty-seventh switches L513 and <L513> illustrated in FIGS. 27 and 28, for example, and the switch control signal SWC corresponds to the magnetic field control signals C-R(n), C-L(n−1) and C-L(n+1).

One end portion of each of the coils Y(0) to Y(p) is connected to the ground voltage Vs during the magnetic field touch detection, and the other end portion thereof is connected to a node n4 via the corresponding switch SWRL and the signal wiring LL1. A detection signal in the node n4 is supplied to a gain circuit, and amplified by the gain circuit. The amplified detection signal is supplied to a filter circuit in order to remove noise, and an output of the filter circuit is rectified by a rectifier circuit, and is supplied to an integrating circuit. An output of the integrating circuit is supplied to a microcontroller MCU.

The microcontroller MCU includes an analog/digital conversion circuit, a clock signal generation circuit, a non-volatile memory in which a program is stored, and a processing unit that operates according to the program stored in the non-volatile memory, although these are not illustrated. The output from the above-described integrating circuit is supplied to the analog/digital conversion circuit via a terminal ADC of the microcontroller MCU, and is converted into a digital signal. The digital signal obtained through the conversion is processed by the processing unit, and the determination is performed on whether the pen is close to any one of the coils Y(0) to Y(p).

The processing unit of the microcontroller MCU forms a control signal according to the program. Examples of the control signal includes the switch control signal SWC, the enable signal EN, and a reset signal rst. Further, the clock signal CLK with the periodically changing voltage is generated by the clock signal generation circuit of the microcontroller MCU. This clock signal is used as the coil clock signal CCLK.

The coil clock signal CCLK is supplied to a buffer circuit BF. The buffer circuit BF is controlled by the enable signal EN. When the enable signal EN is set to a high level, the coil clock signal CCLK is supplied to the node n4 via a resistance R11. On the other hand, an output of the buffer circuit BF is set to a high-impedance state (Hi-Z) when the enable signal EN is set to a low level.

The gain circuit includes resistances R8 to R10, an operational amplifier OP4, and a capacitive element CP3 for cutting off direct current. A detection signal is supplied to a positive phase input (+) of the operational amplifier OP4, an inverting input (−) of the operational amplifier OP4 is connected to the ground voltage Vs via the resistance R9, and is further connected to an output of the operational amplifier OP4 via the resistance R8.

The filter circuit includes resistances R4 to R7, a capacitive element CP2, and an operational amplifier OP3. A positive phase input (+) of the operational amplifier OP3 is connected to the ground voltage Vs via the resistance R7, and is supplied with an output signal from the gain circuit via the capacitive element CP2. Further, an inverting input (−) of the operational amplifier OP3 is supplied to the ground voltage Vs via the resistance R6, and is further connected to the output of the operational amplifier via the resistance R5. Further, the output of the operational amplifier OP3 is connected to an input of the filter circuit via the resistance R4.

The rectifier circuit includes resistances R1 to R3, an operational amplifier OP2, and a diode D. A positive phase input (+) of the operational amplifier is connected to the ground voltage Vs via the resistance R3, and an inverting input (−) of the operational amplifier OP2 is supplied with an output from the filter circuit via the resistance R2, and further supplied with an output of the rectifier circuit via the resistance R1. An output of the operational amplifier OP2 is output via the diode D.

The integrating circuit includes a capacitive element CP1, a switch SW13 to receive the reset signal rst as the switch control signal, and an operational amplifier OP1. A positive phase input (+) of the operational amplifier is connected to the ground voltage Vs, and the inverting input (−) is connected to the output of the integrating circuit via the capacitive element CP1. Further, the switch SW13 is connected between the output and input of the integrating circuit.

Figure 34:
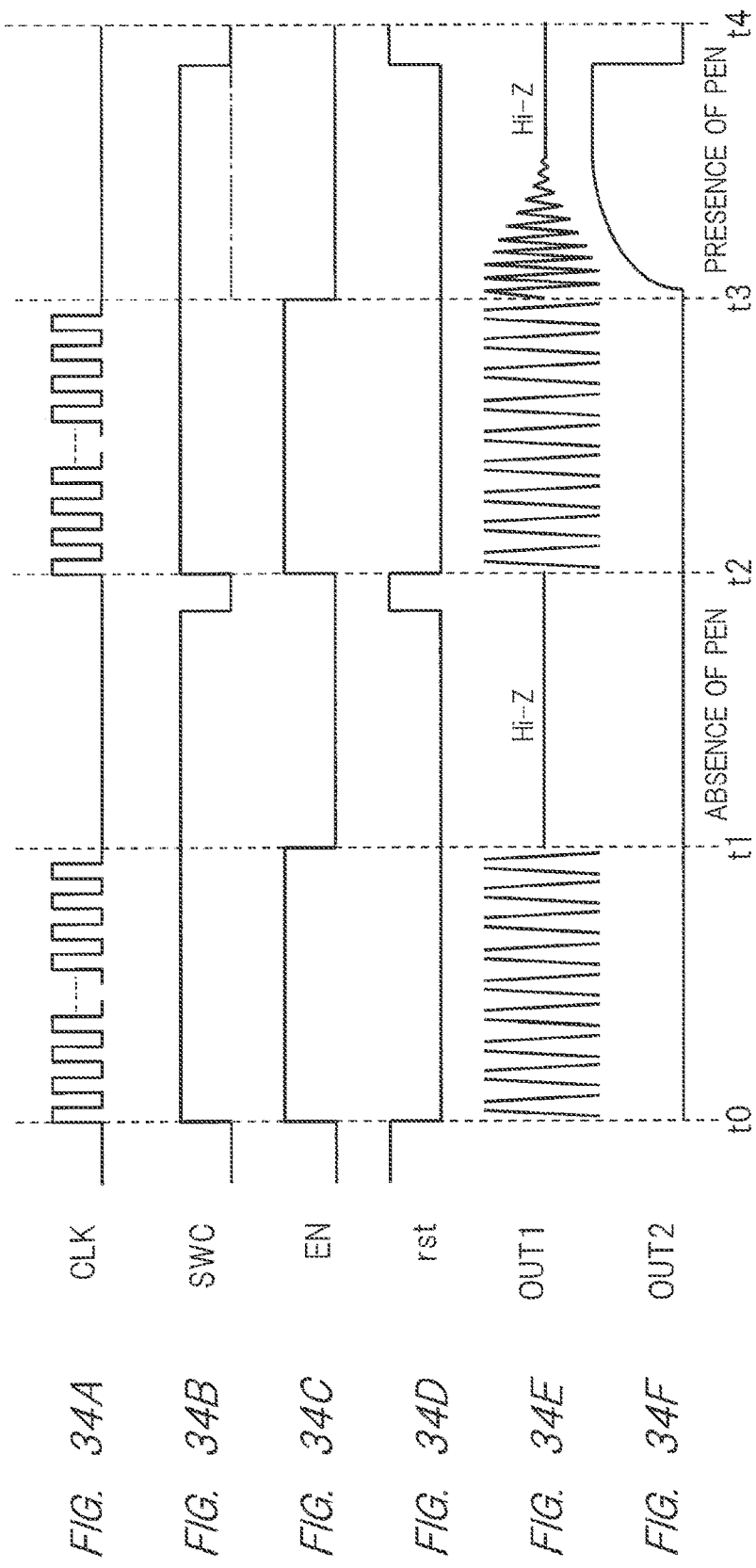
FIGS. 34A to 34F are waveform diagrams illustrating an operation of the liquid crystal display device according to the tenth embodiment.

FIGS. 34A to 34F are waveform diagrams illustrating operations of the magnetic field detection circuit illustrated in FIG. 33. In FIGS. 34A to 34F, the horizontal axis represents time, and the vertical axis represents a voltage. FIG. 34A illustrates the waveform of the coil clock signal CCLK, FIG. 34B illustrates the waveform of the switch control signal SWC, and FIG. 34C illustrates the waveform of the enable signal EN. Further, FIG. 34D illustrates the waveform of the reset signal rst, FIG. 34E illustrates the waveform of an output OUT1 of the gain circuit, and FIG. 34F illustrates the waveform of an output OUT2 of the integrating circuit.

FIGS. 34A to 34F illustrate the operations during the magnetic field touch detection, and do not illustrate operations during the electric field touch detection and the display period.

First, when the reset signal rst is set to a low level at time t0, the reset is released. At this time, the microcontroller MCU sets the enable signal EN to a high level. Accordingly, the coil clock signal CCLK is supplied from the buffer circuit BF to the node n4 via the resistance R11. At this time, the microcontroller MCU outputs the switch control signal SWC such that all the switches SWRL corresponding to the coils Y(0) to Y(p), for example, are set to on-states. Accordingly, the coil clock signal CCLK supplied to the node n4 is supplied to one end portion of each of the coils Y(0) to Y(p), as the magnetic field drive signal.

The coil clock signal CCLK supplied to the node n4 is supplied also to the gain circuit. The output OUT1 of the gain circuit is changed according to a voltage change of the coil clock signal CCLK, and thus, is changed as illustrated in FIG. 34E. The output OUT1 of the amplification circuit is supplied to the rectifier circuit via the filter circuit, and the rectified output is supplied to the integrating circuit. A voltage of the node n4 is periodically changed between time t0 and time t1, but is not changed in terms of an envelope curve, and thus, the output of the integrating circuit becomes a constant value.

The microcontroller MCU sets the enable signal EN to a low level at time t1. Accordingly, the node n4 is set to a high-impedance state (Hi-Z). Further, the microcontroller MCU forms the switch control signal SWC at time t1 such that the switch SWRL corresponding to the coil Y(n−1) is maintained at an on-state, and the other switches SWRL are set to off-states, for example. Accordingly, the other end portion of the coil Y(n−1) is maintained in the state of being connected to the node n4, and the other coils are separated from the node n4. In the examples of FIGS. 34A to 34F, the pen is not close to the coil Y(n−1) between time t1 and time t2, and thus, the magnetic field energy is not applied from the pen to the coil Y(n−1). Thus, the output OUT2 of the integrating circuit is not changed.

The microcontroller MCU once sets the reset signal rst to a high level and sets all the switch control signals SWCs to low levels prior to proceeding to the time t2. Accordingly, the reset signal rst is set to a low level again after performing the reset, and the reset is released. The operation performed from times t2 to t3 is the same as that from times t0 to t1.

The microcontroller MCU forms the switch control signal SWC at time t3 such that the switch SWRL corresponding to the coil Y(n) is maintained at an on-state, and the switches SWRL corresponding to the other coils are set to off-states, for example. In FIG. 34D, the switch control signal SWC to be supplied to the switch SWRL corresponding to the coil Y(n) is drawn by a solid line, and the switch control signal SWC to be supplied to the other switches SWRL is drawn by a one-dot chain line (from time t3 to time t4).

Further, the microcontroller MCU sets the enable signal EN to a low level at time t3. Accordingly, the node n4 is set to a high-impedance state. Since the pen is present in the vicinity of the coil Y(n) at this time, the stored magnetic field energy, which has been applied from the coil Y(n) to the coil and the capacitive element C (FIG. 2) inside the pen between time t2 and time t3, is applied from the pen to the coil Y(n) from time t3.

As a result, the output OUT1 of the gain circuit is oscillated and attenuated as illustrated in FIG. 34E. That is, the voltage is attenuated in terms of an envelope curve. Since the output OUT1 of the gain circuit is oscillated and attenuated from time t3, and the output OUT2 of the integrating circuit gradually increases. The microcontroller MCU converts the output OUT2 of the integrating circuit into a digital signal, and determines that the pen is present. At this time, the microcontroller MCU is capable of grasping a position of the selected coil among the coils Y(0) to Y(p) by setting the switch control signal SWC to a high level, and thus, it is possible to determine a position at which the pen is present, that is, a position touched by the pen, a writing pressure of the pen, and the like from a value of the digital signal obtained by the conversion and a grasped position of the coil.

It is possible to determine the presence or absence of the pen, the writing pressure, and the like by repeating the above-described operations. Although the description has been given by exemplifying the coils Y(0) to Y(p), the same operation is performed regarding the coils X(0) to X(p). Accordingly, it is also possible to obtain a coordinate of a position at which the pen is present.

In the tenth embodiment, the resistance R9 of the gain circuit may be connected to the ground voltage Vs via a switch which is controlled by the reset signal rst. In this manner, it is possible to achieve the reduction in power consumption. Further, the resistance R11 is provided to limit the current when the clock signal CLK is supplied. Thus, the resistance R11 is not necessarily provided in a case where the resistance of the coil is relatively high.

Further, although the description has been given such that the switches SWRL corresponding to the respective coils Y(0) to Y(p) are set to on-states at time t0 and time t2, and thereafter, the switches SWRL corresponding to the respective predetermined coils Y(n−1) and Y(n) are maintained at the on-states, the other switches SWRL are set to off-states, it may be configured such that the predetermined coils Y(n−1) and Y(n) are set to on-states, and maintained at the on-states at each of time t0 and time t2, until the reset signal rst is changed to a high level.

Eleventh Embodiment

Figure 35:
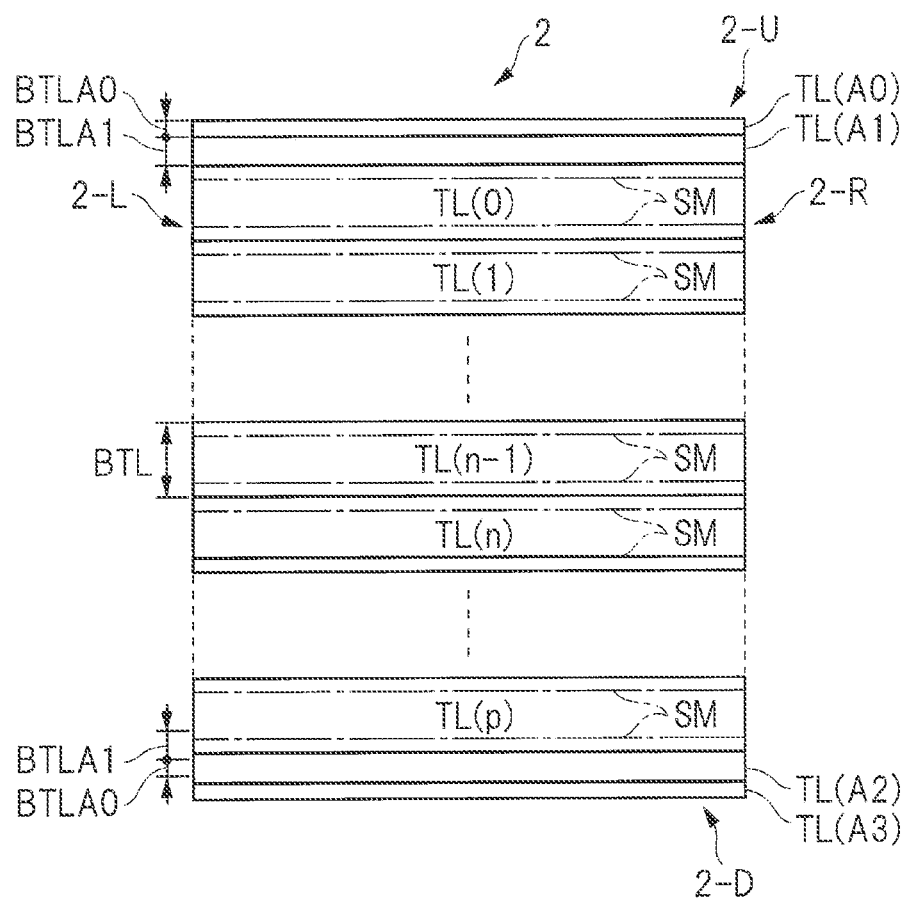
FIG. 35 is a plan view illustrating a configuration of a liquid crystal display device according to an eleventh embodiment.

FIG. 35 is a schematic plan view illustrating a configuration of a drive electrode in the display area 2 of a liquid crystal display device according to an eleventh embodiment. The drive electrodes TL(0) to TL(p) are arranged in parallel to each other between the sides 2-U and 2-D of the display area 2 in the display area 2. Dummy drive electrodes TL(A0) and TLK(A1) are provided between the side 2-U and the drive electrode TL(0), and dummy drive electrodes TL(A2) and TL(A3) are provided between the side 2-D and the drive electrode TL(p) in the eleventh embodiment. These dummy drive electrodes TL(A0) to TL(A3) are also arranged to be parallel with the drive electrodes TL(0) to TL(p). Incidentally, a reference sign SM represents the auxiliary electrode in FIG. 35, and the auxiliary electrode is electrically connected to the drive electrode as already described above.

The dummy drive electrodes TL(A0) to TL(A3) are physically separated from the drive electrodes TL(0) to TL(p), and each of widths BTLA0 and BTLA1 of the dummy drive electrodes TL(A0) to TL(A3) is set to be narrower than each width BTL of the drive electrodes TL(0) to TL(p). Here, the width means a length of the drive electrode in a direction orthogonal (crossing) to the sides 2-U and 2-D. The widths BTLA1 of the dummy drive electrodes TL(A1) and TL(A2), which are arranged to be close to the drive electrodes TL(0) to TL(p), are set to be wider than the widths BTLA0 of the dummy drive electrodes TL(A0) and TL(A3), which are arranged to be distant from the drive electrodes TL(0) to TL(p), although not particularly limited.

For example, the coil of a two-turn winding is formed at the time of magnetic field touch detection in the sixth embodiment that has been described above. A coil is formed using the dummy drive electrodes TL(A0) and TL(A1) as the winding in the eleventh embodiment, in a case where a magnetic field is generated in the group TLG(0) of the drive electrodes including the drive electrode TL(0) which is the closest to the side 2-U of the display area 2. Further, a coil is formed using the dummy drive electrodes TL(A2) and TL(A3) as the winding, in a case where a magnetic field is generated in the group TLG(p) of the drive electrodes including the drive electrode TL(p) which is the closest to the side 2-D of the display area 2. That is, the dummy drive electrodes TL(A0) and TL(A1) are used as two drive electrodes among four drive electrodes arranged across the group TLG(0), and the dummy drive electrodes TL(A2) and TL(A3) are used as two drive electrodes among four drive electrodes arranged across the group TLG(p).

Accordingly, it is possible to detect the pen even in the area close to the sides 2-U and 2-D of the display area 2. Further, it is possible to reduce the area where the detection accuracy by the pen is degraded by narrowing the widths of the dummy drive electrodes TL(A0) to TL(A3). Incidentally, the auxiliary electrode SM may be provided with respect to each of the dummy drive electrodes TL(A0) to TL(A3), although not illustrated in FIG. 35. Further, the widths of the dummy drive electrodes TL(A0) to TL(A3) may be the same with each other, or may be different from each other.

The drive electrode to which the display drive signal is supplied in the display period is configured using the plurality of drive electrodes TL(0) to TL(p) in the above-described embodiments. The coil is formed, using these drive electrode as the winding, in the magnetic field touch detection. Further, the coil is formed, using the signal lines SL(0) to SL(p) for transmitting the image signal, in the magnetic field touch detection during the display period. Here, the signal lines SL(0) to SL(p) are configured using the wirings formed in the second wiring layer 603 which is a lower layer than the third wiring layer 605 to form the drive electrodes TL(0) to TL(p), as illustrated in FIG. 9. Thus, in a case where the drive electrode is configured using one electrode, when a magnetic field is generated by the coil formed using the signal lines, eddy current is generated in the drive electrode by the generated magnetic field. Since the magnetic field, which is generated in the coil formed using the signal lines, generates the eddy current, the magnetic field is consumed, and the amount of the magnetic field reaching the pen is reduced. Similarly, the magnetic field is generated in the pen, and the amount of the magnetic field, which reaches the coil formed using the signal lines, is also reduced.

On the other hand, it is possible to narrow the area to generate the eddy current in a case where the drive electrode is configured using the plurality of drive electrodes, and it is possible to reduce the decrease of the magnetic field through the drive electrodes. When the drive electrode is configured using the plurality of drive electrodes, each resistance of the drive electrodes increases, but it is possible to reduce the resistance of the drive electrodes (including the auxiliary electrodes) at the time of forming the coil by connecting the auxiliary electrodes to the drive electrodes and also using the auxiliary electrodes as the winding of the coil, as described in the embodiments, and accordingly, it is possible to suppress the decrease of the magnetic field to be generated.

Although the description has been given by exemplifying the liquid crystal display device with a touch detection function in the first to eleventh embodiments, the invention is not limited thereto. That is, the invention may be applied to a touch detection device. In this case, the above-described area of the display area 2 is considered as an active area (first area) of the touch detection device, and the peripheral area on the outer side of the display area 2 is considered as a non-active area (second area) of the touch detection device. The touch detection device is provided with the above-described drive electrodes TL(0) to TL(p) as first wirings, and the above-described detection electrodes RL(0) to RL(p) as second wirings. The first wirings are electrically connected to each other by the changeover adjustment circuits SC-R and SC-L arranged in the non-active area to form a coil using the first wirings as a winding, at the time of magnetic field touch detection, and a magnetic field drive signal is supplied to the first wirings. On the other hand, an electric field drive signal is supplied to the first wirings, and a detection signal based on a change of an electric field is transmitted using the second wirings, at the time of electric field touch detection. Accordingly, the first wirings are used in common at the time of the magnetic field touch detection and at the time of the electric field touch detection.

In the category of the idea of the present invention, a person with ordinary skill in the art can conceive various modification examples and revised examples, and such modification examples and revised examples are also deemed to belong to the scope of the present invention.

For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

For example, the description has been given regarding a case where the common electrodes TL(0) to TL(p) and the signal lines SL(0) to SL(p) extend in the column direction and are disposed in the row direction in the embodiments, but the row direction and the column direction are changed depending on a point of view. A case where the common electrodes TL(0) to TL(p) and the signal lines SL(0) to SL(p) extend in the row direction and are disposed in the column direction, is also included in the scope of the invention.

What is claimed is:

1. A display device comprising:
a pixel array which includes a plurality of pixels arranged in a matrix form;
a plurality of scan lines which are arranged in each row of the pixel array;
a plurality of signal lines which are arranged in each column of the pixel array;
a plurality of common electrodes configured to generate electric fields between the common electrodes and a plurality of pixel electrodes in a display period;
an adjustment circuit coupled to each of the plurality of common electrodes forming closed loop winding coils that generate a magnetic field in a first touch detection period at a first time in a single frame, and at a second time in the single frame forming open loop electrodes that generate an electric field in a second touch detection period, wherein at a third time in the single frame, the plurality of common electrodes generate the electric fields in the single frame between the common electrodes and the plurality of pixel electrodes;
a first driving wiring configured to drive the closed loop winding coils in the first touch detection period; and
a second driving wiring configured to drive the open loop electrodes in the second touch detection period.

2. The display device according to claim 1,
wherein each of the plurality of common electrodes includes a transparent electrode and an auxiliary electrode coupled with each other.

3. The display device according to claim 2, further comprising:
a first wiring layer, a second wiring layer and a third wiring layer that are electrically separated from each other,
wherein each of the plurality of pixels includes a thin film transistor coupled to a corresponding scan line in the plurality of pixels, to a corresponding signal line in the plurality of signal lines and to a corresponding pixel electrode in the plurality of pixel electrodes, and wherein the thin film transistor is controlled by a scan signal on the corresponding scan line so as to provide an image signal on the corresponding signal line to the corresponding pixel electrode in the display period, and
wherein each of the plurality of scan lines is formed using each of a plurality of wirings of the first wiring layer, each of the plurality of signal lines is formed using each of a plurality of wirings of the second wiring layer, and a plurality of auxiliary electrodes including the auxiliary electrode are formed using each of a plurality of wirings of the third wiring layer, and
the plurality of the wirings of the third wiring layer are electrically connected to each other by each of the plurality of wirings of the first wiring layer or the second wiring layer in the adjustment circuit to form the closed loop winding coils or the open loop electrodes.

4. The display device according to claim 2,
wherein a part of each of the closed loop winding coils overlaps with each other.

5. The display device according to claim 3,
wherein the auxiliary electrode has a smaller resistance value than each of the plurality of transparent electrodes, and
the first electrode and the plurality of second electrodes are electrically connected to each other.

6. The display device according to claim 4,
wherein the display device is provided with a control circuit which controls such that a display of the image and a detection of an external proximity object are alternately performed in the single frame period, and
the control circuit supplies a magnetic field drive signal to the closed loop winding coils via the first driving wiring in the first touch detection period, performs a detection of the external proximity object using the magnetic field, as the detection of the external proximity object in the single frame period, when the external proximity object is detected, and performs a detection of the external proximity object using the electric field, as the detection of the external proximity object in the single frame period, when the external proximity object is not detected in the detection by the magnetic field.

7. The display device according to claim 6,
wherein the control circuit sets each of the plurality of scan lines, each of the plurality of signal lines, and common electrodes to which the magnetic field drive signal is not supplied to a high-impedance state, when the magnetic field drive signal is supplied to the closed loop winding coils.

8. A display device comprising:
a pixel array which includes a plurality of pixels arranged in a matrix form;
a plurality of scan lines which are arranged in each row of the pixel array;
a plurality of signal lines which are arranged in each column of the pixel array;
a plurality of common electrodes configured to generate electric fields between the common electrodes and a plurality of pixel electrodes in a display period,
an adjustment circuit coupled to each of the plurality of common electrodes forming closed loop winding coils that generate a magnetic field in a first touch detection period at a first time in a single frame, and at a second time in the single frame forming open loop electrodes that generate an electric field in a second touch detection period, wherein at a third time in the single frame, the plurality of common electrodes generate the electric fields in the single frame between the common electrodes and the plurality of pixel electrodes;
a first driving wiring configured to drive the closed loop winding coils in the first touch detection period to generate the magnetic field; and
a second driving wiring configured to drive the open loop electrodes in the second touch detection period,
wherein the plurality of common electrodes are divided into a plurality of groups each of which has common electrodes at a time of detecting an external proximity object,
the closed loop winding coils are formed, in a first group among the plurality of groups, using the common electrodes which are included in a second group and a third group adjacent to the first group, at the time of detecting the external proximity object, and
an electric field drive signal for generating the electric field is supplied via the second driving wiring to the common electrodes included in the first group to detect a change of the electric field caused by the external proximity object.

9. The display device according to claim 8,
wherein the first group is arranged between the second group and the third group, and each of the first group, the second group and the third group includes the plurality of common electrodes.

* * * * *